(12) United States Patent
Ikriannikov et al.

(10) Patent No.: US 11,862,389 B1
(45) Date of Patent: Jan. 2, 2024

(54) MAGNETIC DEVICES FOR POWER CONVERTERS WITH LIGHT LOAD ENHANCERS

(71) Applicant: VOLTERRA SEMICONDUCTOR LLC, San Jose, CA (US)

(72) Inventors: Alexandr Ikriannikov, Castro Valley, CA (US); Anthony J. Stratakos, Kentfield, CA (US)

(73) Assignee: VOLTERRA SEMICONDUCTOR LLC, San Jose, CA (US)

( * ) Notice: Subject to any disclaimer, the term of this patent is extended or adjusted under 35 U.S.C. 154(b) by 144 days.

(21) Appl. No.: 17/373,575

(22) Filed: Jul. 12, 2021

Related U.S. Application Data

(60) Division of application No. 16/360,612, filed on Mar. 21, 2019, now Pat. No. 11,062,830, which is a (Continued)

(51) Int. Cl.
| | |
|---|---|
| *H01F 27/28* | (2006.01) |
| *H01F 3/10* | (2006.01) |
| *H01F 27/38* | (2006.01) |
| *H02M 1/44* | (2007.01) |
| *H02M 3/155* | (2006.01) |
| *H01F 38/08* | (2006.01) |

(Continued)

(52) U.S. Cl.
CPC .............. *H01F 3/10* (2013.01); *H01F 27/38* (2013.01); *H01F 38/08* (2013.01); *H02M 1/44* (2013.01); *H02M 3/155* (2013.01); *H01F 2038/026* (2013.01); *H02M 1/0032* (2021.05); *Y02B 70/10* (2013.01)

(58) Field of Classification Search
CPC . H01F 3/10; H01F 27/38; H01F 38/08; H01F 2038/026; H01F 5/003; H01F 17/0006; H01F 27/2804; H02M 1/44; H02M 3/155; H02M 1/0032; Y02B 70/10
See application file for complete search history.

(56) References Cited

U.S. PATENT DOCUMENTS

| | | | |
|---|---|---|---|
| 2,170,446 A | 8/1939 | Edwards | |
| 2,212,543 A | 8/1940 | Jovy | |

(Continued)

FOREIGN PATENT DOCUMENTS

| | | |
|---|---|---|
| EP | 0 755 060 A1 | 1/1997 |
| JP | 2010-0050160 A | 3/2010 |
| WO | 2006/026674 A2 | 3/2006 |

OTHER PUBLICATIONS

Sun et al. (2007) "Light Load Efficiency Improvement for Laptop VRs," In; The Proceedings of the Twenty Second Annual IEEE Applied Power Electronics Conference, 2007. pp. 120-126.

(Continued)

*Primary Examiner* — Mang Tin Bik Lian
(74) *Attorney, Agent, or Firm* — Cozen O'Connor

(57) ABSTRACT

A magnetic device includes a magnetic core, a plurality of first windings forming respective first winding turns, and a second winding forming a second winding turn. Each first winding turn is within the second winding turn, as seen when the magnetic device is viewed cross-sectionally in a first direction. Yet another magnetic device includes a magnetic core, one or more first windings, and one or more second windings magnetically isolated from the one or more first windings.

8 Claims, 65 Drawing Sheets

Related U.S. Application Data division of application No. 15/632,660, filed on Jun. 26, 2017, now abandoned, which is a division of application No. 14/537,263, filed on Nov. 10, 2014, now Pat. No. 9,691,538, which is a continuation-in-part of application No. 13/599,677, filed on Aug. 30, 2012, now abandoned.

(51) Int. Cl.
*H01F 38/02* (2006.01)
*H02M 1/00* (2006.01)

(56) References Cited

U.S. PATENT DOCUMENTS

| | | | |
|---|---|---|---|
| 2,298,935 A | 10/1942 | Freeman | |
| 2,403,393 A | 7/1946 | Peterson | |
| 3,447,068 A | 5/1969 | Hart | |
| 3,671,847 A | 6/1972 | Shibano | |
| 4,223,360 A | 9/1980 | Sansom et al. | |
| 4,249,229 A | 2/1981 | Hester | |
| 4,488,136 A | 12/1984 | Hansen et al. | |
| 4,800,479 A | 1/1989 | Bupp | |
| 5,023,578 A | 6/1991 | Kaneko et al. | |
| 5,103,201 A | 4/1992 | Schmeller | |
| 5,161,098 A | 11/1992 | Balakrishnan | |
| 5,177,460 A | 1/1993 | Dhyanchand et al. | |
| 5,177,675 A | 1/1993 | Archer | |
| 5,182,535 A | 1/1993 | Dhyanchand | |
| 5,225,971 A | 7/1993 | Spreen | |
| 5,353,001 A | 10/1994 | Meinel et al. | |
| 5,420,558 A * | 5/1995 | Ito | H01F 17/0006 336/200 |
| 5,436,818 A | 7/1995 | Barthold | |
| 5,469,334 A | 11/1995 | Balakrishnan | |
| 5,481,238 A | 1/1996 | Carsten | |
| 5,525,951 A | 6/1996 | Sunano et al. | |
| 5,532,667 A * | 7/1996 | Haertling | H05K 1/165 336/200 |
| 5,565,837 A | 10/1996 | Godek et al. | |
| 5,594,402 A | 1/1997 | Krichtafovitch et al. | |
| 5,631,822 A | 5/1997 | Silberkleit et al. | |
| 5,642,249 A | 6/1997 | Kuznetsov | |
| 5,731,666 A | 3/1998 | Folker et al. | |
| 5,737,203 A | 4/1998 | Barrett | |
| 5,847,518 A | 12/1998 | Ishiwaki | |
| 5,909,069 A | 6/1999 | Allen et al. | |
| 5,939,966 A | 8/1999 | Shin'ei | |
| 6,060,977 A | 5/2000 | Yamamoto et al. | |
| 6,114,932 A | 9/2000 | Wester et al. | |
| 6,147,584 A | 11/2000 | Shin'el | |
| 6,304,460 B1 | 10/2001 | Cuk | |
| 6,307,757 B1 | 10/2001 | Porter et al. | |
| 6,348,848 B1 | 2/2002 | Herbert | |
| 6,362,986 B1 | 3/2002 | Schultz et al. | |
| 6,377,155 B1 | 4/2002 | Allen et al. | |
| 6,388,896 B1 | 5/2002 | Cuk | |
| 6,420,953 B1 | 7/2002 | Dadafshar | |
| 6,462,964 B2 | 10/2002 | Porter et al. | |
| 6,477,414 B1 | 11/2002 | Silvian | |
| 6,501,193 B1 | 12/2002 | Krugly | |
| 6,545,450 B1 | 4/2003 | Ledenev et al. | |
| 6,583,992 B2 | 6/2003 | Porter et al. | |
| 6,590,786 B2 | 7/2003 | Gurov | |
| 6,590,791 B1 | 7/2003 | Zhou et al. | |
| 6,686,727 B2 | 2/2004 | Ledenev et al. | |
| 6,696,823 B2 | 2/2004 | Ledenev et al. | |
| 6,714,428 B2 | 3/2004 | Huang et al. | |
| 6,757,184 B2 | 6/2004 | Wei et al. | |
| 6,784,644 B2 | 8/2004 | Xu et al. | |
| 6,791,444 B1 | 9/2004 | Masuda et al. | |
| 6,856,230 B2 | 2/2005 | Lu | |
| 6,867,678 B2 | 3/2005 | Yang | |
| 6,979,980 B1 | 12/2005 | Hesterman et al. | |
| 6,980,077 B1 | 12/2005 | Chandrasekaran et al. | |
| 7,030,512 B2 | 4/2006 | Krein | |
| 7,110,266 B1 | 9/2006 | Porter et al. | |
| 7,148,661 B2 | 12/2006 | Trainer et al. | |
| 7,187,263 B2 | 3/2007 | Vinciarelli | |
| 7,199,695 B1 | 4/2007 | Zhou et al. | |
| 7,239,530 B1 | 7/2007 | Djekic et al. | |
| 7,248,139 B1 | 7/2007 | Podlisk et al. | |
| 7,259,648 B2 | 8/2007 | Matsutani et al. | |
| 7,280,025 B2 | 10/2007 | Sano | |
| 7,292,128 B2 | 11/2007 | Hanley | |
| 7,317,305 B1 | 1/2008 | Stratakos et al. | |
| 7,352,269 B2 | 4/2008 | Li et al. | |
| 7,423,894 B2 | 9/2008 | Ilic | |
| 7,425,883 B2 | 9/2008 | Matsutani et al. | |
| 7,492,135 B2 | 2/2009 | Saeki et al. | |
| 7,498,920 B2 | 3/2009 | Sullivan et al. | |
| 7,504,808 B2 | 3/2009 | Schrom et al. | |
| 7,525,406 B1 | 4/2009 | Cheng | |
| 7,525,408 B1 | 4/2009 | Li et al. | |
| 7,567,163 B2 | 7/2009 | Dadafshar et al. | |
| 7,649,434 B2 | 1/2010 | Xu et al. | |
| 7,746,209 B1 | 6/2010 | Li et al. | |
| 7,772,955 B1 | 8/2010 | Li et al. | |
| 7,864,016 B1 | 1/2011 | Li et al. | |
| 7,893,806 B1 | 2/2011 | Li et al. | |
| 7,965,165 B2 | 6/2011 | Ikriannikov et al. | |
| 7,994,888 B2 | 8/2011 | Ikriannikov | |
| 8,040,212 B2 | 10/2011 | Ikriannikov | |
| 8,102,233 B2 | 1/2012 | Ikriannikov | |
| 8,174,348 B2 | 5/2012 | Ikriannikov | |
| 8,237,530 B2 | 8/2012 | Ikriannikov | |
| 8,294,544 B2 | 10/2012 | Ikriannikov et al. | |
| 8,299,885 B2 | 10/2012 | Ikriannikov et al. | |
| 8,330,567 B2 | 12/2012 | Ikriannikov et al. | |
| 8,350,658 B1 | 1/2013 | Stratakos et al. | |
| 8,362,867 B2 | 1/2013 | Ikriannikov | |
| 8,416,043 B2 | 4/2013 | Ikriannikov | |
| 8,487,604 B2 | 7/2013 | Ikriannikov et al. | |
| 8,638,187 B2 | 1/2014 | Ikriannikov | |
| 8,674,798 B2 | 3/2014 | Ikriannikov | |
| 8,674,802 B2 | 3/2014 | Ikriannikov | |
| 8,716,991 B1 | 5/2014 | Ikriannikov | |
| 8,772,967 B1 | 7/2014 | Ikriannikov et al. | |
| 8,779,885 B2 | 7/2014 | Li et al. | |
| 8,786,395 B2 | 7/2014 | Li et al. | |
| 8,791,775 B2 * | 7/2014 | Liu | H01L 28/10 333/204 |
| 8,836,461 B2 | 9/2014 | Li et al. | |
| 8,836,463 B2 | 9/2014 | Ikriannikov et al. | |
| 8,847,722 B2 | 9/2014 | Li et al. | |
| 2002/0067234 A1 | 6/2002 | Kung | |
| 2002/0093413 A1 | 7/2002 | Shin'ei | |
| 2004/0160298 A1 | 8/2004 | Hsu et al. | |
| 2005/0024179 A1 | 2/2005 | Chandrasekaran et al. | |
| 2006/0089022 A1 | 4/2006 | Sano | |
| 2006/0145800 A1 | 7/2006 | Dadafshar et al. | |
| 2006/0145804 A1 | 7/2006 | Matsutani et al. | |
| 2006/0158297 A1 | 7/2006 | Sutardja | |
| 2006/0197510 A1 | 9/2006 | Chandrasekaran | |
| 2007/0057755 A1 * | 3/2007 | Suzuki | H01F 17/0013 336/200 |
| 2007/0076453 A1 | 4/2007 | Schultz et al. | |
| 2007/0097571 A1 | 5/2007 | Dinh et al. | |
| 2007/0175701 A1 | 8/2007 | Xu et al. | |
| 2007/0176726 A1 | 8/2007 | Xu et al. | |
| 2007/0262840 A1 | 11/2007 | Matsutani et al. | |
| 2008/0012674 A1 | 1/2008 | Sano et al. | |
| 2008/0012679 A1 * | 1/2008 | Okabe | H01F 41/046 336/200 |
| 2008/0024259 A1 | 1/2008 | Chandrasekaran et al. | |
| 2008/0150666 A1 | 6/2008 | Chandrasekaran et al. | |
| 2008/0205098 A1 | 8/2008 | Xu et al. | |
| 2008/0211613 A1 | 9/2008 | Lin et al. | |
| 2008/0303624 A1 | 12/2008 | Yamada et al. | |
| 2009/0001945 A1 | 1/2009 | Wickersham et al. | |
| 2009/0167455 A1 * | 7/2009 | Liu | H03H 7/42 333/167 |
| 2009/0231081 A1 | 9/2009 | Ikriannikov et al. | |
| 2010/0007453 A1 | 1/2010 | Yan et al. | |

(56) References Cited

U.S. PATENT DOCUMENTS

| | | |
|---|---|---|
| 2010/0007457 A1 | 1/2010 | Yan et al. |
| 2010/0013587 A1 | 1/2010 | Yan et al. |
| 2010/0026443 A1* | 2/2010 | Yan ............... H01F 17/0013 336/234 |
| 2010/0271161 A1 | 10/2010 | Yan et al. |
| 2010/0295521 A1 | 11/2010 | Odaohhara |
| 2011/0032068 A1 | 2/2011 | Ikriannikov |
| 2011/0163824 A1* | 7/2011 | Kawano ............ H01F 21/12 333/17.3 |
| 2011/0279100 A1 | 11/2011 | Ikriannikov |
| 2012/0056704 A1 | 3/2012 | Nagano et al. |
| 2012/0092908 A1* | 4/2012 | Piotr ............... H01F 30/02 363/71 |
| 2012/0098632 A1 | 4/2012 | Markowski |
| 2012/0319478 A1 | 12/2012 | Gentchev et al. |
| 2013/0009737 A1 | 1/2013 | Rocke et al. |
| 2013/0082814 A1 | 4/2013 | Markowski |
| 2013/0127434 A1 | 5/2013 | Ikriannikov |
| 2014/0062446 A1 | 3/2014 | Ikriannikov |
| 2014/0152350 A1 | 6/2014 | Ikriannikov et al. |
| 2014/0266086 A1 | 9/2014 | Ikriannikov |

OTHER PUBLICATIONS

Office Action corresponding to U.S. Appl. No. 13/599,677, dated Jun. 16, 2015.

Office Action corresponding to U.S. Appl. No. 13/599,677, dated Sep. 24, 2015.

Office Action corresponding to U.S. Appl. No. 13/599,677, dated Jan. 14, 2016.

Office Action corresponding to U.S. Appl. No. 14/537,263, dated Sep. 19, 2016.

Restriction Requirement corresponding to U.S. Appl. No. 14/537,263, dated Jul. 11, 2016.

* cited by examiner

MAGNETIC DEVICES FOR POWER CONVERTERS WITH LIGHT LOAD ENHANCERS

RELATED APPLICATIONS

This application is a divisional of U.S. patent application Ser. No. 16/360,612 filed Mar. 21, 2019, which is a divisional of U.S. patent application Ser. No. 15/632,660, filed Jun. 26, 2017, which is a divisional of U.S. patent application Ser. No. 14/537,263, filed Nov. 10, 2014, now U.S. Pat. No. 9,691,538, which is a continuation-in-part of U.S. patent application Ser. No. 13/599,677, filed Aug. 30, 2012. Each of the aforementioned applications are incorporated herein by reference.

BACKGROUND

Switching power converters have many applications. For example, mobile information technology devices, such as mobile telephones, tablet computers, and notebook computers, typically include a number of DC-to-DC switching power converters, such as buck and/or boost DC-to-DC converters, to regulate power and/or to perform voltage level transformation. As another example, stationary computing devices, such as servers and desktop computers, often include an AC-to-DC switching power converter, such as an isolated forward converter, half-bridge converter, or flyback converter, to power the device from an AC power source. Stationary computing devices also typically include one or more DC-to-DC converters to perform local power conversion within the device, such as to transform bulk DC power to a form suitable for powering electronic circuits.

FIG. 1 illustrates a prior-art buck DC-to-DC converter 100, which represents conventional buck converters used in many applications. Converter 100 includes an inductor 102, a switching circuit 104, a controller 106, and a filter capacitor 108. Controller 106 causes transistors 110, 112 of switching circuit 104 to switch between their conductive and non-conductive states to generate a switching waveform, which is filtered by inductor 102 and capacitor 108, and thereby transfer power from an input power port 114 to an output power port 116. Controller 106 is often capable of controlling switching circuit 104 to regulate voltage Vo across output power port 116 and/or current Io delivered to a load (not shown) electrically coupled to output power port 116.

FIG. 2 shows a curve 200 plotting estimated efficiency versus output current Io for DC-to-DC converter 100. As can be seen, converter 100 realizes maximum efficiency at output current magnitude I1. Efficiency drops off somewhat at heavy loads beyond I1. However, efficiency drops off significantly at light loads below I1. Thus, converter 100 is relatively inefficient at light loads.

Efficient operation at light load is important since electronic devices are typically designed to operate in low power states when full functionality is not required. For example, computer microprocessors typically operate in a low power mode, such as a "sleep mode," when the processor is performing little activity. As another example, mobile telephones often operate in a low power standby mode when idle. Many electronic devices will spend much time in a low power state, and light load efficiency is therefore an important factor in device power consumption.

One known technique for improving light load efficiency is to reduce the size of switching transistors, such as transistors 110, 112 in switching circuit 104 (FIG. 1). Reducing transistor size generally reduces transistor parasitic capacitance and transistor driving requirements, thereby reducing switching related losses. Such technique, however, reduces heavy load efficiency, which is unacceptable in many applications where the converter must power heavy, as well as light, loads. It is also known that light load efficiency can sometimes be increased by increasing the value of energy storage inductance, such as by increasing the inductance value of inductor 102 (FIG. 1). However, increasing inductance impairs the converter's transient response, and may also reduce the converter's heavy load efficiency. Accordingly, increasing inductance value is not an acceptable option in many applications.

SUMMARY

In an embodiment, a power converter includes first and second switching sub-converters. The first switching sub-converter is adapted to transfer power from an input power port to an output power port in a first operating mode of the power converter, and the first switching sub-converter is adapted to operate in an inactive mode in a second operating mode of the power converter. The second switching sub-converter is adapted to transfer power from the input power port to the output power port in the second operating mode of the power converter, and the second switching sub-converter is adapted to operate in an inactive mode in the first operating mode of the power converter.

In an embodiment, a power converter includes first and second inductors, first and second control switching devices, and first and second freewheeling devices. The first inductor is electrically coupled to a first switching node, and the first control switching device is electrically coupled between a first power node and the first switching node. The second inductor is electrically coupled to a second switching node, and the second control switching device is electrically coupled between the first power node and the second switching node. The first control switching device is adapted to (1) repeatedly switch between its conductive and non-conductive states in a first operating mode of the power converter, and (2) operate in its non-conductive state in a second operating mode of the power converter. The second control switching device is adapted to (1) operate in its non-conductive state in the first operating mode of the power converter, and (2) repeatedly switch between its conductive and non-conductive states in the second operating mode of the power converter. The first freewheeling device is adapted to provide a path for current flowing through the first inductor when the first control switching device is in its non-conductive state, in the first operating mode of the power converter. The second freewheeling device is adapted to provide a path for current flowing through the second inductor when the second control switching device is in its non-conductive state.

In an embodiment, a power converter includes N first inductors, M second inductors, N first control switching devices, N first freewheeling devices, M second control switching devices, and M second freewheeling devices. N is an integer greater than one, and M is an integer greater than or equal to one and less than or equal to N. Each of the N first control switching devices is electrically coupled between a first power node and a respective one of the N first inductors, and each of the M second control switching devices is electrically coupled between the first power node and a respective one of the M second inductors. Each of the N first control switching devices is adapted to (1) repeatedly switch between its conductive and non-conductive states in a first operating mode of the power converter, and (2) operate in its non-conductive state in a second operating mode of the power converter. Each of the M second control switching devices is adapted to (1) operate in its non-conductive state in the first operating mode of the power converter, and (2) repeatedly switch between its conductive and non-conductive states in the second operating mode of the power converter. Each of the N first freewheeling devices is adapted to provide a path for current flowing through a respective one the N first inductors when the first control switching device electrically coupled to the first inductor is in its non-conductive state, in the first operating mode of the power converter. Each of the M second freewheeling devices is adapted to provide a path for current flowing through a respective one the M second inductors when the second control switching device electrically coupled to the second inductor is in its non-conductive state.

In an embodiment, a method for transferring power from an input power port to an output power port using a first and a second switching sub-converter includes the following steps: (1) in a first operating mode, operating the first switching sub-converter to transfer power from the input power port to the output power port, while operating the second switching sub-converter in an inactive mode, and (2) in a second operating mode, operating the second switching sub-converter to transfer power from the input power port to the output power port, while operating the first switching sub-converter in an inactive mode.

In an embodiment, a magnetic device includes a magnetic core, one or more first windings wound around at least a portion of the magnetic core, and one or more second windings wound around at least a portion of the magnetic core. Each of the one or more first windings forms a respective first turn around a respective first winding center axis, and each of the one or more second windings forms a respective second turn around a common second winding center axis that is orthogonal to each first winding center axis.

In an embodiment, a magnetic device includes a magnetic core, a plurality of first windings forming respective first winding turns around portions of the magnetic core, and a second winding forming a second winding turn around a portion of the magnetic core. Each of the plurality of first winding turns is within the second winding turn, as seen when the magnetic device is viewed cross-sectionally in a first direction.

In an embodiment, a magnetic device includes a magnetic core, one or more first windings wound around portions of the magnetic core, and one or more second windings wound around portions of the magnetic core. The one or more first windings are magnetically isolated from the one or more second windings.

DETAILED DESCRIPTION OF THE EMBODIMENTS

As discussed above, conventional techniques for improving switching power converter light load efficiency generally have undesirable drawbacks. Applicants have discovered, however, that light load efficiency can often be improved by use of a light load enhancer. Unlike the conventional techniques discussed above, use of a light load enhancer typically does not materially degrade heavy load efficiency.

Figure 3:
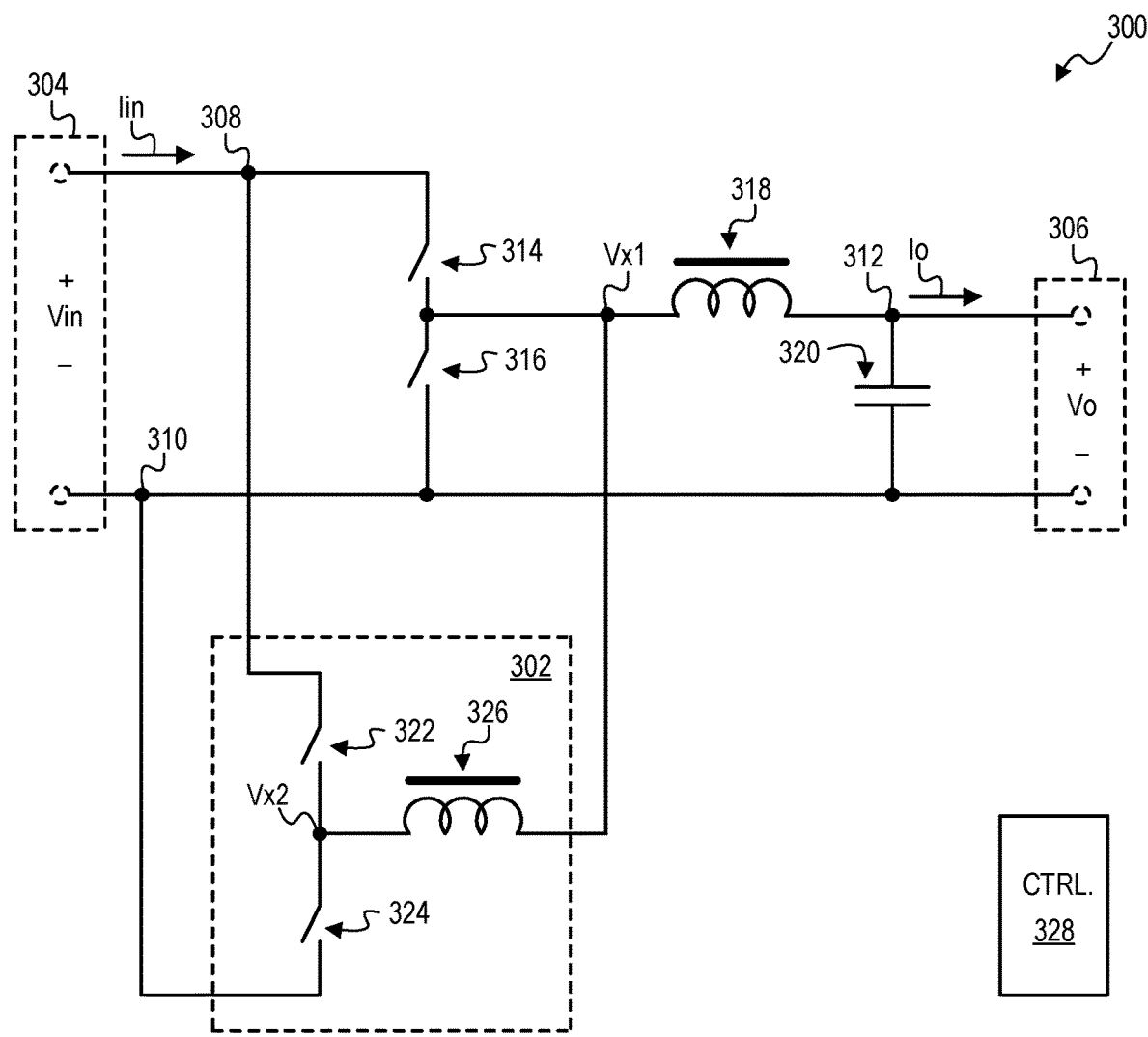
FIG. 3 illustrates a buck DC-to-DC switching power converter including a light load enhancer, according to an embodiment.

One possible application of a light load enhancer is in a buck-type DC-to-DC switching power converter. For example, FIG. 3 illustrates a buck DC-to-DC switching power converter 300 including a light load enhancer 302. As discussed below, light load enhancer 302 operates in certain operating modes of converter 300 to promote efficient light load operation.

Converter 300 includes an input power port 304 for electrically coupling to an input power source (not shown), and an output power port 306 for electrically coupling to a load (not shown). Input power port 304 is electrically coupled across input and common power nodes 308, 310, and output power port 306 is electrically coupled across an output power node 312 and common power node 310. In some embodiments, common power node 310 is electrically coupled to ground, such that common power node 310 is a ground node.

Converter 300 further includes a first control switching device 314, a first freewheeling switching device 316, a first inductor 318, and a capacitor 320. In the context of this disclosure, a switching device includes, but is not limited to, a bipolar junction transistor, a field effect transistor (e.g., a N-channel or P-channel metal oxide semiconductor field effect transistor, a junction field effect transistor, a metal semiconductor field effect transistor), an insulated gate bipolar junction transistor, a thyristor, or a silicon controlled rectifier. Additionally, in the context of this document, a freewheeling device, such as a freewheeling switching device or a freewheeling diode, is a device that performs a freewheeling function. That is, a freewheeling device provides a path for current flowing through one or more inductors when a control switching device electrically coupled to the one or more inductors is in its non-conductive state.

First control switching device 314 is electrically coupled between input power node 308 and a first switching node Vx1, and first freewheeling switching device 316 is electrically coupled between first switching node Vx1 and common power node 310. First inductor 318 is electrically coupled between first switching node Vx1 and output power node 312, and capacitor 320 is electrically coupled between output power node 312 and common power node 310.

Light load enhancer 302 includes a second control switching device 322, a second freewheeling switching device 324, and a second inductor 326. Second control switching device 322 is electrically coupled between input power node 308 and a second switching node Vx2, and second freewheeling switching device 324 is electrically coupled between second switching node Vx2 and common power node 310. Second inductor 326 is electrically coupled between second switching node Vx2 and first switching node Vx1, such that first and second inductors 318, 326 are electrically coupled in series.

First and second inductors 318, 326 are physically separate components in some embodiments. However, in some other embodiments, first and second inductors 318, 326 are part of a common magnetic device, such as discussed below with respect to FIGS. 29-95.

A controller 328 controls operation of switching power converter 300. Although controller 328 is symbolically shown as a single element, in some embodiments, controller 328 encompasses a number of separate elements. For example, in certain embodiments where the switching devices include transistors, controller 328 includes: (1) driver circuitry for causing the transistors to switch between their conductive and non-conductive states, and (2) control logic for controlling the driver circuitry.

Converter 300 has at least a first and a second operating mode. Controller 328 is typically adapted to operate converter 300 in its first operating mode under moderate or heavy load operating conditions, and to operate converter 300 in its second operating mode under light load operating conditions.

Figure 4:
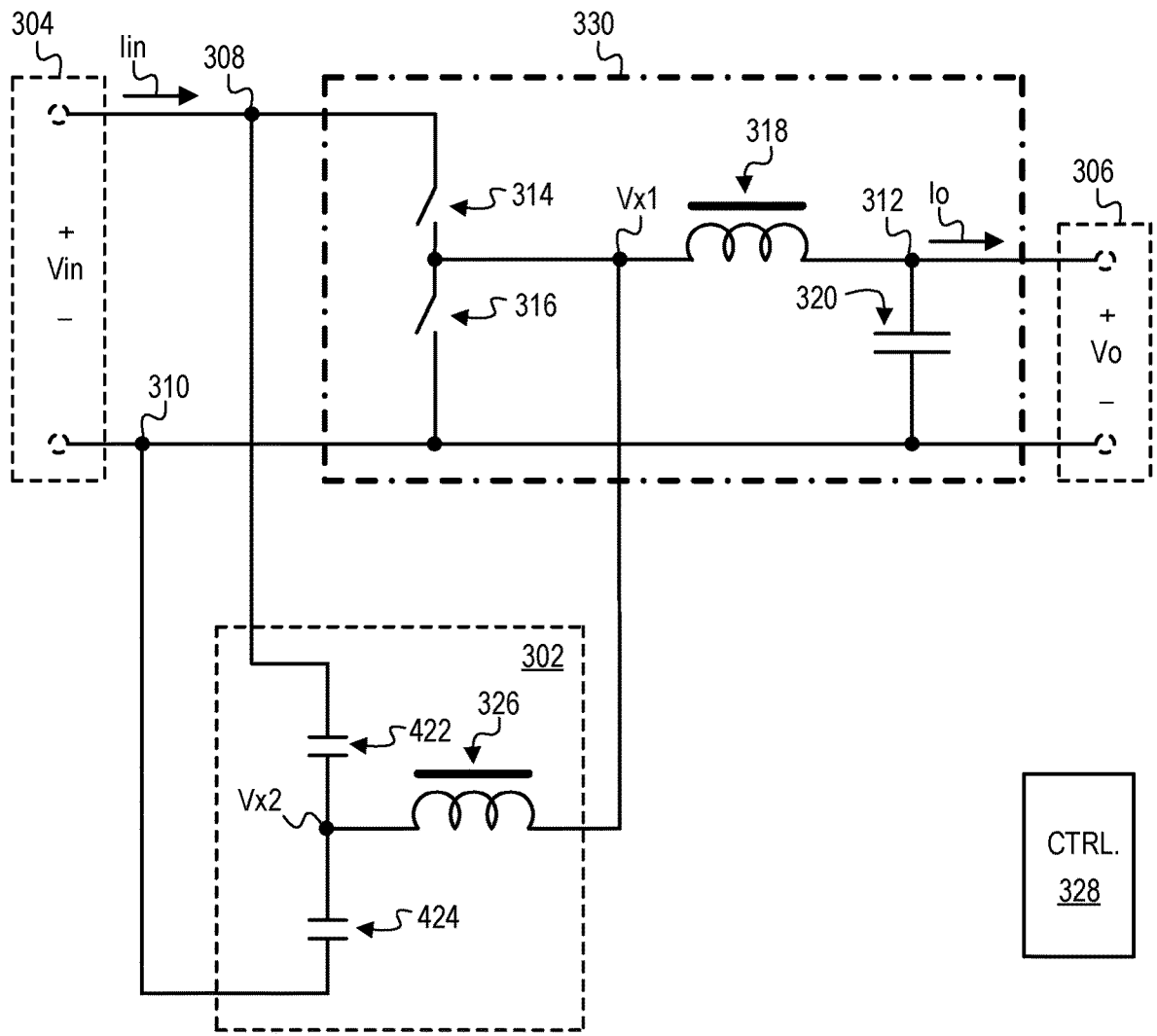
FIG. 4 illustrates operation of the FIG. 3 switching power converter in a first operating mode.

FIG. 4 illustrates operation of converter 300 in its first operating mode. Second switching devices 322, 324 are adapted to operate in their non-conductive states in the first operating mode. Specifically, controller 328 causes second switching devices 322, 324 to remain in their non-conductive states in the first operating mode, thereby causing light load enhancer 302 to be inactive. Accordingly, second switching devices 322, 324 are replaced with capacitors 422, 424 in FIG. 4, to represent that these devices remain in their non-conductive states, but nevertheless exhibit parasitic capacitance, in the first operating mode.

Controller 328 also controls switching of first control and freewheeling switching devices 314, 316 such that these switching devices, along with first inductor 318 and capacitor 320, collectively form a first buck sub-converter 330 transferring power from input power port 304 to output power port 306, in the first operating mode. Specifically, controller 328 causes first control switching device 314 to repeatedly switch between its conductive and non-conductive states to cause current through first inductor 318 to ramp up and down, and controller 328 causes first freewheeling switching device 316 to repeatedly switch between its conductive and non-conductive states to perform a freewheeling function. In other words, controller 328 controls first freewheeling switching device 316 such that it provides a path for current flowing through first inductor 318 when first control switching device 314 is in its non-conductive state, in the first operating mode. Thus, first switching devices 314, 316 are adapted to repeatedly switch between their conductive and non-conductive states in the first operating mode.

Figure 5:
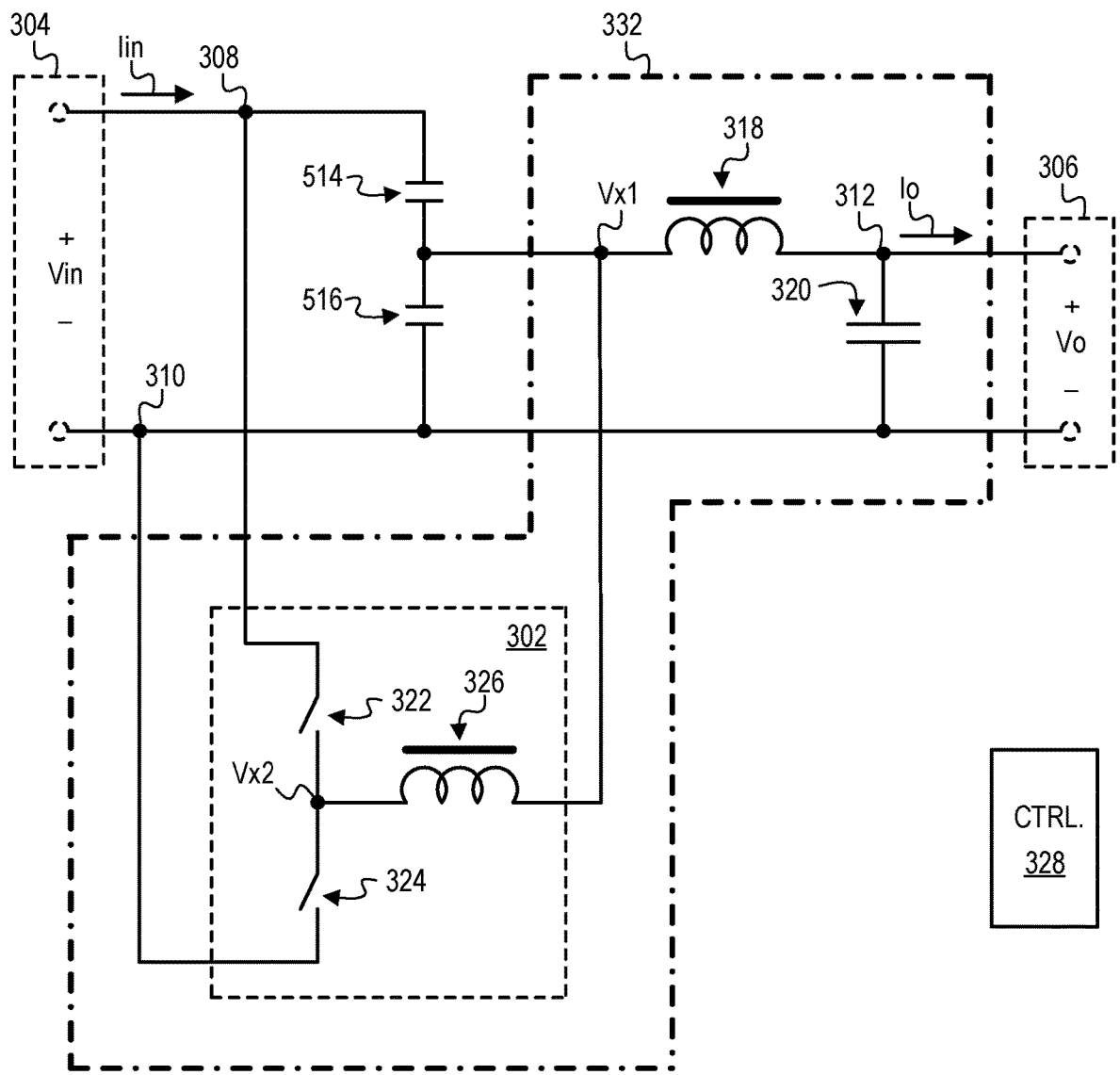
FIG. 5 illustrates operation of the FIG. 3 switching power converter in a second operating mode.

FIG. 5 illustrates operation of converter 300 in its second operating mode. First switching devices 314, 316 are adapted to operate in their non-conductive states in the second operating mode. Specifically, controller 328 causes first switching devices 314, 316 to remain in their non-conductive states in the second operating mode. Accordingly, first switching devices 314, 316 are replaced with capacitors 514, 516 in FIG. 5, to represent that switching devices 314, 316 remain in their non-conductive states, but nevertheless exhibit parasitic capacitance, in the second operating mode.

Controller 328 also controls operation of light load enhancer 302 such that it, along with first inductor 318 and capacitor 320, collectively form a second buck sub-converter 332 transferring power from input power port 304 to output power port 306, in the second operating mode. Specifically, controller 328 causes second control switching device 322 to repeatedly switch between its conductive and non-conductive states to cause current through both first and second inductors 318, 326 to ramp up and down, and controller 328 causes second freewheeling device 324 to repeatedly switch between its conductive and non-conductive states to provide a path for current through first and second inductors 318, 326 when second control switching device 322 is in its non-conductive state. Thus, second switching devices 322, 324 are each adapted to repeatedly switch between their conductive and non-conductive states in the second operating mode.

Thus, first buck sub-converter 330, which includes first inductor 318, transfers power from input power port 304 to output power port 306, in the first operating mode. On the other hand, second buck sub-converter 332, which includes both first and second inductors 318, 326, transfers power from input power port 304 to output power port 306, in the second operating mode.

As discussed above, large energy storage inductor values promote high light load efficiency. However, large energy storage inductance values degrade converter transient response, and transient response is often an important converter parameter under heavy load conditions, or when transitioning from light load to heavy load conditions. Additionally, large energy storage inductor values often degrade heavy load efficiency, due to large inductor winding resistance that typically accompanies large inductance values. Thus, in short, large energy storage inductance values are beneficial at light load, but are undesirable at heavy load.

Use of light load enhancer 302, however, enables certain embodiments of converter 300 to obtain the benefits of high energy storage inductance at light loads, without the drawbacks at heavy loads. In particular, in the converter's first operating mode, which corresponds to moderate or heavy load operation, converter 300 has an effective energy storage inductance corresponding to the inductance value of first inductor 318. However, in the converter's second operating mode, which corresponds to light load operation, converter 300 has an effective energy storage inductance corresponding to the sum of the inductance value of first inductor 318 and the inductance value of second inductor 326. Because the of sum inductor 318 and 326 values is greater than the value of inductor 318 alone, converter 300 has a larger energy storage inductance value at light loads than at moderate or heavy loads. Thus, light load enhancer 302 enables converter 300 to operate with a relatively large inductance value at light load and relatively small inductance value at heavy load.

The ability to have different energy storage inductance values at light and heavy loads enables inductance to be optimized for both light and heavy loads. For example, in some embodiments, second inductor 326 has a larger inductance value than first inductor 318, to maximize both light and heavy load efficiency and promote good heavy load transient response.

Additionally, output voltage Vo ripple will be smaller in the second operating mode than in the first operating mode, assuming constant frequency, continuous conduction mode operation in both operating modes, due to effective energy storage inductance being greater in the second operating mode than in the first operating mode. Thus, converter 300's switching frequency could be reduced in the second operating mode while maintaining the same ripple voltage magnitude as in the first operating mode, thereby further increasing light load efficiency. Accordingly, in some embodiments, controller 328 is adapted to operate converter 300 at a lower switching frequency in the second operating mode than in the first operating mode.

Use of light load enhancer 302 also promotes low inductor core losses at light load by reducing voltage applied across energy storage inductors. Inductor magnetic flux density is proportional to voltage across the inductor, and core losses are approximately proportional to between the second and third power of flux density. Thus, reducing voltage across an inductor by one half will reduce core losses in the inductor to one fourth to one eighth of their full voltage value.

In conventional buck converters, the input-output voltage differential (Vin–Vout) is applied across a single inductor under all load conditions. In converter 300, in contrast, the input-output voltage differential is applied across two inductors at light load. In particular, the input-output voltage differential is divided between first and second inductors 318, 326 according to their inductance value, when second control switching device 322 is in its conductive state. For example, in an embodiment where first and second inductors 318, 326 have the same inductance value, the voltage differential is evenly divided between the two inductors, thereby reducing voltage across each inductor by one half, and reducing core losses in each inductor by a factor of four to eight, compared to a conventional converter where the entire voltage differential is applied across a single inductor. While the reduction in core losses in each inductor 318, 326 is partially offset by the fact that there are two inductors, use of two inductors at light load still reduces net core loss by a factor two to four, assuming otherwise identical inductor core material, construction, and total inductance value, compared to a conventional converter where the entire voltage differential is applied across a single inductor.

It is anticipated that in many applications, second inductor 326 can have a relative low current rating because light load enhancer 302 is inactive in the first operating mode. A low inductor current rating helps negate the impact of winding resistance, thereby potentially allowing use of a large number of winding turns. A large number of winding turns helps achieve large inductance values. Additionally, a large number of winding turns results in relatively low magnetic flux density levels, thereby potentially allowing use of a small size magnetic core. Thus, in certain embodiments, second inductor 326 has a smaller core size and a greater number of winding turns than first inductor 318, such that second inductor 326 has a larger inductance value and smaller current rating than first inductor 318.

Figure 1:
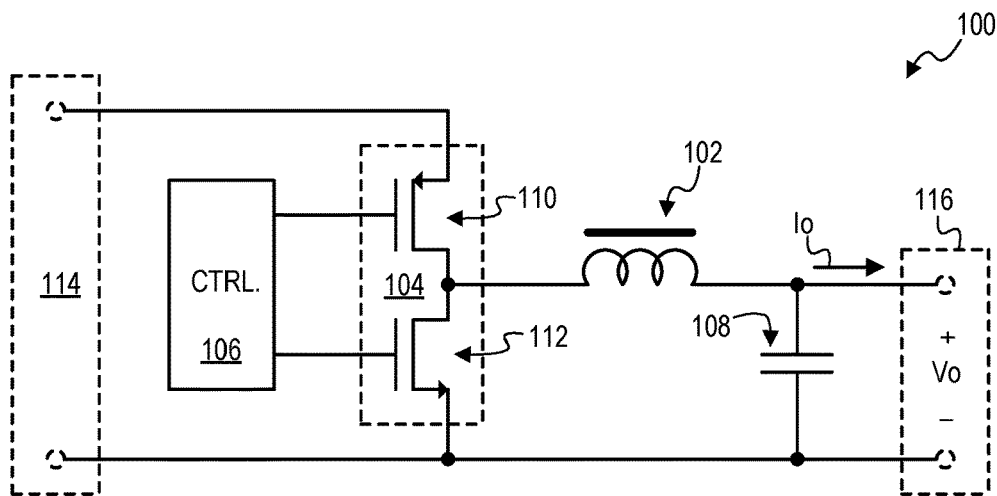
FIG. 1 illustrates a prior-art buck DC-to-DC converter.
Figure 2:
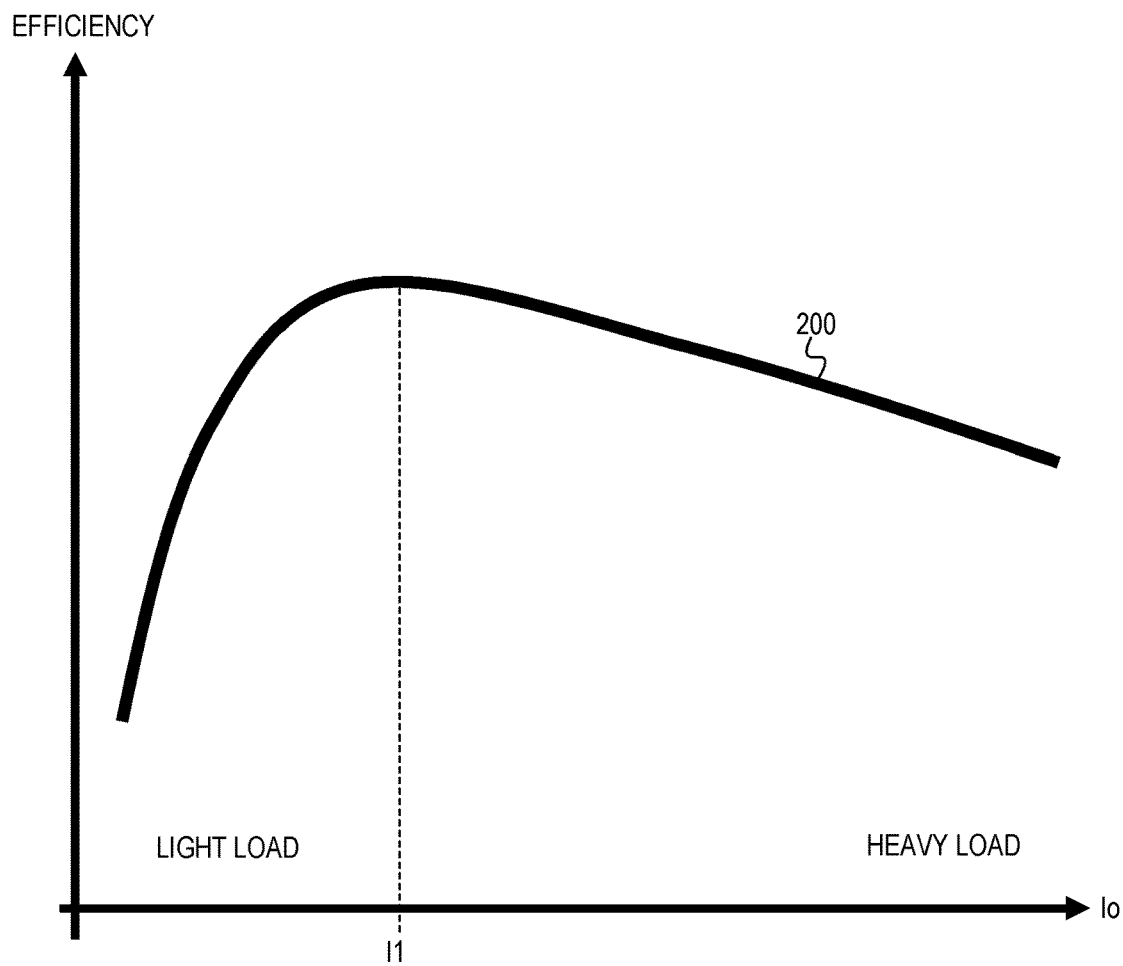
FIG. 2 shows a curve of estimated efficiency versus output current for the buck DC-to-DC converter of FIG. 1.
Figure 6:
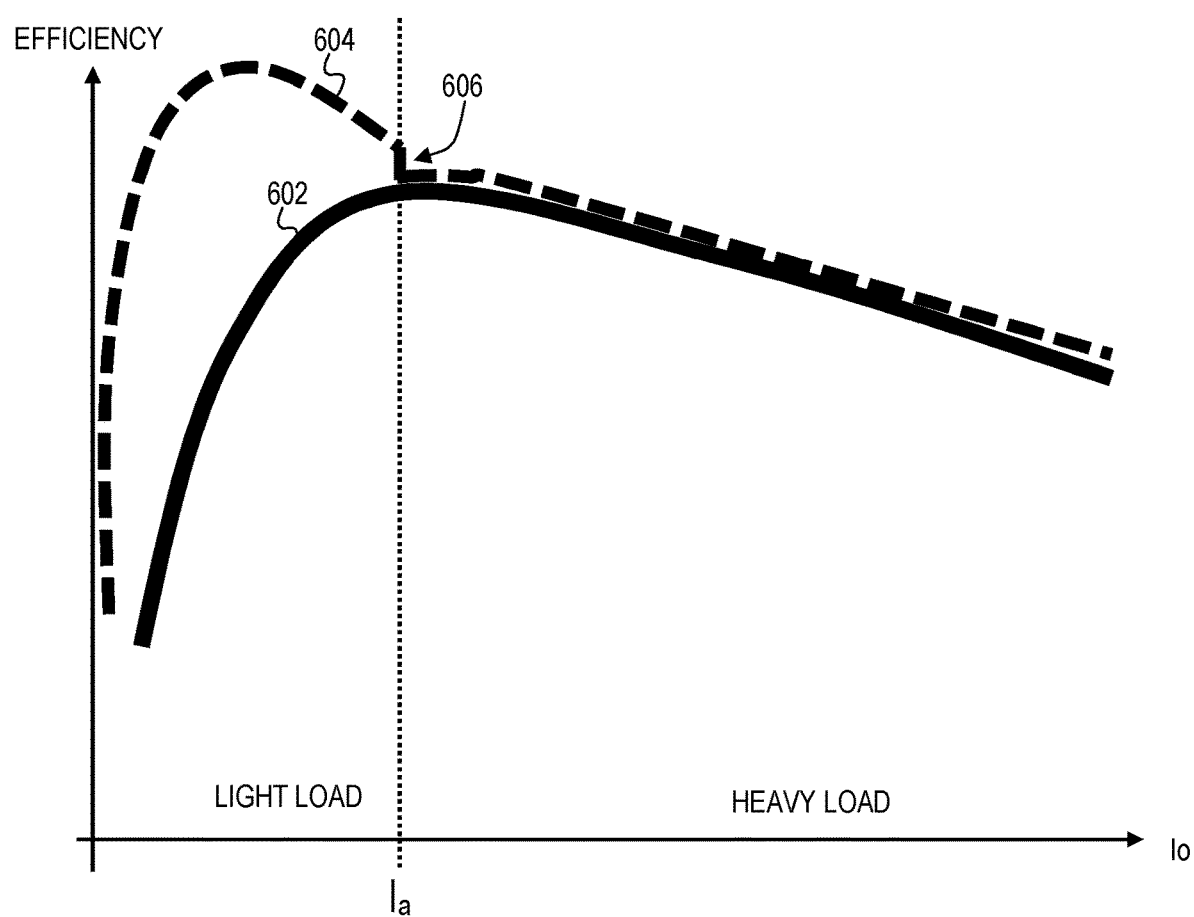
FIG. 6 shows curves of estimated efficiency versus output current for the power converter of FIG. 1 and the power converter of FIG. 3.

FIG. 6 shows a plot of estimated efficiency versus output current Io for both conventional converter 100 (FIG. 1) and converter 300 with light load enhancer 302 (FIG. 3). Curve 602 (solid line) corresponds to converter 100, and curve 604 (dashed line) corresponds to converter 300. Both converters have essentially the same efficiency curves at heavy load, thereby showing that incorporation of light load enhancer 302 in converter 300 does not materially impact heavy load efficiency. However, converter 300 has a significantly higher efficiency than converter 100 over much of the light load range, thereby showing that light load enhancer 302 can significantly improve light load efficiency. A step 606 change in efficiency resulting from converter 300 switching between its first and second operating modes at output current level $I_a$ can be seen in FIG. 6.

In some embodiments, controller 328 is adapted to switch converter 300 between the first and second operating modes. For example, in certain embodiments, controller 328 determines or estimates the magnitude of a load powered from output port 306, or a characteristic associated with load, such as output current magnitude, and sets the converter's operating mode accordingly. In these embodiments, controller 328 switches converter 300 from its first to its second operating mode if output power, or a related characteristic, falls below a first threshold value, and controller 328 switches converter 300 from its second to its first operating mode if output power, or a related characteristic, rises above a second threshold value. The second threshold value is typically greater than the first threshold value to create hysteresis in the transition between operating modes. Output power is determined or estimated, for example, from one or more of converter input voltage Vin, converter input current Iin, converter output current Io, and converter output voltage Vo.

In some other embodiments, controller 328 is adapted to switch converter 300 between its first and second operating modes in response to one or more external signals, such as a signal representing actual or expected power consumption of a load powered by converter 300. For example, in certain embodiments where converter 300 powers a processor, such as an information technology device processor, controller 328 switches between the first and second operating modes in response to a signal, such as a "sleep" signal, from or associated with the processor. In some embodiments, controller 328 is operable to switch converter 300 from its second to its first operating mode before an expected load increase, thereby causing converter 300 to have relatively small energy storage inductance and high potential output current at the time of the load increase.

In many embodiments, controller 328 is operable to regulate a converter operating characteristic, such as input voltage Vin, output voltage Vo, input current In, and/or current output current Io. In these embodiments, controller 328 achieves regulation by controlling switching of first control switching device 314 in the first operating mode, and by controlling switching of second control switching device 322 in the second operating mode. In some embodiments, controller 328 causes converter 300 to operate in a continuous conduction mode (CCM) in both the first and second operating modes. As known in the art, CCM operation promotes fast transient response and low ripple voltage magnitude. However, in some alternate embodiments, controller 328 is operable to cause converter 300 to operate in a discontinuous conduction mode (DCM) in one or both of the first and second operating modes, to promote efficiency. For example, in a certain embodiment, controller 328 is adapted to operate converter 300 in either CCM or DCM sub-modes, as characterized by TABLE 1 below:

TABLE 1

| | First Operating Mode | | Second Operating Mode | |
| --- | --- | --- | --- | --- |
| Load | Heavy | Moderate | Light | Very Light |
| CCM or DCM? | CCM | DCM | CCM | DCM |

In the embodiment characterized by TABLE 1, converter 300 operates in its first operating mode at heavy and moderate load conditions, and the converter operates in its second operating mode at light and very light load conditions. In its first operating mode, converter 300 has a first sub-mode characterized by CCM operation at heavy loads, and a second sub-mode characterized by DCM operation at moderate loads. In its second operating mode, converter 300 has a first sub-mode characterized by CCM operation at light loads, and a second sub-mode characterized by DCM operation at very light loads.

In some embodiments supporting DCM, controller 328 is adapted to switch converter 300 from its second operating mode to its first operating mode based at least partially on DCM operating conditions. For example, in a certain embodiment, controller 328 switches converter 300 from its second operating mode to its first operating mode if DCM pulses exceed a predetermined frequency, or if time between successive DCM pulses is less than a predetermined value.

The additional effective energy storage inductance of the second operating mode will cause output voltage Vo ripple to be greater in the second operating mode than in the first operating mode in embodiments supporting peak current mode control DCM. In these embodiments, the DCM peak current threshold can be adjusted to achieve a desired maximum ripple voltage magnitude. In a certain embodiment supporting DCM, controller 328 sets the DCM peak current threshold such that it is lower in the second operating mode than in the first operating mode, to prevent excessive ripple voltage magnitude in the second operating mode.

As discussed above, reducing converter switching device size, such as transistor size, can improve light load efficiency by reducing switching losses associated with parasitic switch capacitance and switch drivers. However, use of small switching devices typically degrades heavy load efficiency because the switching loss reduction associated with small switching devices is typically more than offset by high conduction losses associated with series resistance of small switching devices. Thus, while small switching devices are typically favored at light loads, large switching devices are often preferred at heavy loads. Use of light load enhancer 302, however, can enable converter 300 to realize the benefits of both small and large switching devices. In particular, in some embodiments, first control switching device 314 and first freewheeling switching device 316 are relatively large, while second control switching device 322 and second freewheeling switching device 324 are relatively small. In these embodiments, converter 300 therefore operates with relatively large switching devices in its first operating mode, thereby promoting low conduction losses at heavy load, while operating with relatively small switching devices in its second operating mode, thereby promoting low switching losses at light load.

Additionally, second inductor 326 largely prevents parasitic capacitance associated with first control and freewheeling switching devices 314, 316, which is symbolically shown by capacitors 514, 516 in FIG. 5, from being charged and discharged during switching transitions of second pair of switching devices 322, 324 in the second operating mode, thereby further promoting light load efficiency. Parasitic capacitance 514, 516 will, however, help filter voltage spikes generated by switching of second switching node Vx2, thereby reducing potential for electromagnetic interference and/or converter control difficulties from Vx2 voltage spikes.

Features of converter 300 can be varied without departing from the scope hereof. For example, one or both of freewheeling switching devices 316, 324 are replaced with or supplemented by one or more freewheeling diodes in some alternate embodiments, to reduce complexity with the possible tradeoff of increased conduction losses. The freewheeling diodes perform a freewheeling function similar to first and second freewheeling switching devices 316, 324. In a certain alternate embodiment, first freewheeling switching device 316 is replaced with a first freewheeling diode electrically coupled between common power node 310 and first switching node Vx1, and second freewheeling switching device 324 is replaced with a second diode electrically coupled between common power node 310 and second switching node Vx2. As another example, in some alternate embodiments, both first and second buck sub-converters 330, 332 are active in the first operating mode to simplify system control.

Figure 7:
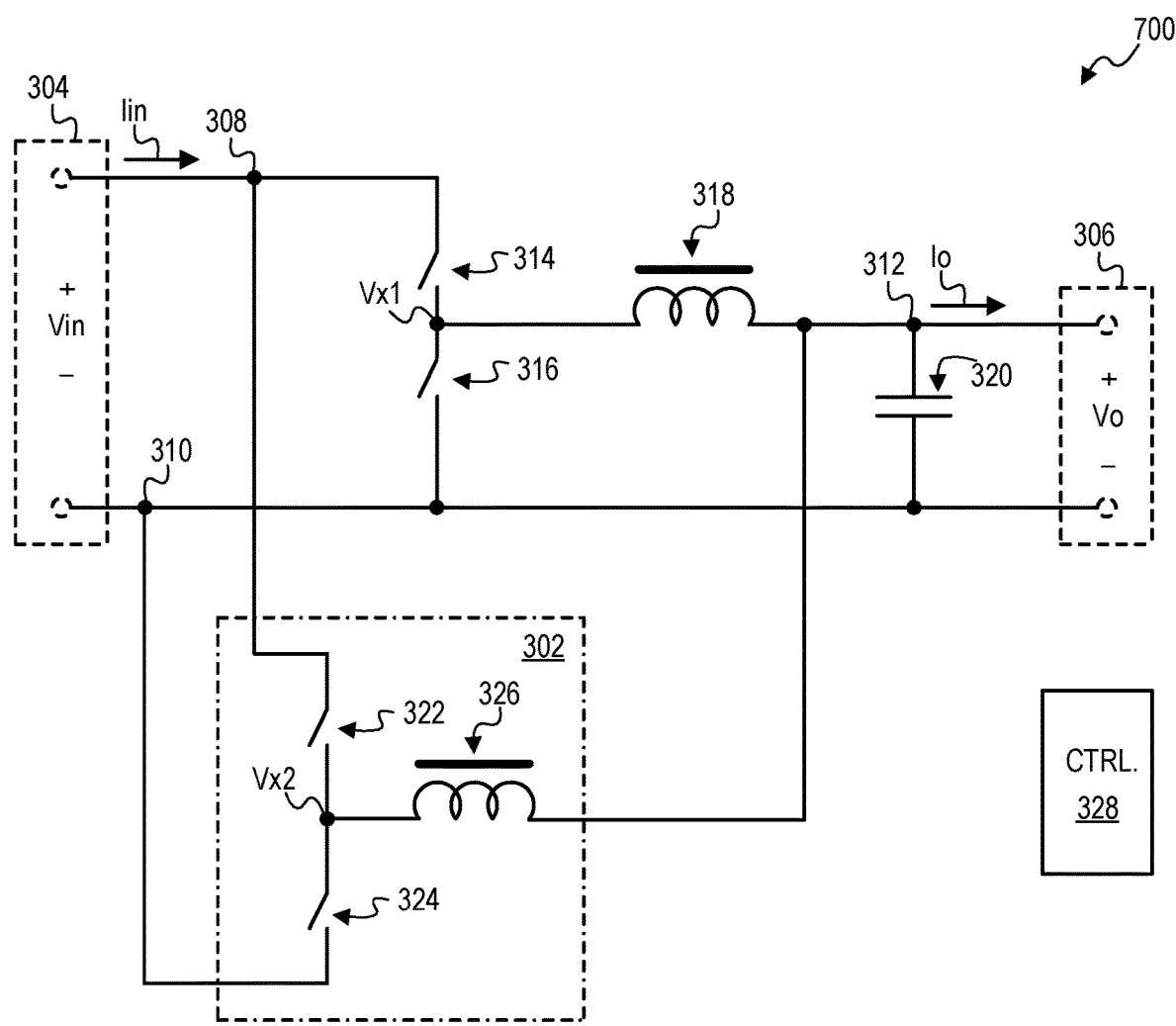
FIG. 7 illustrates an alternate embodiment of the switching power converter of FIG. 3 with a light load enhancer connected to an output power node.
Figure 8:
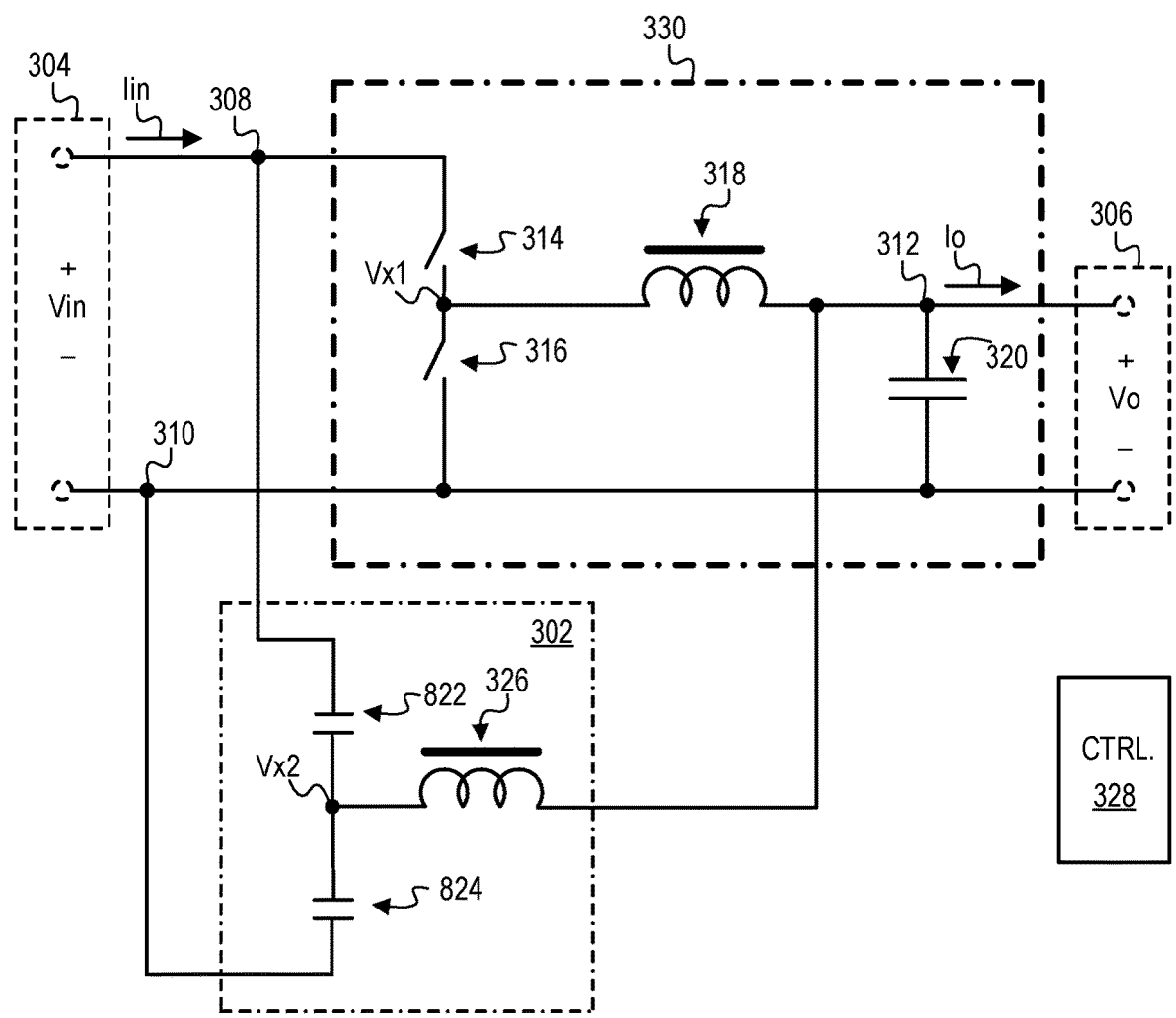
FIG. 8 illustrates operation of the FIG. 7 switching power converter in a first operating mode.

FIG. 7 illustrates a DC-to-DC switching power converter 700, which is similar to converter 300 of FIG. 3, but with light load enhancer 302 electrically coupled to output power node 312, instead of to first switching node Vx1. Controller 328 controls operation of converter 700 such that the converter has at least first and second operating modes, similar to those of converter 300. Specifically, in the first operating mode, which is illustrated in FIG. 8, first switching devices 314 and 316, first inductor 318, and capacitor 320 collectively form first buck sub-converter 330, which transfers power from input power port 304 to output power port 306. Second switching devices 322, 324 remain in their non-conductive states in the first operating mode, and therefore replaced with capacitors 822, 824 in FIG. 8, to represent that the switching devices remain in their non-conductive states, but nevertheless exhibit parasitic capacitance.

Figure 9:
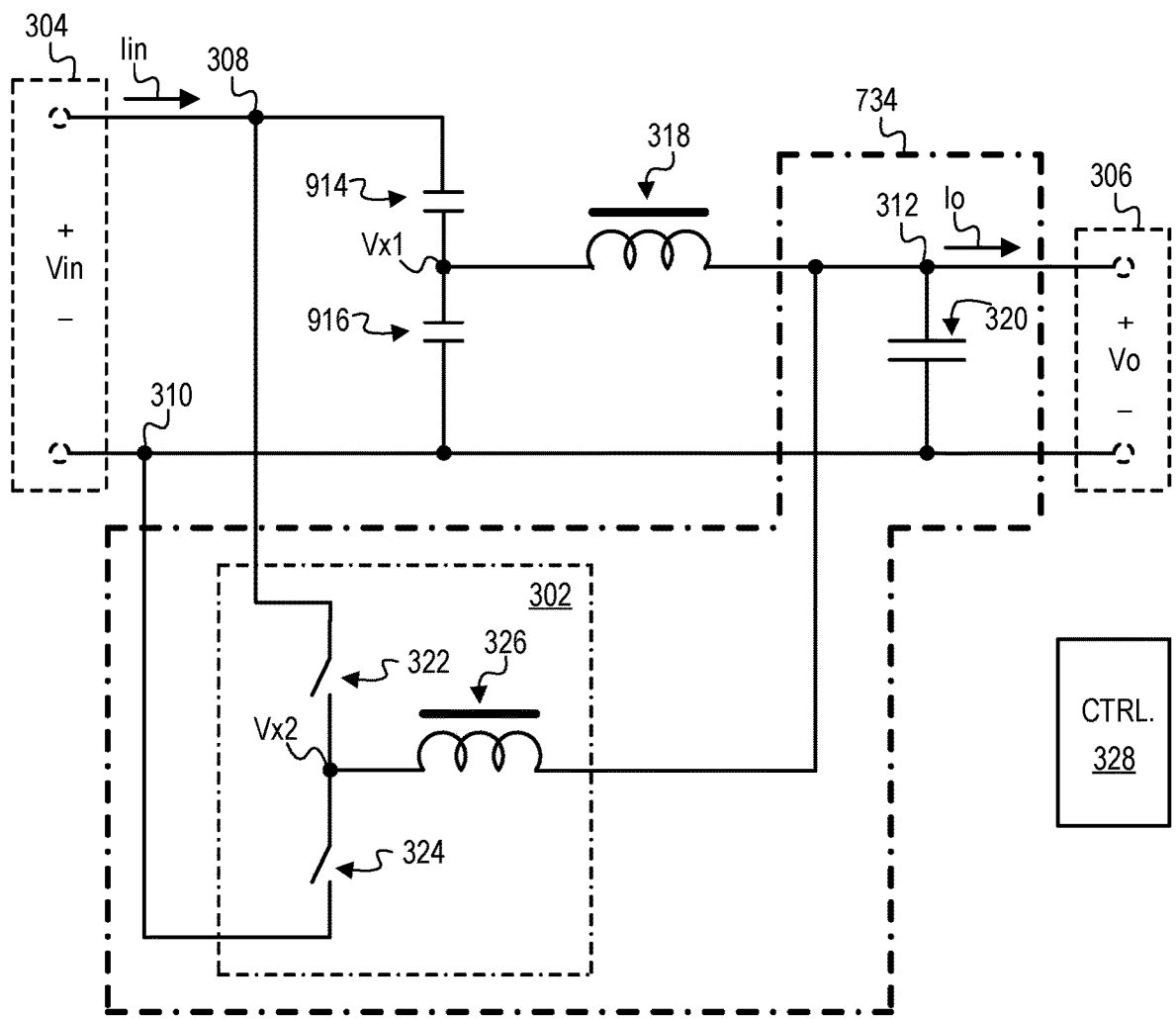
FIG. 9 illustrates operation of the FIG. 7 switching power converter in a second operating mode.

In the second operating mode, which is illustrated in FIG. 9, light load enhancer 302 and capacitor 320 collectively form a second buck sub-converter 734, which transfers power from input power port 304 to output power port 306. First switching devices 314, 316 remain in their non-conductive states in the second operating mode, and are therefore replaced with capacitors 914, 916 in FIG. 9 to represent that the switching devices remain in their non-conductive states, but nevertheless exhibit parasitic capacitance. In contrast to second buck sub-converter 332 of converter 300, second buck sub-converter 734 of converter 700 does not include first inductor 318. Accordingly, converter 700 may allow more freedom in selecting first and second inductors 318, 326 than converter 300. However, the fact that second buck sub-converter 734 includes only a single inductor prevents converter 700 from realizing light load core loss reduction associated with use of two inductors. Converter 700 can be adapted to support CCM and/or DCM operation, in a manner similar to that converter 300.

In some alternate embodiments of converter 700, controller 328 is adapted to control converter 700 such that both first and second buck sub-converters 330, 734 are active in the first operating mode, while only second buck sub-converter 734 is active in the second operating mode. Operating both buck sub-converters 330, 734 in the first operating mode promotes large power handling capability in the first operating mode. In embodiments where both buck sub-converters are operable in the first operating mode, controller 328 is optionally adapted to operate the first and second buck sub-converters out of phase with respect to each other, to enable ripple current cancelation in capacitor 320 and fast transient response.

Figure 10:
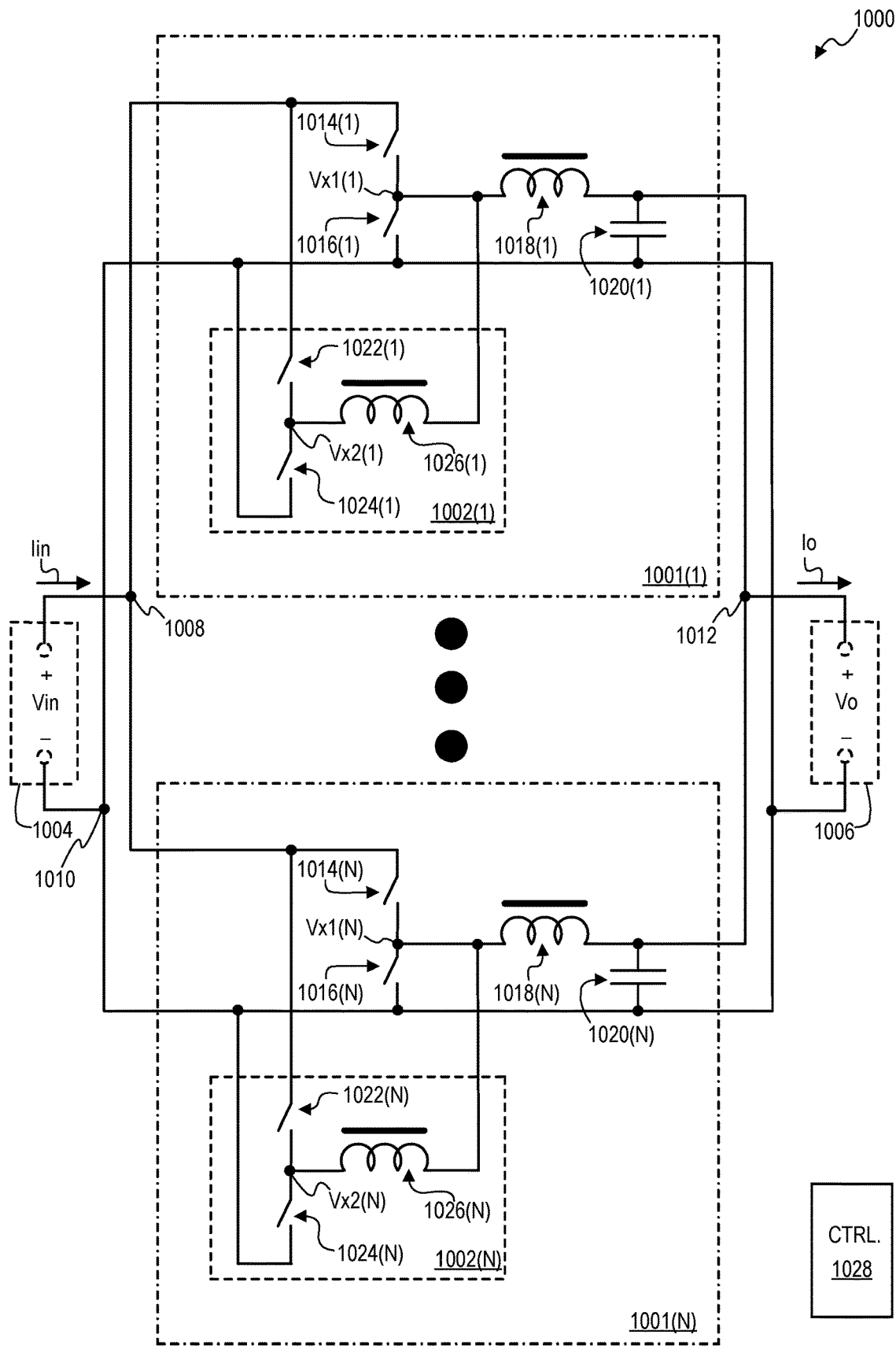
FIG. 10 illustrates a switching power converter including multiple power stages, where each power stage includes a light load enhancer, according to an embodiment.

Light load enhancers can also be used in switching power converters including multiple power stages electrically coupled in parallel, such as in a multi-phase DC-to-DC switching converter. For example, FIG. 10 illustrates a DC-to-DC switching power converter 1000 include N power stages 1001 electrically coupled in parallel, where N is an integer greater than one. In this disclosure, specific instances of an item may be referred to by use of a numeral in parentheses (e.g., power stage 1001(1)) while numerals without parentheses refer to any such item (e.g., power stages 1001).

Converter 1000 includes an input power port 1004 for electrically coupling to an input power source (not shown), and an output power port 1006 for electrically coupling to a load (not shown). Input power port 1004 is electrically coupled across input and common power nodes 1008, 1010, and output power port 1006 is electrically coupled across output and common power nodes 1012, 1010.

Each power stage 1001 is similar to converter 300 of FIG. 3. Specifically, each power stage 1001 includes a first control switching device 1014, a first freewheeling switching device 1016, and a first inductor 1018. The first control switching device 1014 is electrically coupled between input power node 1008 and a first switching node Vx1, and the first freewheeling switching device 1016 is electrically coupled between the first switching node and common power node 1010. The first inductor 1018 is electrically coupled between the first switching node and output power node 1012, and a capacitor 1020 is electrically coupled across output and common power nodes 1012, 1010.

Each power stage 1001 further includes a light load enhancer 1002 including a second control switching device 1022, a second freewheeling switching device 1024, and a second inductor 1026. The second control switching device 1022 is electrically coupled between input power node 1008 and a second switching node Vx2, and the second freewheeling switching device 1024 is electrically coupled between the second switching node and common power node 1010. Second inductor 1026 is electrically coupled between second switching node Vx2 and first switching node Vx1, such that first and second inductors 1018, 1026 of each power stage 1001 are electrically coupled in series.

A controller 1028 controls operation of switching power converter 1000. Although controller 1028 is symbolically shown as a single element, in some embodiments, controller 1028 encompasses a number of separate elements, such as respective control circuitry in each power stage 1001.

Figure 11:
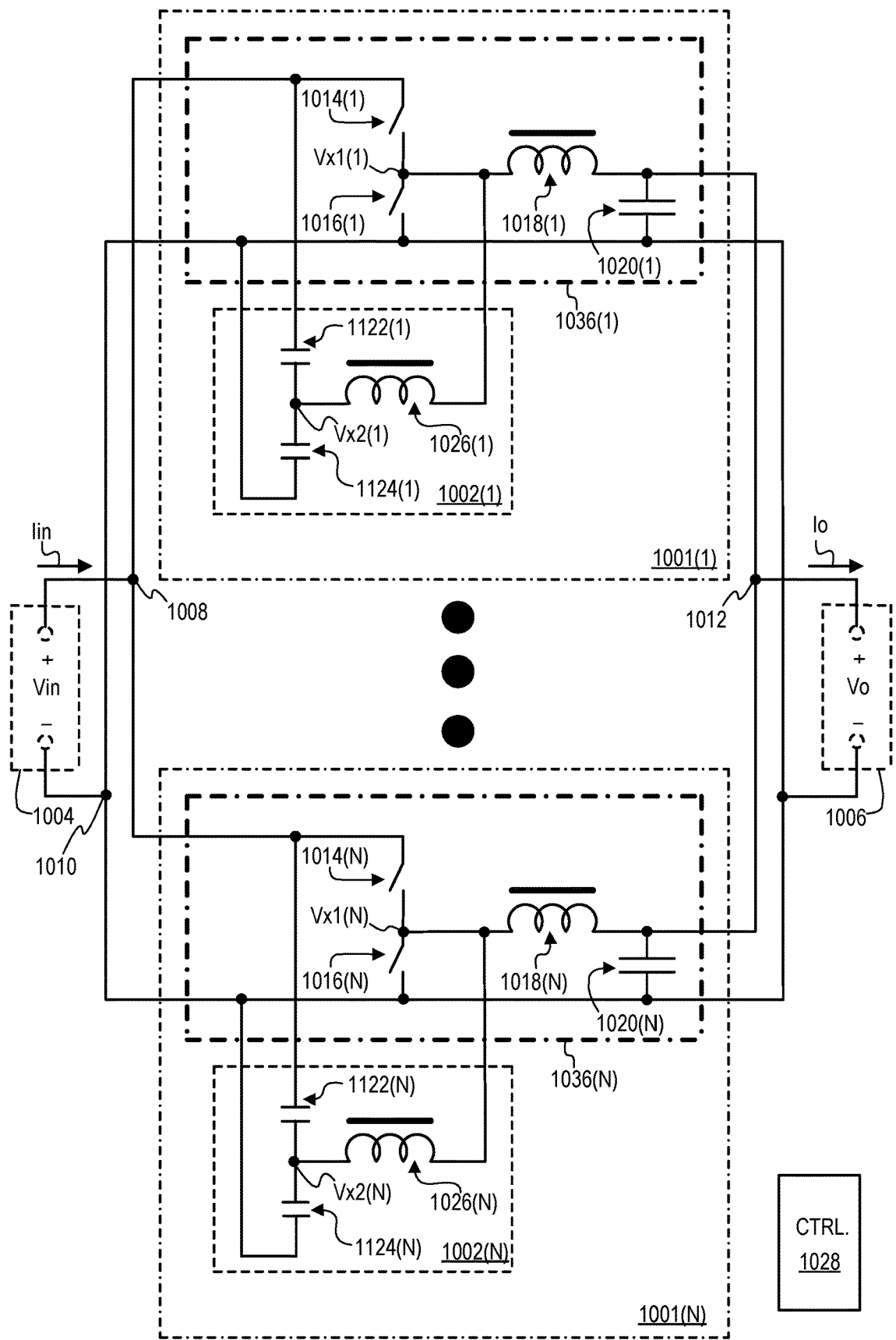
FIG. 11 illustrates operation of the FIG. 10 switching power converter in a first operating mode.

Like converter 300 of FIG. 3, converter 1000 also has a first operating mode corresponding to moderate and heavy load operating conditions, and a second operating mode corresponding to light load operating conditions. FIG. 11 illustrates operation of converter 1000 in its first operating mode. In the first operating mode, second switching devices 1022, 1024 are adapted to remain in their non-conductive states. Specifically, controller 1028 causes second switching devices 1022, 1024 of each power stage 1001 to remain in their non-conductive states in the first operating mode, such that light load enhancers 1002 are inactive. Thus, second switching devices 1022, 1024 are replaced with capacitors 1122, 1124 in FIG. 11, to represent that these devices remain in their non-conductive states, but nevertheless exhibit parasitic capacitance, in the first operating mode.

Controller 1028 also controls each power stage 1001 such that first control and freewheeling switching devices 1014, 1016, along with first inductor 1018 and capacitor 1020, collectively form a first buck sub-converter 1036 of the power stage transferring power from input power port 1004 to output power port 1006, in the first operating mode. Specifically, controller 1028 causes first control switching device 1014 of each power stage 1001 to repeatedly switch between its conductive and non-conductive states to cause current through first inductor 1018 of the power stage to ramp up and down, and controller 1028 causes first freewheeling switching device 1016 of the power stage to repeatedly switch between its conductive and non-conductive states to perform a freewheeling function. In other words, controller 1028 controls first freewheeling switching device 1016 of the power stage such that it provides a path for current flowing through first inductor 1018 when first control switching device 1014 is in its non-conductive state, in the first operating mode. Thus, first switching devices 1014, 1016 of each power stage 1001 are adapted to repeatedly switch between their conductive and non-conductive states in the first operating mode.

Figure 12:
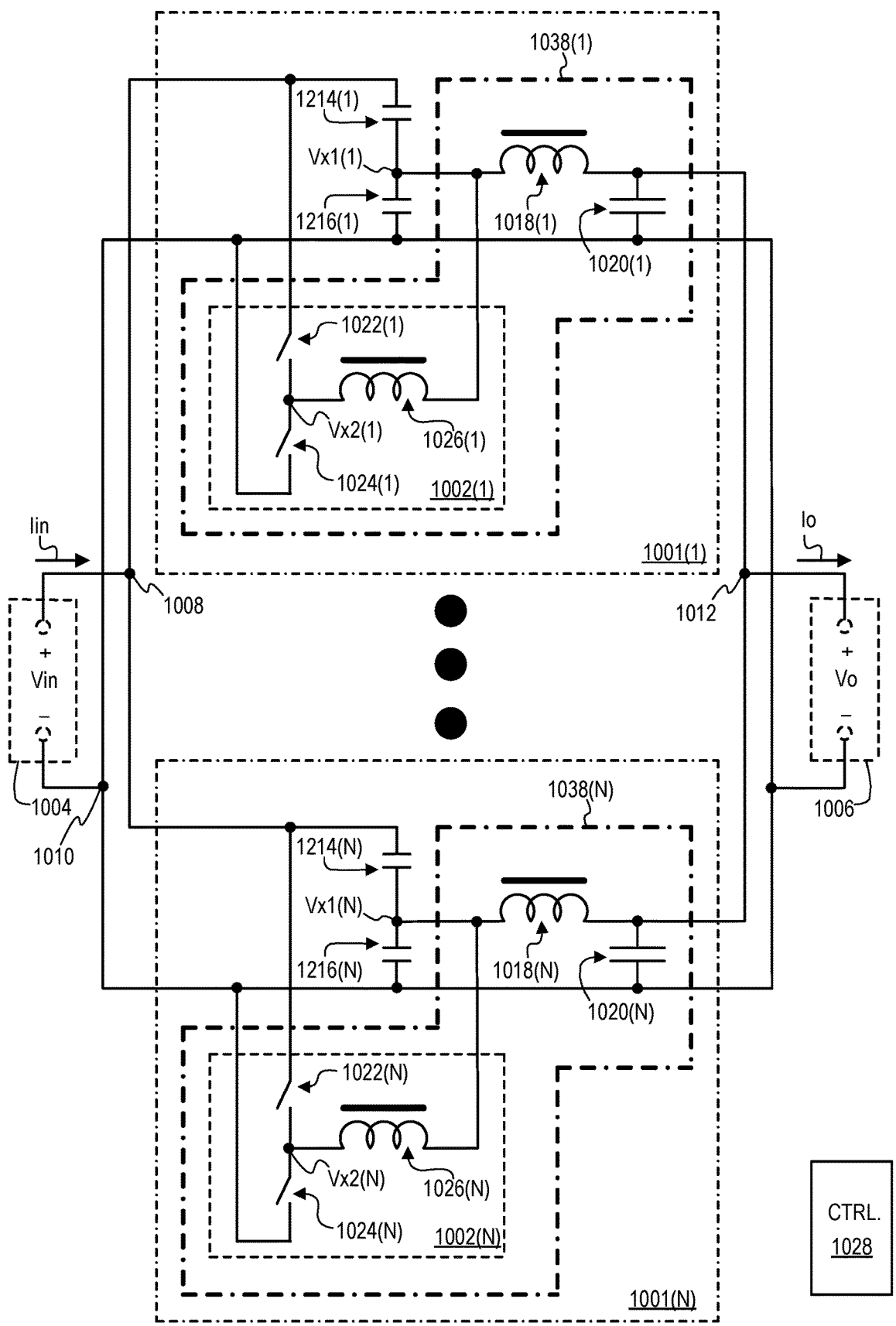
FIG. 12 illustrates operation of the FIG. 10 switching power converter in a second operating mode.

FIG. 12 illustrates operation of converter 1000 in its second operating mode. First switching devices 1014, 1016 are adapted to operate in their non-conductive states in the second operating mode. Specifically, controller 1028 causes first switching devices 1014, 1016 to remain in their non-conductive states in the second operating mode, such that first buck sub-converters 1036 are inactive. Accordingly, first switching devices 1014, 1016 are replaced with capacitors 1214, 1216 in FIG. 12, to represent that switching devices 1014, 1016 remain in their non-conductive states, but nevertheless exhibit parasitic capacitance, in the second operating mode.

Controller 1028 also controls operation of light load enhancer 1002 of each power stage 1001 such that it, along with first inductor 1018 and capacitor 1020 of the power stage, collectively form a second buck sub-converter 1038 of the power stage transferring power from input power port 1004 to output power port 1006, in the second operating mode. Specifically, controller 1028 causes second control switching device 1022 of each power stage 1001 to repeatedly switch between its conductive and non-conductive states to cause current through both first and second inductors 1018, 1026 of the power stage to ramp up and down.

Controller 1028 also causes second freewheeling device 1024 of the power stage to repeatedly switch between its conductive and non-conductive states to provide a path for current through first and second inductors 1018, 1026 when second control switching device 1022 is in its non-conductive state. Thus, second switching devices 1022, 1024 are adapted to repeatedly switch between their conductive and non-conductive states in the second operating mode.

In a manner like that of converter 300, use of light load enhancers 1002 enables certain embodiments of converter 1000 to obtain the benefits of high energy storage inductance at light loads, without the drawbacks at heavy loads. In particular, in the first operating mode, which corresponds to moderate or heavy load operating conditions, each power stage 1001 has an effective energy storage inductance corresponding to the inductance value of first inductor 1018 of the power stage. However, in the second operating mode, which corresponds to light load operating conditions, each power stage 1001 has an effective energy storage inductance corresponding to the sum of the inductance value of first inductor 1018 and the inductance value of second inductor 1026. Because the sum of inductor 1018 and 1026 values is greater than the value of inductor 1018 alone, each power stage has a larger energy storage inductance value at light loads than at moderate or heavy loads. Thus, light load enhancers 1002 enable converter 1000 to operate with a relatively large inductance at light load and relatively small inductance at heavy load.

In some embodiments, controller 1028 is adapted to control operation of power stages 1001 such that each power stage is switched out of phase with respect to each other power stage in the first and/or second operating modes, such that converter 1000 is a "multi-phase" converter, and each power stage can be considered a "phase." Such phasing of power stages promotes ripple current cancelation in output capacitors 1020 and fast transient response.

It is anticipated that all first inductors 1018 will typically have a common first inductance value and that all second inductors 1026 will typically have a common second inductance value, such as to achieve maximum ripple current cancelation in embodiments with phase shifting between power stages 1001. However, first inductance values and/or second inductance values can vary among power stage 1001 instances.

In some embodiments of converter 1000, controller 1028 is operable to support both DCM and CCM operation, such as is a manner similar to that discussed above with respect to FIG. 3. Additionally, controller 1028 is optionally adapted to shut down one or more power stages 1001 during light load conditions, to further promote light load efficiency. For example, in one particular embodiment including four power stages 1001, controller 1028 causes all four power stages to operate under heavy load operating conditions and only one of the four power stages to operate under light load operating conditions. As another example, in one particular embodiment including three power stages 1001, controller 1028 causes all three power stages to operate under heavy load operating conditions, two of the three power stages to operate under light load operating conditions, and one of the three power stages to operate under very light load operating conditions.

Figure 13:
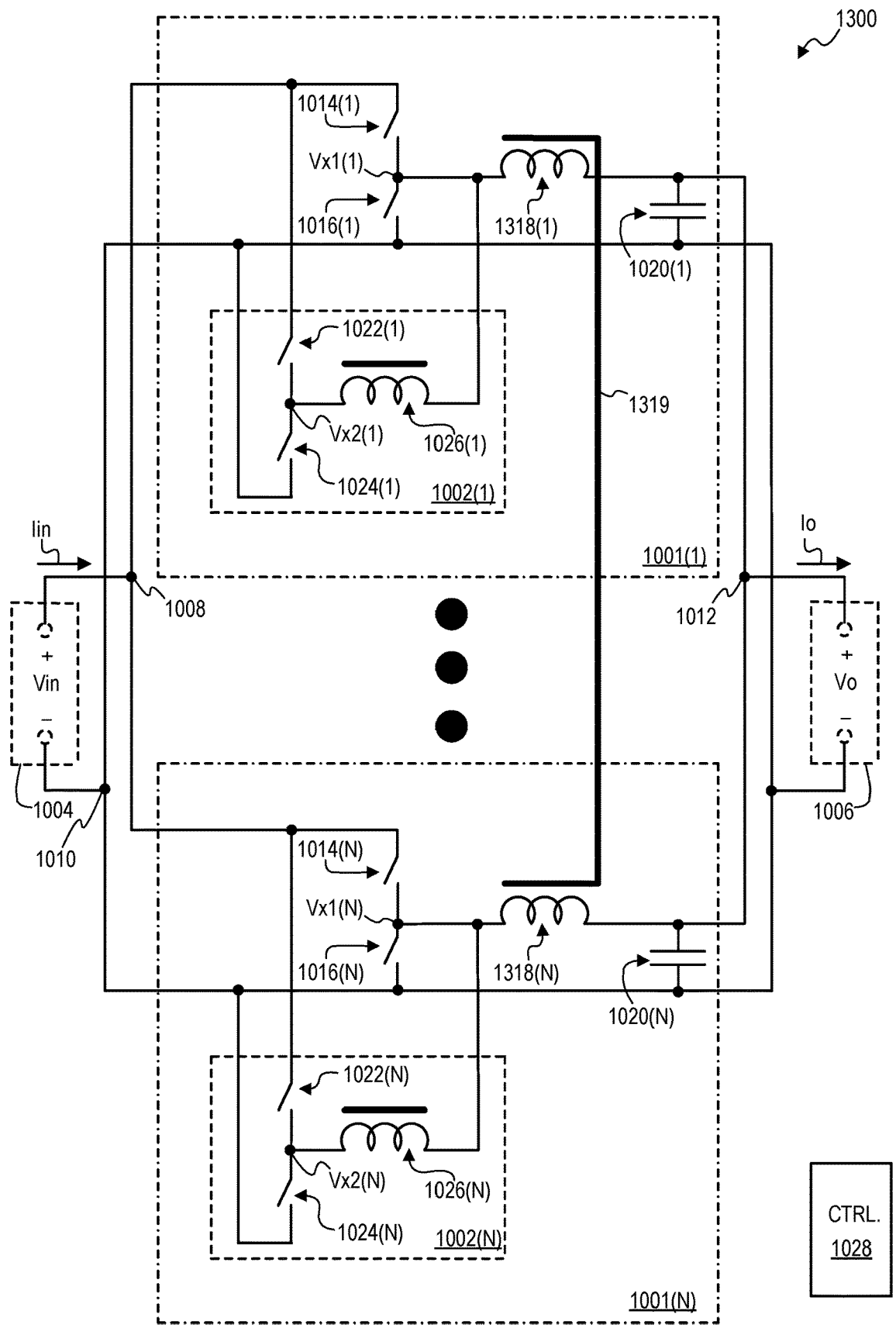
FIG. 13 illustrates an alternate embodiment of the switching power converter of FIG. 10 including a coupled inductor.

Variations in converter 1000 are possible. For example, although each power stage 1001 is shown with its own output capacitor 1020, in some alternate embodiments, one or more power stages 1001(1) share common output capacitance. Furthermore, in certain alternate embodiments, all power stages 1001 share a common output capacitance. As another example, some or all of first and second freewheeling switching devices 1016, 1024 are replaced with freewheeling diodes in some alternate embodiments to reduce converter complexity, with the possible tradeoff of increased conduction losses. Two or more inductors can also be replaced with a common coupled inductor to increase effective converter switching frequency, as taught in U.S. Pat. No. 6,362,986 to Schultz et al., which is incorporated herein by reference. For example, FIG. 13 illustrates a converter 1300, which is similar to converter 1000, but where first inductors 1018 are replaced with first inductors 1318, which are part of a common coupled inductor including a magnetic core 1319. Some or all of second inductors 1026 could also be replaced with a common coupled inductor in a similar manner.

Figure 14:
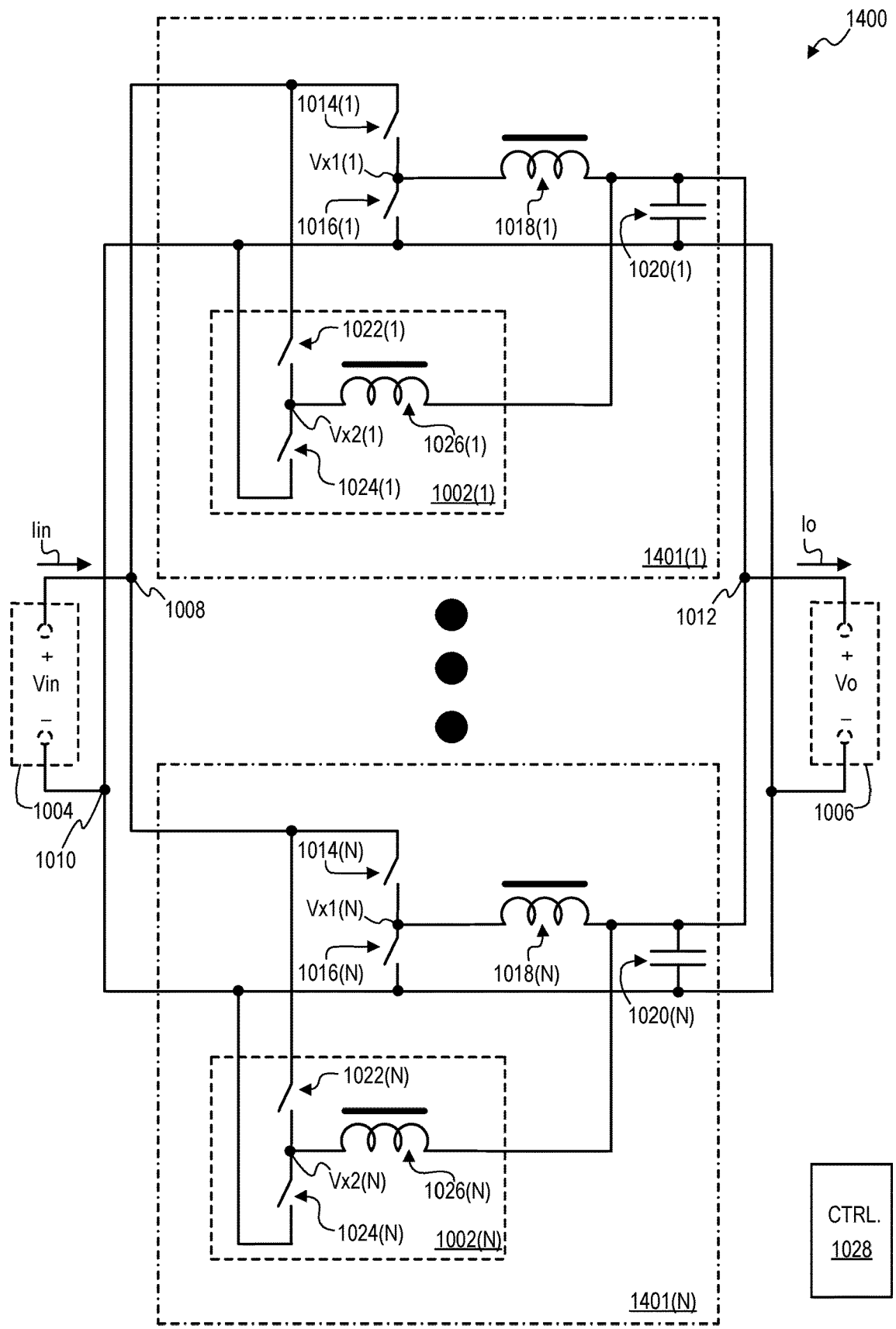
FIG. 14 illustrates a switching power converter similar to that of FIG. 10, but with light load enhancers electrically coupled to an output power node, according to an embodiment.

Additionally, converter 1000 can be modified such that light load enhancers 1002 are electrically coupled to output power node 1012, instead of to a respective first switching node, in a manner similar to that of converter 700 (FIG. 7). For example, FIG. 14 illustrates a switching power converter 1400, which is similar to converter 1000 (FIG. 10), but with light load enhancers 1002 electrically coupled to output power node 1012. Converter 1400 operates in the same manner as converter 1000, although each power stage 1401 has an effective energy storage inductance value equal to the value of second inductor 1026, instead of the sum of the values of first and second inductors 1018, 1026, in the second operating mode. Accordingly, second inductors 1026 typically have larger inductance values than first inductors 1018 to realize high light load efficiency.

Figure 15:
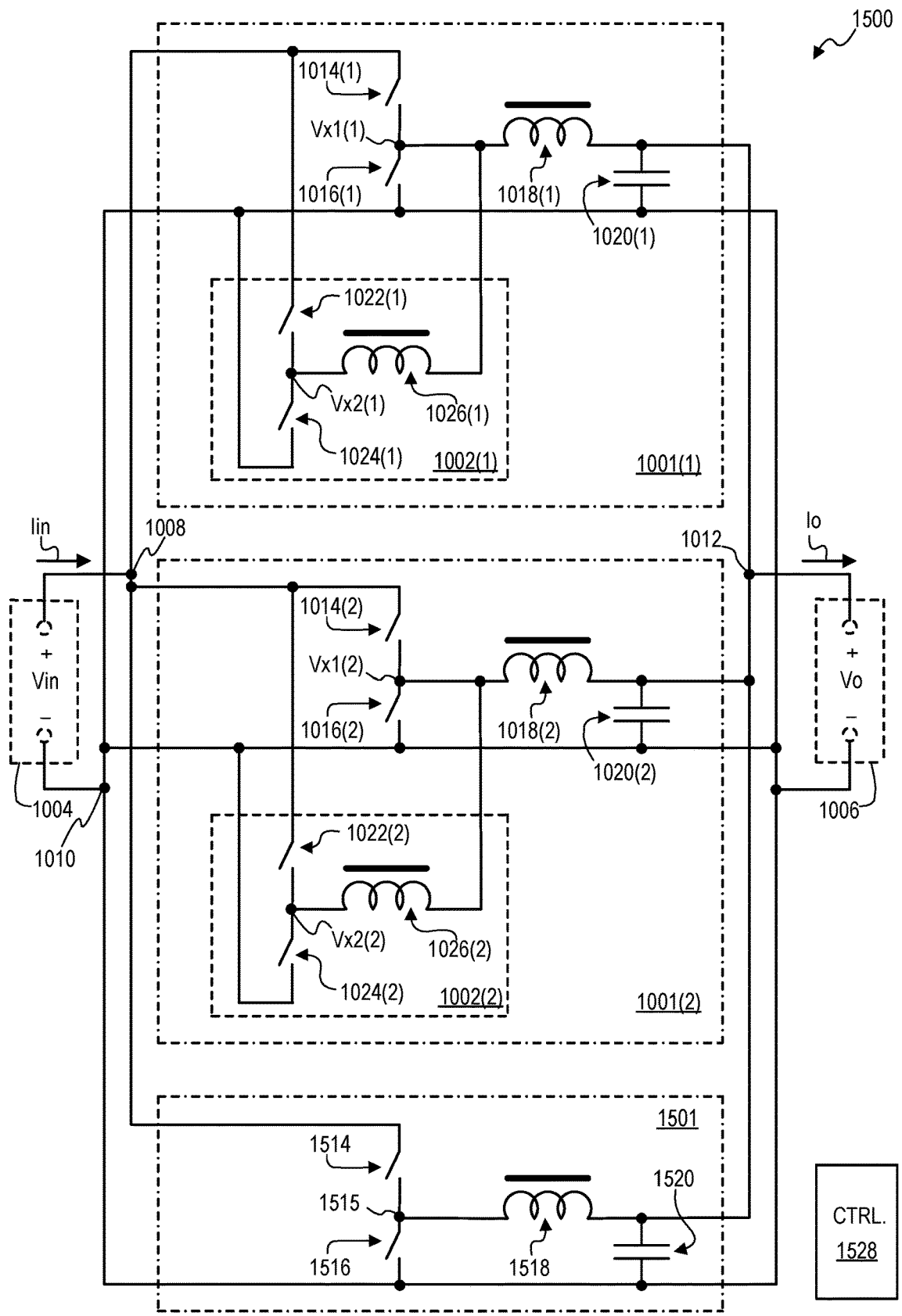
FIG. 15 illustrates a switching power converter including multiple power stages, where one of the power stages does not include a light load enhancer, according to an embodiment.

Some alternate embodiments of converter 1000 include one or more power stages without a light load enhancer, such as to increase converter power capacity. For example, FIG. 15 illustrates a DC-to-DC switching power converter 1500 including two power stages 1001 and one additional power stage 1501, electrically coupled in parallel. In contrast to power stages 1001, power stage 1501 does not include a light load enhancer, and as discussed below, power stage 1501 is active only in a first operating mode of converter 1500.

Additional power stage 1501 includes a first switching device 1514 electrically coupled between input power node 1008 and a first switching node 1515, and a first control switching device 1516 electrically coupled between first switching node 1515 and common power node 1010. Additional power stage 1501 further includes a first inductor 1518 electrically coupled between switching node 1515 and output power node 1012, and a capacitor 1520 electrically coupled between output power node 1012 and common power node 1010.

A controller 1528 controls operation of converter 1500. In the first operating mode of converter 1500, power stages 1001 form respective first buck sub-converters 1036 in the same manner as described above with respect to FIG. 11. Additional power stage 1501 also operates as a first buck sub-converter transferring power from input power port 1004 to output power port 1006, in the first operating mode. Specifically, controller 1528 causes first control switching device 1514 to repeatedly switch between its conductive and non-conductive states to cause current through first inductor 1518 to ramp up and down, and controller 1528 causes first freewheeling switching device 1516 to repeatedly switch between its conductive and non-conductive states to perform a freewheeling function. Thus, first switching devices 1514, 1516 are adapted to repeatedly switch between their conductive and non-conductive states in the first operating mode.

In a second operating mode of converter 1500, power stages 1001 form respective second buck sub-converters 1038 in the same manner as described above with respect to FIG. 12. However, controller 1528 causes switching devices 1514, 1516 of additional power stage 1501 to remain in their non-conductive states in the second operating mode, such that additional power stage 1501 is inactive in the second operating mode. Thus, switching devices 1514, 1516 are adapted to operate in their non-conductive states in the second operating mode.

The number of power stages and the number of power stages with light load enhancers can be varied without departing from the scope hereof. Thus, converter 1500 can be modified to have N power stages, where M of the N power stages include light load enhancers, N is an integer greater than one, and M is an integer greater than or equal to one and less than or equal to N.

Figure 16:
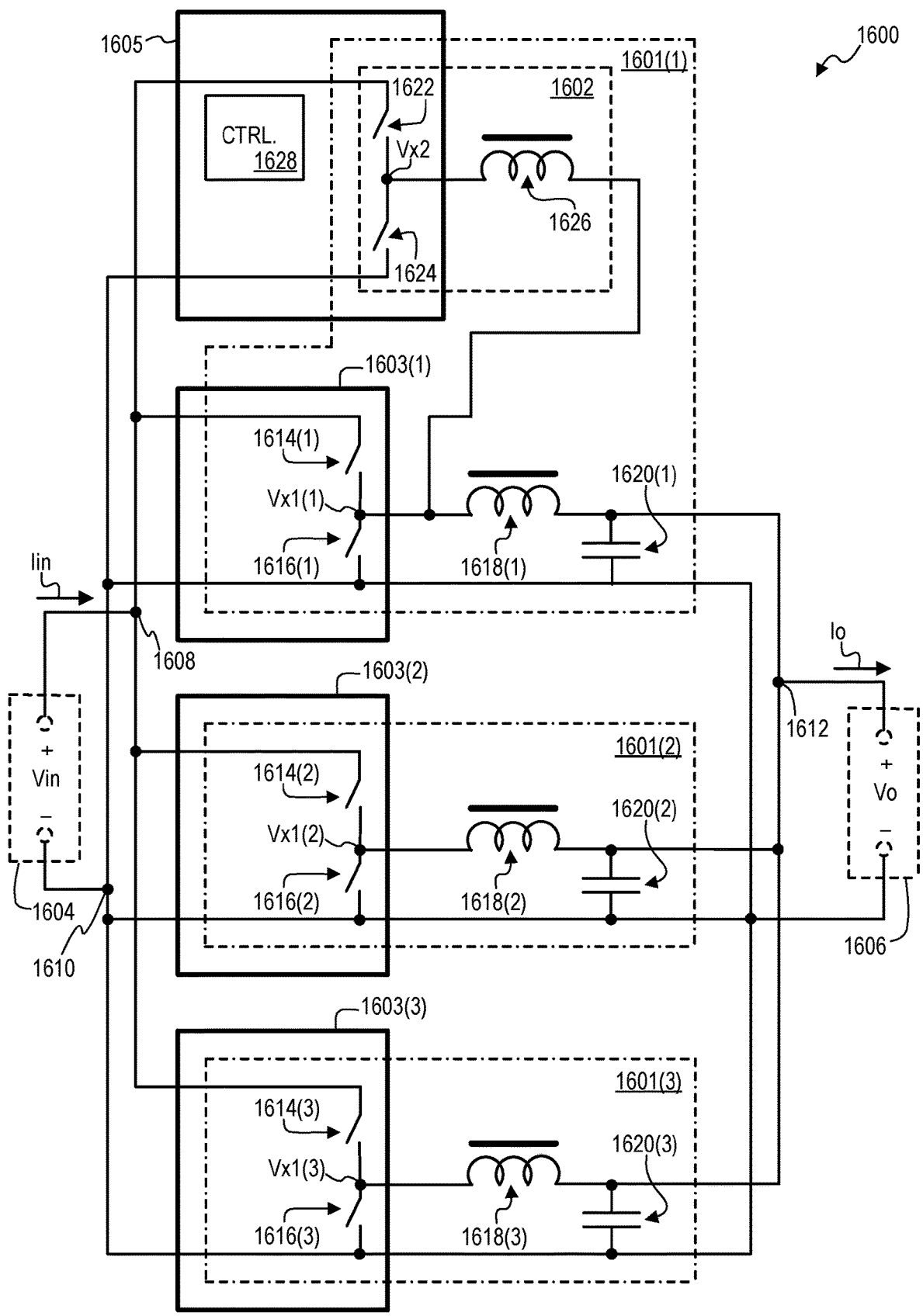
FIG. 16 illustrates a switching power converter including three slave integrated circuits and one master integrated circuit, where the master integrated circuit includes a portion of a light load enhancer, according to an embodiment.

In some embodiments of converters including multiple power stages and one or more light load enhancers, power stage components are distributed among two or more integrated circuits. For example, FIG. 16 illustrates a DC-to-DC switching power converter 1600 including three "slave" integrated circuits 1603 and one "master" integrated circuit 1605. Each slave 1603 includes a control switching device 1614 and a freewheeling switching device 1616 operating under the command of a controller 1628 in master 1605. Master 1605 also includes a control and freewheeling switching device 1622, 1624, which form part of a light load enhancer 1602 electrically coupled to a first slave 1603(1). Thus, a first power stage 1601(1), which includes light load enhancer 1602, includes components distributed among first slave 1603(1) and master 1605. Incorporation of light load enhancer circuitry in a master integrated circuit chip may enable implementation of a light load enhancer in a converter including standard slave integrated circuit chips, instead of requiring use of one or more slaves with light load enhancer circuitry, thereby promoting ease of component procurement and/or low component cost. Additionally, incorporation of light load enhancer circuitry in a master integrated chip may facilitate control of the light load enhancer, such as when switching between operating modes.

Converter 1600 includes an input power port 1604 electrically coupled across input and common power nodes 1608, 1610, and output power port 1606 electrically coupled across an output power node 1612 and a common power node 1610. Each power stage 1601 includes a first control switching device 1614 electrically coupled between input power node 1608 and a first switching node Vx1, and a first freewheeling switching device 1616 electrically coupled between the first switching node and common power node 1610. Each power stage 1601 further includes a first inductor 1618 electrically coupled between the first switching node and output power node 1612, and a capacitor 1620 electrically coupled between output power node 1612 and common power node 1610.

Power stage 1601(1) also includes a light load enhancer 1602 partially integrated in master 1605. Light load enhancer 1602 includes a second control switching device 1622 electrically coupled between input power node 1608 and a second switching node Vx2, a second freewheeling switching device 1624 electrically coupled between second switching node Vx2 and common power node 1610, and a second inductor 1626 electrically coupled between second switching node Vx2 and first switching node Vx1(1).

Converter 1600 operates in a similar manner to that of converter 1500. Specifically, in a first operating mode of converter 1600 corresponding to moderate or heavy load operating conditions, first control switching device 1614, first freewheeling switching device 1616, first inductor 1618, and capacitor 1620 of each power stage 1601 form a respective buck sub-converter for transferring power from input power port 1604 to output power port 1606. Light load enhancer 1602 is inactive in the first operating mode. In a second operating mode of converter 1600 corresponding to light load operating conditions, light load enhancer 1602, first inductor 1618(1), and capacitor 1620(1) collective form a second buck sub-converter of power stage 1601(1) for transferring power from input power port 1604 to output power port 1606. Remaining power stages 1601(2), 1601(3) are inactive in the second operating mode.

Figure 17:
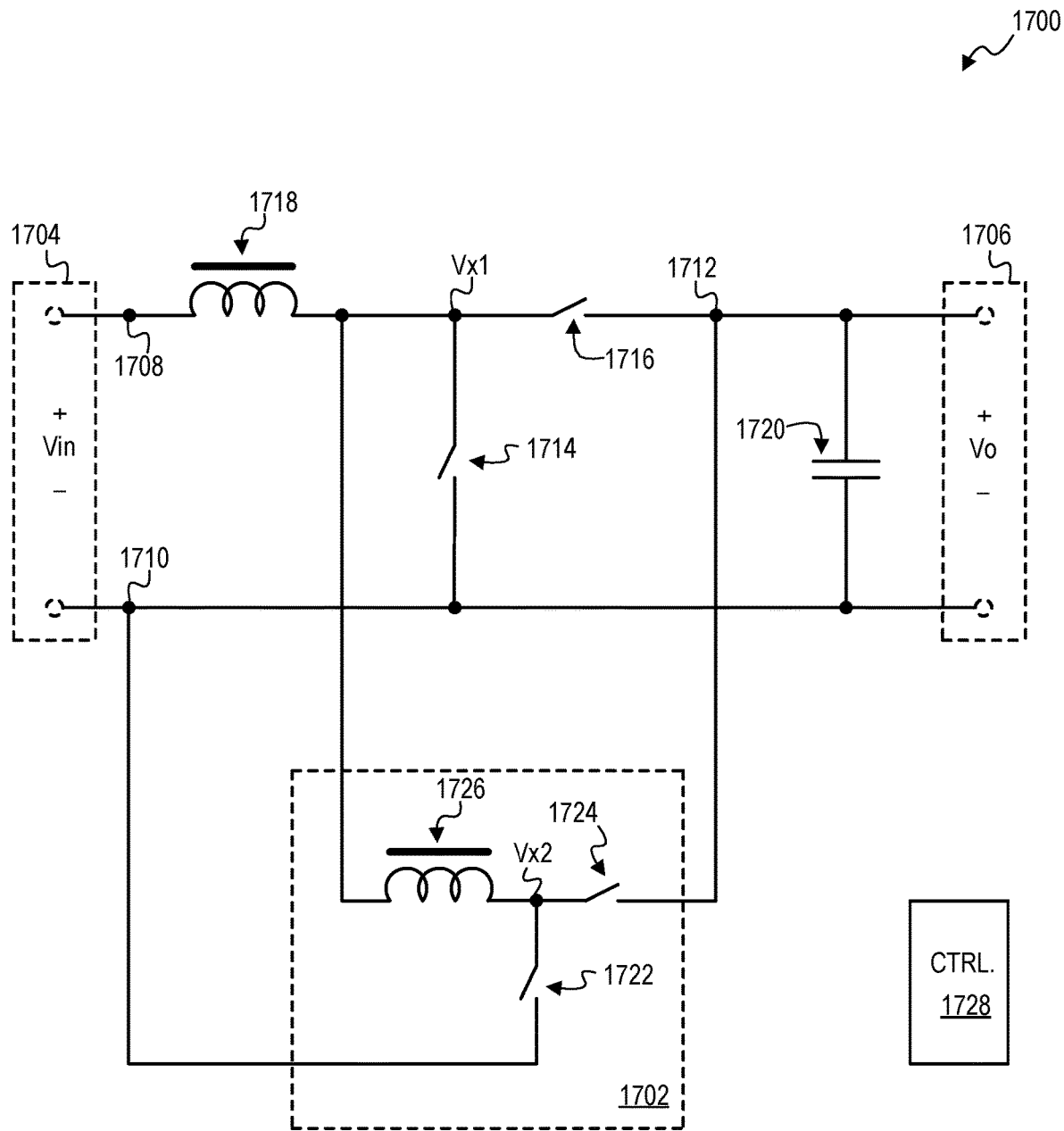
FIG. 17 illustrates a boost DC-to-DC switching power converter including a light load enhancer, according to an embodiment.

A light load enhancer can be used in a switching power converter having a topology other than a buck topology, such as in a boost converter or a buck-boost converter. For example, FIG. 17 illustrates a boost DC-to-DC switching power converter 1700 including a light load enhancer 1702. Converter 1700 includes an input power port 1704 electrically coupled across input and common power nodes 1708, 1710, and an output power port 1706 electrically coupled across output power node 1712 and common power node 1710. Converter 1700 further includes a first inductor 1718, first control and freewheeling switching devices 1714, 1716, a capacitor 1720, and a controller 1728. First inductor 1718 is electrically coupled between input power node 1708 and a first switching node Vx1, and first control switching device 1714 is electrically coupled between first switching node Vx1 and common power node 1710. First freewheeling switching device 1716 is electrically coupled between first switching node Vx1 and output power node 1712, and capacitor 1720 is electrically coupled between output and common power nodes 1712, 1710.

Light load enhancer 1702 includes a second inductor 1726, a second control switching device 1722, and a second freewheeling switching device 1724. Second inductor 1726 is electrically coupled between first switching node Vx1 and a second switching node Vx2, such that first and second inductors 1718, 1726 are electrically coupled in series. Second control switching device 1722 is electrically coupled between second switching node Vx2 and common power node 1710, and second freewheeling switching device 1724 is electrically coupled between second switching node Vx2 and output power node 1712.

Figure 18:
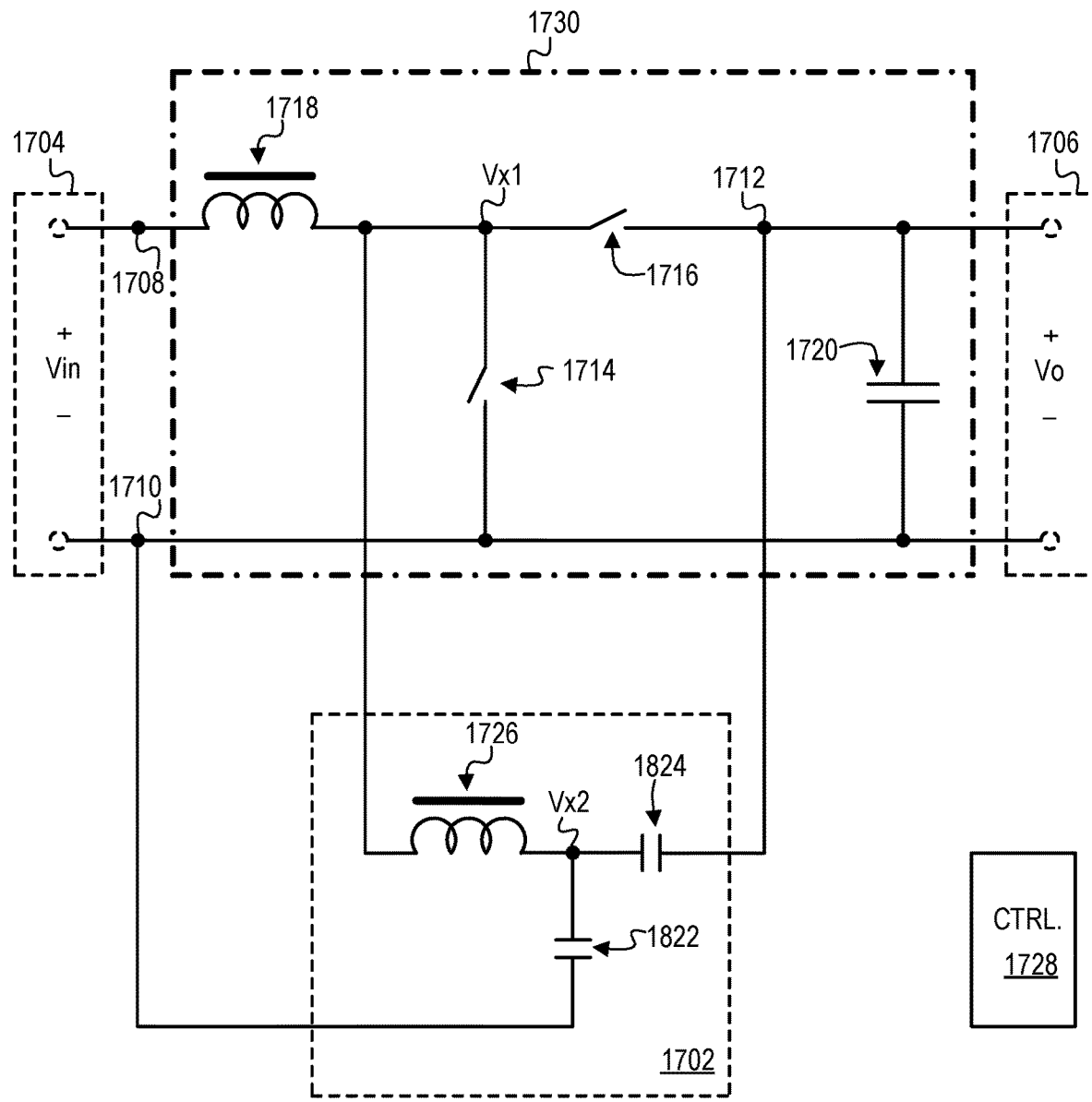
FIG. 18 illustrates operation of the FIG. 17 switching power converter in a first operating mode.

Converter 1700 has at least a first operating mode corresponding to moderate or heavy load operating conditions, and a second operating mode corresponding to light load operating conditions. FIG. 18 illustrates operation of converter 1700 in its first operating mode. In the first operating mode, second switching devices 1722, 1724 are adapted to operate in their non-conductive states. Specifically, controller 1728 causes second switching devices 1722, 1724 of light load enhancer 1702 to remain in their non-conductive states in the first operating mode, such that light load enhancer 1702 is inactive. Thus, second switching devices 1722, 1724 are replaced with capacitors 1822, 1824 in FIG. 18, to represent that these devices remain in their non-conductive states, but nevertheless exhibit parasitic capacitance, in the first operating mode.

Controller 1728 also controls first control and freewheeling switching devices 1714, 1716, such that these switching devices, along with first inductor 1718 and capacitor 1720, collectively form a first boost sub-converter 1730 transferring power from input power port 1704 to output power port 1706, in the first operating mode. Specifically, controller 1728 causes first control switching device 1714 to repeatedly switch between its conductive and non-conductive states to cause current through first inductor 1718 to ramp up and down, and controller 1728 causes first freewheeling switching device 1716 to repeatedly switch between its conductive and non-conductive states to perform a freewheeling function. In other words, controller 1728 controls first freewheeling switching device 1716 such that it provides a path for current flowing through first inductor 1718 when first control switching device 1714 is in its non-conductive state, in the first operating mode. Thus, first switching devices 1714, 1716 are adapted to repeatedly switch between their conductive and non-conductive states in the first operating mode.

Figure 19:
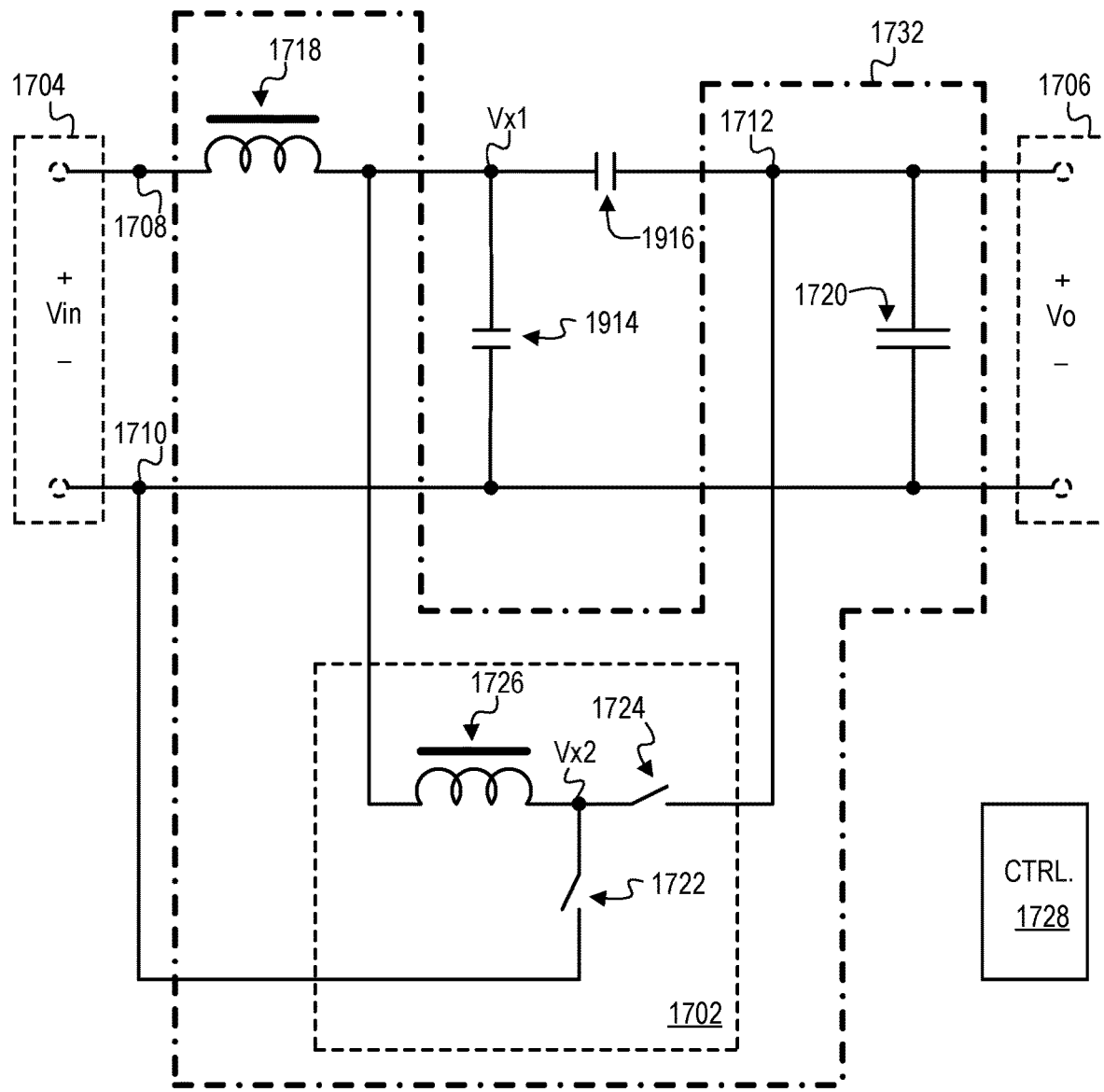
FIG. 19 illustrates operation of the FIG. 17 switching power converter in a second operating mode.

FIG. 19 illustrates operation of converter 1700 in its second operating mode. First switching devices 1714, 1716 are adapted to operate in their non-conductive states in the second operating mode. Specifically, controller 1728 causes first switching devices 1714, 1716 to remain in their non-conductive states in the second operating mode, such that first boost sub-converter 1730 is inactive. Accordingly, first switching devices 1714, 1716 are replaced with capacitors 1914, 1916 in FIG. 19, to represent that switching devices 1714, 1716 remain in their non-conductive states, but nevertheless exhibit parasitic capacitance, in the second operating mode.

Controller 1728 also controls operation of light load enhancer 1702 such that it, along with first inductor 1718 and capacitor 1720, collectively form a second boost sub-converter 1732 transferring power from input power port 1704 to output power port 1706, in the second operating mode. Specifically, controller 1728 causes second control switching device 1722 to repeatedly switch between its conductive and non-conductive states to cause current through both first and second inductors 1718, 1726 to ramp up and down, and controller 1728 causes second freewheeling device 1724 to repeatedly switch between its conductive and non-conductive states to provide a path for current through first and second inductors 1718, 1726 when second control switching device 1722 is in its non-conductive state. Thus, second switching devices 1722, 1724 are adapted to repeatedly switch between their conductive and non-conductive states in the second operating mode.

Thus, light load enhancer 1702 enables certain embodiments of converter 1700 to obtain the benefits of high energy storage inductance at light loads, without the drawbacks at heavy loads. In particular, in the first operating mode, which corresponds to moderate or heavy load conditions, converter 1700 has an effective energy storage inductance corresponding to the inductance value of first inductor 1718. However, in the second operating mode, which corresponds to light load conditions, converter 1700 has an effective energy storage inductance corresponding to the sum of the inductance value of first inductor 1718 and the inductance value of second inductor 1726. Because the of sum inductor 1718 and 1726 is greater than the value of inductor 1718 alone, converter 1700 has a larger energy storage inductance value at light load than at moderate or heavy load. Thus, light load enhancer 1702 enables converter 1700 to operate with a relatively large inductance at light load and relatively small inductance at heavy load.

Features of converter 1700 can be varied without departing from the scope hereof. For example, in some alternate embodiments, light load enhancer 1702 is electrically coupled to input power node 1708 instead of to first switching node Vx1, such that effective inductance in the second operating mode is equal to the value of second inductor 1726. As another example, one or more of freewheeling switching devices 1716, 1724 are replaced with freewheeling diodes in some alternate embodiments. Additionally, converter 1700 can be modified to include additional power stages with or without light load enhancers, such as to form a multi-phase boost converter.

Figure 20:
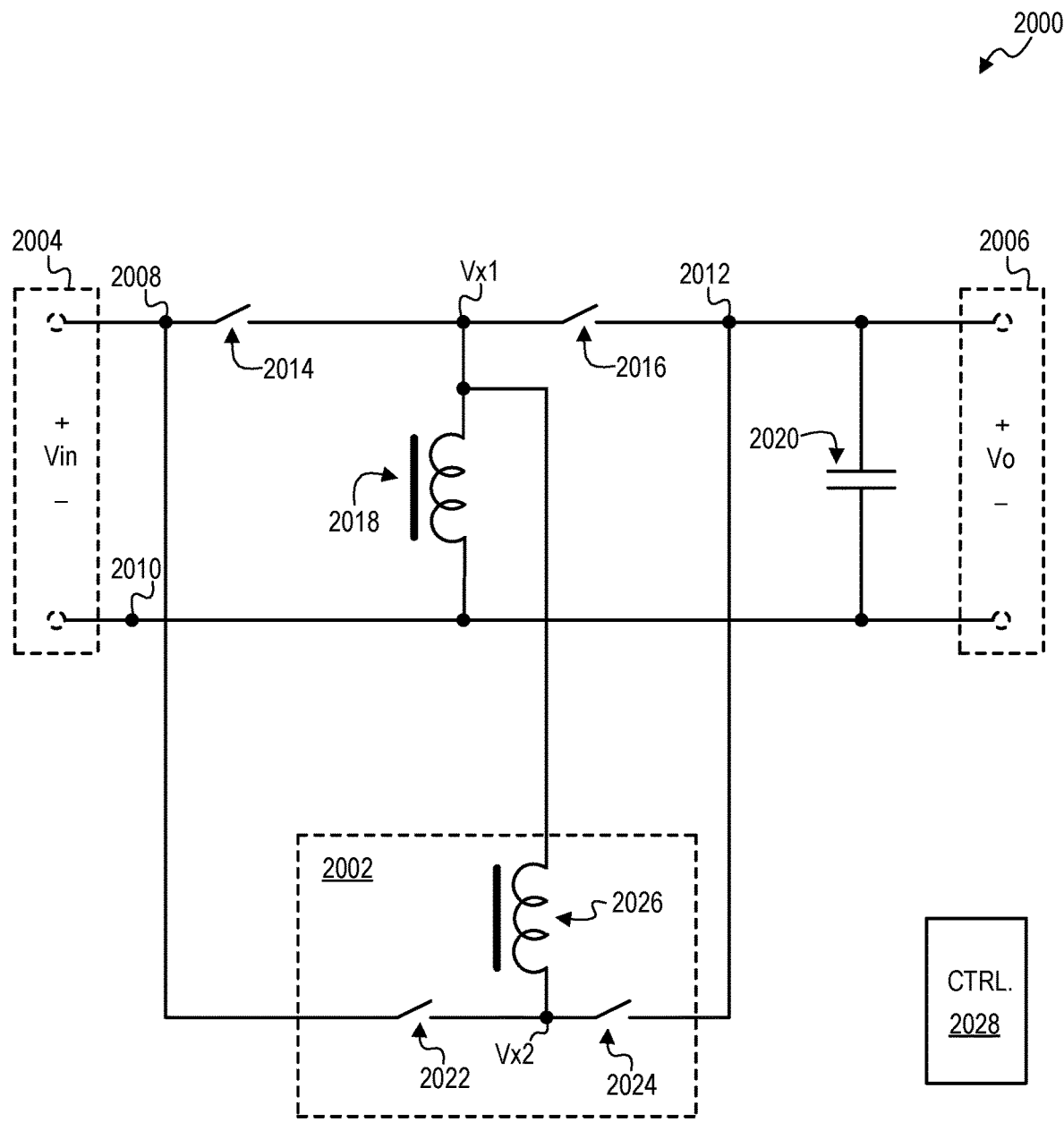
FIG. 20 illustrates a buck-boost DC-to-DC switching power converter including a light load enhancer, according to an embodiment.

FIG. 20 illustrates a buck-boost DC-to-DC switching power converter 2000 including a light load enhancer 2002. Converter 2000 also includes an input power port 2004 electrically coupled across input and common power nodes 2008, 2010, and an output power port 2006 electrically coupled across output power node 2012 and common power node 2010. Converter 2000 further includes a first control switching device 2014, a first freewheeling switching device 2016, a first inductor 2018, a capacitor 2020, and a controller 2028. First control switching device 2014 is electrically coupled between input power node 2008 and a first switching node Vx1, and first freewheeling switching device 2016 is electrically coupled between first switching node Vx1 and output power node 2012. First inductor 2018 is electrically coupled between first switching node Vx1 and common power node 2010, and capacitor 2020 is electrically coupled between output power node 2012 and common power node 2010.

Light load enhancer 2002 includes a second control switching device 2022, a second freewheeling switching device 2024, and a second inductor 2026. The second control switching device is electrically coupled between first input power node 2008 and a second switching node Vx2, and the second freewheeling switching device is electrically coupled between second switching node Vx2 and output power node 2012. Second inductor 2026 is electrically coupled between second switching node Vx2 and first switching node Vx1, such that first and second inductors 2018, 2026 are electrically coupled in series.

Figure 21:
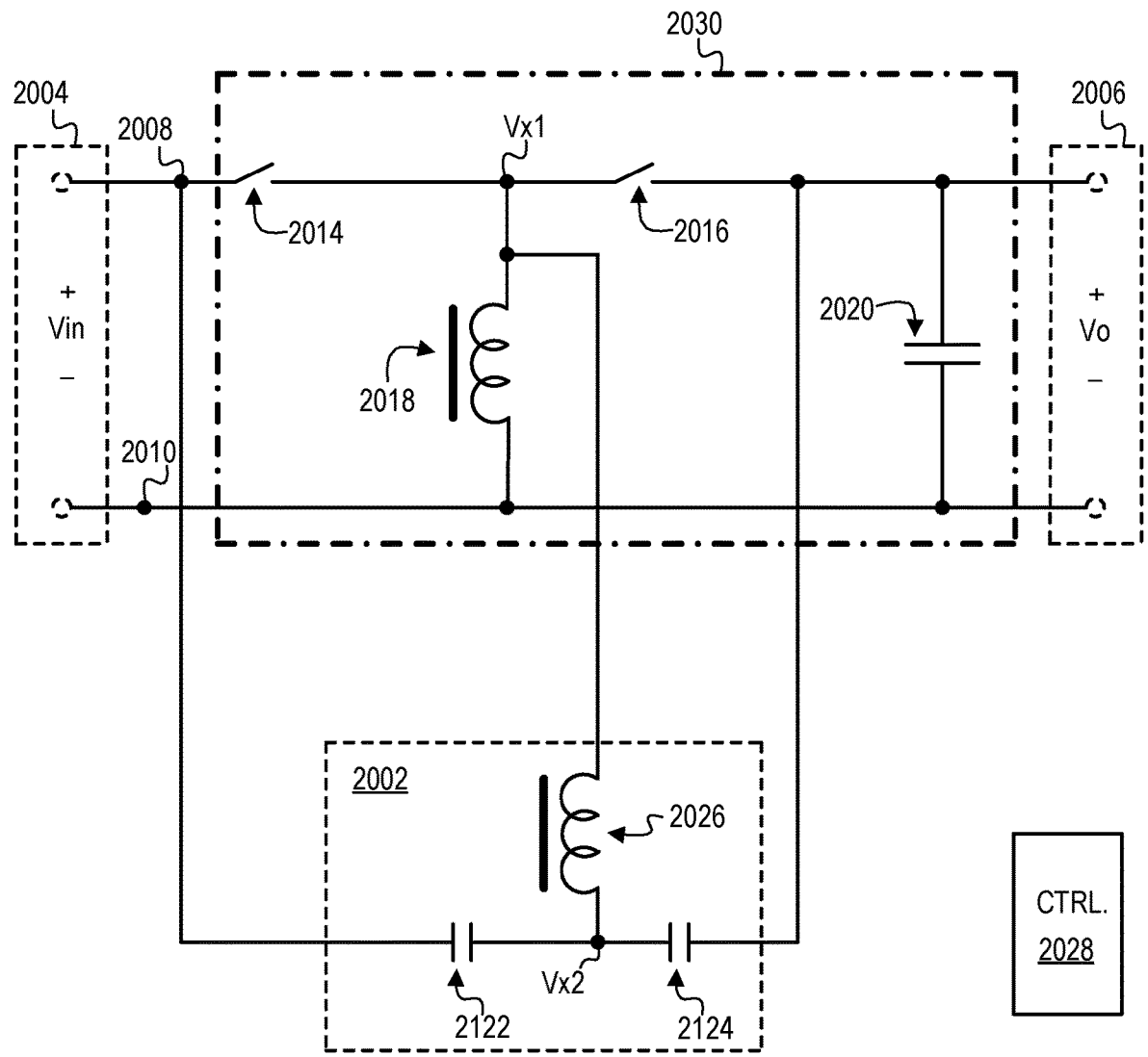
FIG. 21 illustrates operation of the FIG. 20 switching power converter in a first operating mode.

Converter 2000 has a first operating mode corresponding to moderate or heavy load operating conditions, and a second operating mode corresponding to light load operating conditions. FIG. 21 illustrates operation of converter 2000 in its first operating mode. Second switching devices 2022, 2024 are adapted to operate in their non-conductive states in the first operating mode. Specifically, controller 2028 causes second switching devices 2022, 2024 of light load enhancer 2002 to remain in their non-conductive states in the first operating mode, such that light load enhancer 2002 is inactive. Thus, second switching devices 2022, 2024 are replaced with capacitors 2122, 2124 in FIG. 21, to represent that these devices remain in their non-conductive states, but nevertheless exhibit parasitic capacitance, in the first operating mode.

Controller 2028 also controls first control and freewheeling switching devices 2014, 2016 such that these switching devices, along with first inductor 2018 and capacitor 2020, collectively form a first buck-boost sub-converter 2030 transferring power from input power port 2004 to output power port 2006, in the first operating mode. Specifically, controller 2028 causes first control switching device 2014 to repeatedly switch between its conductive and non-conductive states to cause current through first inductor 2018 to ramp up and down, and controller 2028 causes first freewheeling switching device 2016 to repeatedly switch between its conductive and non-conductive states to perform a freewheeling function. In other words, controller 2028 controls first freewheeling switching device 2016 such that it provides a path for current flowing through first inductor 2018 when first control switching device 2014 is in its non-conductive state, in the first operating mode. Thus, first switching devices 2014, 2016 are adapted to repeatedly switch between their conductive and non-conductive states in the first operating mode.

Figure 22:
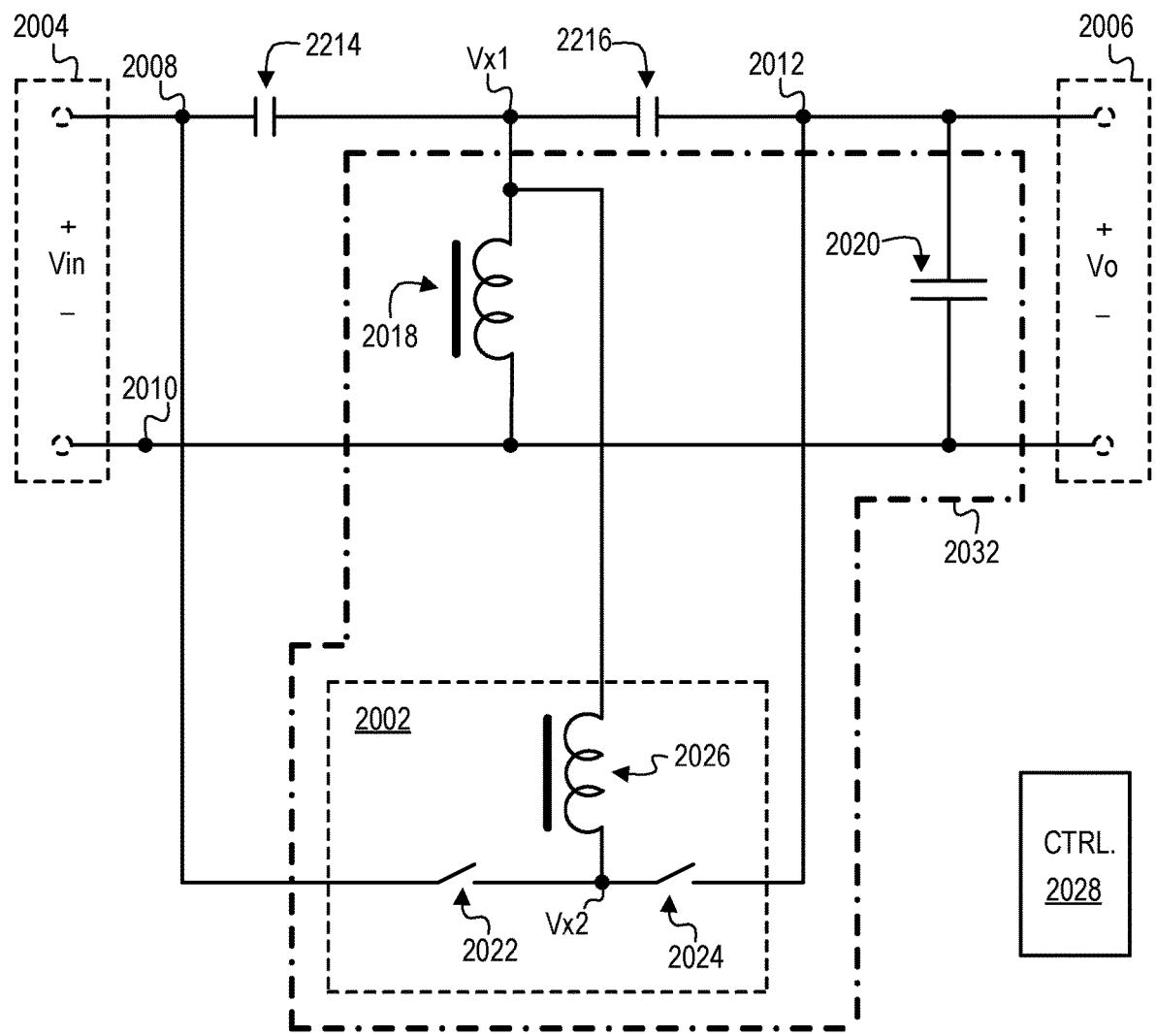
FIG. 22 illustrates operation of the FIG. 20 switching power converter in a second operating mode.

FIG. 22 illustrates operation of converter 2000 in its second operating mode. First switching devices 2014, 2016 are adapted to operate in their non-conductive states in the second operating mode. Specifically, controller 2028 causes first switching devices 2014, 2016 to remain in their non-conductive states in the second operating mode, such that first buck-boost sub-converter 2030 is inactive. Accordingly, first switching devices 2014, 2016 are replaced with capacitors 2214, 2216 in FIG. 22, to represent that switching devices 2014, 2016 remain in their non-conductive states, but nevertheless exhibit parasitic capacitance, in the second operating mode.

Controller 2028 also controls operation of light load enhancer 2002 such that it, along with first inductor 2018 and capacitor 2020, collectively form a second buck-boost sub-converter 2032 transferring power from input power port 2004 to output power port 2006, in the second operating mode. Specifically, controller 2028 causes second control switching device 2022 to repeatedly switch between its conductive and non-conductive states to cause current through both first and second inductors 2018, 2026 to ramp up and down, and controller 2028 causes second freewheeling device 2024 to repeatedly switch between its conductive and non-conductive states to provide a path for current through first and second inductors 2018, 2026 when second control switching device 2022 is in its non-conductive state. Thus, second switching devices 2022, 2024 are adapted to repeatedly switch between their conductive and non-conductive states in the second operating mode.

Thus, light load enhancer 2002 enables certain embodiments of converter 2000 to obtain the benefits of high energy storage inductance at light loads, without the drawbacks at heavy loads. In particular, in the first operating mode, which corresponds to moderate or heavy load conditions, converter 2000 has an effective energy storage inductance corresponding to the inductance value of first inductor 2018. However, in the second operating mode, which corresponds to light load conditions, converter 2000 has an effective energy storage inductance corresponding to the sum of the inductance value of first inductor 2018 and the inductance value of second inductor 2026. Because the of sum inductor 2018 and 2026 values is greater than value of inductor 2018 alone, converter 2000 has a larger energy storage inductance value at light loads than at moderate or heavy loads. Thus, light load enhancer 2002 enables converter 2000 to operate with a relatively large inductance at light load and relatively small inductance at heavy load.

Features of converter 2000 can be varied without departing from the scope hereof. For example, in some alternate embodiments, at least one of freewheeling switching devices 2016, 2024 is replaced with a freewheeling diode. As another example, in certain alternate embodiments, light load enhancer 2002 is electrically coupled to common power node 2010, instead of to first switching node Vx1, such that converter 2000 has an effective inductance equal to the value of second inductor 2026, in the second operating mode. Additionally, converter 2000 can be modified to include additional power stages with or without light load enhancers, such as to form a multi-phase buck-boost converter.

Figure 23:
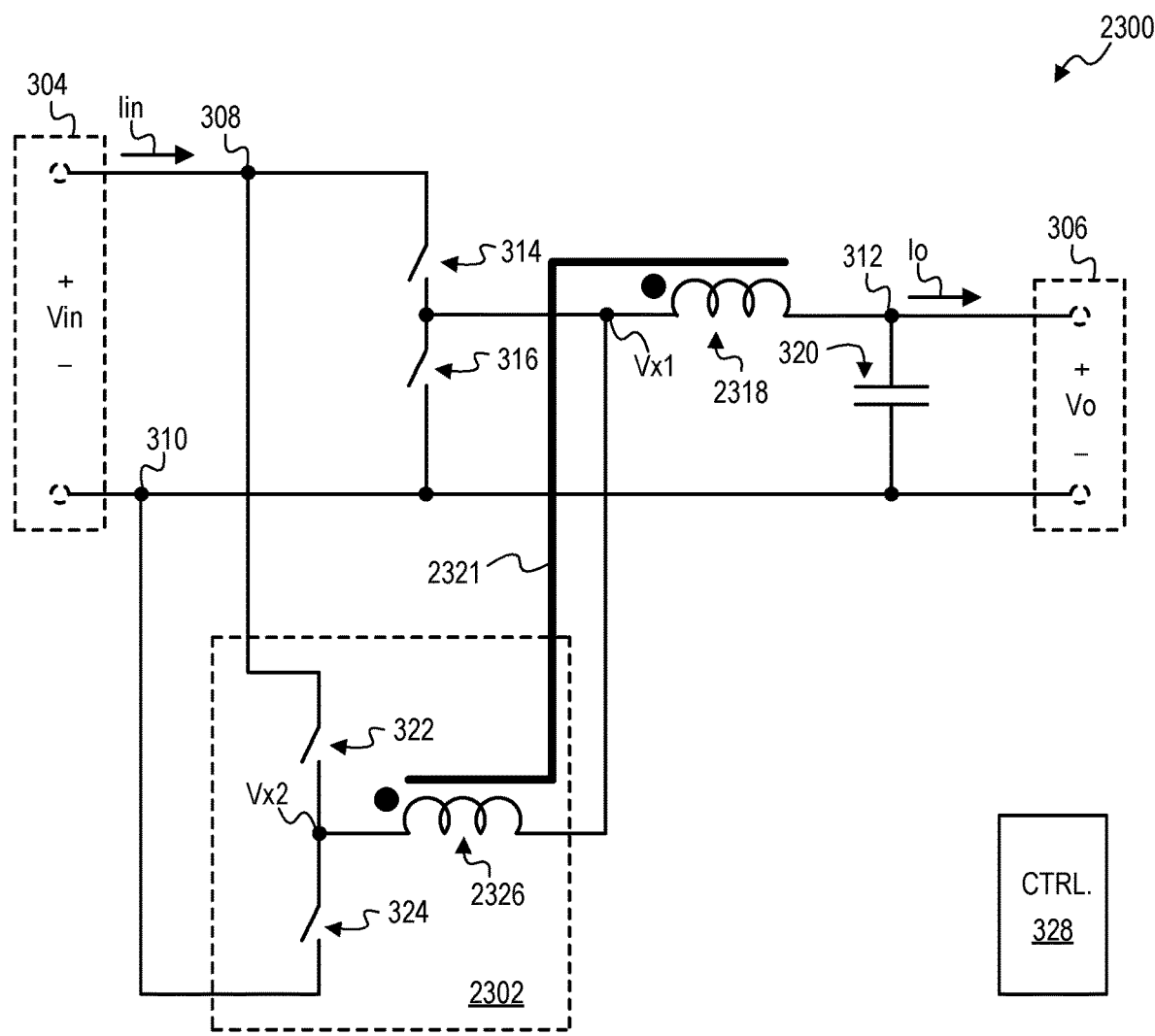
FIG. 23 illustrates a buck DC-to-DC switching power converter including a light load enhancer with magnetic coupling of first and second inductors, according to an embodiment.

The switching converters with light load enhancers discussed above can be modified to realize magnetic coupling between first and second inductors, thereby promoting large energy storage inductance values at light load. For example, FIG. 23 illustrates a switching converter 2300 including a light load enhancer 2302. Converter 2300 is similar to converter 300 of FIG. 3, but includes magnetically coupled first and second inductors 2318, 2326 in place of discrete first and second inductors 318, 326. First and second inductors 2318, 2326 are part of a common coupled inductor including a magnetic core 2321. First and second inductors 2318, 2326 are also arranged such that they are in-phase when electrically coupled in series, as shown, for example, by the winding polarity dots in FIG. 23.

Figure 24:
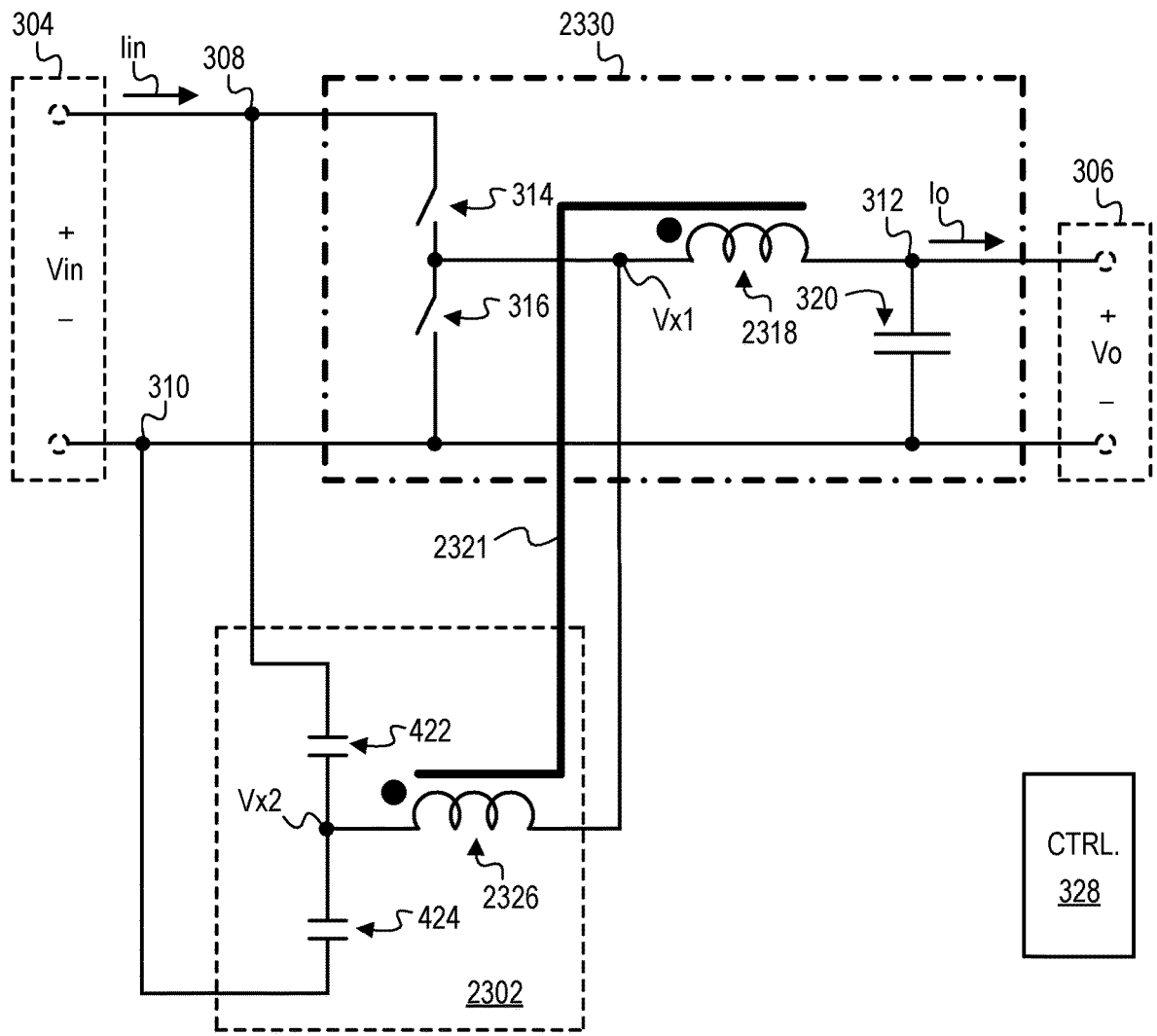
FIG. 24 illustrates operation of the FIG. 23 switching power converter in a first operating mode.
Figure 25:
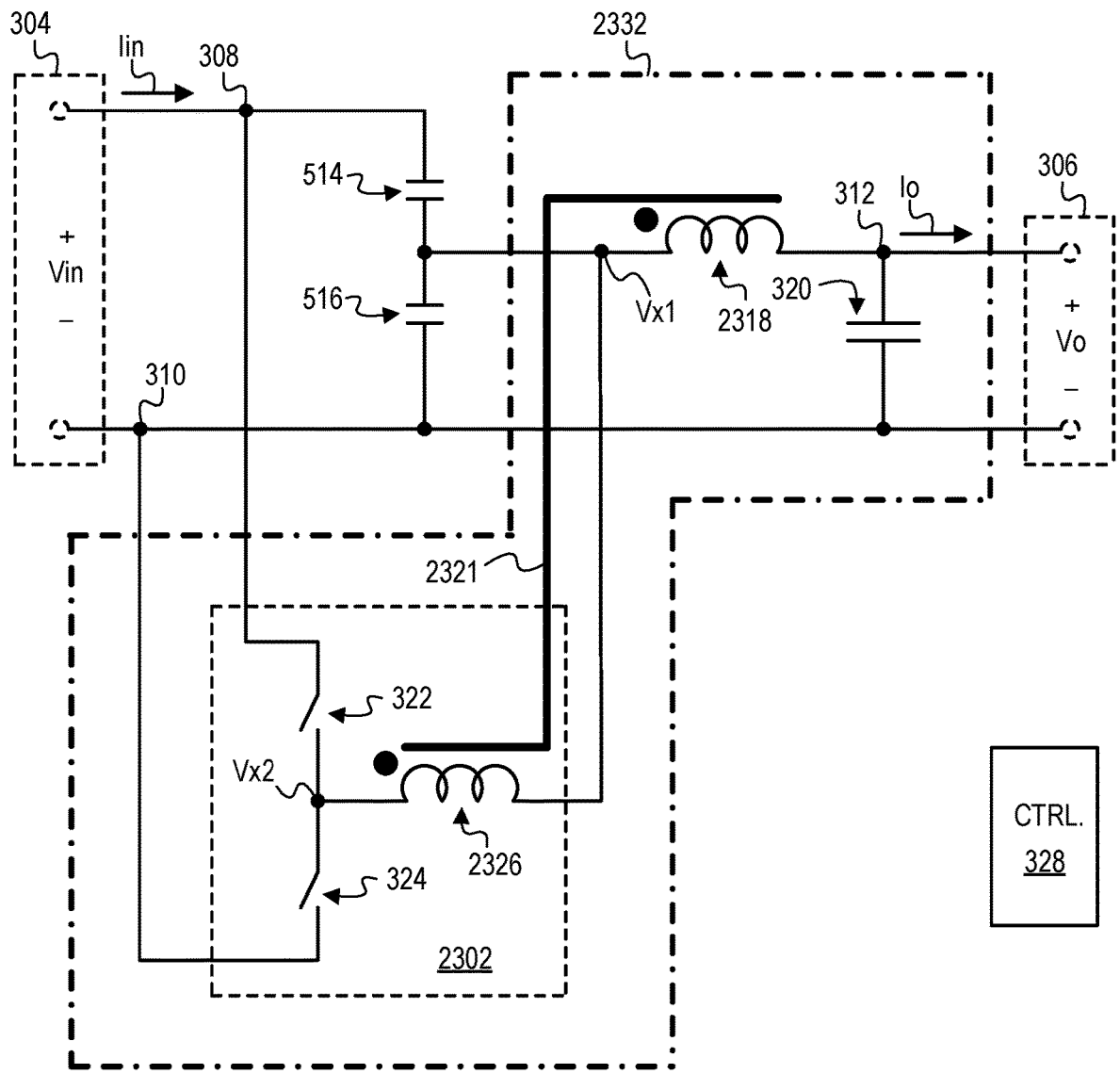
FIG. 25 illustrates operation of the FIG. 23 switching power converter in a second operating mode.

Converter 2300 has first and second operating modes similar to those of converter 300. FIG. 24 illustrates converter 2300 in its first operating mode, where first control and freewheeling switching devices 314, 316, first inductor 2318, and capacitor 320 collectively form a first buck sub-converter 2330 transferring power from input power port 304 to output power port 306, in a manner similar to that discussed above with respect to FIG. 4. FIG. 25 illustrates converter 2300 in its second operating mode, where light load enhancer 2302, first inductor 2318, and capacitor 320 collectively form a second buck sub-converter 2332 transferring power from input power port 304 to output power port 306, in a manner similar to that discussed above with respect to FIG. 5. First and second inductors 2318, 2326 collectively form a single inductor in the second operating mode, where the single inductor has a number of turns equal to the sum of the number of turns first inductor 2318 and the number of turns of inductor 2326, assuming strong magnetic coupling of first and second inductors 2318, 2326.

Magnetic coupling of first and second inductors 2318, 2326 promotes a large energy storage inductance value in the second operating mode. For example, consider an embodiment where first and second inductors 2318, 2326 are part of a symmetrical coupled inductor, where first inductor 2318 includes a winding forming a single turn, and second inductor 2326 includes a winding forming two turns. Inductance is roughly proportional to the square of the number of winding turns. Thus, inductance is expressed as follows, where N is the number of winding turns, and $L_T$ is the inductance of a single turn:

$$L = L_T(N)^2 \qquad \text{EQN. 1}$$

In the first operating mode, N is one, and first buck sub-converter 2330 has an effective energy storage inductance $L_{eff1}$ given by:

$$L_{eff1} = L_T(1)^2 = L_T \qquad \text{EQN. 2}$$

In the second operating mode, first and second inductors 2318, 2326 collectively form an inductor with a three-turn winding such that N is three, assuming strong magnetic coupling between all three windings. Therefore, second buck sub-converter 2332 has an effective energy storage inductance $L_{eff2}$ in the second operating mode given by:

$$L_{eff2} = L_T(3)^2 = 9L_T \qquad \text{EQN. 3}$$

Thus, the effective energy storage inductance value of the second operating mode is nine times that of the first operating mode, thereby promoting light load efficiency.

In contrast, consider an alternate embodiment where first and second inductors 2318, 2326 are replaced with first and second discrete (non-coupled) inductors including windings forming one and two turns, respectively. Assuming these discrete inductors have the same corresponding core cross sections and air gaps as the coupled inductor they replaced, effective energy storage inductance in the first operating mode $L_{eff1}$ is given by:

$$L_{eff1} = L_T(1)^2 = L_T \qquad \text{EQN. 4}$$

However, in the second operating mode, effective energy storage inductance $L_{eff2}$ is equal to the following, since the first and second inductors are discrete:

$$L_{eff2} = L_T(2)^2 + L_T(1)^2 = 5L_T \qquad \text{EQN. 5}$$

Thus, the effective energy storage inductance value of the second operating mode is only five times that of the first operating mode in this alternate embodiment. Accordingly, in embodiments where first and second inductors 2318, 2326 have one and two winding-turns, respectively, strong magnetic coupling of the two inductors can increase effective energy storage inductance by a factor of approximately 1.8, compared to an otherwise similar embodiment with no magnetic coupling between the inductors. Significant increases in effective energy storage inductance are also potentially obtainable with other numbers of winding turns.

Figure 26:
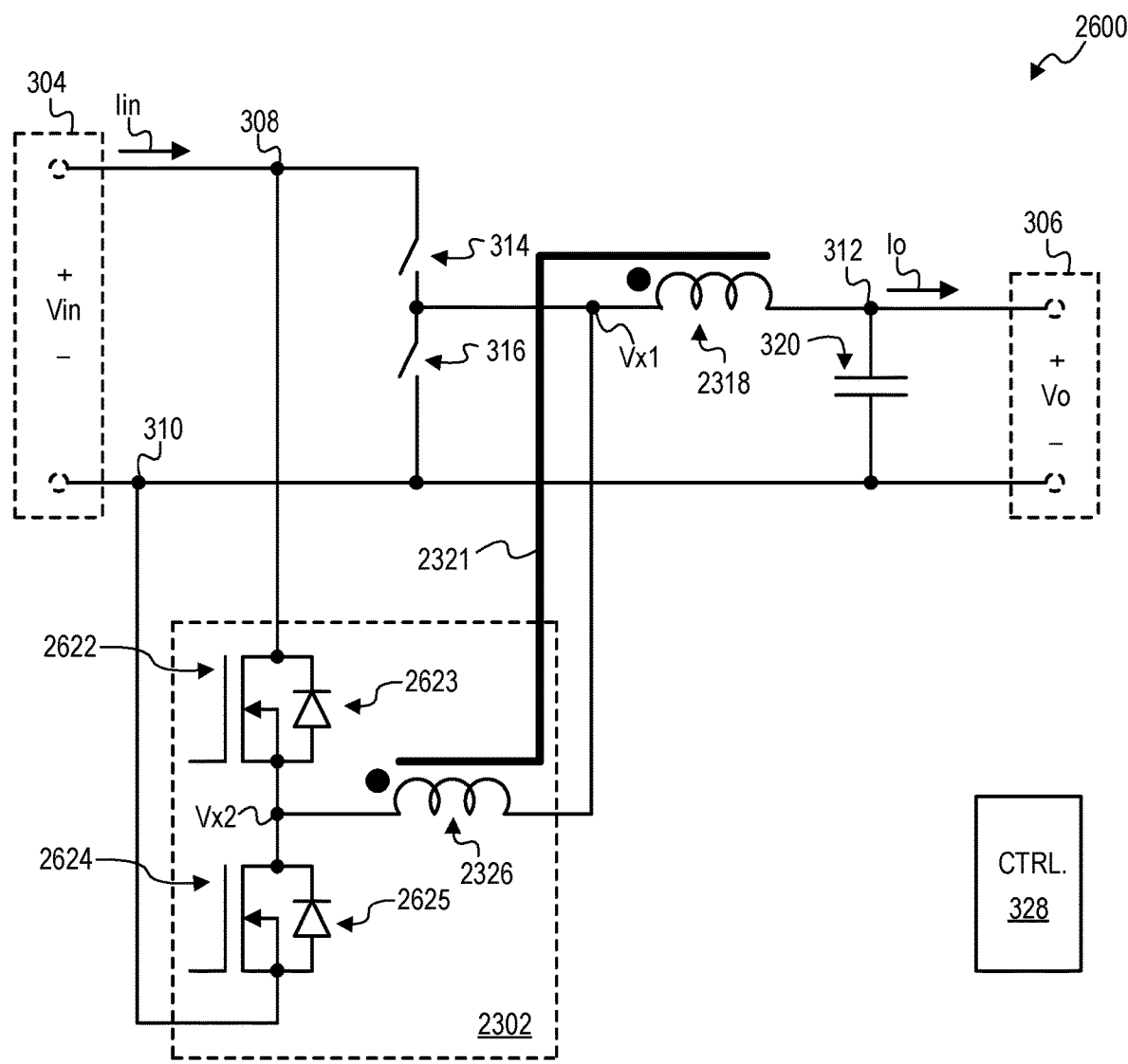
FIG. 26 illustrates an embodiment of the FIG. 23 switching power converter where the light load enhancer includes transistors.

Although magnetic coupling of first and second inductors 2318, 2326 can significantly boost effective energy storage inductance relative to an otherwise similar converter without the magnetic coupling, undesired diode conduction may occur in embodiments where one or more of second switching devices 322, 324 includes a diode. For example, consider switching converter 2600 of FIG. 26, which is an embodiment of converter 2300 (FIG. 23), where second control and freewheeling switching devices 322, 324 are implemented by control and freewheeling transistors 2622, 2624, respectively. Each transistor include a respective body diode 2623, 2625 which will conduct current in the first operating mode, due to magnetic coupling of first and second inductors 2318, 2326.

In particular, when first control switching device 314 is in its conductive state, a positive voltage across first inductor 2318 is reflected across second inductor 2326, causing body diode 2623 to be forward biased and conduct current. The voltage across second inductor 2326, however, is forced to be equal to the voltage drop across body diode 2623, since inductor 2326 is electrically coupled in parallel with diode 2623 under this condition. Thus, the ratio of voltage across first inductor 2318 to voltage across second inductor 2326 likely differs from the ratio of number of winding turns of first inductor 2318 to number of winding turns of second inductor 2326. This ratio disparity causes energy to be stored primarily in the small parasitic leakage inductance between windings, instead of in the relatively large magnetizing inductance of the coupled inductor. Such operation with small energy storage inductance severely impacts converter waveforms, causing large ripple current magnitude and impairing converter efficiency.

Similarly, when first freewheeling switching device 316 is in its conductive state, a negative voltage across first inductor 2318 is reflected across second inductor 2326, causing body diode 2625 to be forward biased and conduct current. Conduction of body diode 2625 in the first operating mode impairs converter performance in a similar manner to that discussed above with respect to body diode 2623. Thus, conduction of body diodes 2623, 2625 in the first operating mode is typically undesirable.

Figure 27:
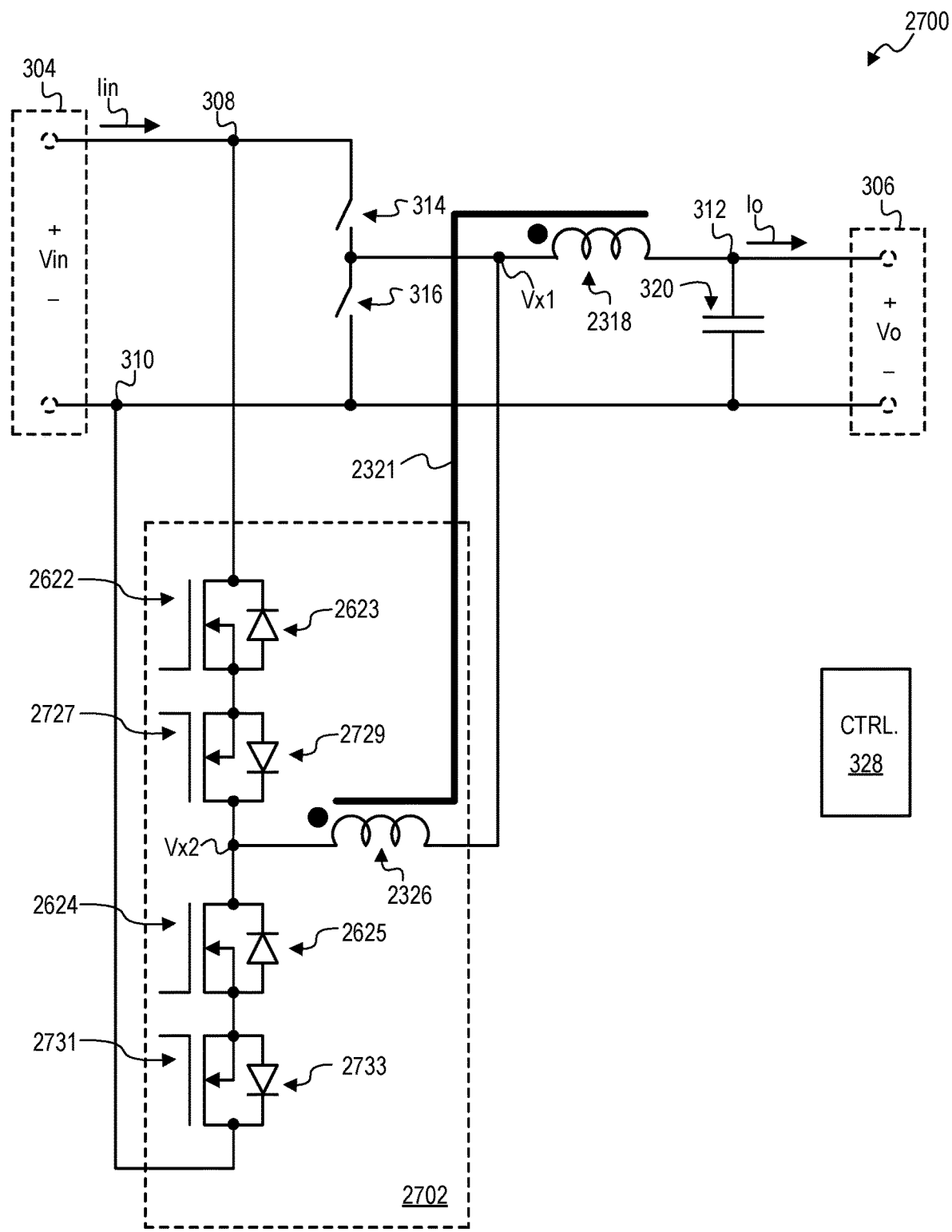
FIG. 27 illustrates a buck DC-to-DC switching power converter including a light load enhancer with magnetic coupling of first and second inductors, where the light load enhancer includes additional transistors, according to an embodiment.

Undesired body diode conduction in the first operating mode can be prevented, for example, by adding an additional switching device in series with each of the control and freewheeling switching devices of the light load enhancer. For example, FIG. 27 illustrates a switching converter 2700 including a light load enhancer 2702. Converter 2700 in similar to converter 2600 of FIG. 26, but further includes an additional switching device in the form of an additional transistor 2727 electrically coupled in series with control transistor 2622, and an additional switching device in the form of an additional transistor 2731 electrically coupled in series with freewheeling transistor 2624. Thus, control transistor 2622 is electrically coupled to second switching node Vx2 via additional transistor 2727, and freewheeling transistor 2624 is electrically coupled to common power node 310 via additional transistor 2731. In certain alternate embodiments, the position of control transistor 2622 and additional transistor 2727 are swapped, such that control transistor 2622 is electrically coupled to input power node 308 via additional transistor 2727. Similarly, in some alternate embodiments, the position of freewheeling transistor 2624 and additional transistor 2731 are swapped such that freewheeling transistor 2624 is electrically coupled to second switching node Vx2 via additional transistor 2731.

Additional transistors 2727, 2731 are adapted to operate in their non-conductive states in the first operating mode of converter 2700, to prevent body diodes 2623, 2625 from conducting current in the first operating mode. Specifically, controller 328 causes additional transistors 2727, 2731 to operate in their non-conductive states in the first operating mode, such that the anodes of body diodes 2623, 2625 are electrically de-coupled from the remainder of the converter. Body diodes 2729, 2733 of additional transistors 2727, 2731 each have an electrical orientation opposing that of body diodes 2623, 2625, so that body diodes 2729, 2733 also do not conduct current in the first operating mode. In other words, body diode 2729 is electrically coupled in series to body diode 2623 such that both diodes 2623, 2729 cannot simultaneously conduct current, and body diode 2733 is electrically coupled in series to body diode 2625 such that both diodes 2625, 2733 cannot simultaneously conduct current.

In the second operating mode of converter 2700, additional transistors 2727, 2731 are adapted to operate in their conductive states. In particular, controller 328 causes additional transistor 2727 to operate in its conductive state at least whenever control transistor 2622 is operating in its conductive state. Additionally, controller 328 also causes additional transistor 2731 to operate in its conductive state at least whenever freewheeling transistor 2624 operates in its conductive state. Thus, additional transistors 2727, 2731 do not affect the operation of light load enhancer 2702 in the second operating mode, neglecting losses, such as conduction losses, associated with the additional transistors. In certain embodiments, controller 328 is adapted to cause additional transistors 2727, 2731 to continuously operate in their conductive states in the second operating mode, thereby essentially eliminating switching losses associated with additional transistors 2727, 2731. Continuous conduction of additional transistors 2727, 2731 in the second operating mode also allows for clamping of voltage spikes on second switching node Vx2 via body diodes 2623, 2625, such as during dead-time when both control and freewheeling transistors 2622, 2624 are in their non-conductive states.

The type and/or configuration of control and/or freewheeling transistors 2622, 2624 can be varied without departing from the scope hereof. For example, in some alternate embodiments, N-channel control transistor 2622 is replaced with a P-channel control transistor to ease transistor driving requirements. As another example, in certain alternate embodiments, single control transistor 2622 is replaced with a pair of control transistors electrically coupled in parallel. Furthermore, the type and/or configuration of additional transistors 2727, 2731 can be varied without departing from the scope hereof, as long as the additional transistors prevent conduction of body diodes 2623, 2625 in the first operating mode. Moreover, additional transistors 2727, 2731 could even be replaced with switching devices other than transistors, as long as the switching devices prevent conduction of body diodes 2623, 2625 in the first operating mode.

Although magnetic coupling of first and second inductors is discussed with respect to converters similar to those of FIG. 3, other switching converters with light load enhancers could also be modified in a similar manner to realize magnetic coupling between first and second inductors. For example, converter 1000 (FIG. 10) could be modified such that first and second inductors 1018, 1026 in each power stage 1001 are magnetically coupled. As another example, converter 2000 (FIG. 20) could be modified such that first and second inductors 2018, 2026 of converter 2000 are magnetically coupled.

Figure 28:
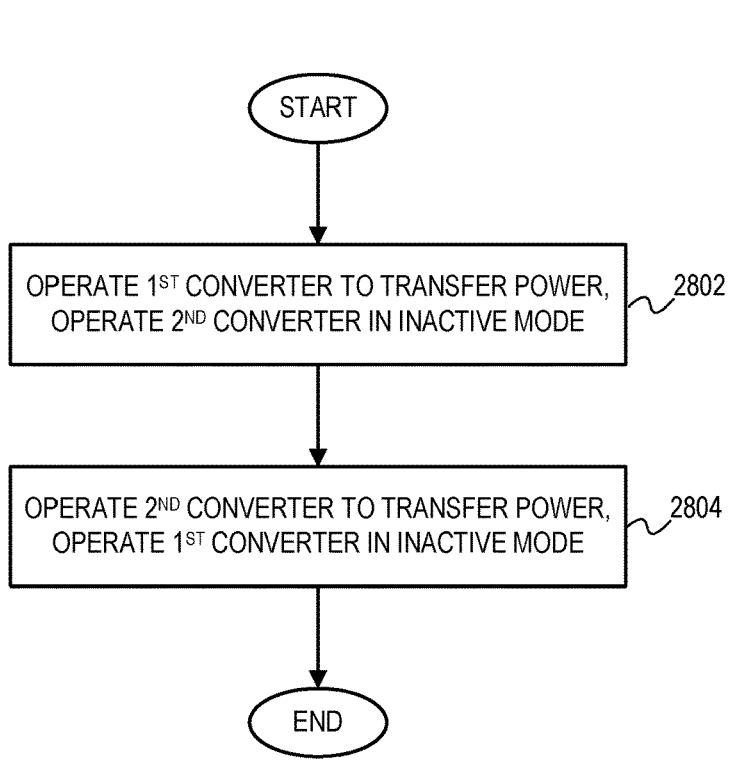
FIG. 28 shows a method for transferring power from an input power port to an output power port using a first and second switching sub-converter, according to an embodiment.

FIG. 28 shows a method 2800 for transferring power from an input power port to an output power port using a first and a second switching sub-converter. Method 2800 is used, for example, to power a processor electrically coupled to the output power port.

Method 2800 includes steps 2802 and 2804 representing a first and second operating mode, respectively. In step 2802, the first switching sub-converter is operated to transfer power from the input power port to the output power port, while the second switching sub-converter is operated in an inactive mode. One example of step 2802 is operating first buck sub-converter 330 of converter 300 (FIGS. 3 and 4) to transfer power from input power port 304 to output power port 306, while operating the second buck sub-converter 332 of converter 300 (FIGS. 3 and 5) in its inactive mode. Another example of step 2802 is operating the N first buck sub-converters 1036 of converter 1000 (FIGS. 10 and 11) to transfer power from input power port 1004 to output power port 1006, while operating the N second buck sub-converters 1038 of converter 1000 (FIGS. 10 and 12) in their inactive modes.

In step 2804, the second switching sub-converter is operated to transfer power from the input power port to the output power port, while the first switching sub-converter is operated in an inactive mode. One example of step 2804 is operating second buck sub-converter 332 of converter 300 to transfer power from input power port 304 to output power port 306, while operating first buck sub-converter 330 of converter 300 in its inactive mode. Another example of step 2804 is operating the N second buck sub-converters 1038 of converter 1000 to transfer power from input power port 1004 to output power port 1006, while operating the N first buck sub-converters 1036 of converter 1000 in their inactive modes.

One possible application of light load enhancer equipped switching power converters and associated methods is in information technology applications, such as in computing and telecommunication applications. Information technology devices often spend significant amounts of time in low power states and may therefore significantly benefit from a light load efficiency improvement potentially obtainable by use of a light load enhancer. For example, mobile information technology devices, such as tablet computers and smart phones, are particularly battery life sensitive. These devices often include a primary processor that operates in a sleep mode except when running an application or making a call. A switching power converter with a light load enhancer could be used, for example, to power the primary processor and promote efficient operation during sleep mode, thereby helping prolong battery life. In these applications, the switching power converter is switched between its first and second operating modes, for example, in response to a sleep signal provided by, or associated with, the primary processor.

Discussed below are examples of some possible magnetic devices that may be used with switching power converters including light load enhancers. Certain of these magnetic devices advantageously include two or more inductors in a common package, thereby promoting low cost, small size, and ease of component procurement, while minimizing or eliminating interaction (i.e., magnetic coupling) between inductors, thereby helping prevent undesired diode conduction, such as discussed above with respect to FIG. 26. It should be understood, however, that light load enhancers are not limited to use with the magnetic devices described below. Furthermore, the magnetic devices described below are not limited to use in light load enhancer applications.

Figure 29:
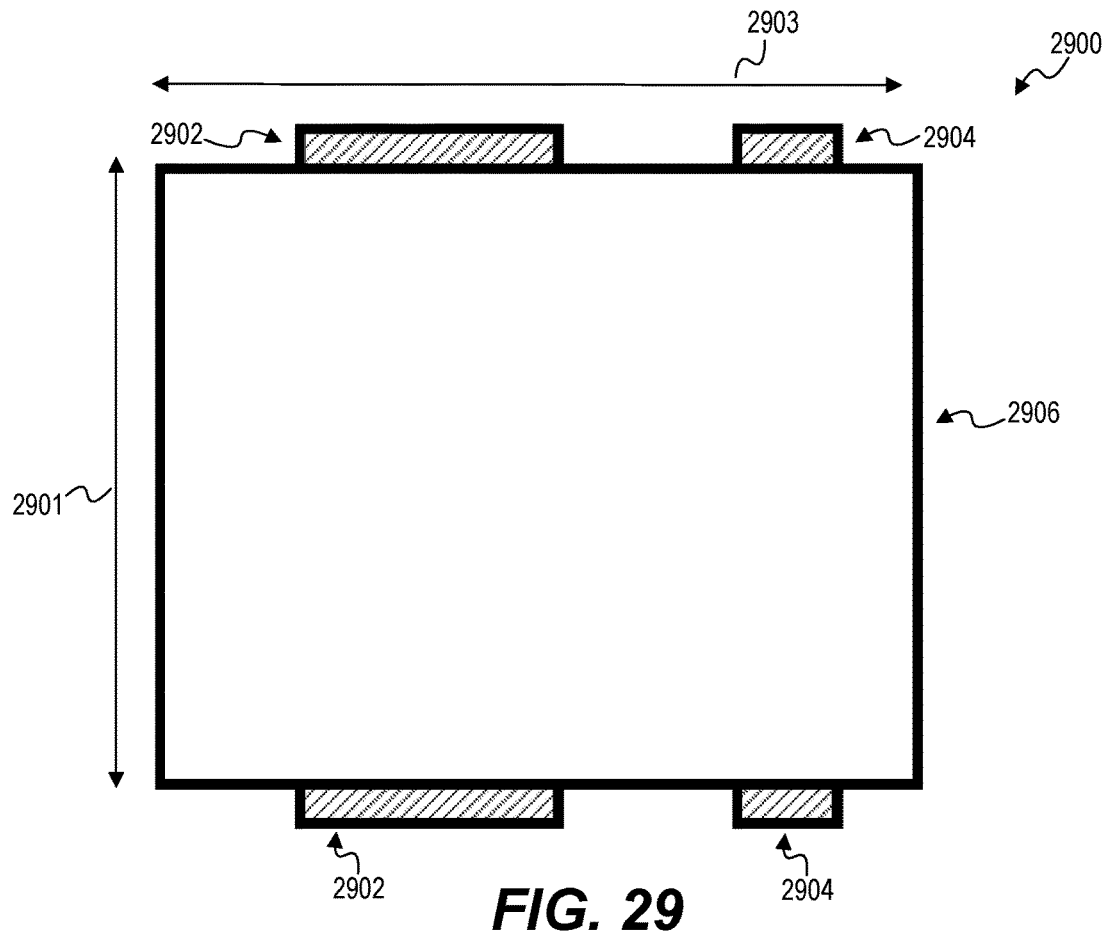
FIG. 29 shows a top plan view of a magnetic device including two inductors, according to an embodiment.
Figure 30:
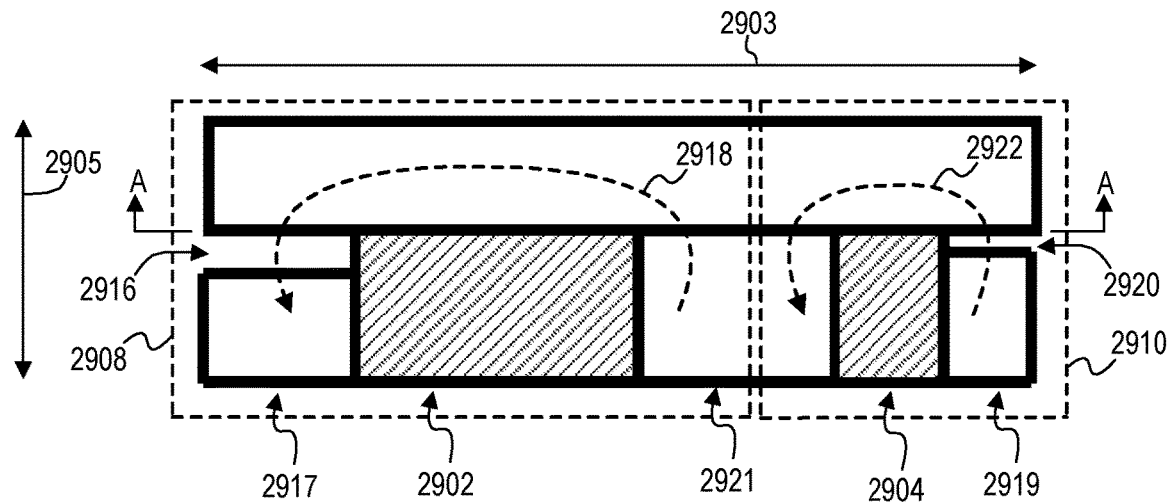
FIG. 30 shows a side view of the magnetic device of FIG. 29.
Figure 31:
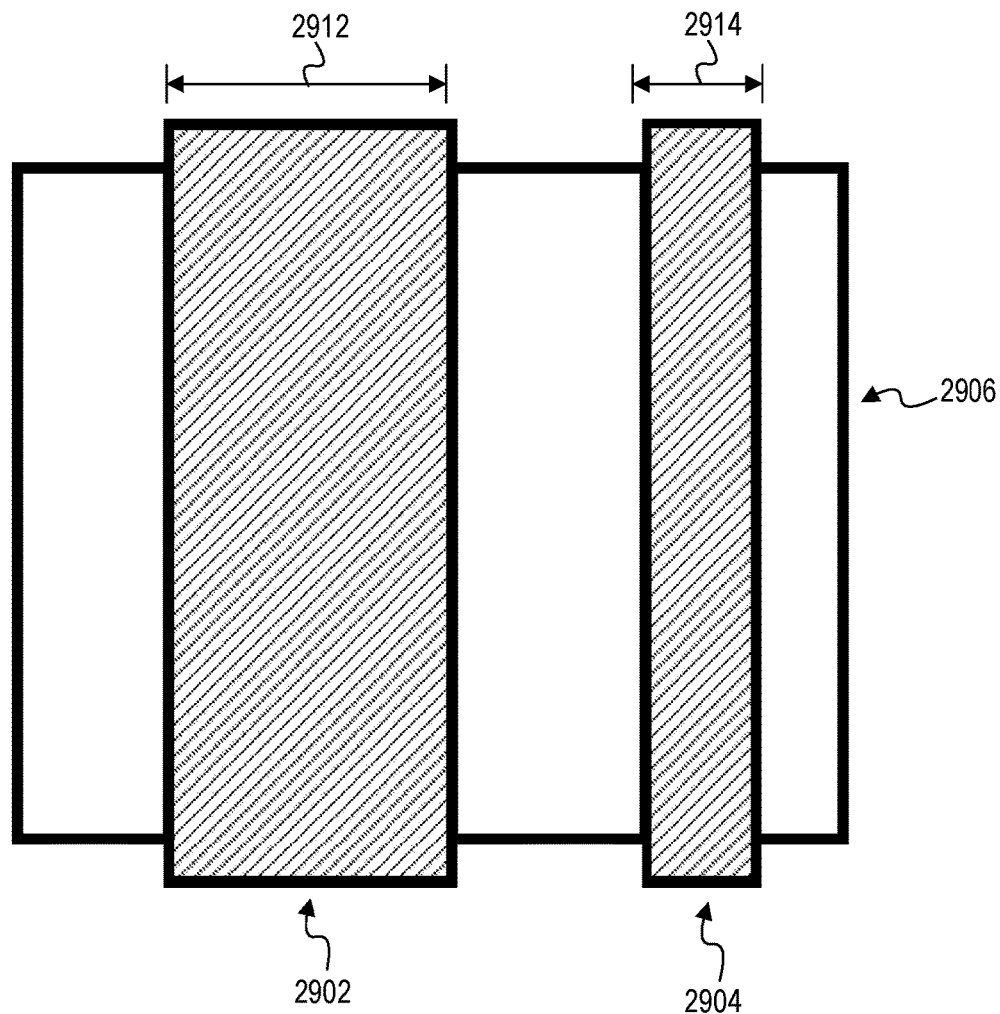
FIG. 31 shows a cross-sectional view of the magnetic device of FIGS. 29 and 30.

FIG. 29 shows a top plan view of a magnetic device 2900 including two inductors which may be used, for example, in a switching power converter including a light load enhancer. FIG. 30 shows a side view of device 2900, and FIG. 31 shows a cross-sectional view of device 2900 taken along line A-A of FIG. 30. Magnetic device 2900 has a depth 2901, a width 2903, and a height 2905 (see FIGS. 29 and 30).

Figure 32:
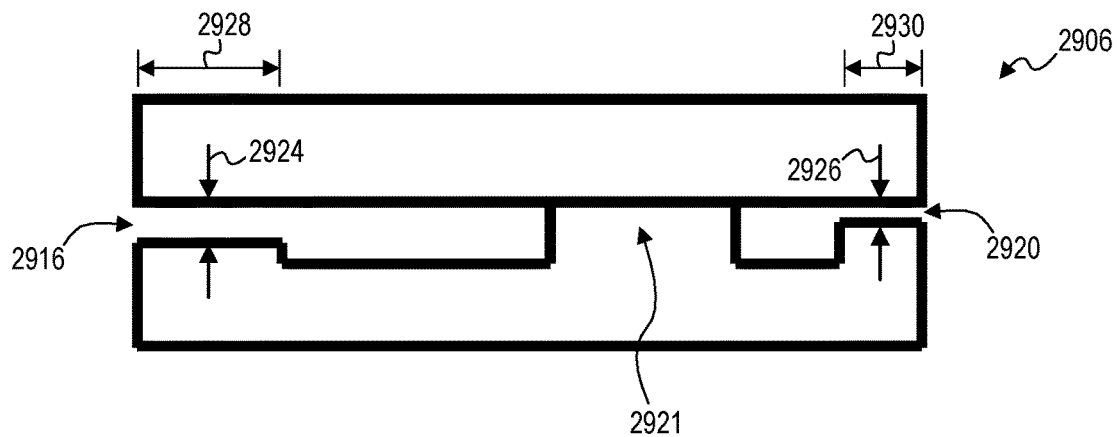
FIG. 32 shows a side view of the magnetic core of the magnetic device of FIGS. 29 and 30, without windings.

Magnetic device 2900 includes first and second foil "staple" windings 2902, 2904 wound through a magnetic core 2906 in the depth 2901 direction. First winding 2902 and magnetic core 2906 collectively form a first inductor 2908, and second winding 2904 and magnetic core 2906 collectively form a second inductor 2910, as illustrated in FIG. 30. The dashed lines of FIG. 30 only approximately delineate the portions of device 2900 forming first and second inductors 2908, 2910; in actuality, there is some overlap in portions of magnetic core 2906 forming first and second inductors 2908, 2910. FIG. 32 shows a side view of magnetic core 2906 without windings 2902, 2904. As discussed below, magnetic device 2900 is typically configured to magnetically isolate first and second windings 2902 and 2904 from each other, thereby minimizing magnetic coupling between first and second inductors 2908, 2910.

First inductor 2908 has a relatively small inductance value and a relatively large current handling capability, which may make this inductor particular suitable for use in heavy load applications. Second inductor 2910, on the other hand, has a relatively large inductance value and a relatively small current handling capability, which may make this inductor particularly suitable for use in light load applications. Thus, one possible application of first inductor 2908 is in a switching sub-converter intended for use at moderate or heavy loads, such as in first buck sub-converter 330 of converter 300 (FIG. 4), and one possible application of second inductor 2910 is in a switching sub-converter intended for use at light loads, such as in second buck sub-converter 332 of converter 300 (FIG. 5). Accordingly, some embodiments of converter 300 incorporate magnetic device 2900 such that first inductor 2908 of device 2900 is first inductor 318 of converter 300, and second inductor 2910 of device 2900 is second inductor 326 of converter 300. Magnetic device 2900 may also be used in a similar manner in the other switching power converters with light load enhancers discussed herein without magnetic coupling between the first and second inductors. For example, in some embodiments of converter 1000 (FIG. 10), each power stage 1001 includes an instance of magnetic device 2900 forming first and second inductors 1018, 1026 of the power stage.

First winding 2902 has a first width 2912, and second winding 2904 has a second width 2914 (see FIG. 31). First width 2912 is typically greater than second width 2914 to promote large current handling capability of first inductor 2908. Magnetic core 2906 forms a first gap 2916 in the primary magnetic flux path 2918 of first inductor 2908 to help control inductance of first inductor 2908 and to help prevent magnetic saturation, and the core forms a second gap 2920 in the primary magnetic flux path 2922 of second inductor 2910 to help control inductance of second inductor 2910 and to help prevent magnetic saturation. First and second gaps 2916, 2920 are respectively disposed in opposing first and second outer portions 2917, 2919 of core 2906. First winding 2902 is disposed between first outer portion 2917 and a core center portion 2921 in the width 2903 direction, and second winding 2904 is disposed between center portion 2921 and second outer portion 2919 in the width 2903 direction. Each gap 2916, 2920 is at least partially filled with a non-magnetic material, such as air, paper, plastic, and/or adhesive, or a magnetic material having a lower magnetic permeability than material forming magnetic core 2906. Gaps 2916, 2920 have respective thicknesses 2924, 2926 and respective widths 2928, 2930 (see FIG. 32). Inductance is roughly inversely proportional to gap thickness. Thus, first gap 2916 thickness 2924 is typically greater than second gap 2920 thickness 2926 to promote inductance disparity among first and second inductors 2908, 2910, i.e., to promote first inductor 2908 having a smaller inductance value than second inductor 2910. On the other hand, width 2928 of first gap 2916 is typically greater than width 2930 of second gap 2920 to promote high current capability of first inductor 2908, since large gap cross-section reduces susceptibility to magnetic saturation at high current levels.

Center portion 2921 of magnetic core 2906 typically includes little or no gap so that center portion 2921 acts as a low-reluctance "magnetic short," thereby magnetically isolating first winding 2902 from second winding 2904. In the context of this document, windings are "magnetically isolated" from each other when no more than ten percent of magnetic flux generated by current flowing through any one winding links any of other winding. Magnetic flux takes the path of least reluctance, and presence of low-reluctance center portion 2921 causes magnetic flux associated with first inductor 2908 to take primary magnetic flux path 2918 which does not link second winding 2904. Similarly, low-reluctance of center portion 2921 causes magnetic flux associated with second inductor 2910 to take primary magnetic flux path 2922 which does not link first winding 2902. Thus, presence of low-reluctance center portion 2921 prevents magnetic coupling of inductors 2908 and 2910, even though the two inductors are part of a common magnetic device and share common magnetic core 2906.

Core losses in center portion 2921 can be minimized by connecting and operating magnetic device 2900 such that magnetic flux associated with first inductor 2908 and magnetic flux associated with second inductor 2910 flow in opposite directions in center portion 2921. Such opposing flow of magnetic flux causes net magnetic flux in center portion 2921 to be smaller than magnetic flux associated with either first inductor 2908 or second inductor 2910. Smaller net magnetic flux, in turn, allows cross-sectional area of center portion 2921 to be reduced while maintaining given core losses, or allows core losses to be reduced while maintaining a given cross-sectional area of center portion 2921. Alternately, magnetic device 2900 can be connected and operated such that both magnetic flux associated with first inductor 2908 and magnetic flux associated with second inductor 2910 flow in a common direction in center portion 2921, to boost inductance to greater than the sum of the inductance of first inductor 2908 and the inductance of second inductor 2910, when first and second inductors 2908 and 2910 are electrically coupled in series.

Figure 33:
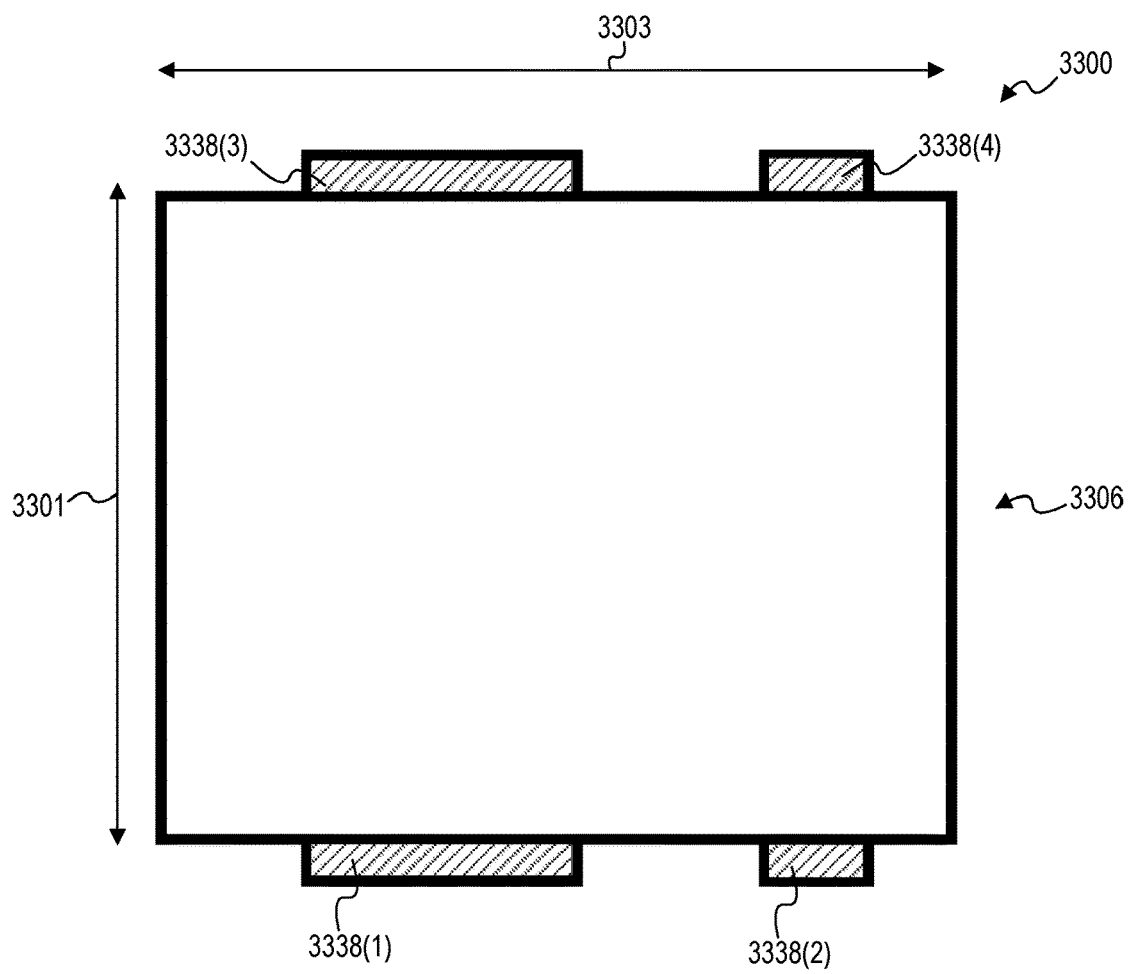
FIG. 33 shows a top plan view of magnetic device including first and second wire windings embedded in a powder magnetic core, according to an embodiment.
Figure 34:
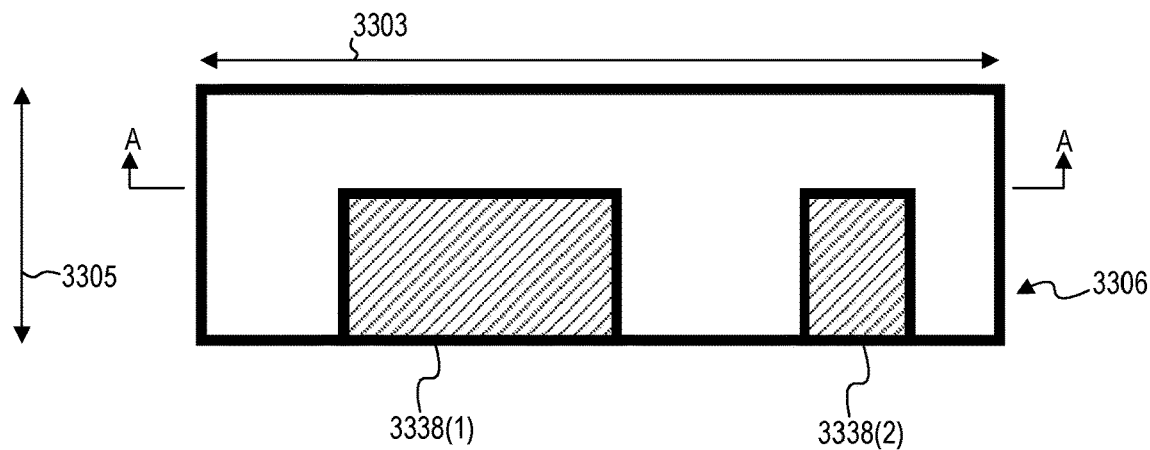
FIG. 34 shows a side view of the magnetic device of FIG. 33.
Figure 35:
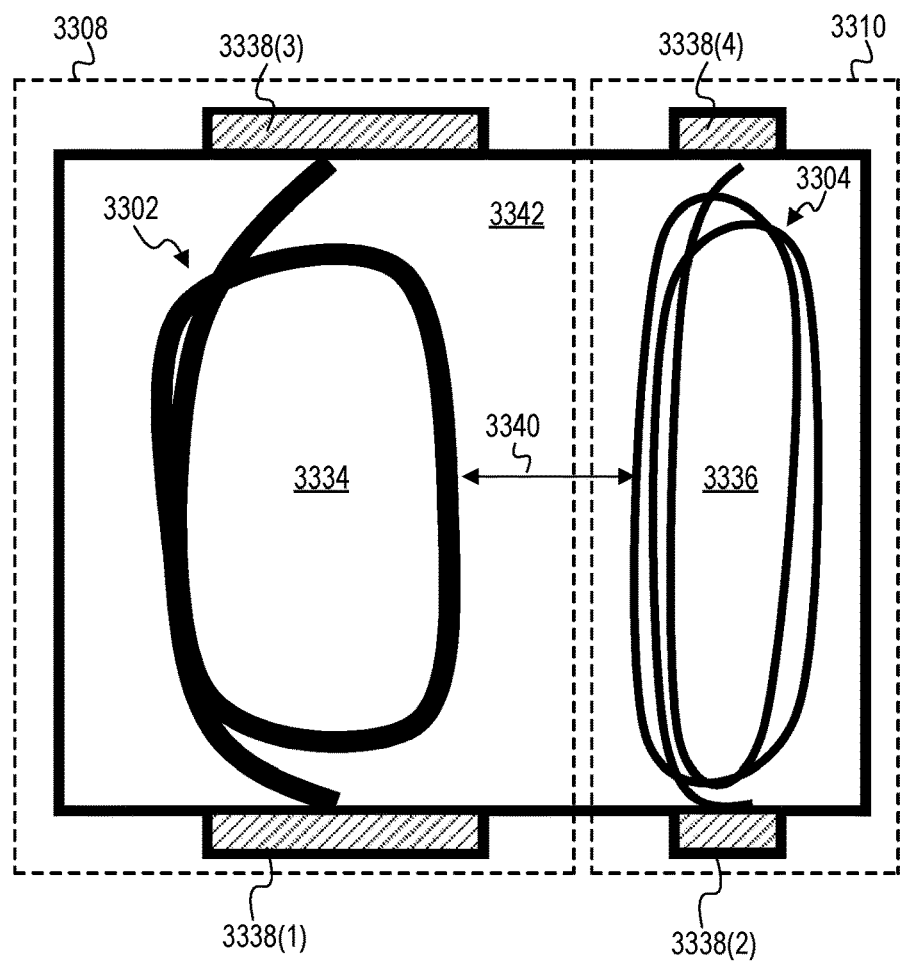
FIG. 35 shows a cross-sectional view of the magnetic device of FIGS. 33 and 34.

Magnetic device 2900 can be modified to have windings other than staple style windings. For example, FIGS. 33-35 show a magnetic device 3300, which is similar to magnetic device 2900, but includes first and second wire windings 3302, 3304 embedded in a monolithic powder magnetic core 3306, in place of staple style windings. FIG. 33 shows a top plan view of magnetic device 3300, FIG. 34 shows a side view of magnetic device 3300, and FIG. 35 shows a cross-sectional view of magnetic device 3300 taken along line A-A of FIG. 34. Magnetic device 3300 has a depth 3301, a width 3303, and a height 3305 (see FIGS. 33 and 34).

First winding 3302 and magnetic core 3306 collectively form a first inductor 3308, and second winding 3304 and magnetic core 3306 collectively form a second inductor 3310, as illustrated in FIG. 35. The dashed lines of FIG. 35 only approximately delineate the portions of device 3300 forming first and second inductors 3308, 3310; in actuality, there is some overlap in portions of magnetic core 3306 forming first and second inductors 3308, 3310.

Magnetic core 3306 is a single-piece, monolithic magnetic core that typically does not form any discrete gaps. However, the material forming core 3306 typically includes a mixture of magnetic particles and spacers, or a mixture of magnetic particles and other non-magnetic material, such that magnetic core 3306 effectively has a distributed gap. Inductance of inductors 3308, 3310 is controlled, in part, by varying the number of turns forming windings 3302, 3304, since inductance is roughly proportional to the square of the number of winding turns. Thus, second winding 3304 typically forms more turns than first winding 3302 so that second inductor 3310 has a larger inductance value than first inductor 3308. Additionally, first winding 3302 is typically formed of thicker (lower gauge) wire or conductive foil than second winding 3304, and an area 3334 enclosed by first winding 3302 is typically greater than an area 3336 enclosed by seconding winding 3304, as seen when magnetic device 3300 is viewed cross-sectionally in the height 3305 direction, to promote large current carrying capability of first inductor 3308. Accordingly, magnetic device 3300 is used in some embodiments of the switching power converters including light load enhancers disclosed herein, where first inductor 3308 of device 3300 is a first inductor of the converter, and second inductor 3310 of device 3300 is a second inductor of the converter. For example, in some embodiments of converter 300, first inductor 3308 of device 3300 is first inductor 318 of converter 300, and second inductor 3310 of device 3300 is second inductor 326 of converter 300.

Opposing ends of each winding 3302, 3304 are electrically coupled to a respective solder tab 3338. Solder tabs 3338 are adapted, for example, for surface mount soldering to a substrate, such as a printed circuit board. In certain alternate embodiments, one or more of solder tabs 3338 are replaced with an alternative connector, such as a thru-hole pin or a socket pin.

Magnetic device 3300 is formed, for example, by forming magnetic core material, such as powdered iron within a binder, around windings 3302, 3304, and then curing the binder, such as by exposing the binder to pressure, heat, electromagnetic radiation, and/or curing chemicals. For instance, in some embodiments, a mold is use to form magnetic core material around windings 3302, 3304, such that device 3300 has a "molded" magnetic core 3306.

Magnetic device 3300 is typically designed to magnetically isolate first and second windings 3302, 3304 by having a significant widthwise separation distance 3340 between the windings, such that a sum of areas 3334 and 3336 is less than an area 3342 outside of areas 3334 and 3346, as seen when magnetic device 3300 is view cross-sectionally in the height 3305 direction (see FIG. 35). The monolithic nature of magnetic core 3306 causes magnetic flux to flow as closely as possible to windings 3302 and 3304, and therefore, separation of windings 3302 and 3304 minimizes magnetic coupling of the windings. Furthermore, in some alternate embodiments, magnetic core 3306 is a non-homogenous magnetic core, with portions of magnetic core between first and second windings 3302 and 3304 having higher magnetic permeability than other portions of magnetic core 3306, to act as a magnetic "short" and thereby further minimize magnetic coupling of windings 3302 and 3304, and/or to allow for reduction in separation distance 3340 while maintaining magnetic isolation between the two windings.

Figure 36:
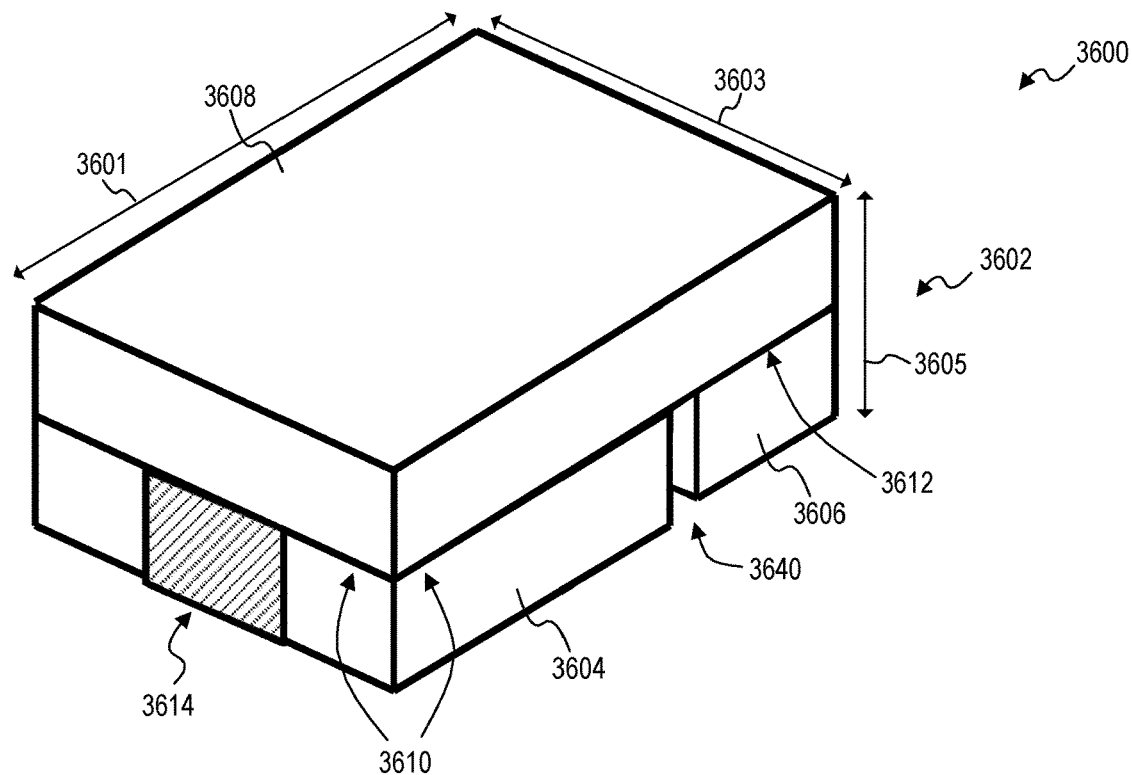
FIG. 36 shows a perspective view of a magnetic device including multiple single-turn windings which can be configured as a multi-turn inductor, according to an embodiment.
Figure 37:
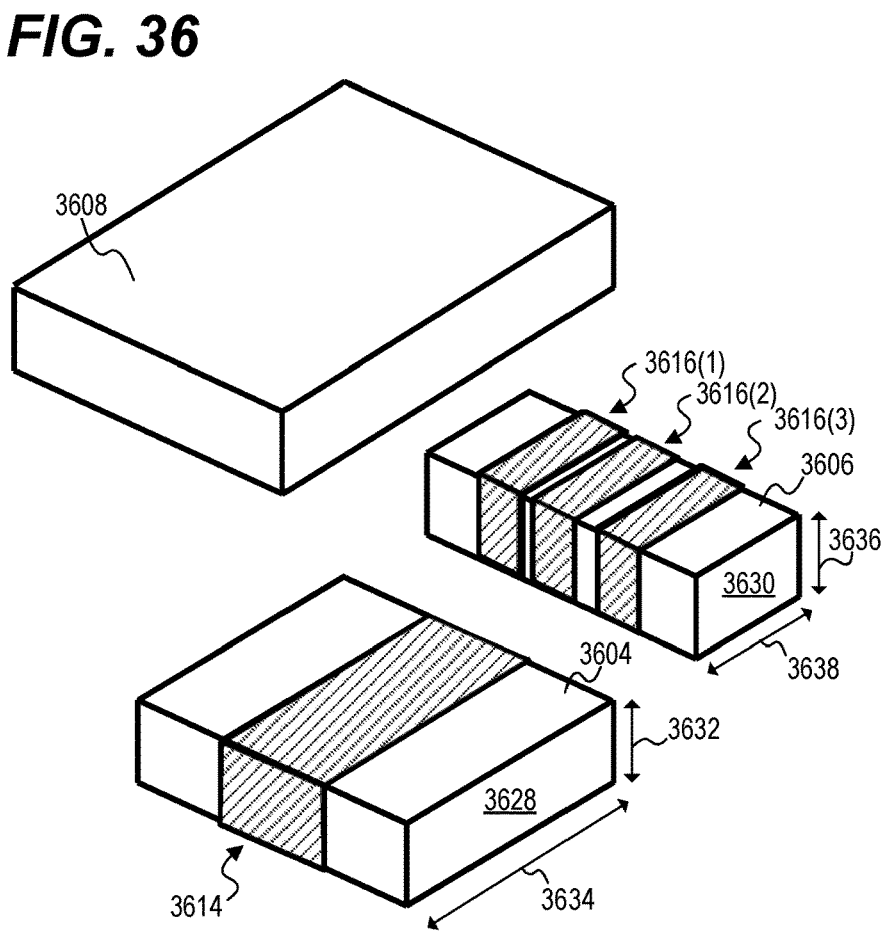
FIG. 37 shows an exploded perspective view of the magnetic device of FIG. 36.
Figure 38:
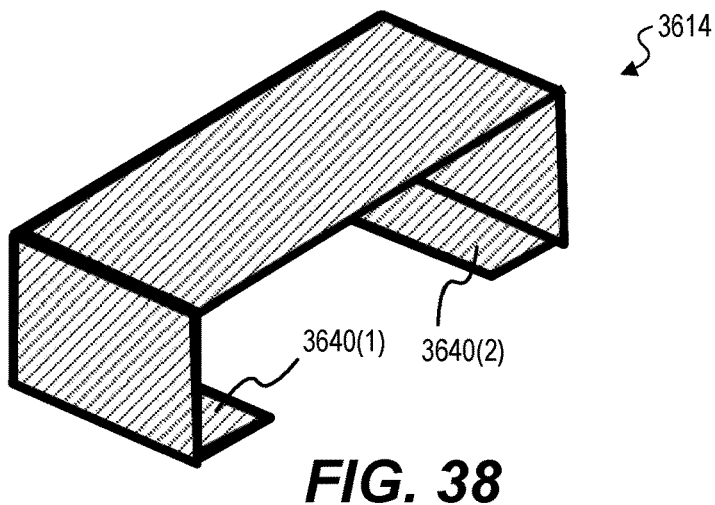
FIGS. 38 and 39 show perspective views of the windings of the FIG. 36 magnetic device.
Figure 39:
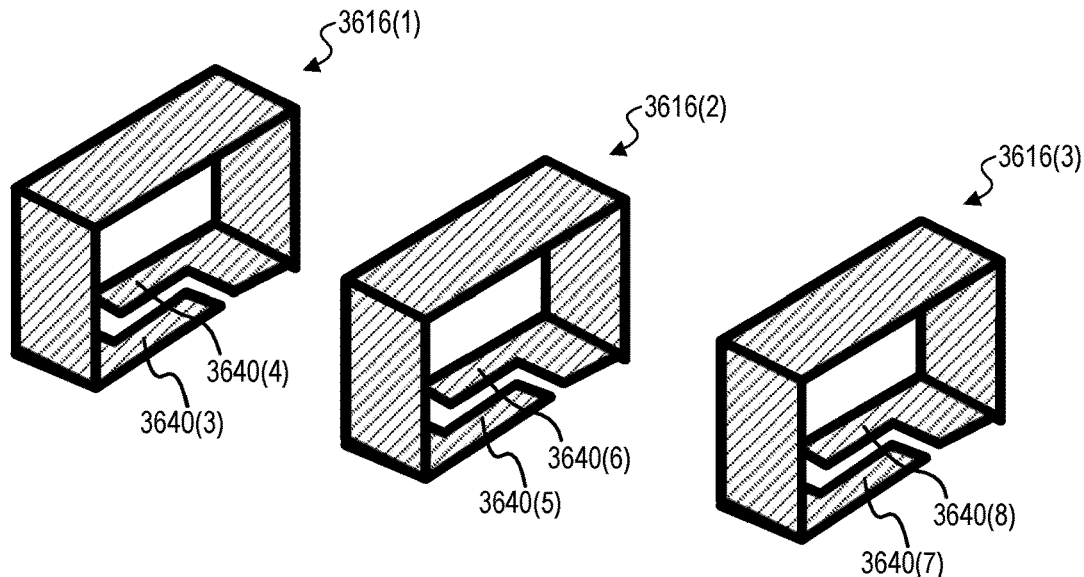

FIG. 36 shows a perspective view and FIG. 37 shows an exploded perspective view of a magnetic device 3600 including multiple single-turn windings which can be configured as a multi-turn inductor. Magnetic device 3600 has a depth 3601, a width 3603, and a height 3605. Magnetic device 3600 includes a magnetic core 3602 including a first magnetic element 3604, a second magnetic element 3606, and a top magnetic element 3608 disposed over first and second magnetic elements 3604, 3606 in the height 3605 direction. A first gap 3610 separates top magnetic element 3608 from first magnetic element 3604 in the height 3605 direction, and a second gap 3612 separates top magnetic element 3608 from second magnetic element 3606 in the height direction. A first winding 3614 is wound around first magnetic element 3604, and a plurality of second windings 3616 are wound around second magnetic element 3606. FIG. 38 is a perspective view of first winding 3614 separated from the remainder of magnetic device 3600, and FIG. 39 shows a perspective view of second windings 3616 separated from the remainder of magnetic device 3600. First and second windings 3614, 3616 are single-turn windings to promote manufacturing simplicity.

Figure 40:
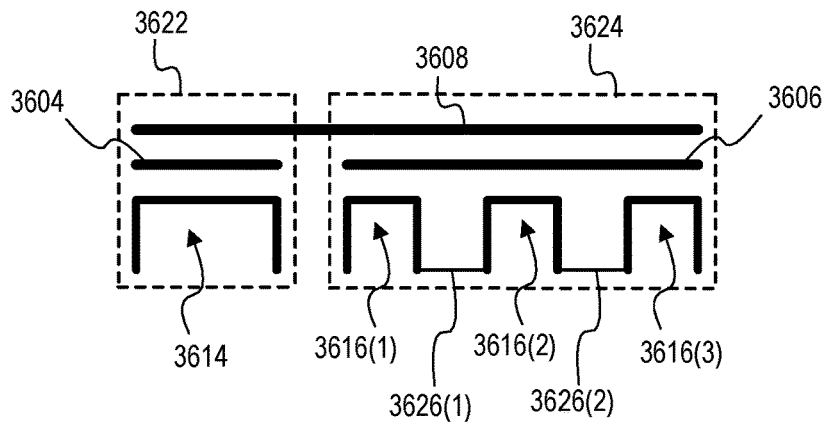
FIG. 40 symbolically shows one possible application of the magnetic device of FIG. 36 when used as a two-inductor magnetic device, according to an embodiment.

FIG. 40 symbolically shows one possible application of magnetic device 3600 when used as a two-inductor magnetic device. In this application, first winding 3614, first magnetic element 3604, and top magnetic element 3608 collectively form a single-turn first inductor 3622. Second windings 3616, second magnetic element 3606, and top magnetic element 3608 collectively form a three-turn second inductor 3624, in this application. Second windings 3616 are electrically coupled in series by connectors 3626, which in some embodiments are printed circuit board conductive traces, such that second windings 3616 collectively form a three turn winding. The dashed lines of FIG. 40 only approximately delineate the portions of top magnetic element 3608 forming first and second inductors 3622, 3624; in actuality, there is some overlap in portions of top magnetic element 3608 forming first and second inductors 3622, 3624.

Inductance is roughly proportional to the square of the number of winding turns. Thus, in certain embodiments, three-turn second inductor 3624 has a larger inductance value than single-turn first inductor 3622. First winding 3614 is typically wider and/or thicker than second windings 3616 to promote large current carrying capability of first inductor 3622. Additionally, a cross section 3628 of first magnetic element 3604 is typically larger than a cross section 3630 of second magnetic element 3606 to further promote high current capability of first inductor 3622, since large cross-section reduces susceptibility to saturation at high current levels. Cross-section 3628 is defined by height 3632 and depth 3634 of first magnetic element 3604, and cross-section 3630 is defined by height 3636 and depth 3638 of second magnetic element 3606.

Magnetic device 3600 is used in some embodiments of the switching power converters with light load enhancers disclosed herein, where first inductor 3622 of device 3600 is a first inductor of the converter, and second inductor 3624 of device 3600 is a second inductor of the converter. For example, in some embodiments of converter 300, first inductor 3622 of device 3600 is first inductor 318 of converter 300, and second inductor 3624 of device 3600 is second inductor 326 of converter 300.

Each gap 3610, 3612 is at least partially filled with a non-magnetic material, such as air, paper, plastic, and/or adhesive. Inductance of first inductor 3622 may be varied by changing the thickness of first gap 3610, and inductance of second inductor 3624 may be varied by changing thickness of second gap 3612. Respective thicknesses of first and second gaps 3610, 3612 may differ to achieve desired inductance values of first and second inductors 3622, 3624. Opposing ends of the windings 3614, 3616 form respective solder tabs 3640 for surface mount soldering to a substrate, such as a printed circuit board (see FIGS. 38 and 39). In some embodiments, solder tabs 3640 of adjacent pairs of second windings 3616 are laterally adjacent to facilitate short connections between adjacent windings when connecting the second windings in series. In certain alternate embodiments, one or more of solder tabs 3640 are replaced with an alternative connector, such as a thru-hole or socket pin.

A gap 3640 separates first magnetic element 3604 from second magnetic element 3606 in the depth 3601 direction. Gap 3640 which is, for example, filled with a non-magnetic material, or a magnetic material having a lower magnetic permeability than that forming magnetic core 3602, acts as a "magnetic open" which essentially blocks flow of magnetic flux between first winding 3614 and second windings 3616, to magnetically isolate first winding 3614 from second windings 3616. Consequentially, gap 3640 prevents magnetic coupling of first inductor 3622 and second inductor 3624, even though both inductors are part of common magnetic device 3600.

The number of single-turn windings wound around magnetic element 3604 and/or 3606 may be varied, such as to achieve a desired inductance value, without departing from the scope hereof. For example, certain alternate embodiments of device 3600 include only two second windings 3616 wound around second magnetic element 3606 to achieve smaller inductance values of second inductor 3624. Additionally, although magnetic device 3600 is shown with foil windings to help minimize conduction losses at high frequencies, the winding style may be varied without departing from the scope thereof. For example, in some alternate embodiments, one or more of windings 3614, 3616 are replaced with round cross-section windings.

Figure 41:
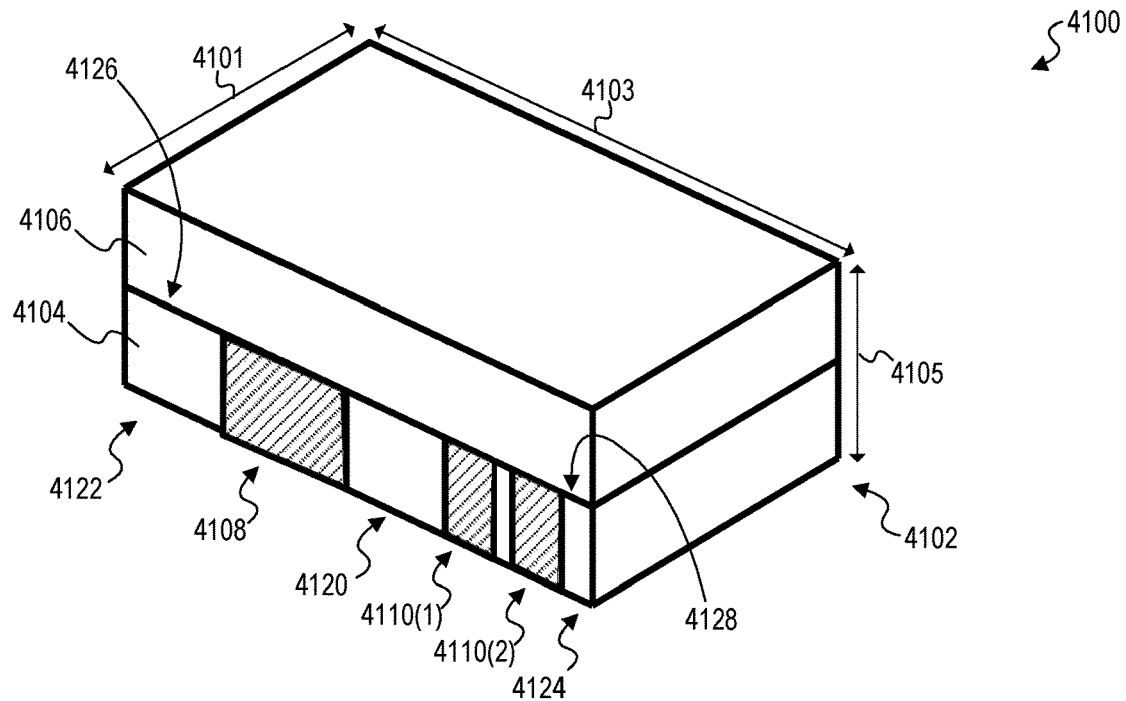
FIG. 41 shows a perspective view of another magnetic device including multiple single-turn windings which can be configured as a multi-turn inductor, according to an embodiment.
Figure 42:
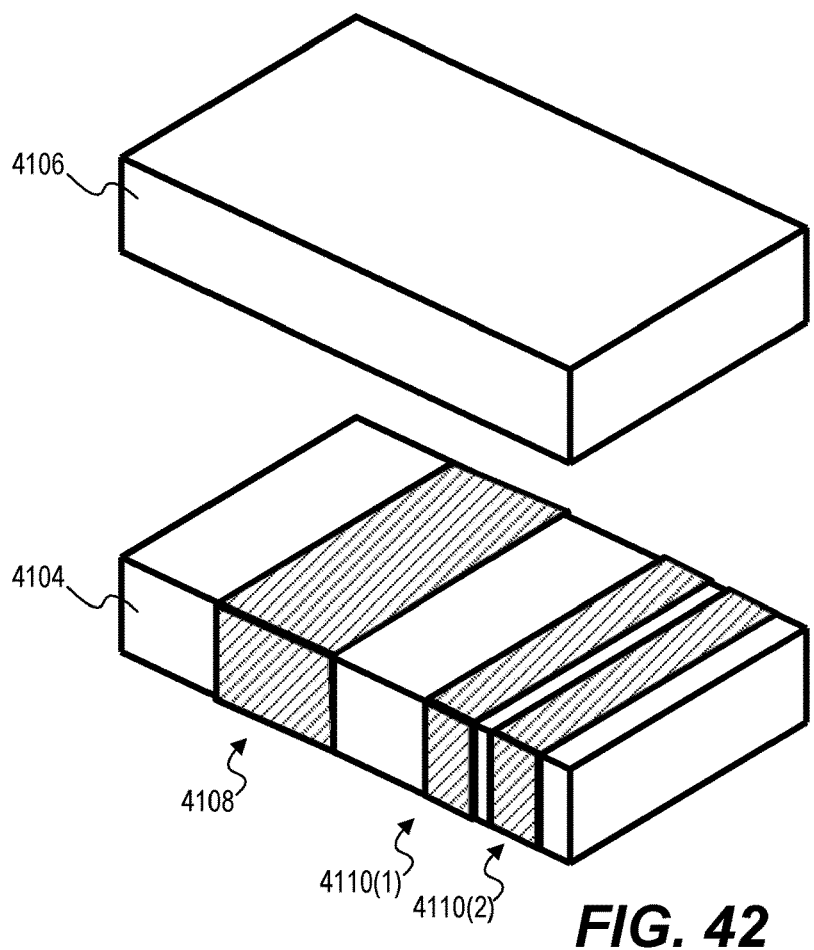
FIG. 42 shows an exploded perspective view of the magnetic device of FIG. 41.
Figure 43:
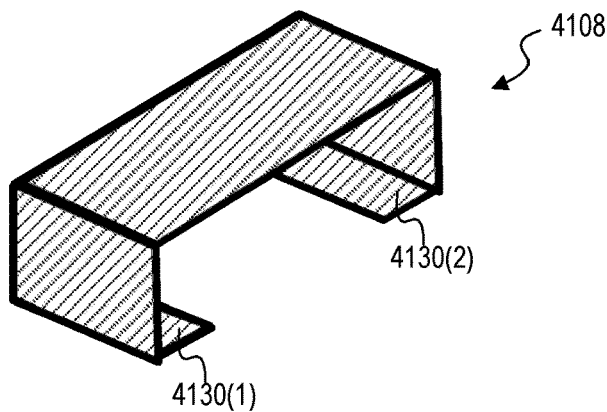
FIGS. 43 and 44 show perspective views of the windings of the FIG. 41 magnetic device.
Figure 44:
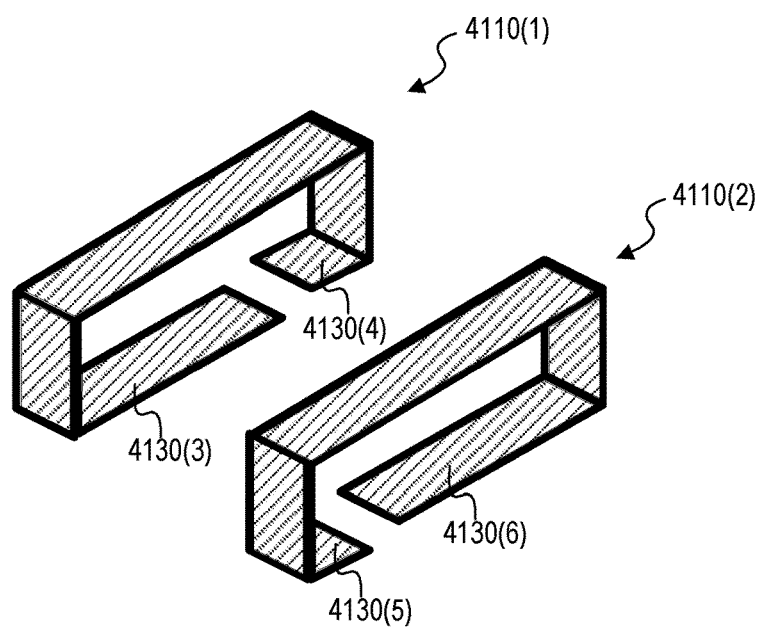

FIG. 41 shows a perspective view and FIG. 42 shows an exploded perspective view of another magnetic device 4100 including multiple single-turn windings which can be configured as a multi-turn inductor. Magnetic device 4100 has a depth 4101, a width 4103, and a height 4105. Magnetic device 4100 includes a magnetic core 4102 including a first magnetic element 4104 and a second magnetic element 4106 disposed on first magnetic element 4104 in the height 4105 direction. A first single-turn winding 4108 and a plurality of second single-turn windings 4110 are wound around first magnetic element 4104. FIG. 43 is a perspective view of first winding 4108 separated from the remainder of magnetic device 4100, and FIG. 44 is a perspective view of second windings 4110 separated from the remainder of magnetic device 4100.

Figure 45:
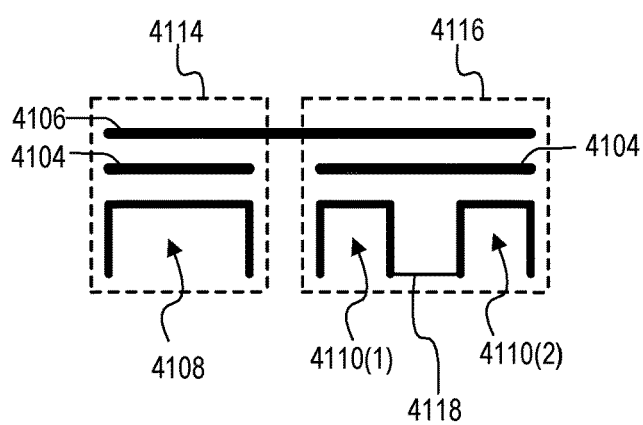
FIG. 45 symbolically shows one possible application of the magnetic device of FIG. 41 when used as a two-inductor magnetic device, according to an embodiment.

FIG. 45 symbolically shows one possible application of magnetic device 4100 when used as a two-inductor magnetic device. In this application, first winding 4108, first magnetic element 4104, and second magnetic element 4106 collectively form a single-turn first inductor 4114. Second windings 4110, first magnetic element 4104, and second magnetic element 4106 collectively form a two-turn second inductor 4116, in this application. Second windings 4110 are electrically coupled in series by a connector 4118, which in some embodiments is a printed circuit board conductive trace, such that second windings 4110 collectively form a two turn winding. The dashed lines of FIG. 45 only approximately delineate the portions of first and second magnetic elements 4104, 4106 forming first and second inductors 4114, 4116; in actuality, there is some overlap in portions of first and second magnetic element 4104, 4106 forming first and second inductors 4114, 4116.

Inductance is roughly proportional to the square of the number of winding turns. Thus, two-turn second inductor 4116 typically has a larger inductance value than single-turn first inductor 4114. First winding 4108 is typically wider and/or thicker than each second winding 4110 to promote large current carrying capability of first inductor 4114. Thus, magnetic device 4100 is used in some embodiments of the switching power converters with light load enhancers disclosed herein, where first inductor 4114 of device 4100 is a first inductor of the converter, and second inductor 4116 of device 4100 is a second inductor of the converter. For example, in some embodiments of converter 300, first inductor 4114 of device 4100 is first inductor 318 of converter 300, and second inductor 4116 of device 4100 is second inductor 326 of converter 300.

Magnetic core 4102 includes a center portion 4120 and opposing first and second outer portions 4122, 4124 separated from each other in the width 4103 direction. First winding 4108 is disposed between center and first outer portions 4120, 4122, and second windings 4110 are disposed between center and second outer portions 4120, 4124, in the width direction. Magnetic flux linking first winding 4108 flows primarily in a loop including first outer portion 4122 and center portion 4120, and magnetic flux linking second windings 4110 flows primarily in a loop including center portion 4120 and second outer portion 4124. Accordingly, center portion 4120 acts as a low-reluctance magnetic "short," thereby essentially magnetically isolating first winding 4108 from second windings 4110 so that inductors 4114 and 4116 are not magnetically coupled, even though both inductors are part of common magnetic device 4100.

A first gap 4126 separates first and second magnetic elements 4104, 4106 in core first outer portion 4122, and a second gap 4128 separates first and second magnetic elements 4104, 4106 in core second outer portion 4124. Core center portion 4120 typically does not have a significant gap between first and second magnetic elements 4104, 4106 to minimize reluctance of center portion 4120, thereby minimizing interaction between first and second inductors 4114, 4116. Each gap 4126, 4128 is at least partially filled with a non-magnetic material, such as air, paper, plastic, and/or adhesive. Inductance of first inductor 4114 may be varied by changing the thickness of first gap 4126, and inductance of second inductor 4116 may be varied by changing thickness of second gap 4128. First and second gaps 4126, 4128 may have different thicknesses to achieve desired inductance values for first and second inductors 4114, 4116. In some embodiments first gap 4126 has a larger thickness than that of second gap 4128. Opposing ends of windings 4108, 4110 form respective solder tabs 4130 for surface mount soldering to a substrate, such as a printed circuit board (see FIGS. 43 and 44). In some embodiments, solder tabs 4130 of second windings 4110 are laterally adjacent to facilitate short connections between adjacent windings when connecting the second windings in series. In certain alternate embodiments, one or more of solder tabs 4130 are replaced with an alternative connector, such as a thru-hole or socket pin.

Additional single-turn windings are optionally wound around first magnetic element 4104 without departing from the scope thereof. For example, some alternate embodiments include additional instances of second windings 4110, such as to achieve a larger inductance value in second inductor 4116. Additionally, although magnetic device 4100 is shown with foil windings to help minimize conduction losses at high frequencies, the winding style may be varied without departing from the scope hereof. For example, in some alternate embodiments, one or more of windings 4108, 4110 are replaced with round cross-section windings.

Figure 46:
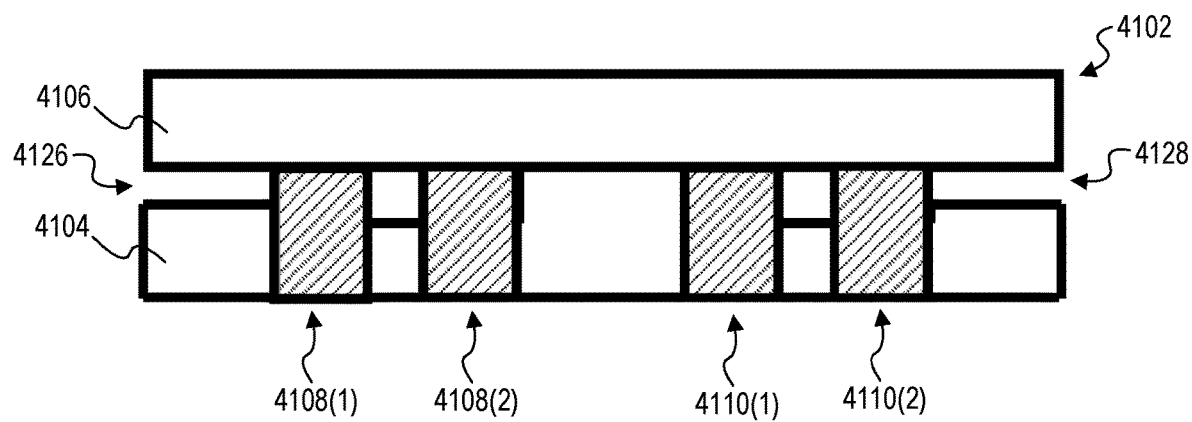
FIG. 46 shows a side view of one alternate embodiment of the FIG. 41 magnetic device including a symmetrical magnetic core, two first winding instances, and two second winding instances.

In some embodiments of inductor 4100, first and second magnetic elements 4104, 4106 have the same size, and/or first and second gaps 4126, 4128 have the same size. Additionally, in some alternate embodiments, first and second windings 4108, 4110 have the same size and configuration, thereby allowing a single winding type to be used for both first and second windings 4108, 4110. Such configurations promote manufacturing simplicity, ease of component procurement, and/or low cost. However, these configurations may also result in first inductor 4114 having insufficient current handling capability and/or excessive inductance value, in applications similar to that shown in FIG. 45. Accordingly, some alternate embodiments include two or more instances of first winding 4108 wound around first magnetic element 4104, such that multiple first windings 4108 can be electrically coupled in parallel to achieve sufficiently high current capability and sufficiently low inductance values for first inductor 4114. For example, one alternate embodiment includes a symmetrical magnetic core 4102, two instances of first winding 4108, and two instances of second winding 4110. Assuming first windings 4108 are electrically coupled in parallel and second windings 4110 are electrically coupled in series, second inductor 4116 will have roughly four times the inductance of first inductor 4114. FIG. 46 shows a side view of one alternate embodiment of magnetic device 4100 including a magnetic core 4102 with symmetric gaps 4126, 4128, two instances of first winding 4108, and two instances of second winding 4110.

Figure 47:
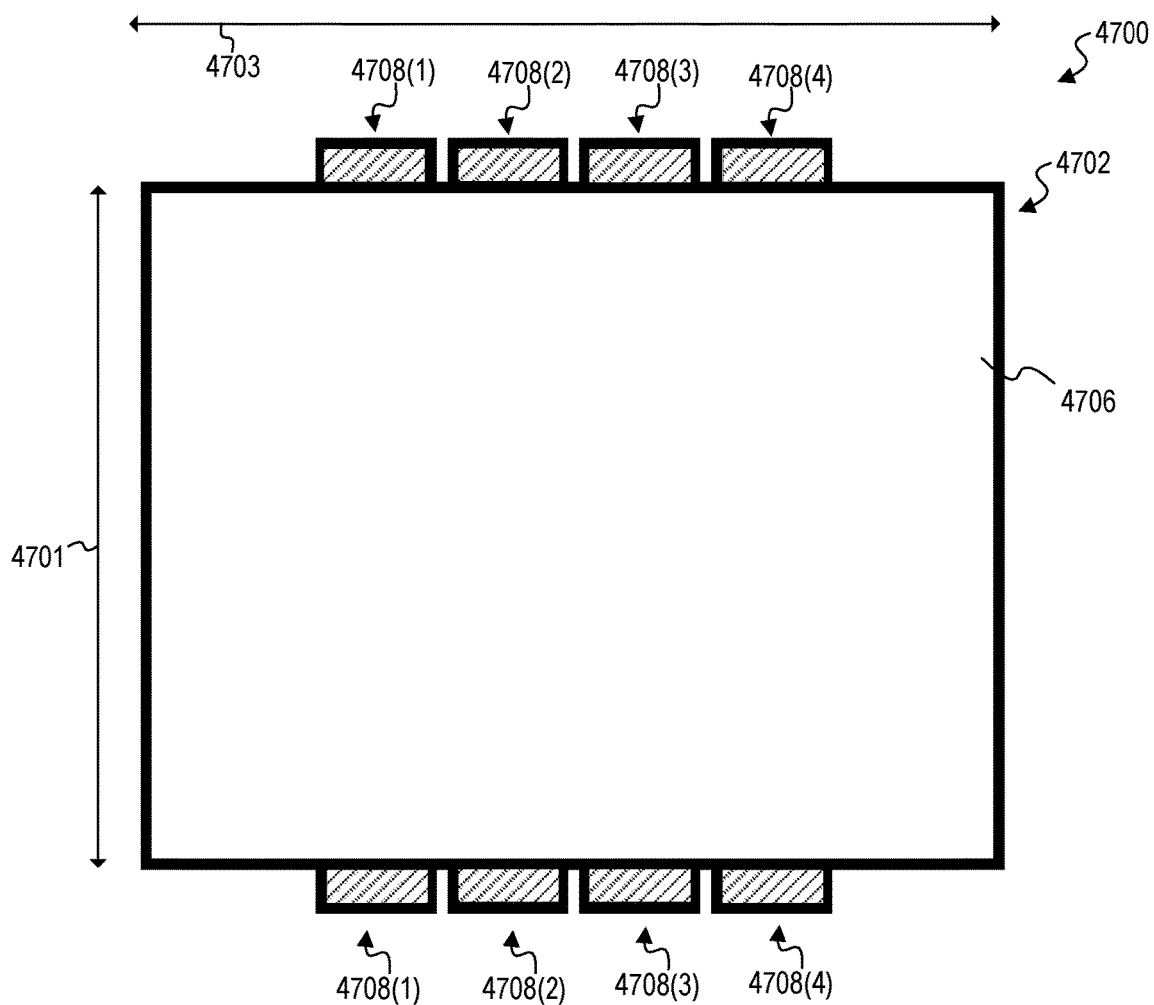
FIG. 47 shows a top plan view of another magnetic device including multiple single-turn windings, according to an embodiment.
Figure 48:
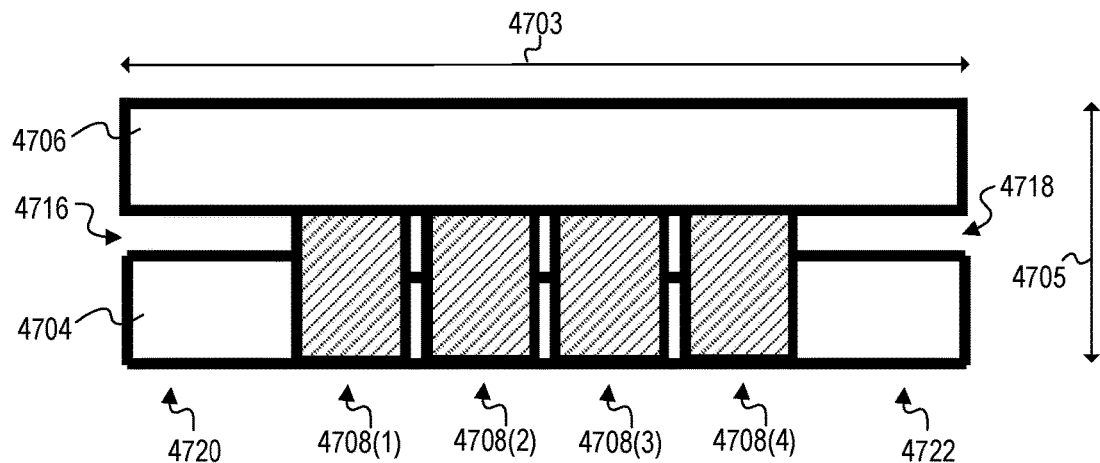
FIG. 48 shows a side view of the FIG. 47 magnetic device.
Figure 49:
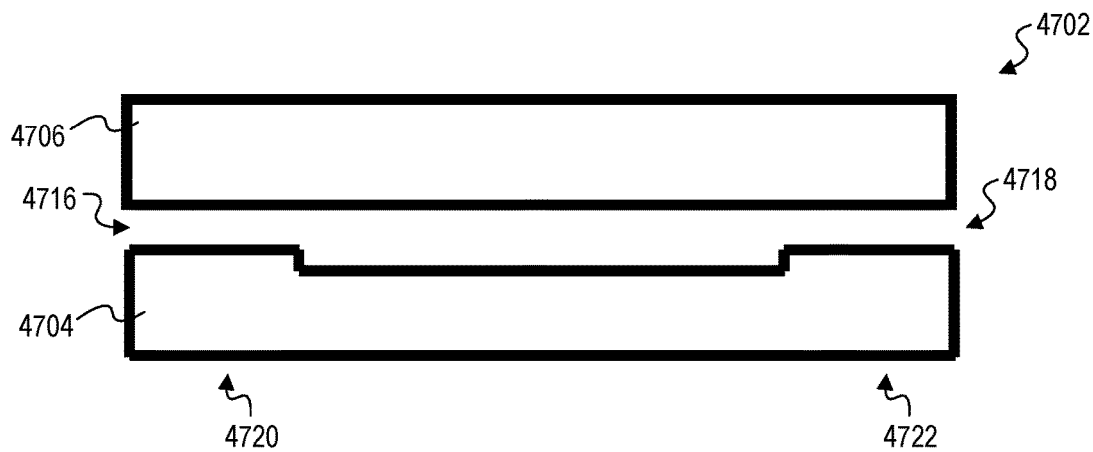
FIG. 49 shows a side view of the FIG. 47 magnetic device with windings removed.

FIG. 47 shows a top plan view and FIG. 48 shows a side view of another magnetic device 4700 including multiple single-turn windings. In contrast to magnetic device 4100 discussed above, magnetic device 4700 is intended for use in a coupled inductor application. Magnetic device 4700 has a depth 4701, a width 4703, and a height 4705 (see FIGS. 47 and 48). Magnetic device 4700 includes a magnetic core 4702 including a first magnetic element 4704 and a second magnetic element 4706 disposed on first magnetic element 4704 in the height 4705 direction. Four single-turn windings 4708 are wound around first magnetic element 4704. FIG. 49 is a side view of magnetic device 4700 with windings 4708 removed, to better show magnetic core 4702.

Figure 50:
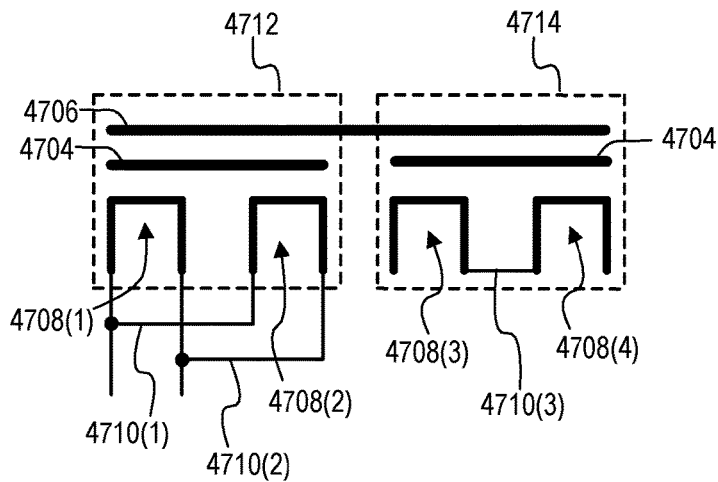
FIG. 50 symbolically shows one possible application of the magnetic device of FIG. 47 when used as a two-inductor magnetic device, according to an embodiment.

FIG. 50 symbolically shows one possible application of magnetic device 4700 when used as a two-inductor magnetic device. In this application, single-turn windings 4708(1), 4708(2) are electrically coupled in parallel by connectors 4710(1), 4710(2), and single-turn windings 4708(3), 4708 (4) are electrically coupled in series by a connector 4710(3). In some embodiments, connectors 4710 are printed circuit board conductive traces. Windings 4708(1), 4708(2), first magnetic element 4704, and second magnetic element 4706 collectively form a single-turn first inductor 4712. Windings 4708(3), 4708(4), first magnetic element 4704, and second magnetic element 4706 collectively form a two-turn second inductor 4714, in this application. The dashed lines of FIG. 50 only approximately delineate the portions of first and second magnetic elements 4704, 4706 forming first and second inductors 4712, 4714; in actuality, there is some overlap in portions of first and second magnetic element 4704, 4706 forming first and second inductors 4712, 4714. First and second inductors 4712 and 4714 are magnetically coupled.

One possible application of magnetic device 4700 is in a switching converter including a light load enhancer with magnetically coupled inductors. For example, in some embodiments of converter 2300 (FIG. 23), first inductor 4712 of device 4700 is first inductor 2318 of converter 2300, and second inductor 4714 of device 4700 is second inductor 2326 of converter 2300. In these embodiments, second buck sub-converter 2332 will have an effective energy storage inductance that is approximately nine times that of first buck sub-converter 2330, due to first and second inductors 4712, 4714 being magnetically coupled.

Magnetic core 4702 typically forms first and second gaps 4716, 4718 in opposing first and second magnetic core outer portions 4720, 4722. Gaps 4716, 4718 are at least partially filled with a non-magnetic material such as air, paper, plastic, and/or adhesive. Gaps 4716, 4718 help control inductance of first and second inductors 4712, 4714 and help prevent saturation of magnetic core 4702 at high current levels. In certain embodiments, gaps 4716, 4718 have the same size and configuration to promote symmetrical operation of device 4700. Opposing ends of each winding 4708 form respective solder tabs (not shown) for surface mount soldering to a substrate, such as a printed circuit board. However, in certain alternate embodiments, one or more of the solder tabs are replaced with an alternative connector, such as a thru-hole or socket pin.

The number of windings 4708 may be varied without departing from the scope thereof. For example, some alternate embodiments only include two instances of windings 4708, such that both first and second inductors 4712, 4714 are single-winding, single-turn inductors. Additionally, although magnetic device 4700 is shown with foil windings to help minimize conduction losses at high frequencies, the winding style may be varied without departing from the scope hereof. For example, in some alternate embodiments, one or more of windings 4708 are replaced with round cross-section windings.

Figure 51:
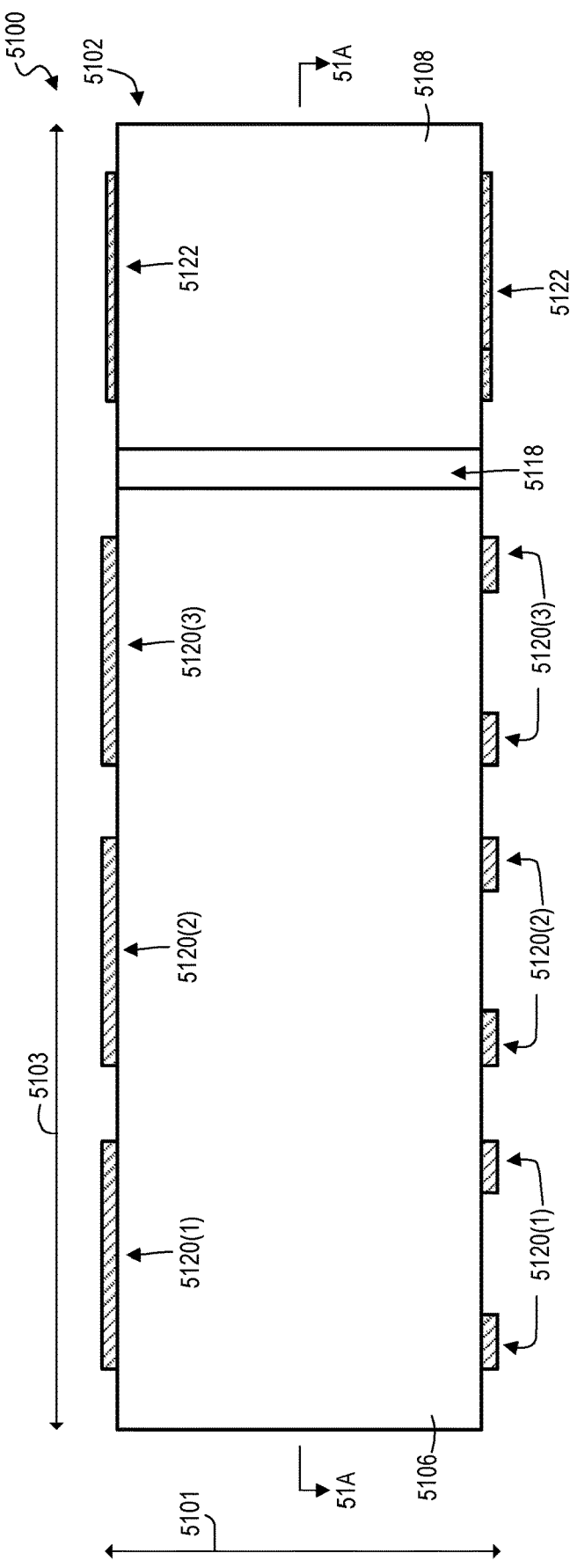
FIG. 51 shows a top plan view of a magnetic device including four inductors, according to an embodiment.
Figure 52:
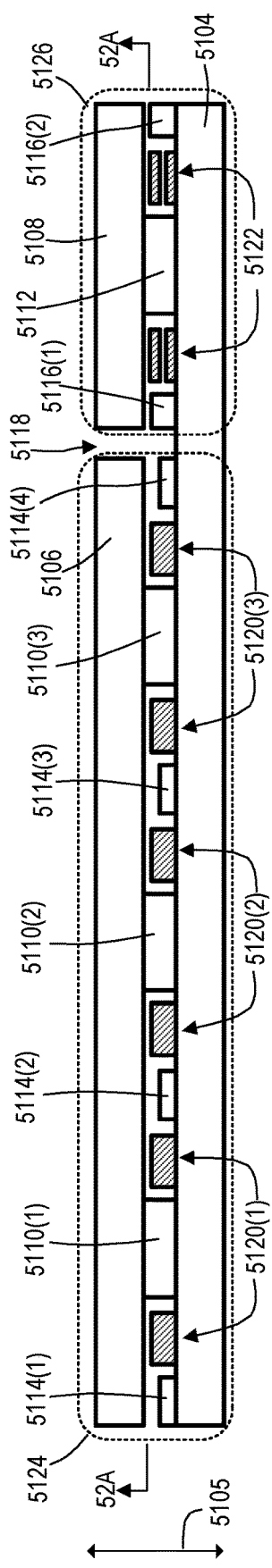
FIG. 52 shows a vertical cross-sectional view of the FIG. 51 magnetic device.
Figure 53:
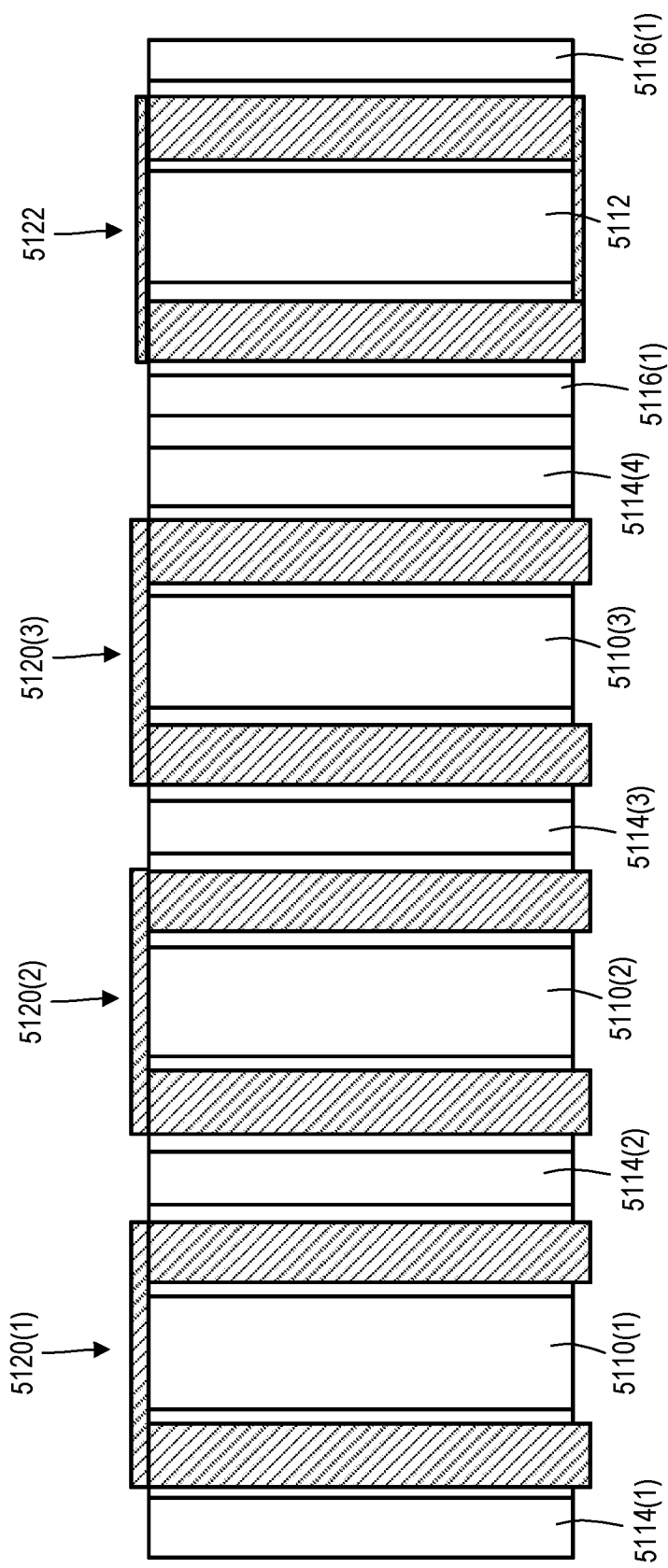
FIG. 53 shows a horizontal cross-sectional view of the FIG. 51 magnetic device.

FIG. 51 shows a top plan view of a magnetic device 5100 including four inductors which may be used, for example, in a switching power converter including three power stages and a light load enhancer. FIG. 52 shows a cross-sectional view of magnetic device 5100 taken along line 51A-51A of FIG. 51, and FIG. 53 shows a cross-sectional view of magnetic device 5100 taken along line 52A-52A of FIG. 52. Magnetic device 5100 has a depth 5101, a width 5103, and a height 5105 (see FIGS. 51 and 52).

Magnetic device 5100 includes a magnetic core 5102 including a first rail 5104, a second rail 5106, a third rail 5108, a plurality of rungs 5110, a center post 5112, a plurality of leakage teeth 5114, and two outer posts 5116. Each rung 5110 joins first and second rails 5104, 5106 in the height 5105 direction to form a "ladder" portion of magnetic core 5102, and each leakage tooth 5114 is disposed in the height direction between first and second rails 5104, 5106. Center post 5112 and each outer post 5116 joins first rail 5104 and third rail 5108 in the height 5105 direction, with center post 5112 disposed between outer posts 5116 in the widthwise 5103 direction. Second rail 5106 and third rail 5108 are separated in the widthwise 5103 direction by a gap 5118 filled with non-magnetic material and/or with material having a lower magnetic permeability than that of magnetic core 5102.

A respective first winding 5120 is wound around each rung 5110, and a second winding 5122 is wound around center post 5112. Although magnetic device 5100 is shown with windings 5120 and 5122 being foil windings to help minimize conduction losses at high frequencies, the winding style may be varied without departing from the scope thereof. For example, in some alternate embodiments, one or more of windings 5120, 5122 are replaced with round cross-section windings.

Windings 5120, first rail 5104, second rail 5106, rungs 5110, and leakage teeth 5114 collectively form a three-winding, first inductor 5124, as illustrated in FIG. 52. First rail 5104, second rail 5106, and rungs 5110 collectively magnetically couple first windings 5120 together, such that first inductor 5124 is a coupled inductor including three windings. Each leakage tooth 5114 provides a path for leakage magnetic flux between first and second rails 5104, 5106 to help achieve leakage inductance. Although not required, each leakage tooth 5114 is typically separated from first rail 5104 and/or second rail 5106 by a gap to achieve desired leakage inductance values and to help prevent magnetic saturation at high current levels. Leakage teeth 5114 can be omitted, such as if small leakage inductance values are desired. Additionally, leakage teeth 5114 can be replaced with, or supplemented by, one more alternative magnetic structures providing a path for leakage magnetic flux between first and second rails 5104, 5106. Furthermore, the number of rungs 5110 and respective windings 5120 can be varied, such as to change the number of "phases" supported by first inductor 5124, as long as the inductor includes at least two rungs 5110 and respective windings 5120.

First rail 5104, third rail 5108, center post 5112, outer posts 5116, and second winding 5122 collectively form a second inductor 5126, as also illustrated in FIG. 52. Although not required, each outer post 5116 is typically separated from first rail 5104 and/or from third rail 5108 by a gap to achieve a desired inductance value of second inductor 5126 and to prevent magnetic saturation at high current levels. In some alternate embodiments, center post 5112 is separated from first rail 5104 and/or from third rail 5108 by a gap.

The dashed lines of FIG. 52 only approximately delineate the portions of magnetic device 5100 forming first and second inductors 5124, 5126. Gap 5118 substantially prevents magnetic flux associated with first inductor 5124 from interacting with magnetic flux associated with second inductor 5126. Consequentially, first windings 5120 are magnetically isolated from second winding 5122, and first inductor 5124 and second inductor 5126 are not magnetically coupled, even though the two inductors share magnetic core 5102.

First windings 5120 are single-turn, relatively thick windings, while second winding 5122 is a relatively thin, two-turn winding. Therefore, first inductor 5124 has relatively small leakage inductance values and a relatively large current handling capability, which may make this inductor particular suitable for use in heavy load, multi-phase applications. Second inductor 5126, on the other hand, has a relatively large inductance value and a relatively small current handling capability, which may make this inductor particularly suitable for use in light load applications. Thus, one possible application of first inductor 5124 is in switching sub-converters intended for use at moderate or heavy loads, such as in first buck sub-converters 1036 of converter 1000 (FIGS. 10 and 11), and one possible application of second inductor 5126 is in a switching sub-converter intended for use at light loads, such as in one of second buck sub-converters 1038 of converter 1000 (FIGS. 10 and 12).

Figure 54:
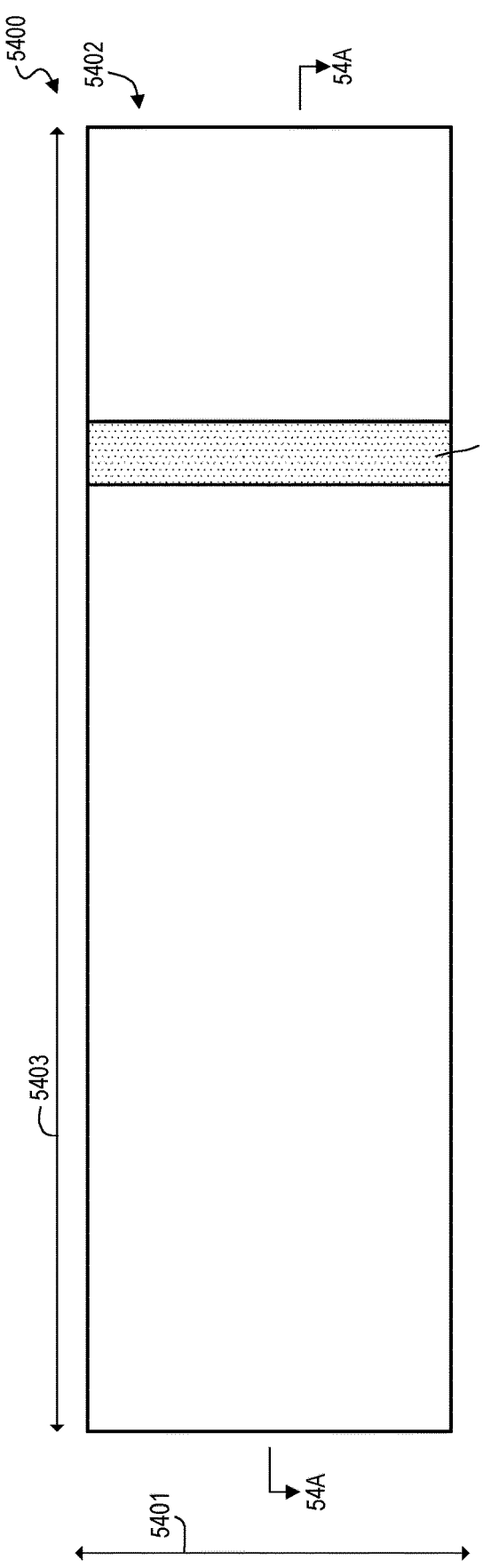
FIG. 54 shows a top-plan view of another magnetic device including four inductors.
Figure 55:
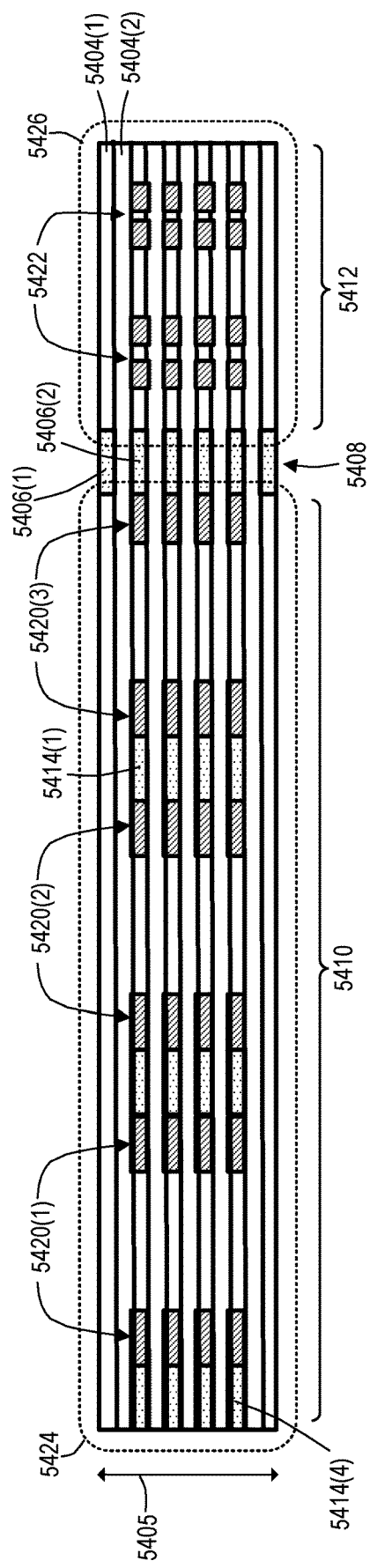
FIG. 55 shows a vertical cross-sectional view of the FIG. 54 magnetic device.

FIG. 54 shows a top-plan view of a magnetic device 5400, and FIG. 55 shows a cross-sectional view of magnetic device 5400 taken along lines 54A-54A of FIG. 54. Magnetic device 5400 has a depth 5401, a width 5403, and a height 5405. Magnetic device 5400 includes four inductors like magnetic device 5100 of FIGS. 51-53, but magnetic device 5400 has a different magnetic core structure than magnetic device 5100.

In particular, magnetic device 5400 includes a monolithic magnetic core 5402 including a plurality of magnetic film layers 5404 stacked in the height 5405 direction (see FIG. 55). A plurality of non-magnetic structures 5406 are embedded in monolithic magnetic core 5402 to form a column 5408 extending in the height 5405 direction, where adjacent non-magnetic structures 5406 are optionally separated from each other by one or more magnetic film layers 5404. Non-magnetic structures 5406 are formed of non-magnetic material or of magnetic material having a lower magnetic permeability than the material forming magnetic film layers 5404. Only some instances of magnetic film layers 5404 and non-magnetic structures 5406 are labeled to promote illustrative clarity. In some alternate embodiments, monolithic magnetic core 5402 is formed of a powder magnetic material, instead of magnetic film layers 5404.

A plurality of first windings 5420 and one second winding 5422 are embedded in monolithic magnetic core 5402. First windings 5420 and second windings 5422 are formed, for example, of one or more layers of conductive ink or film disposed on respective magnetic film layers 5404, where different layers of conductive ink or film are connected in the height 5405 direction by conductive vias (not shown). First and second windings 5420 and 5422 may include multiple turns, as illustrated. The turns of each winding 5420 and 5422 are electrically coupled in series and/or parallel, to achieve desired inductance values and requisite current carrying capability. In some embodiments, two or more turns of each first winding 5420 are electrically coupled in parallel to achieve relatively small inductance values and to achieve relatively high current carrying capabilities, while the turns of second winding 5422 are electrically coupled in series to achieve a relatively large inductance value. The number of windings 5420 can be varied as long as magnetic device 5400 includes at least two first winding 5420 instances. Additionally, the number of turns of each winding 5420, 5422 can be varied without departing from the scope hereof.

Column 5408 of non-magnetic structures 5406 divides magnetic device 5400 into a first inductor 5424 and a second inductor 5426. First inductor 5424 includes each first winding 5420 and a portion 5410 of magnetic core 5402 to the left of column 5408, as seen in FIG. 55. Second inductor 5426 includes second winding 5422 and a portion 5412 of magnetic core 5402 to the right of column 5408, as also seen in FIG. 55. The dashed lines of FIG. 55 only approximately delineate the portions of magnetic device 5400 forming first and second inductors 5424, 5426. Magnetic core 5402 magnetically couples first windings 5420 together such that first inductor 5424 is a three-winding coupled inductor. Second inductor 5426, in contrast, is a single-winding inductor. Column 5408 magnetically isolates first windings 5420 from second winding 5422. Consequentially, first inductor 5424 and second inductor 5426 are not magnetically coupled, even though the two inductors share magnetic core 5402.

In some embodiments, non-magnetic structures 5414 are additionally embedded in magnetic core 5402, such that non-magnetic structures 5414 are disposed in some or all of portion 5410 not enclosed by first windings 5420, as seen when magnetic device 5400 is viewed cross-sectionally in the height 5405 direction. Non-magnetic structures 5414 are formed of non-magnetic material or of material having a lower magnetic permeability than the material of magnetic film layers 5404. Consequentially, non-magnetic structures 5414 help prevent flow of magnetic flux outside of areas enclosed by first windings 5420, thereby promoting strong magnetic coupling of first windings 5420.

One possible application of first inductor 5424 is in switching sub-converters intended for use at moderate or heavy loads, such as in first buck sub-converters 1036 of converter 1000 (FIGS. 10 and 11), and one possible application of second inductor 5426 is in a switching sub-converter intended for use at light loads, such as in one of second buck sub-converters 1038 of converter 1000 (FIGS. 10 and 12).

Magnetic coupling of inductors sharing a magnetic core in a magnetic device can also be minimized by configuring the magnetic device so that the magnetic flux path of each inductor is orthogonal to the magnetic flux path of each other inductor. This technique for minimizing magnetic coupling can be effective even in applications where several windings share a common magnetic core, thereby promoting small magnetic device size and low magnetic device cost. In this document, the term "orthogonal" is considered encompass embodiments that substantially orthogonal, i.e., within ten degrees of being orthogonal, unless otherwise indicated.

Figure 56:
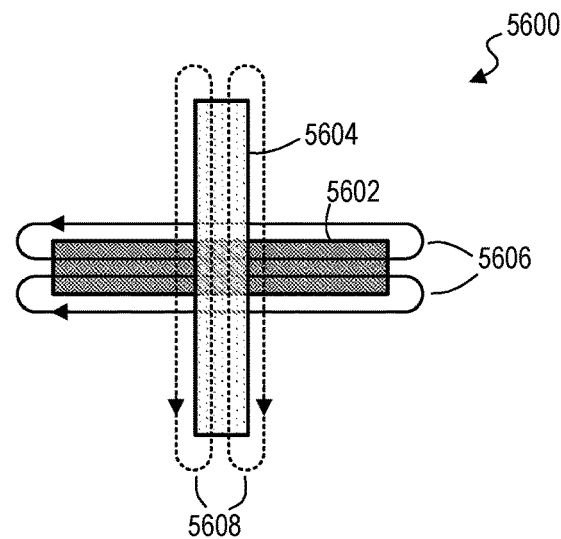
FIG. 56 schematically illustrates a magnetic device including two inductors having substantially orthogonal magnetic flux paths, according to an embodiment.

Consider, for example, FIG. 56, which schematically illustrates a magnetic device 5600 including a first inductor 5602 and a second inductor 5604. First inductor 5602 has magnetic flux paths 5606, and second inductor 5604 has magnetic flux paths 5608 which are substantially orthogonal to magnetic flux paths 5606. Therefore, net magnetic flux associated with second inductor 5604 is near zero in first inductor 5602, and net magnetic flux associated with first inductor 5602 is near zero in second inductor 5604. Consequentially, first and second inductors 5602, 5604 are not magnetically coupled, even though both inductors are part of a common magnetic device 5600.

Figure 57:
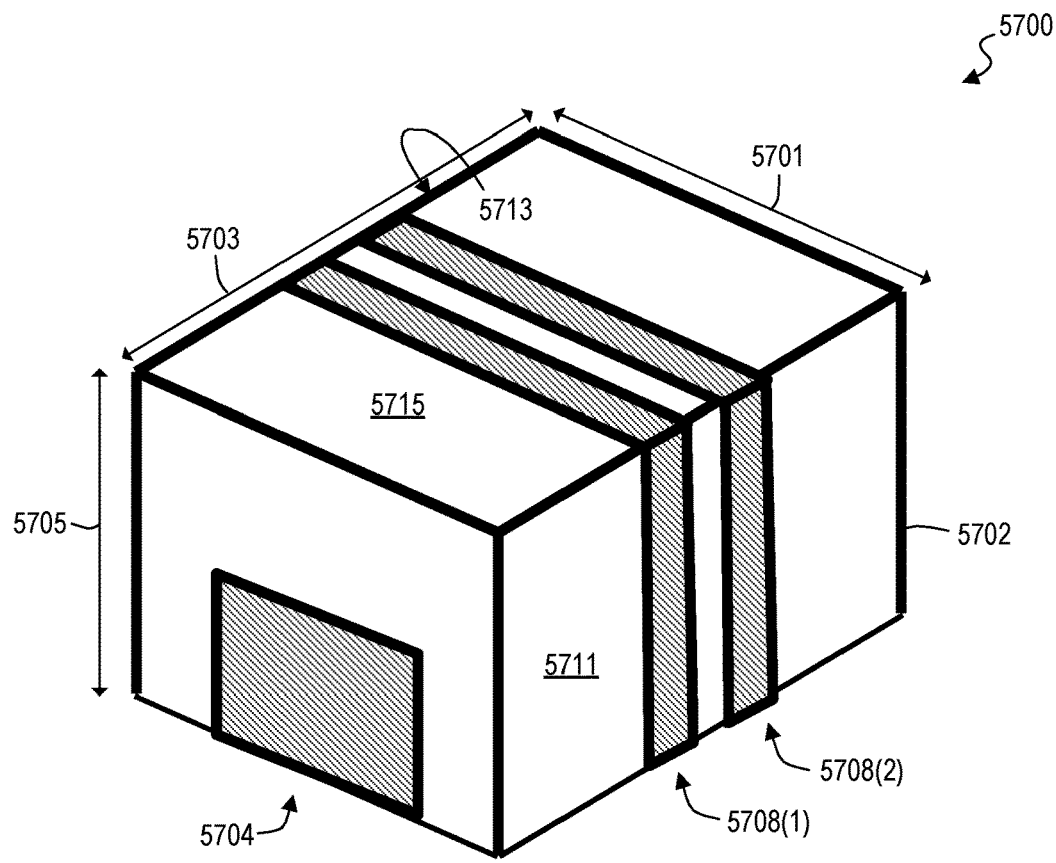
FIG. 57 shows a perspective view of a magnetic device including two inductors with orthogonal magnetic flux paths, according to an embodiment.

FIG. 57 is a perspective view of a magnetic device 5700 including two inductors with orthogonal magnetic flux paths. Magnetic device 5700 includes a magnetic core 5702, which is, for example, formed of one or more ferrite magnetic elements. Magnetic device 5700 has a depth 5701, a width 5703, and a height 5705.

Figure 58:
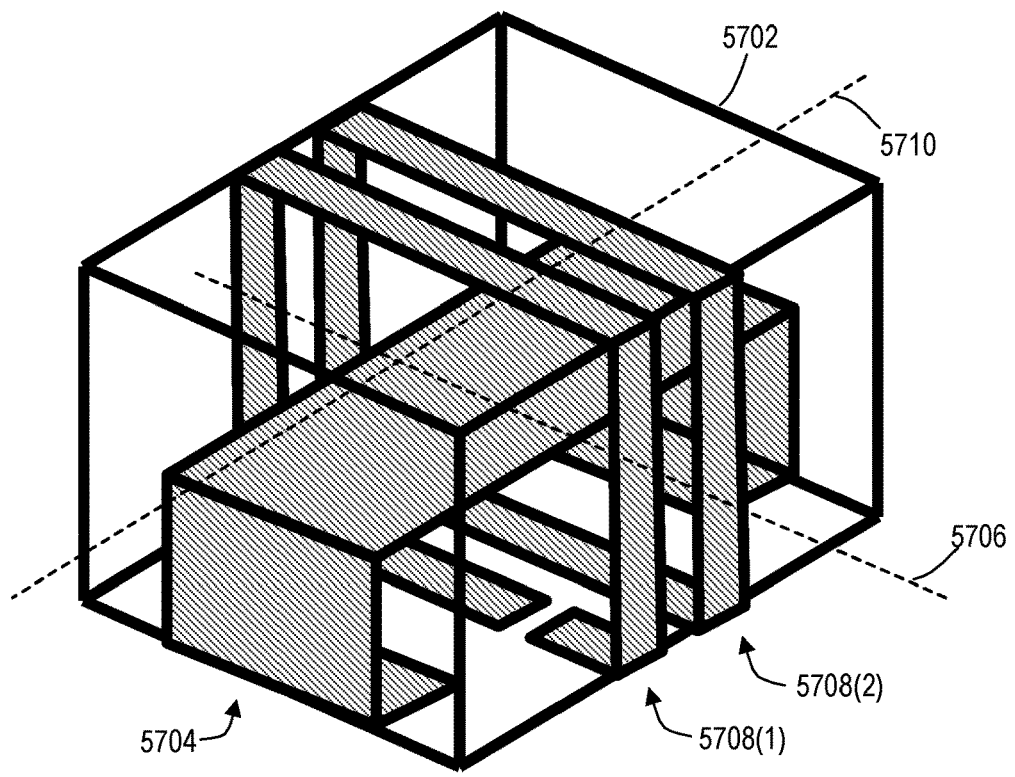
FIG. 58 shows a perspective view of the FIG. 57 magnetic device with a magnetic core of the device shown in wire view.
Figure 59:
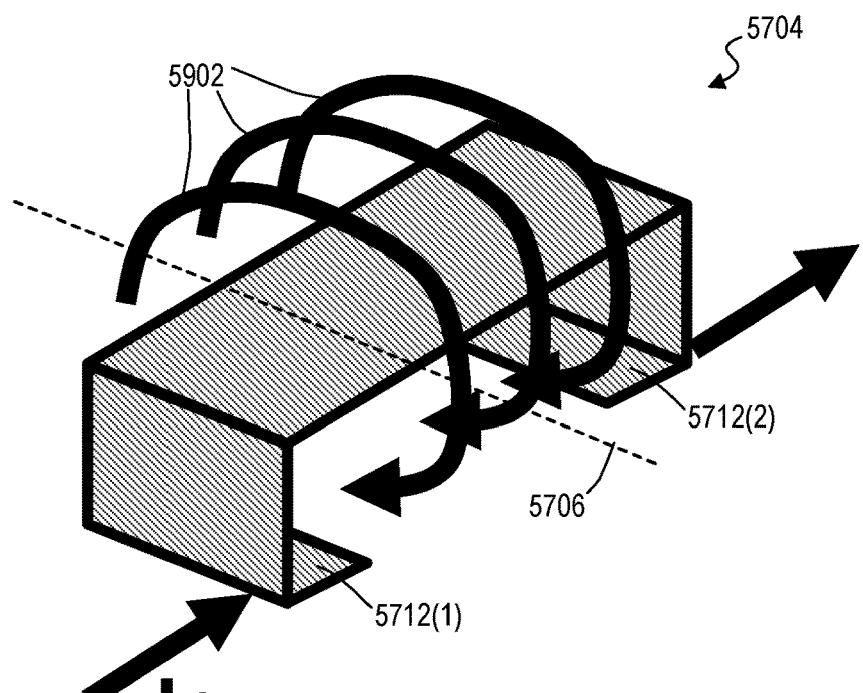
FIG. 59 shows a perspective view of a first winding of the FIG. 57 magnetic device when separated from the remainder of the magnetic device.
Figure 60:
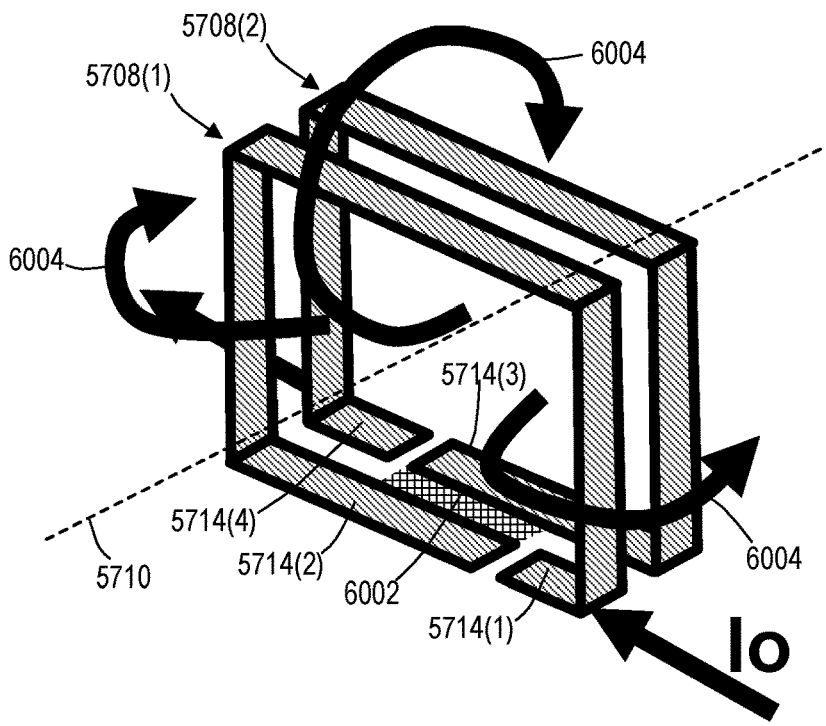
FIG. 60 shows a perspective view of second windings of the FIG. 57 magnetic device when separated from the remainder of the magnetic device.

FIG. 58 shows a perspective view of magnetic device 5700 with magnetic core 5702 shown in wire view, i.e., only the outline of magnetic core 5702 is shown, to show the interior of magnetic device 5700. A first winding 5704 extends through magnetic core 5702 in the widthwise 5703 direction, such that first winding 5704 forms a turn around a first winding center axis 5706 extending in the depth 5701 direction. Two second windings 5708 are each wound around at least side outer surfaces 5711 and 5713 and top outer surface 5715 of magnetic core 5702 in the depth 5701 direction, such that each second winding 5708 forms a respective turn around a common second winding center axis 5710 extending in the widthwise 5703 direction. Second windings 5708 partially enclose first winding 5704. FIGS. 59 and 60 show perspective views of first winding 5704 and second windings 5708, respectively, when separated from the remainder of the magnetic device 5700. The number of second windings 5708 may be varied without departing from the scope hereof, such as to achieve a desired inductance value.

First winding 5704 and magnetic core 5702 collectively form a first inductor, and second windings 5708 and magnetic core 5702 collective form a second inductor. Second windings 5708 are typically electrically coupled in series and/or parallel to achieve desired characteristics of the second inductor. For example, second windings 5708 may be electrically coupled in series by a printed circuit board conductive trace 6002, as illustrated in FIG. 60, to achieve a relatively large inductance value of the second inductor. One possible application of magnetic device 5700 is in power converter 300 (FIG. 3), where the first inductor of magnetic device 5700 serves as first inductor 318, and the second inductor of magnetic device 5700 serves as second inductor 326.

Figure 61:
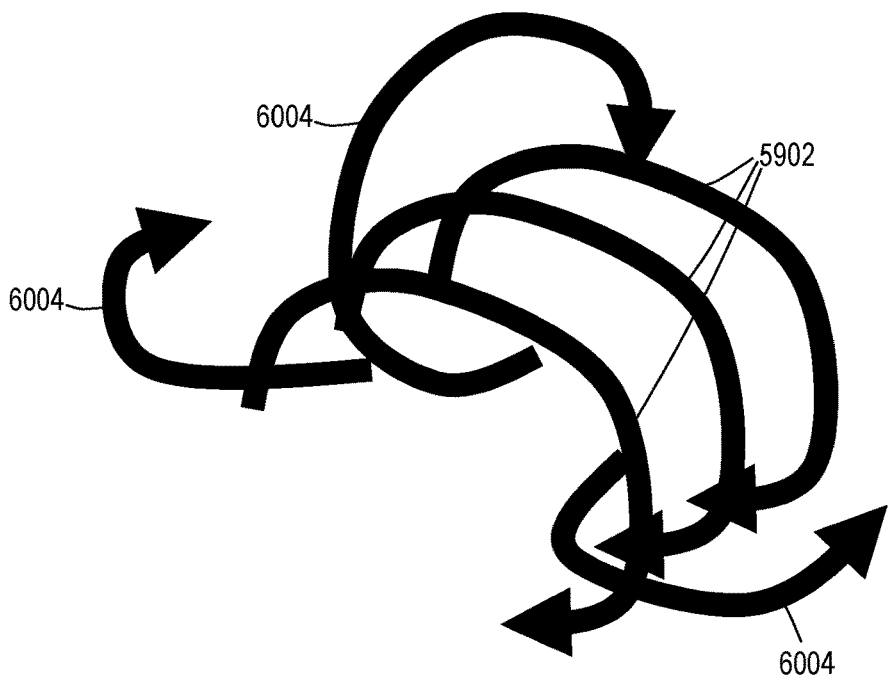
FIG. 61 illustrates a magnetic flux path of the first winding of the FIG. 57 magnetic device superimposed on a magnetic flux path of the second windings of the FIG. 57 magnetic device.

First winding center axis 5706 is orthogonal to second winding center axis 5710. Therefore, magnetic flux induced by current flowing through the turn of first winding 5704 is orthogonal to magnetic flux induced by current flowing through the turns of second windings 5708, neglecting second order effects, and first winding 5704 is therefore not magnetically coupled with second windings 5708. Consequentially, the first inductor is not magnetically coupled with the second inductor, even though both windings share a common magnetic core 5702 and are wound around a common portion of the magnetic core. FIG. 59 illustrates the approximate magnetic flux path 5902 of first winding 5704 when current flows through the turn of first winding 5704 as illustrated. FIG. 60 illustrates the approximate magnetic flux path 6004 of second windings 5708 when current flows through the turns of second windings 5708 as illustrated, neglecting magnetic flux associated with current flowing through printed circuit board conductive trace 6002. FIG. 61 illustrates magnetic flux path 5902 of first winding 5704 superimposed on magnetic flux path 6004 of second windings 5708, showing that the two magnetic flux paths are orthogonal.

Opposing ends of first winding 5704 form respective solder tabs 5712 (see FIG. 59), and opposing ends of each second winding 5708 form respective solder tabs 5714 (see FIG. 60). In certain embodiments, solder tabs 5714(2) and 5714(3) are laterally adjacent, as illustrated, to facilitate connecting second windings 5708(1) and 5708(2) in series by a short conductive trace. Although magnetic device 5700 is shown with first winding 5704 and second windings 5708 being foil windings to help minimize conduction losses at high frequencies, the winding style may be varied without departing from the scope thereof.

Figure 62:
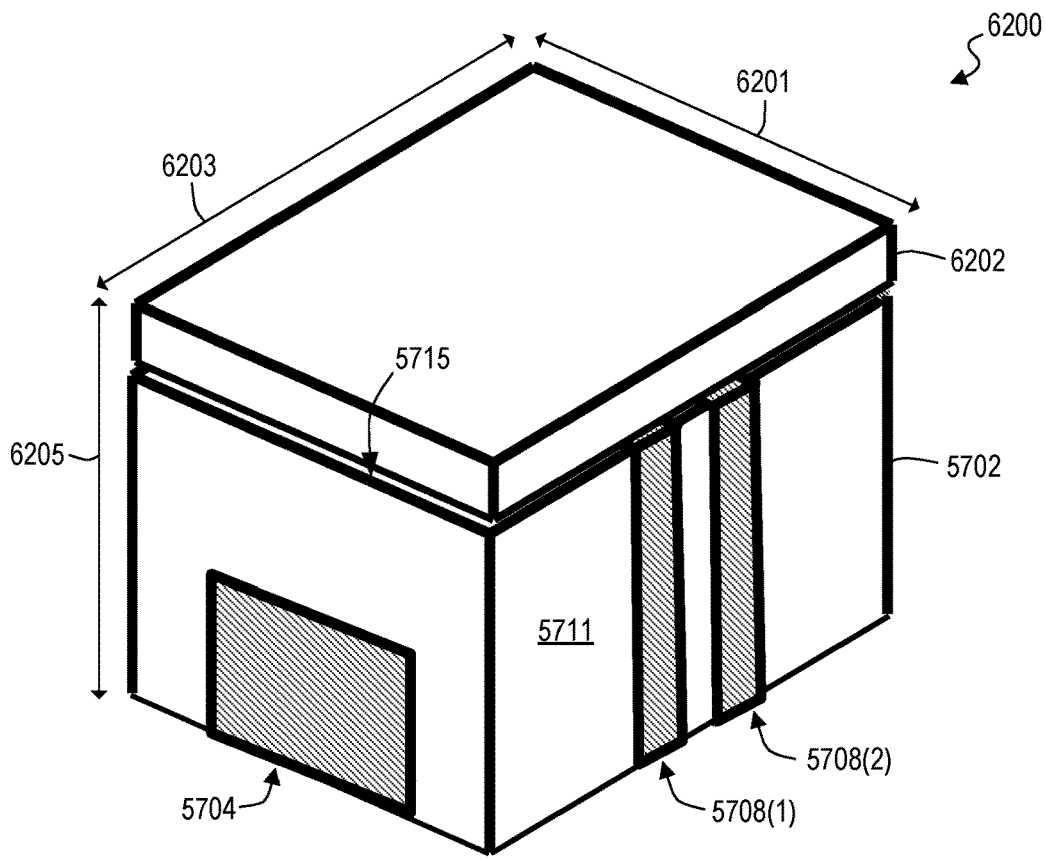
FIG. 62 shows a perspective view of a magnetic device like the FIG. 57 magnetic device, but further including a top magnetic plate, according to an embodiment.

FIG. 62 is a perspective view of a magnetic device 6200, which is like magnetic device 5700 of FIGS. 57-61, but further includes a top magnetic plate 6202 formed of magnetic material. Magnetic device 6200 has a depth 6201, a width 6203, and a height 6205. Top magnetic plate 6202 is disposed over top outer surface 5715 of magnetic core 5702 in the height 6205 direction, such that portions of second windings 5708 are sandwiched between top outer surface 5715 and top magnetic plate 6202. Accordingly, top magnetic plate 6202 decreases reluctance of the magnetic flux path of second windings 5708, thereby promoting large inductance values of the second inductor, as well as electromagnetic compatibility of magnetic device 6200 with adjacent electrical circuitry.

Figure 63:
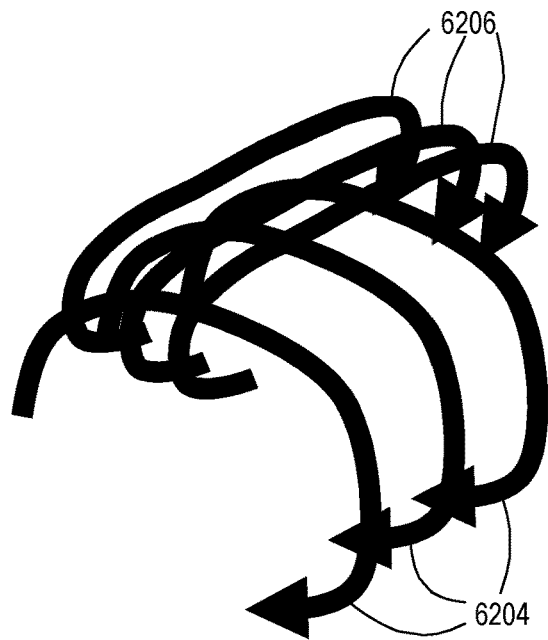
FIG. 63 illustrates approximate magnetic flux paths of the FIG. 62 magnetic device.

The magnetic flux path of first winding 5704 in magnetic device 6200 is essentially the same as in magnetic device 5700. However, presence of top magnetic plate 6202 in magnetic device 6200 causes the magnetic flux path of second windings 5708 to be concentrated around the top of magnetic device 6200. FIG. 63 illustrates approximate magnetic flux paths of magnetic device 6200 resulting from current flowing through winding turns. Magnetic flux path 6204 of first winding 5704 is orthogonal to magnetic flux path 6206 of second windings 5708, thereby causing first winding 5704 to not be magnetically coupled with second windings 5708, even though both windings share common magnetic core 5702.

Figure 64:
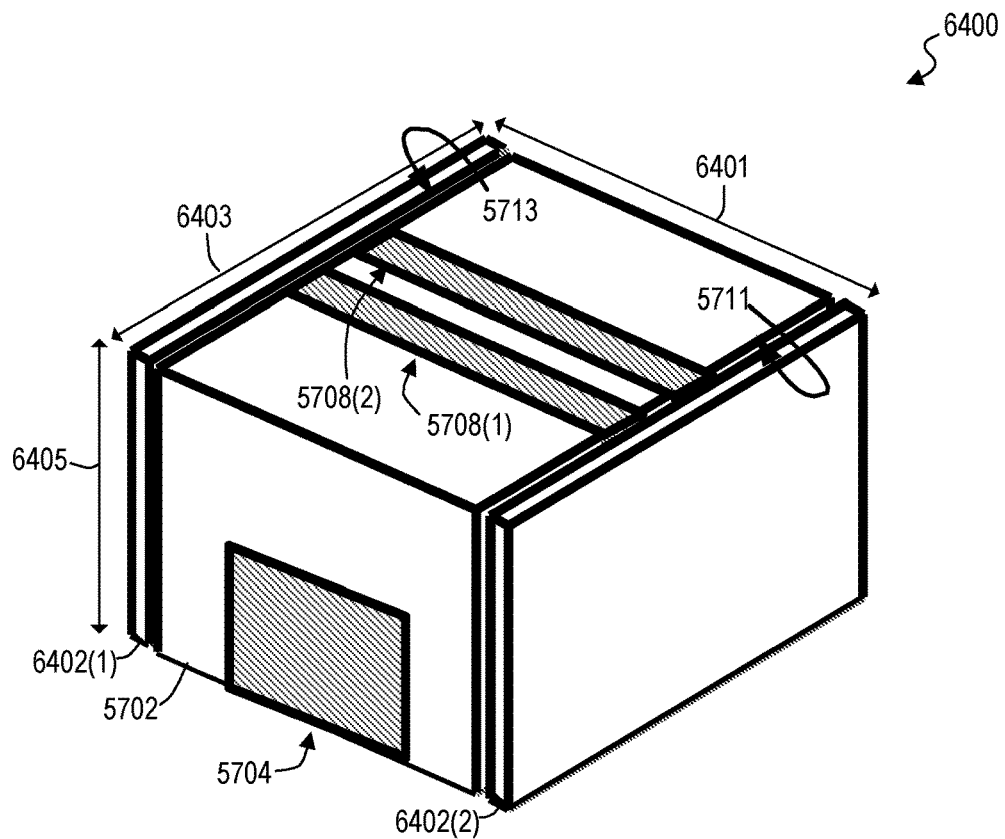
FIG. 64 shows a perspective view of a magnetic device like the FIG. 57 magnetic device, but further including side magnetic plates, according to an embodiment.

FIG. 64 is a perspective view of a magnetic device 6400, which is like magnetic device 5700 of FIGS. 57-61, but further including opposing side magnetic plates 6402 formed of magnetic material. Magnetic device 6400 has a depth 6401, a width 6403, and a height 6405. Side magnetic plate 6402(1) is disposed on a side outer surface 5713 of magnetic core 5702 in the depth 6401 direction, while side magnetic plate 6402(2) is disposed on side outer surface 5711 of magnetic core 5702 in the depth direction 6401. In the embodiment illustrated in FIG. 64, side outer surface 5711 opposes side outer surface 5713. Similar to the top magnetic plate of magnetic device 6200 (FIG. 62), side magnetic plates 6402 decrease reluctance of the magnetic flux path of second windings 5708, thereby promoting large inductance values of the second inductor, as well as electromagnetic compatibility of magnetic device 6400 with adjacent electrical circuitry.

Figure 65:
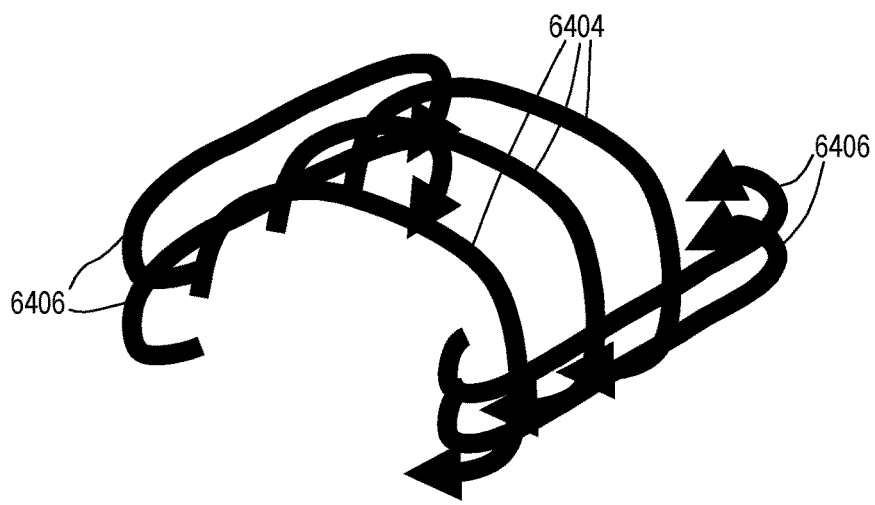
FIG. 65 illustrates approximate magnetic flux paths of the FIG. 63 magnetic device.

Side magnetic plates 6402 in magnetic device 6400 cause the magnetic flux path of second windings 5708 to be concentrated along the sides of magnetic device 6400. FIG. 65 illustrates approximate magnetic flux paths of magnetic device 6400 resulting from current flowing through the winding turns. A magnetic flux path 6404 of first winding 5704 is orthogonal to a magnetic flux path 6406 of second windings 5708, thereby causing the first and second windings to not be magnetically coupled with each other.

Figure 66:
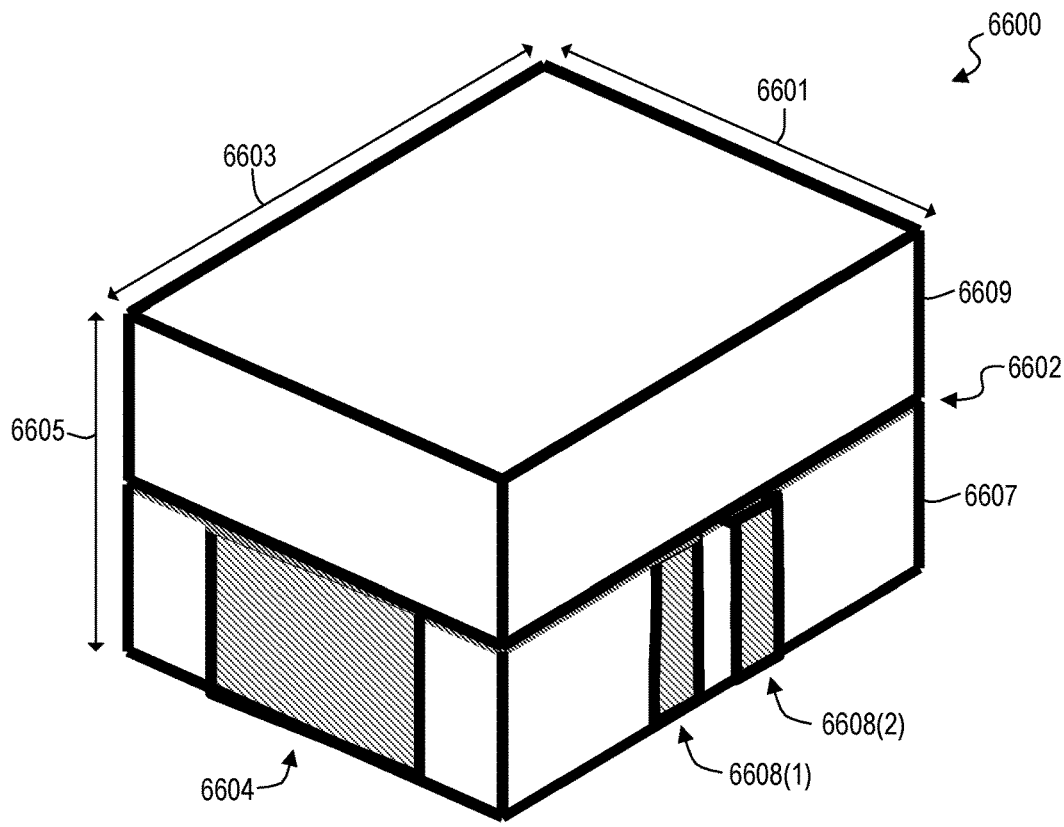
FIG. 66 shows a perspective view of a magnetic device like the FIG. 57 magnetic device, but with second windings extending through a magnetic core, according to an embodiment.

FIG. 66 is a perspective view of a magnetic device 6600, which is similar to magnetic device 5700 of FIGS. 57-61, but with second windings extending through a magnetic core 6602 of the device. Magnetic core 6602 is, for example, formed of one or more ferrite magnetic elements. In some embodiments, magnetic core 6602 includes a first portion 6607 and a second portion 6609 joined together, as shown. Magnetic device 6600 has a depth 6601, a width 6603, and a height 6605.

Figure 67:
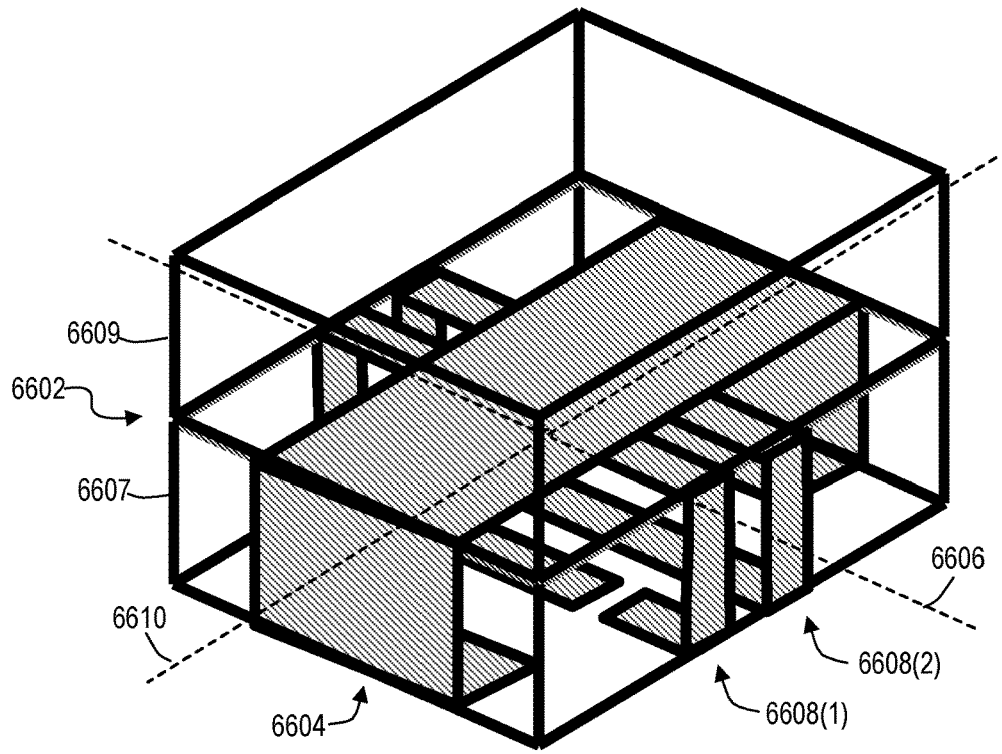
FIG. 67 shows a perspective view of the FIG. 66 magnetic device with a magnetic core of the device shown in wire view.

FIG. 67 shows a perspective view of magnetic device 6600 with magnetic core 6602 show in wire view, i.e., only the outline of magnetic core 6602 is shown, to show the interior of magnetic device 6600. A first winding 6604 extends through magnetic core 6602 in the widthwise 6603 direction, such that first winding 6604 forms a turn around a first winding center axis 6606 extending in the depth 6601 direction. Two second windings 6608 each extend through magnetic core 6602 in depth 6601 direction, such that each second winding 6608 forms a turn around a second winding center axis 6610 extending in the widthwise 6603 direction. First winding 6604 partially encloses second windings 6608.

Disposing second windings 6608 within magnetic core 6602, instead of on the magnetic core outer surface, promotes a low reluctance, controlled path for magnetic flux associated with current flowing through second windings 6608, thereby promoting large inductance values and electromagnetic capability with adjacent electrical circuitry. The number of second windings 6608 may be varied without departing from the scope hereof, such as to achieve a desired inductance value. Although magnetic device 6600 is shown with first winding 6604 and second winding 6608 being foil windings to help minimize conduction losses at high frequencies, the winding style may be varied without departing from the scope thereof.

First winding 6604 and magnetic core 6602 collectively form a first inductor, and second windings 6608 and magnetic core 6602 collectively form a second inductor. Second windings 6608 are typically electrically coupled in series and/or parallel to achieve desired characteristics of the second inductor. For example, second windings 6608 may be electrically coupled in series by a printed circuit board conductive trace, to achieve a relatively large inductance value of the second inductor. One possible application of magnetic device 6600 is in power converter 300 (FIG. 3), where the first inductor of magnetic device 6600 serves as first inductor 318, and the second inductor of magnetic device 6600 serves as second inductor 326.

Figure 68:
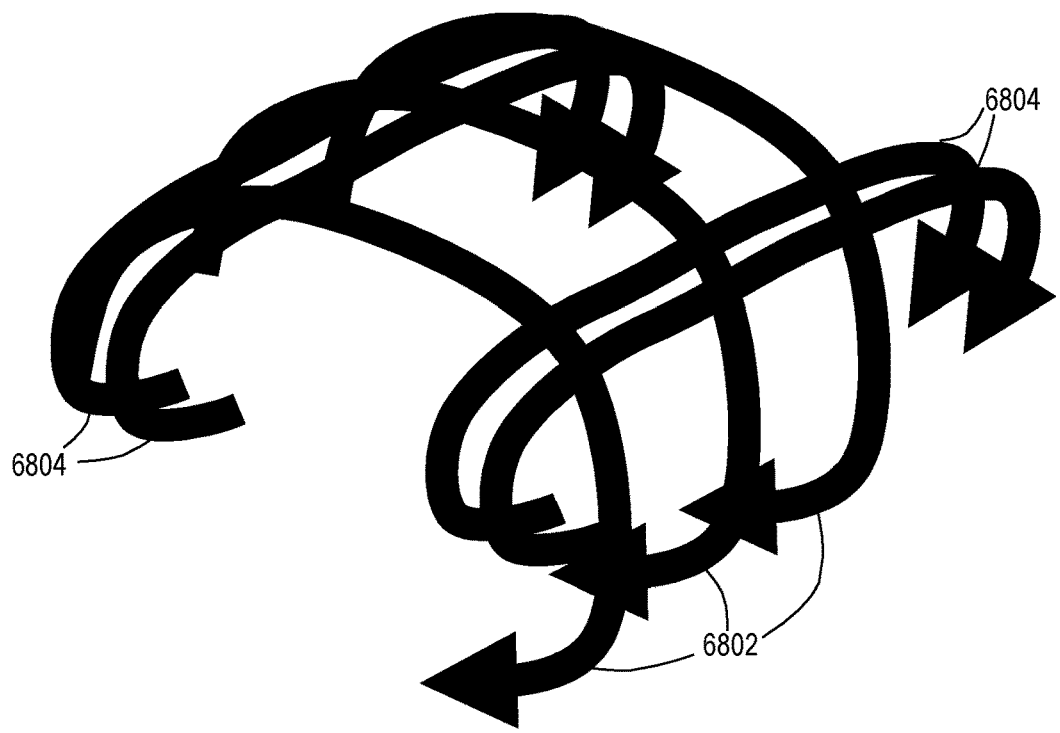
FIG. 68 illustrates approximate magnetic flux paths of the FIG. 66 magnetic device.

First winding center axis 6606 is orthogonal to second winding center axis 6610. Therefore, magnetic flux induced by current flowing through the turn of first winding 6604 is orthogonal to magnetic flux induced by current flowing through the turns of second windings 6608, neglecting second order effects, and first winding 6604 is not magnetically coupled with second windings 6608. Consequentially, the first inductor of magnetic device 6600 is not magnetically coupled with the second inductor of magnetic device 6600, even though both inductors share a common magnetic core 6602 and are wound around a common portion of the magnetic core. FIG. 68 illustrates a magnetic flux path 6802 associated with current flowing through the turn of first winding 6604 superimposed on a magnetic flux path 6804 associated with current flowing through the turns of second windings 6608, showing that the two magnetic flux paths are orthogonal.

Figure 69:
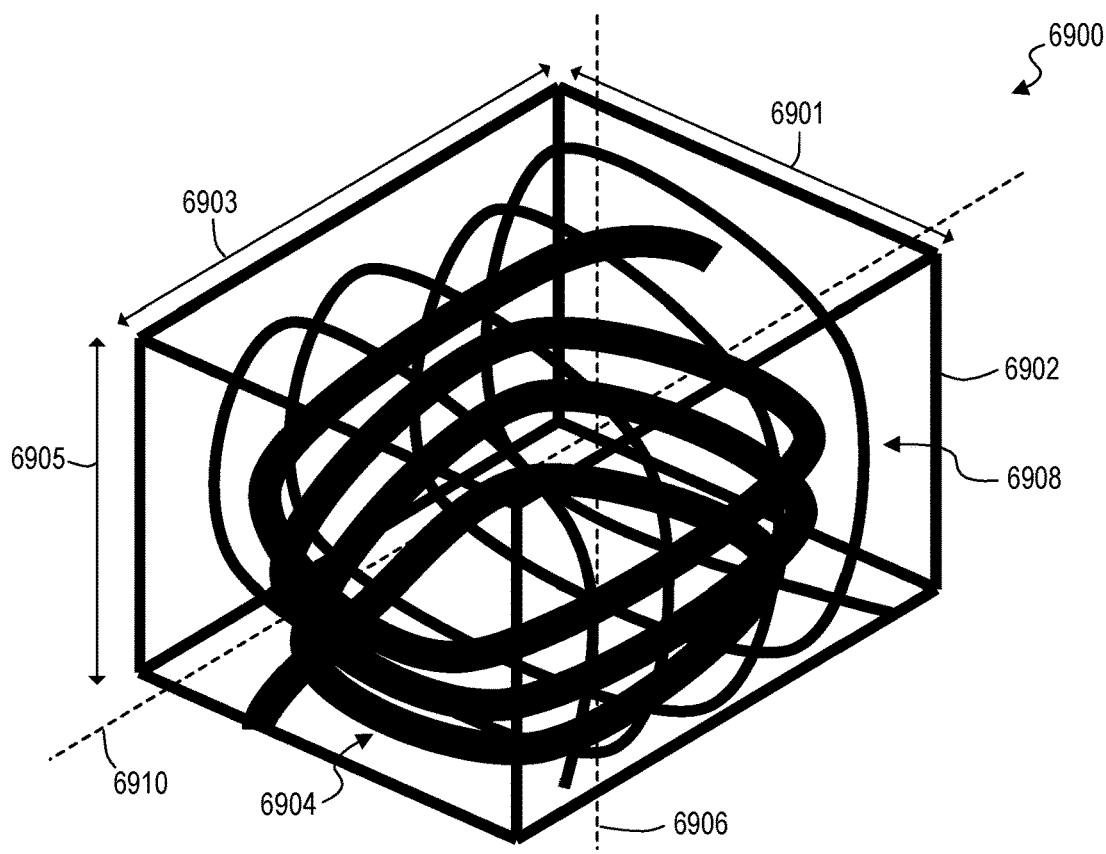
FIG. 69 shows a perspective view of another magnetic device including two inductors with orthogonal magnetic flux paths, according to an embodiment.

FIG. 69 shows a perspective view of a magnetic device 6900, which is another magnetic device including two inductors with orthogonal magnetic flux paths. Magnetic device 6900 includes a monolithic magnetic core 6902, which is, for example, formed of powder magnetic material. Magnetic core 6902 is shown in wire view, i.e., only its outline is shown, to show the interior of magnetic device 6900. Magnetic device 6900 has a depth 6901, a width 6903, and a height 6905.

Figure 70:
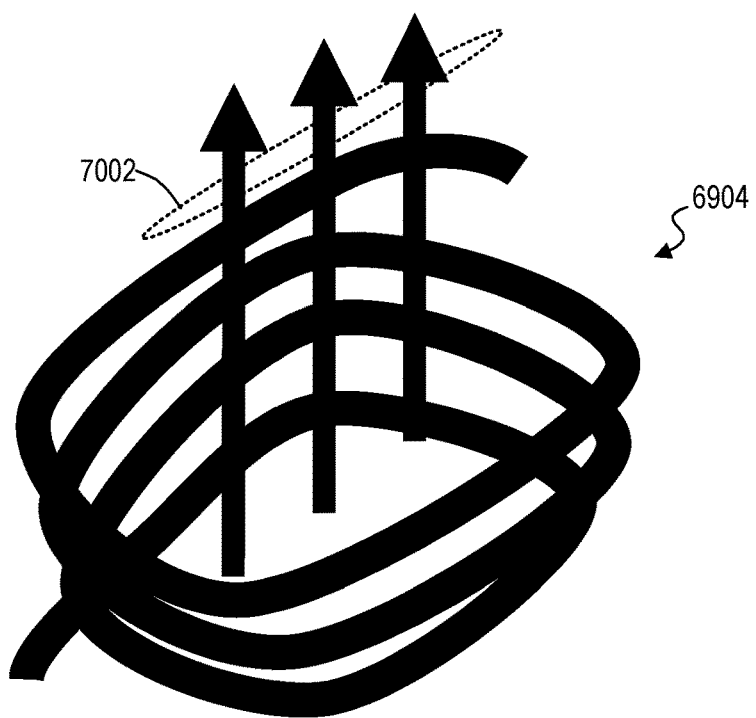
FIG. 70 shows a perspective view of a first winding of the FIG. 69 magnetic device when separated from the remainder of the magnetic device.
Figure 71:
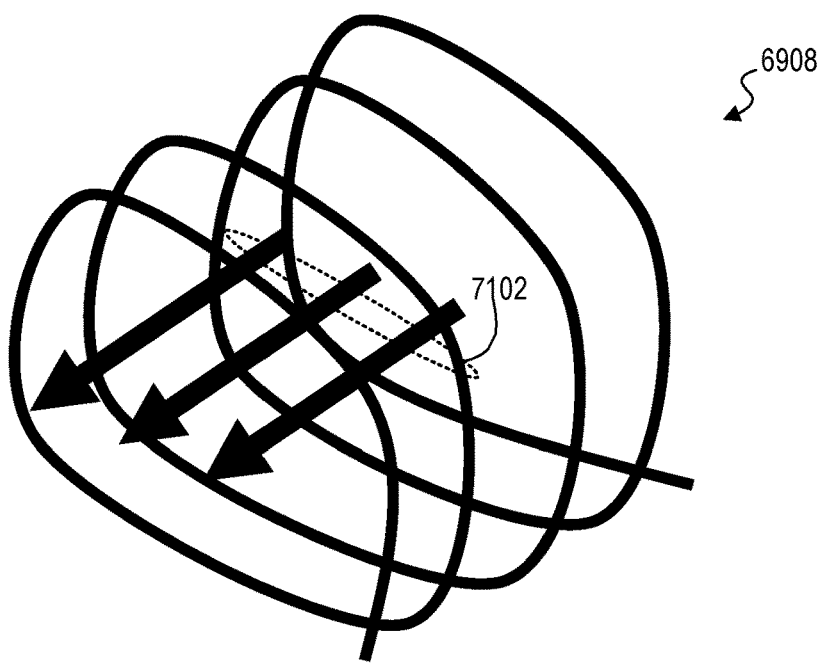
FIG. 71 shows a perspective view of a second winding of the FIG. 69 magnetic device when separated from the remainder of the magnetic device.

A first winding 6904 and a second winding 6908 are embedded in monolithic magnetic core 6902. First winding 6904 forms one or more turns around a first winding center axis 6906 extending in the height 6901 direction, and second winding 6908 forms one or more turns around a second winding center axis 6910 extending in the widthwise 6903 direction. Second winding 6908 typically at least partially encloses first winding 6904 to minimize required size of magnetic core 6902. FIGS. 70 and 71 show perspective views of first winding 6904 and second windings 6908, respectively, when separated from the remainder of magnetic device 6900. The number of turns of each winding 6904 and 6908 may be varied without departing from the scope hereof.

First winding 6904 and monolithic magnetic core 6902 collectively form a first inductor, and second winding 6908 and monolithic magnetic core 6902 collectively form a second inductor. Although not required, it is anticipated that second winding 6908 will form more turns than first winding 6904, so that the second inductor has a greater inductance value than the first inductor. Additionally, in certain embodiments, first winding 6904 is thicker, e.g., formed of lower gauge wire, than second winding 6908, so that the first inductor has a higher current handling capability than the second inductor. According, one possible application of magnetic device 6900 is in power converter 300 (FIG. 3), where the first inductor of magnetic device 6900 serves as first inductor 318, and the second inductor of magnetic device 6900 serves as second inductor 326.

First winding center axis 6906 is orthogonal to second winding center axis 6910. Therefore, magnetic flux induced by current flowing through the turns of first winding 6904 is orthogonal to magnetic flux induced by current flowing through the turns of second winding 6908, neglecting second order effects. See, for example, FIGS. 70 and 71, which respectively show an approximate first path 7002 of magnetic flux through the turns of first winding 6904 and an approximate second path 7102 of magnetic flux through the turns of second winding 6908. First path 7002 is orthogonal to second path 7104, as can be seen when comparing FIGS. 70 and 71, and first winding 6904 is therefore not magnetically coupled with second winding 6908. Consequentially, the first inductor of magnetic device 6900 is not magnetically coupled with the second inductor of magnetic device 6900, even though both inductors share a common monolithic magnetic core 6902 and are wound around a common portion of the magnetic core.

Figure 72:
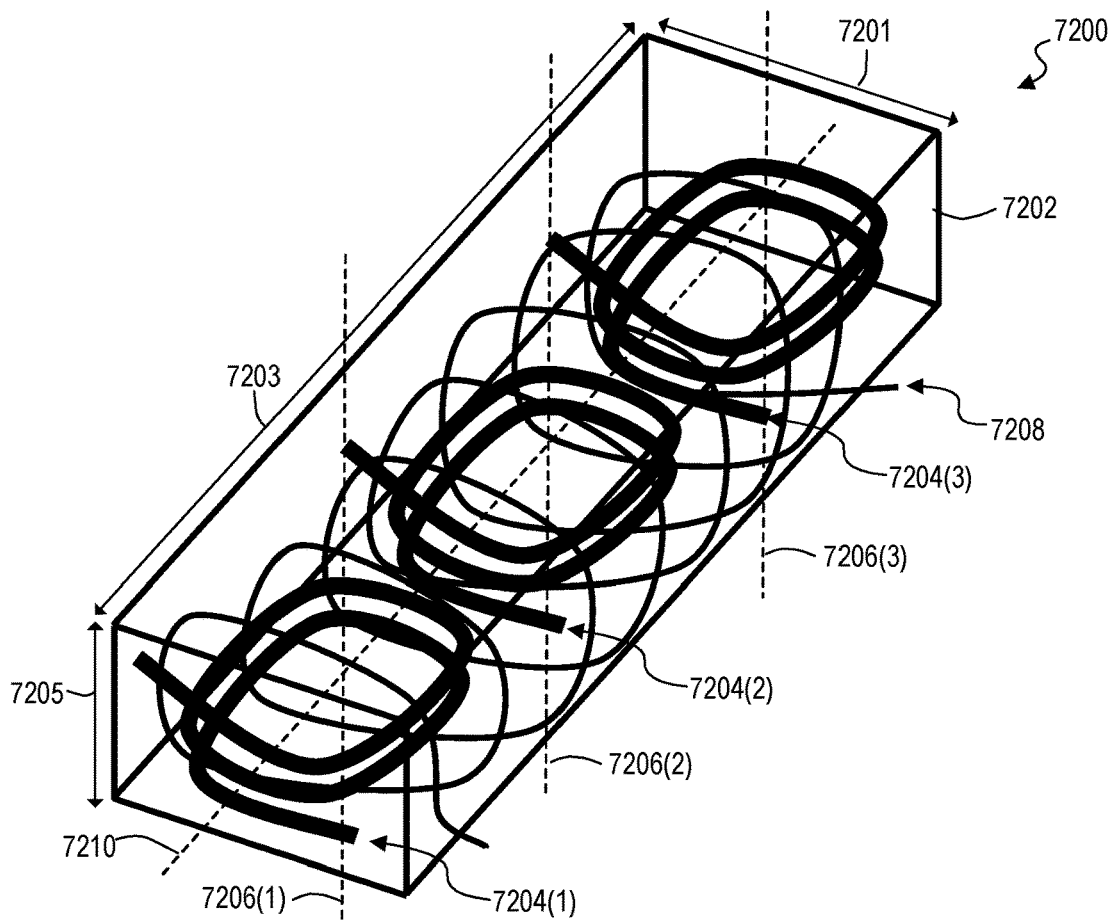
FIG. 72 shows a perspective view of a magnetic device similar to the FIG. 69 magnetic device, but including three first winding instances, according to an embodiment.

Magnetic device 6900 could be modified to include additional instances of first winding 6904 and/or second winding 6908. For example, FIG. 72 shows a perspective view of a magnetic device 7200, which is similar to magnetic device 6900 of FIG. 69, but includes three first winding instances. Magnetic device 7200 has a depth 7201, a width 7203, and a height 7205.

Figure 73:
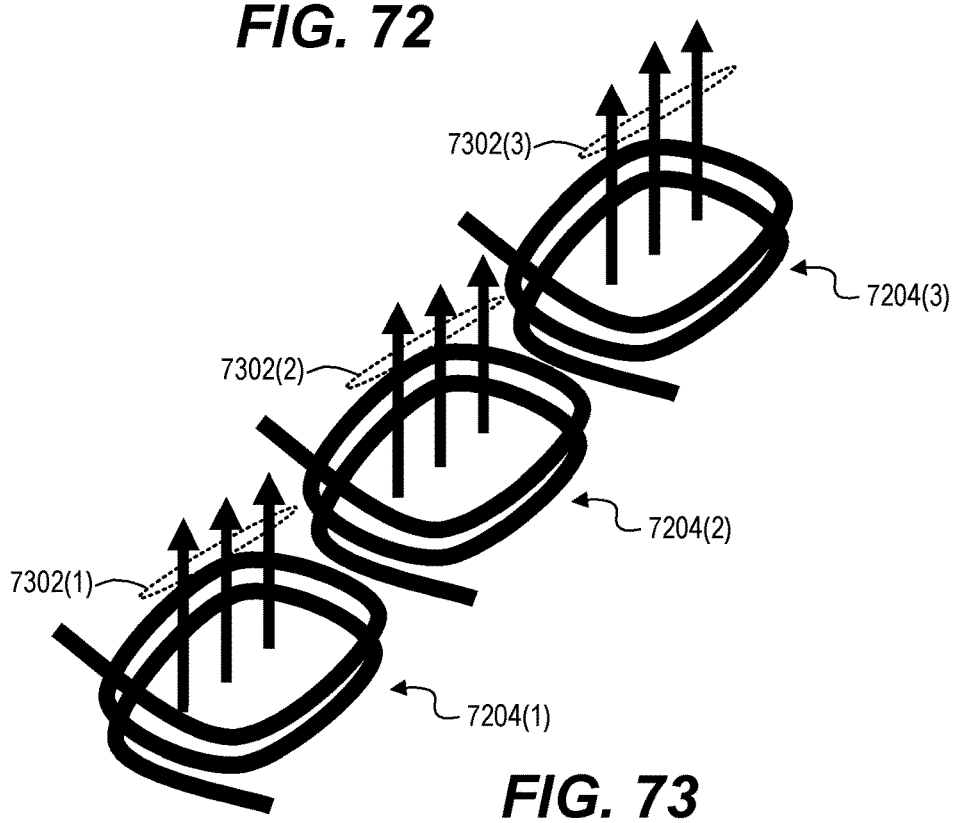
FIG. 73 shows a perspective view of first windings of the FIG. 72 magnetic device when separated from the remainder of the magnetic device.
Figure 74:
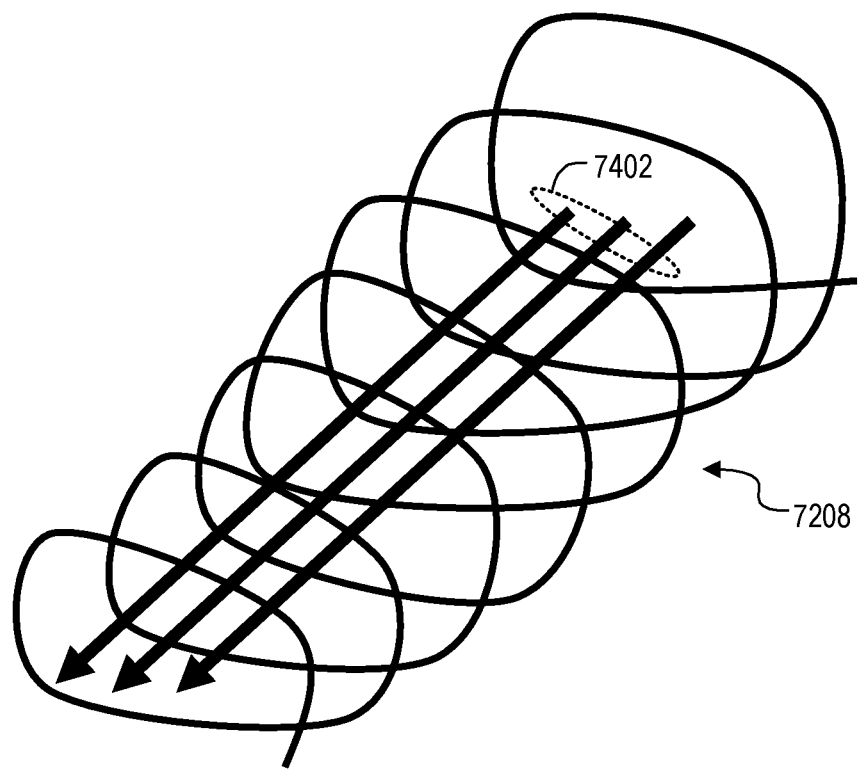
FIG. 74 shows a perspective view of a second winding of the FIG. 72 magnetic device when separated from the remainder of the magnetic device.

Three first windings 7204 and one second winding 7208 are embedded in a monolithic magnetic core 7202, which is formed, for example, of powder magnetic material. Monolithic magnetic core 7202 is shown in wire view in FIG. 72, i.e., only the outline is shown in FIG. 72, to show the interior of magnetic device 7200. Each first winding 7204 forms one or more turns around a respective first winding center axis 7206 extending in the height 7205 direction, and second winding 7208 forms one or more turns around a second winding center axis 7210 extending in the widthwise 7203 direction. Second winding 7208 typically at least partially encloses first windings 7204. FIGS. 73 and 74 show perspective views of first windings 7204 and second winding 7208, respectively, when separated from the remainder of magnetic device 7200. The number of turns of each winding 7204 and 7208 may be varied without departing from the scope hereof.

First windings 7204 and monolithic magnetic core 7202 collectively form a first inductor, and second winding 7208 and monolithic magnetic core 7202 collective form a second inductor. Each first winding center axis 7206 is parallel to each other first winding center axis 7206, and accordingly, monolithic magnetic core 7202 magnetically couples each first winding 7204 with each other first winding. Therefore, the first inductor of magnetic device 7200 is a coupled inductor including three first windings 7204.

Second winding center axis 7210 is orthogonal to each first winding center axis 7206. Therefore, magnetic flux induced by current flowing through the turns of first windings 7204 is orthogonal to magnetic flux induced by current flowing through the turns of second winding 7208, neglecting second order effects. See, for example, FIGS. 73 and 74, which respectively show approximate paths 7302 of magnetic flux through the turns of first windings 7204 and an approximate path 7402 of magnetic flux through the turns of second winding 7208. Each path 7302 is orthogonal to path 7404, as can be seen when comparing FIGS. 73 and 74. Consequentially, although first windings 7204 are magnetically coupled with each other, first windings 7204 are not magnetically coupled with second winding 7208, even though second winding 7208 and each first winding 7204 are wound around a common respective portion of magnetic core 7202.

One possible application of the first inductor of magnetic device 7200 is in switching sub-converters intended for use at moderate or heavy loads, such as in first buck sub-converters 1036 of converter 1000 (FIGS. 10 and 11). One possible application of the second inductor of magnetic device 7200 is in a switching sub-converter intended for use at light loads, such as in one of second buck sub-converters 1038 of converter 1000 (FIGS. 10 and 12).

Figure 75:
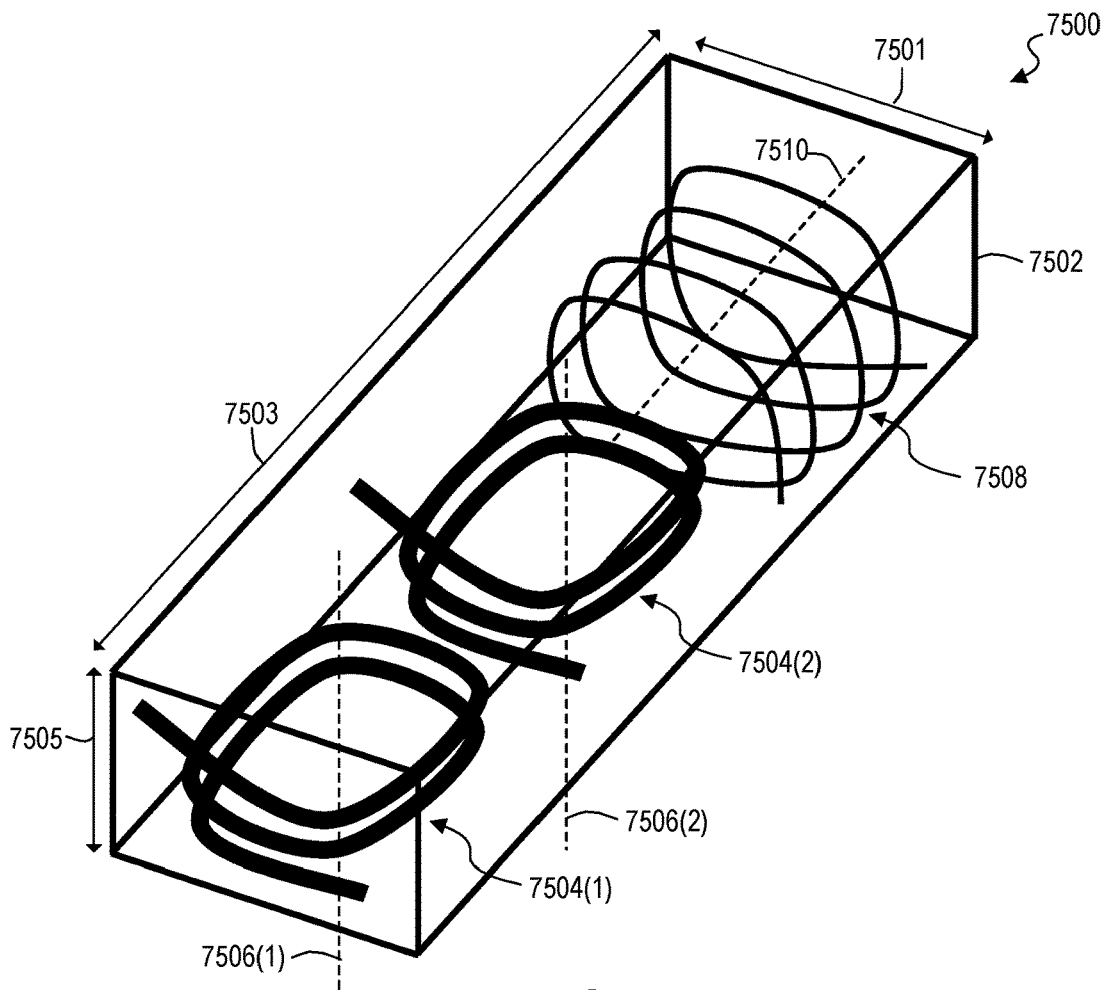
FIG. 75 shows a perspective view of a magnetic device similar to the FIG. 72 magnetic device, but where the second winding does not enclose the first windings, according to an embodiment.

FIG. 75 shows a perspective view of a magnetic device 7500, which is similar to magnetic device 7200 of FIG. 72, but where the second winding does not enclose the first windings. Magnetic device 7500 has a depth 7501, a width 7503, and a height 7505.

Figure 76:
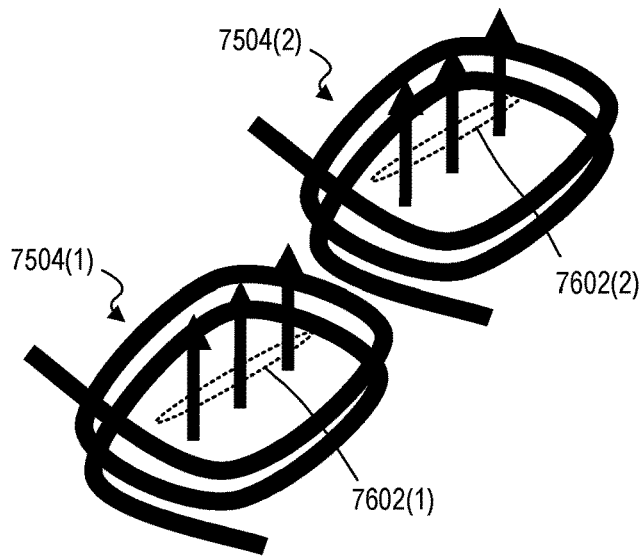
FIG. 76 shows a perspective view of first windings of the FIG. 75 magnetic device when separated from the remainder of the magnetic device.
Figure 77:
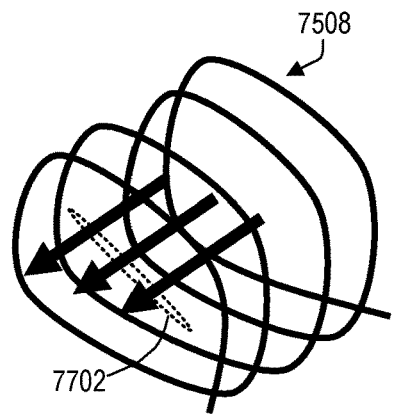
FIG. 77 shows a perspective view of a second winding of the FIG. 75 magnetic device when separated from the remainder of the magnetic device.

Two first windings 7504 and one second winding 7508 are embedded in a monolithic magnetic core 7502, which is formed, for example, of powder magnetic material. Monolithic magnetic core 7502 is shown in wire view in FIG. 75, i.e., only the outline is shown in FIG. 75, to show the interior of magnetic device 7500. Each first winding 7504 forms one or more turns around a respective first winding center axis 7506 extending in the height 7505 direction, and second winding 7508 forms one or more turns around a second winding center axis 7510 extending in the widthwise 7503 direction. FIGS. 76 and 77 show perspective views of first windings 7504 and second winding 7508, respectively, when separated from the remainder of magnetic device 7500. The number of turns of each winding 7504 and 7508 may be varied without departing from the scope hereof.

First windings 7504 and monolithic magnetic core 7502 collectively form a first inductor, and second winding 7508 and monolithic magnetic core 7502 collectively form a second inductor. Each first winding center axis 7506 is parallel to each other first winding center axis 7506, and accordingly, monolithic magnetic core 7502 magnetically couples each first winding 7504 with each other first winding 7504. Therefore, the first inductor of magnetic device 7500 is a coupled inductor including two first windings 7504.

Second winding center axis 7510 is orthogonal to each first winding center axis 7506. Therefore, magnetic flux induced by current flowing through the turns of first windings 7504 is orthogonal to magnetic flux induced by current flowing through the turns of second winding 7508, neglecting second order effects. See, for example, FIGS. 76 and 77, which respectively show approximate paths 7602 of magnetic flux from currently flowing through the turns of first windings 7504 and an approximate path 7702 of magnetic flux from current flowing through the turns of second winding 7508. Paths 7602 are each orthogonal to path 7702, as can be seen when comparing FIGS. 76 and 77. Consequentially, although first windings 7504 are magnetically coupled with each other, first windings 7504 are not magnetically coupled with second winding 7508, even though all windings are embedded in monolithic magnetic core 7502.

The fact that second winding 7508 does not enclose first windings 7504 helps minimize overlap of magnetic flux associated with first windings 7504 and magnetic flux associated with second winding 7508. Consequentially, magnetic device 7500 may have higher saturation current ratings than magnetic device 7200, assuming otherwise similar configuration. Magnetic device 7500 will typically be larger than magnetic device 7200, however, because first windings 7504 and second winding 7508 each require a respective portion of magnetic core 7502.

Figure 78:
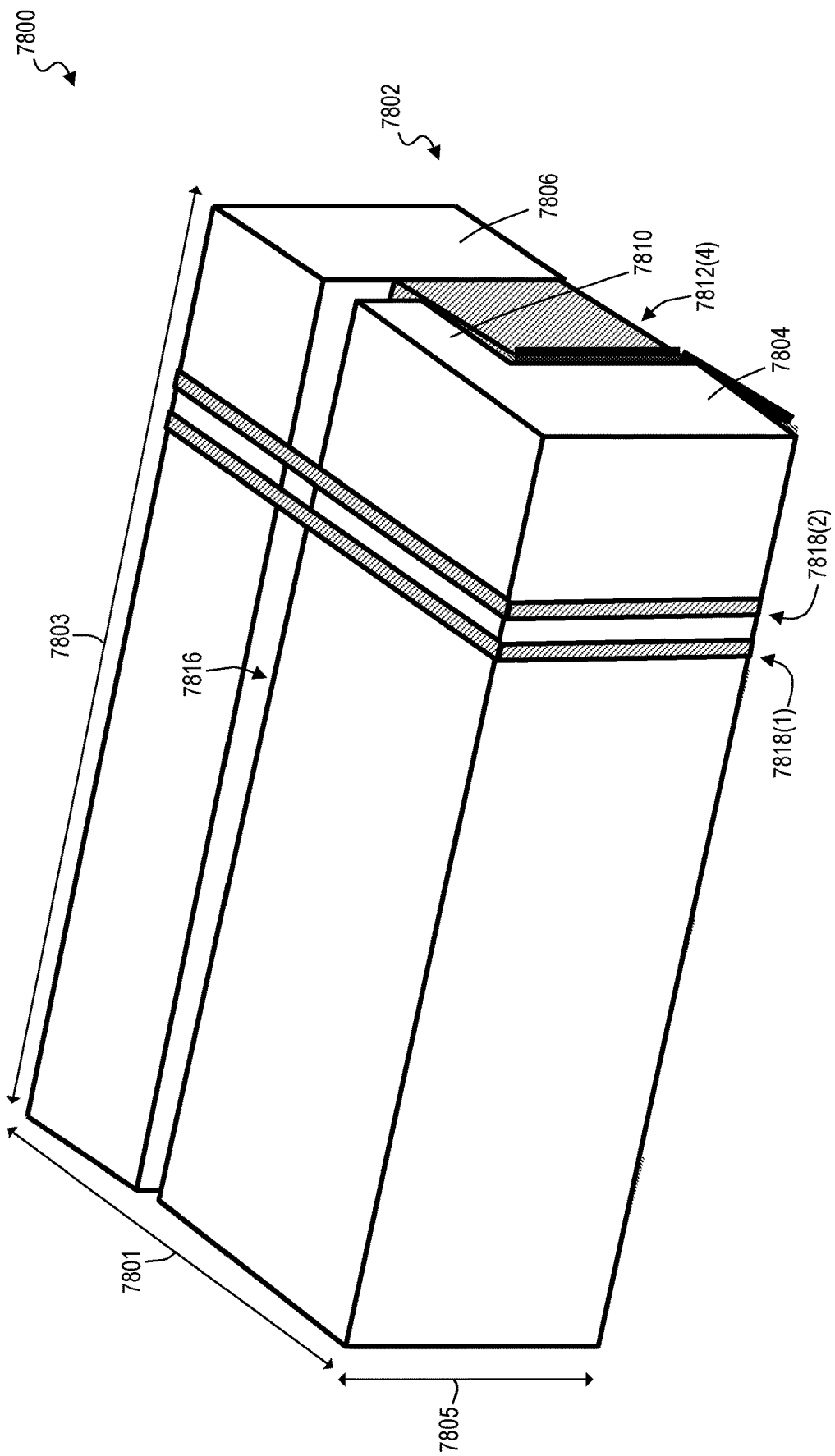
FIG. 78 shows a perspective view of another magnetic device with orthogonal magnetic flux paths, according to an embodiment.
Figure 79:
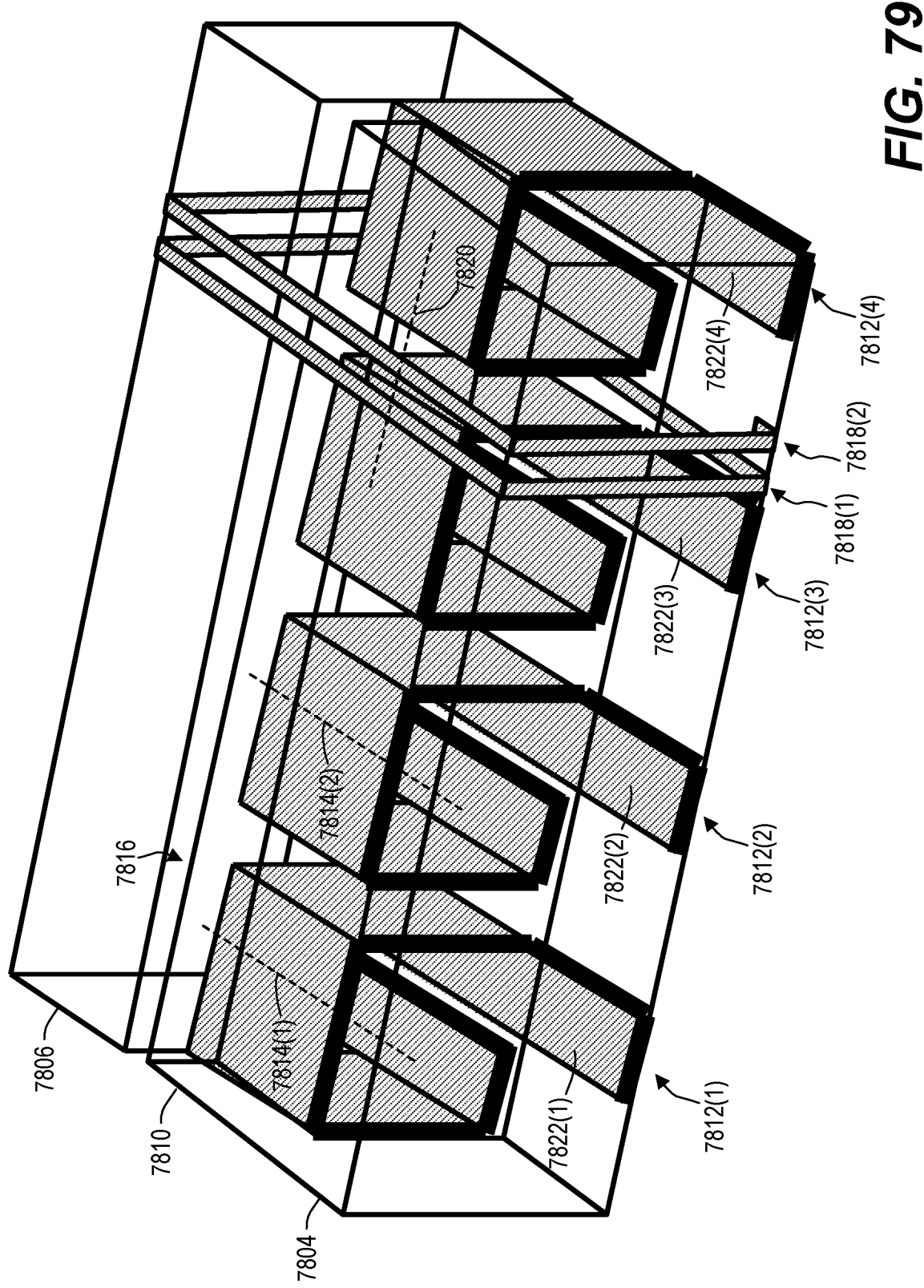
FIG. 79 shows a perspective view of the FIG. 78 magnetic device with a magnetic core of the device shown in wire view.
Figure 80:
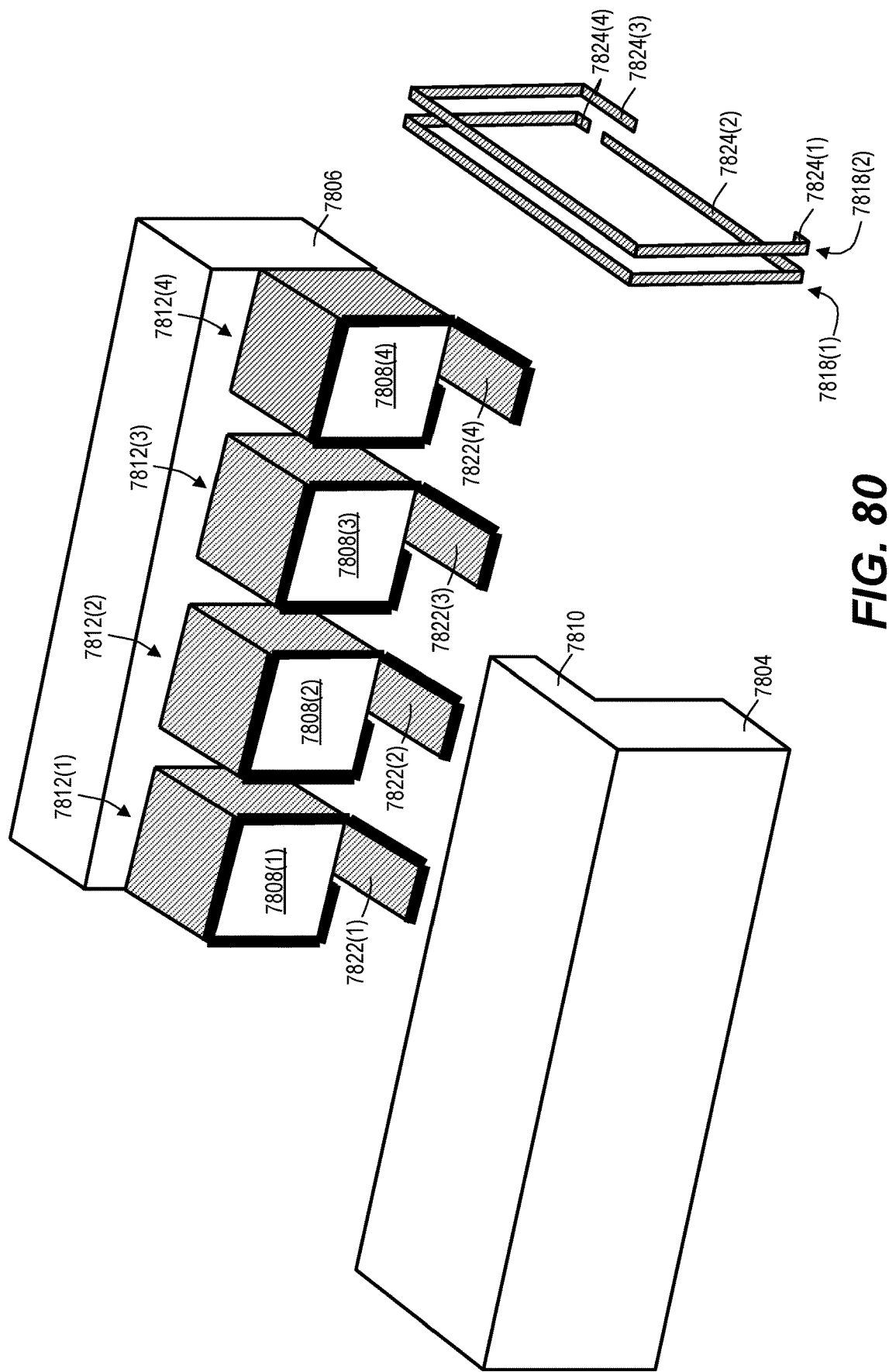
FIG. 80 shows an exploded perspective view of the FIG. 78 magnetic device.

FIG. 78 shows a perspective view of a magnetic device 7800, which is another magnetic device including inductors with orthogonal magnetic flux paths. Magnetic device 7800 has a depth 7801, a width 7803, and a height 7805. Magnetic device 7800 includes a magnetic core 7802 including a first end magnetic element 7804, a second end magnetic element 7806, a plurality of rungs 7808, and a top magnetic element 7810. FIG. 79 shows a perspective view of magnetic device 7800 with magnetic core 7802 shown in wire view, i.e. where only the outline of magnetic core 7802 is shown, to show the interior of magnetic device 7800. FIG. 80 shows an exploded perspective view of magnetic device 7800 with first end magnetic element 7804, top magnetic element 7810, and second windings 7818 separated from the reminder of the magnetic device.

Each rung 7808 joins first end magnetic element 7804 and second magnetic element 7806 in the depth 7801 direction. Therefore, first and second end magnetic elements 7804, 7806 and legs 7808 collectively form a "ladder" magnetic core, where first and second end magnetic elements 7804, 7806 are analogous to ladder rails and rungs 7808 are analogous to ladder rungs. Top magnetic element 7810 is disposed over some or all of rungs 7808 in the height 7805 direction, such that top magnetic element 7810 provides a path in the depth 7801 direction for magnetic flux between first end magnetic element 7804 and second end magnetic element 7806.

A respective first winding 7812 is wound around each rung 7808, such that each first winding forms a turn around a respective first center winding axis 7814 extending in the depth 7801 direction (see FIG. 79). Only some first center winding axes 7814 are shown to promote illustrative clarity. First and second end magnetic elements 7804, 7806 and rungs 7808 collectively magnetically couple first windings 7812 together. Top magnetic element 7810, on the other hand, provides paths for leakage magnetic flux associated with first windings 7812. Accordingly, first windings 7812 and magnetic core 7802 collectively from a first inductor, which is a coupled inductor. Although not required, one or more gaps 7816 are typically formed in series with the magnetic flux path of top magnetic element 7810, such as to achieve desired leakage inductance values of first windings 7812 and/or to achieve resistance to magnetic saturation.

Magnetic device 7800 further includes one or more second windings 7818, where each second winding 7818 is wound around first and second end magnetic elements 7804, 7806 and top magnetic element 7810 in the depth 7801 direction, such that each second winding 7818 forms one or more turns around a common second winding center axis 7820 extending in the width 7803 direction. Second windings 7818 and magnetic core 7802 collectively form a second inductor. Second windings 7818 are typically electrically coupled in series and/or parallel to achieve desired characteristics of the second inductor. For example, second windings 7818 may be electrically coupled in series by a printed circuit board conductive trace to achieve a relatively large inductance value of the second inductor. One possible application of the first inductor of magnetic device 7800 is in a switching sub-converter intended for use at moderate or heavy loads, such as in first buck sub-converters 1036 of converter 1000 (FIGS. 10 and 11). One possible application of the second inductor of magnetic device 7800 is in a switching sub-converter intended for use at light loads, such as in one of second buck sub-converters 1038 of converter 1000 (FIGS. 10 and 12).

The relationship between the turns of first windings 7812, the turns of second windings 7818, and magnetic core 7802 causes first windings 7812 to not be magnetically coupled with second windings 7818, even though all windings are wound around portions of common magnetic core 7802. In particular, net coupling magnetic flux associated with first windings 7812 is essentially zero in the turns of second windings 7818. Furthermore, magnetic flux associated with second windings 7818 is substantially orthogonal to leakage magnetic flux associated with first windings 7812.

Figure 81:
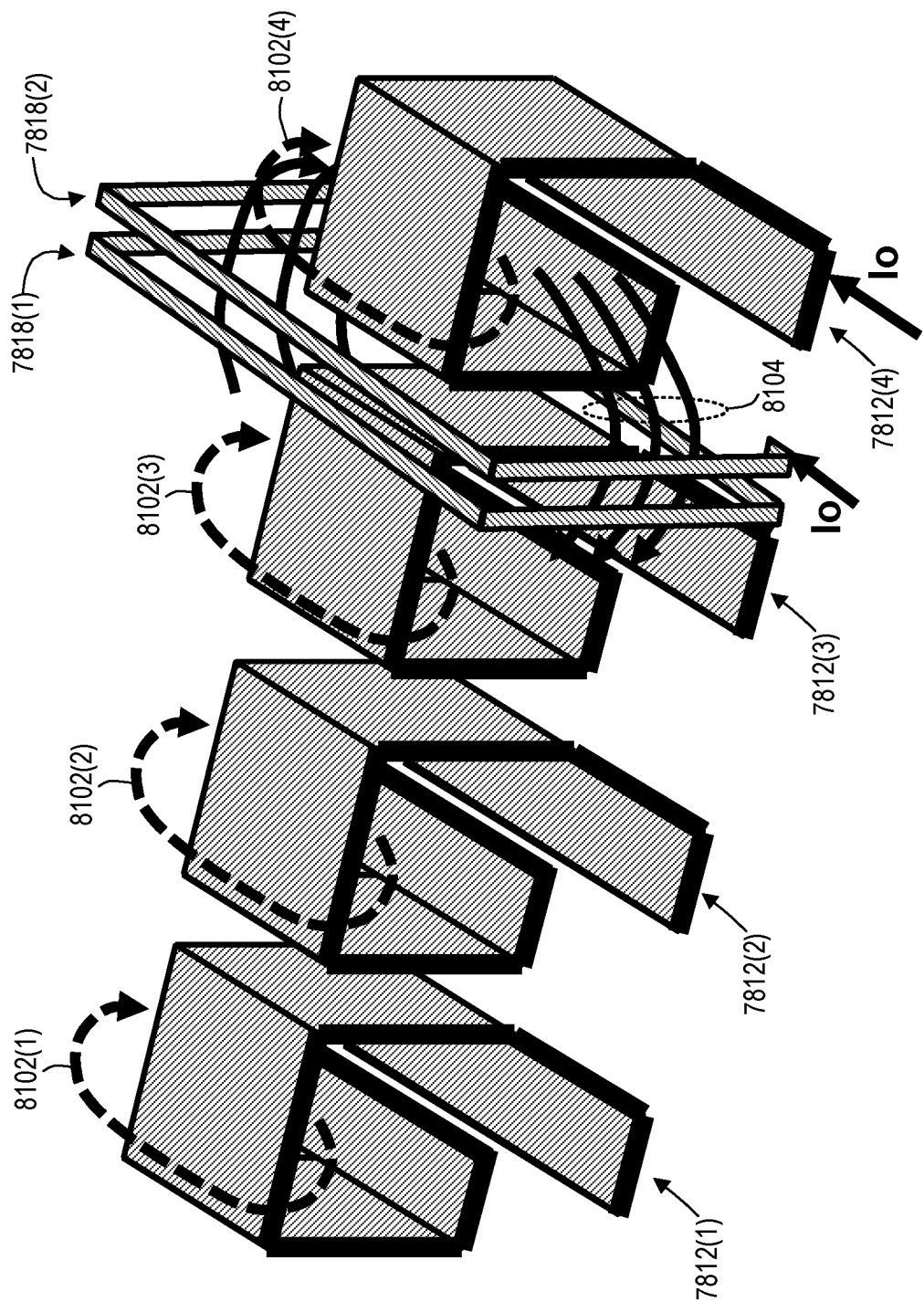
FIG. 81 shows a perspective view of the windings of the FIG. 78 magnetic device.

To help appreciate these features, first consider FIG. 81, which is a perspective view of first windings 7812 and second windings 7818 without magnetic core 7802. Leakage magnetic flux associated with each first winding 7812 flows in loops around each turn of the winding and primarily through top magnetic element 7810, as approximated by leakage flux paths 8102. Magnetizing flux associated first windings 7812, in contrast, links turns of first winding 7812 instances. An approximate path 8104 is shown in FIG. 81 for magnetizing flux linking first windings 7812(3) and 7812(4).

Figure 82:
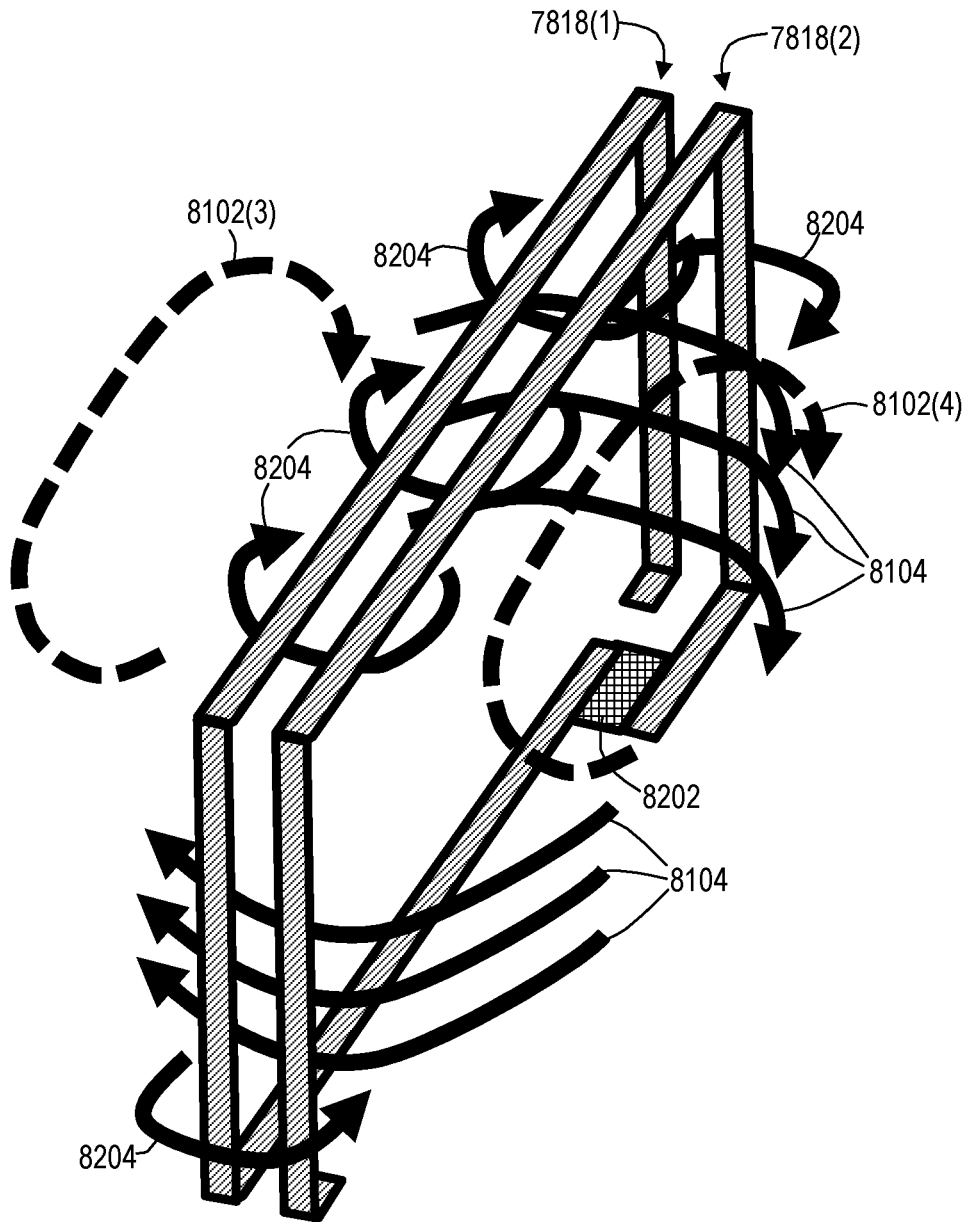
FIG. 82 shows a perspective view of second windings of the FIG. 78 magnetic device.

Next consider FIG. 82, which is a perspective view of second windings 7818 without magnetic core 7802, where second windings 7818 are connected in series by a printed circuit board conductive trace 8202. Leakage magnetic flux paths 8102 and coupling magnetic flux path 8104 from FIG. 81 are superimposed on FIG. 82. Magnetic flux associated with current flowing through the turns of second windings 7818 is approximated by magnetic flux paths 8204. Leakage magnetic flux paths 8102 are orthogonal to magnetic flux paths 8204. Therefore, leakage magnetic flux associated with first windings 7812 does not materially link second windings 7818. Additionally, net magnetizing flux associated with first windings 7812 is substantially zero in the turns of second windings 7818, as shown, for example, by magnetizing flux path 8104 being symmetric within each second winding 7818. Therefore, magnetizing flux associated with first windings 7812 does not link second windings 7818. Accordingly, first windings 7812 are not magnetically coupled with second windings 7818.

It should be appreciated the lack of interaction between first windings 7812 and second windings 7818 applies irrespective of the location and number of second windings 7818 along the width 7803 of magnetic device 7800. Accordingly, the number of second windings 7818 and the location of second windings 7818 along width 7803 may be varied without departing from the scope hereof.

Opposing ends of first windings 7812 form respective solder tabs 7822, and opposing ends of each second winding 7818 form respective solder tabs 7824 (see FIG. 80). Only some solder tabs 7822 are visible in the perspective views herein, however. In certain embodiments, solder tabs 7824(2) and 7824(3) are laterally adjacent, such as illustrated in FIGS. 80 and 82, to facilitate connecting second windings 7818 in series by a short conductive printed circuit board trace. Although magnetic device 7800 is shown with first windings 7812 and second windings 7818 being foil windings to help minimize conduction losses at high frequencies, the winding style may be varied without departing from the scope thereof.

Figure 83:
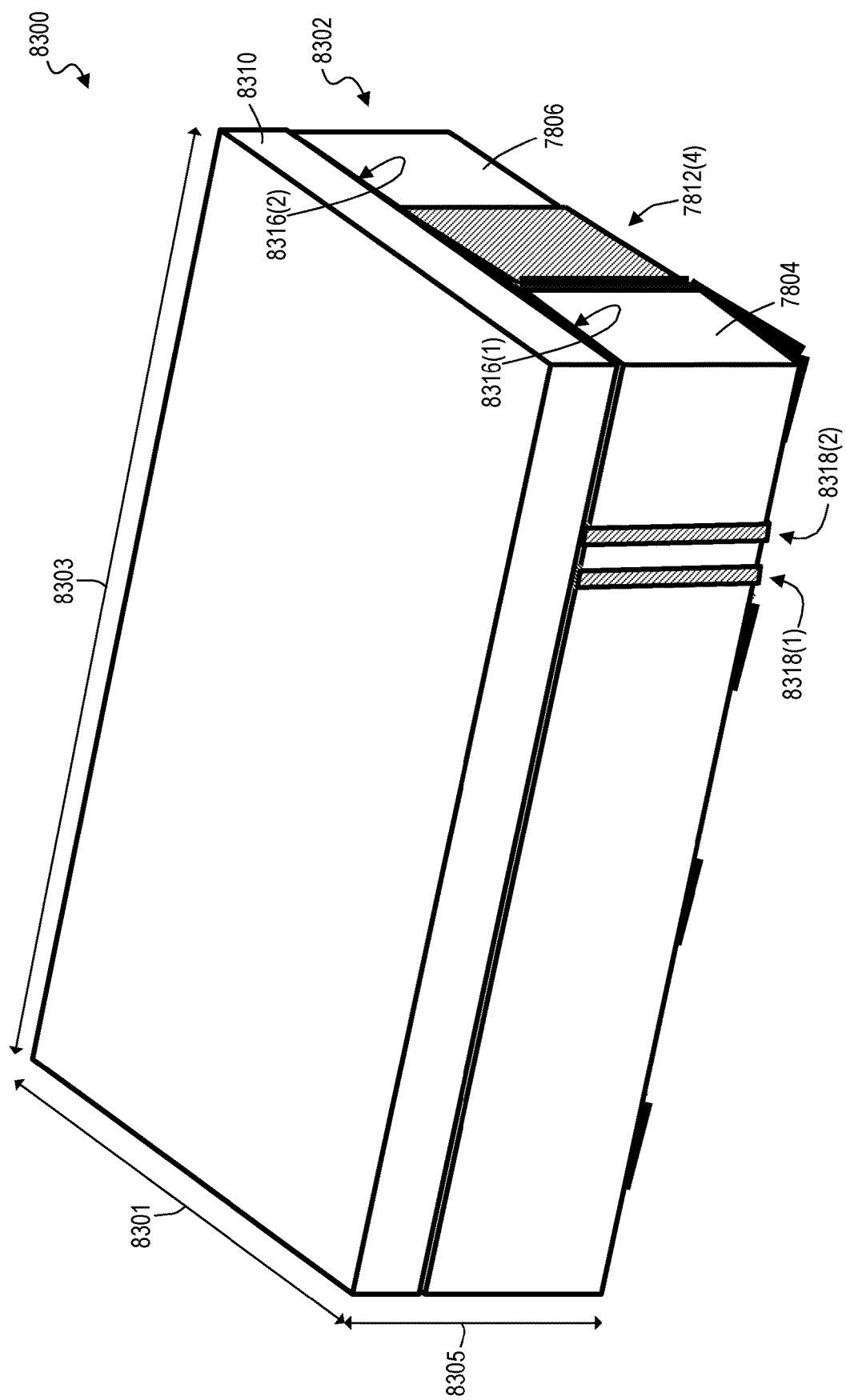
FIG. 83 shows a perspective view of yet another magnetic device with orthogonal magnetic flux paths, according to an embodiment.
Figure 84:
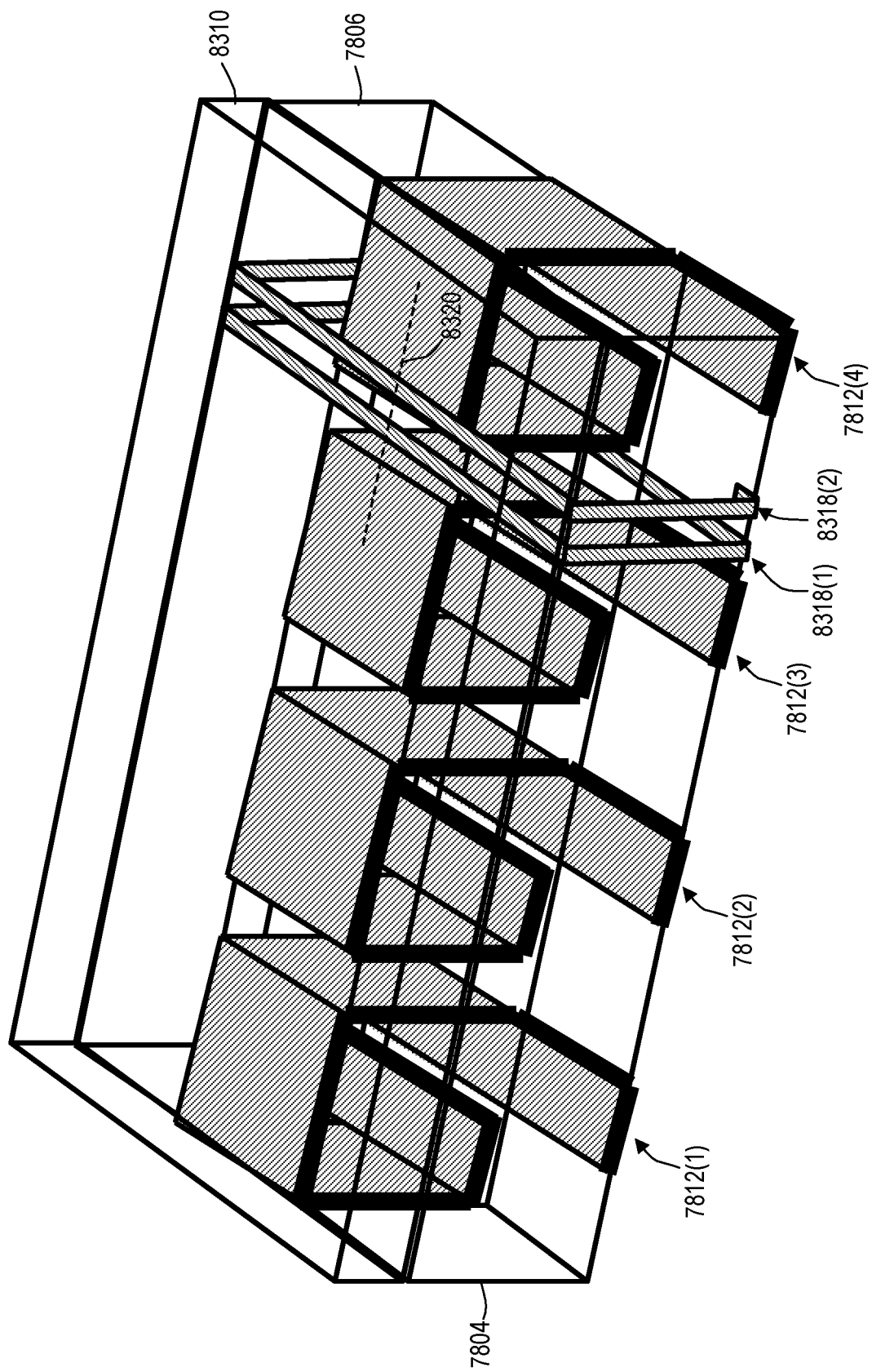
FIG. 84 shows a perspective view of the FIG. 83 magnetic device with a magnetic core of the device shown in wire view.

FIG. 83 shows a perspective view of a magnetic device 8300 having a depth 8301, a width 8303, and a height 8305. Magnetic device 8300 is similar to magnetic device 7800 of FIGS. 78-82, but with top magnetic element 7810 replaced with top magnetic element 8310, and with second windings 7818 replaced with second windings 8318. FIG. 84 shows a perspective view of magnetic device 8300 with magnetic core 8302 shown in wire view, i.e. where only the outline of magnetic core 8302 is shown, to show the interior of magnetic device 8300.

Top magnetic element 8310 extends at least partially over each of first end magnetic element 7804 and second end magnetic element 7806, to provide a path in the depth 8301 direction for magnetic flux between first end magnetic element 7804 and second end magnetic element 7806. While not required, top magnetic element 8310 is typically separated from each of first end magnetic element 7804 and second end magnetic element 7806 by a respective gap 8316, to achieve desired leakage inductance values and/or to achieve resistance to magnetic saturation.

Each second winding 8318 is wound around first and second end magnetic elements 7804 and 7806 in the depth direction, such that each second winding 8318 forms one or more turns around a second winding center axis 8320 extending in the width 8303 direction. Top magnetic element 8310 is disposed over second windings 8318 in the height 8305 direction, which helps achieve a low reluctance of a magnetic flux path associated with second windings 8318. Accordingly, the second inductor of magnetic device 8300, which is collectively formed of second windings 8318 and magnetic core 8302, may have a larger inductance value than the second inductor of magnetic device 7800, assuming otherwise similar magnetic device configuration. Additionally, presence of top magnetic element 8310 over second windings 8318 helps contain magnetic flux within magnetic core 8302, thereby promoting electromagnetic compatibility between magnetic device 8300 and adjacent circuitry.

Applicants have further discovered that interaction between a coupled inductor and a co-packaged additional inductor can be minimized by strongly coupling the additional inductor with the coupled inductor, so that essentially all magnetizing flux associated with the coupled inductor links the winding of the additional inductor. Such configuration causes net magnetizing flux linking the winding of the additional inductor to be near zero, assuming the ratio of magnetizing inductance to leakage inductance of the coupled inductor is large. Consequentially, a voltage applied across any winding of the coupled inductor will result in a relatively small (ideally zero) voltage across the additional inductor's winding. Therefore, operation of the coupled inductor will have minimal effect on operation of the additional inductor.

Furthermore, magnetic flux associated with the additional inductor is divided among the various windings of the coupled inductor. As a result, voltage applied across the winding of the additional inductor is divided among the various windings of the coupled inductor, causing only a relatively small voltage to be induced across any one winding of the coupled inductor. Furthermore, in cases where the additional inductor's winding has more turns than each winding of the coupled inductor, magnitude of voltage induced across the coupled inductor's windings is further decreased according to the ratio of turns of the coupled inductor to turns of the additional inductor.

Figure 85:
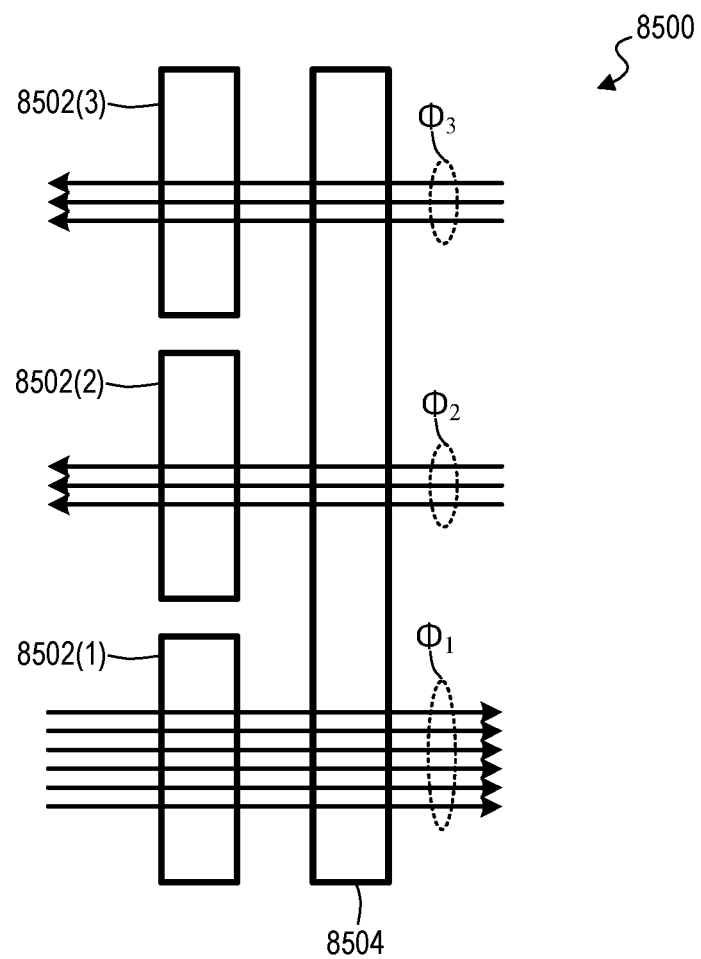
FIG. 85 schematically illustrates a magnetic device including a coupled inductor and an additional inductor, where a winding of the additional inductor is strongly magnetically coupled with windings of the coupled inductor, according to an embodiment.

Consider FIG. 85, for example, which schematically illustrates a magnetic device 8500 including a coupled inductor and an additional inductor. The coupled inductor includes three first windings 8502 symbolically shown by respective boxes, and the additional inductor includes a single second winding 8504 symbolically shown by a box. A magnetic core (not shown) magnetically couples first windings 8502 together. Additionally, the magnetic core strongly couples second winding 8504 with first windings 8502, such that essentially all magnetizing flux associated with first windings 8502 links second winding 8504.

Assume that (1) the magnetizing inductance is much greater than leakage inductance in the coupled inductor, (2) current through first winding 8502(1) generates a magnetizing flux $\Phi_1$, and (3) that the magnetic core is symmetrical. Magnetizing flux $\Phi_1$ will divide roughly equally into magnetizing flux $\Phi_2$ and $\Phi_3$ flowing in the opposite direction of magnetizing flux $\Phi_1$, where magnetizing flux $\Phi_2$ links first winding 8502(2), and magnetizing flux $\Phi_3$ links first winding 8502(3). Each of magnetizing flux $\Phi_1$, $\Phi_2$, and $\Phi_3$ links second winding 8504, since second winding 8504 is strongly magnetically coupled to first windings 8502. Therefore, net magnetizing flux net through second winding 8504 is equal to the sum of $\Phi_1$, $\Phi_2$ and $\Phi_3$. Net magnetizing flux $\Phi_{net}$ is substantially zero because each of $\Phi_2$ and $\Phi_3$ is roughly half of $\Phi_1$, and because each of $\Phi_2$ and $\Phi_3$ flows in the opposite direction of $\Phi_1$. Therefore, current flowing through coupled inductor winding 8502(1) induces relatively little voltage on additional inductor winding 8504. Similarly, current flowing through each of coupled inductor windings 8502(2) and 8502(3) also induces relatively little voltage on additional inductor winding 8504.

On the other hand, magnetic flux (not shown) associated with current flowing through second winding 8504 will divide roughly evenly between each of first windings 8502. Therefore, current flowing through second winding 8504 will generate relatively little magnetic flux linking any one first winding 8502, and current flowing through second winding 8504 will therefore induce relatively little voltage on any one first winding 8502.

The above discussion of magnetic device 8500 assumes that leakage inductance is negligible. However, a practical coupled inductor will necessarily have some leakage inductance, such as to achieve energy storage in switching power converter applications. Although net leakage magnetic flux within the turns of second winding 8504 will likely not be zero, leakage magnetic flux within the turns of second winding 8504 will tend to average, such that leakage magnetic flux has a relatively minor effect on magnetic device 8500 operation, in typical switching power converter applications.

Figure 86:
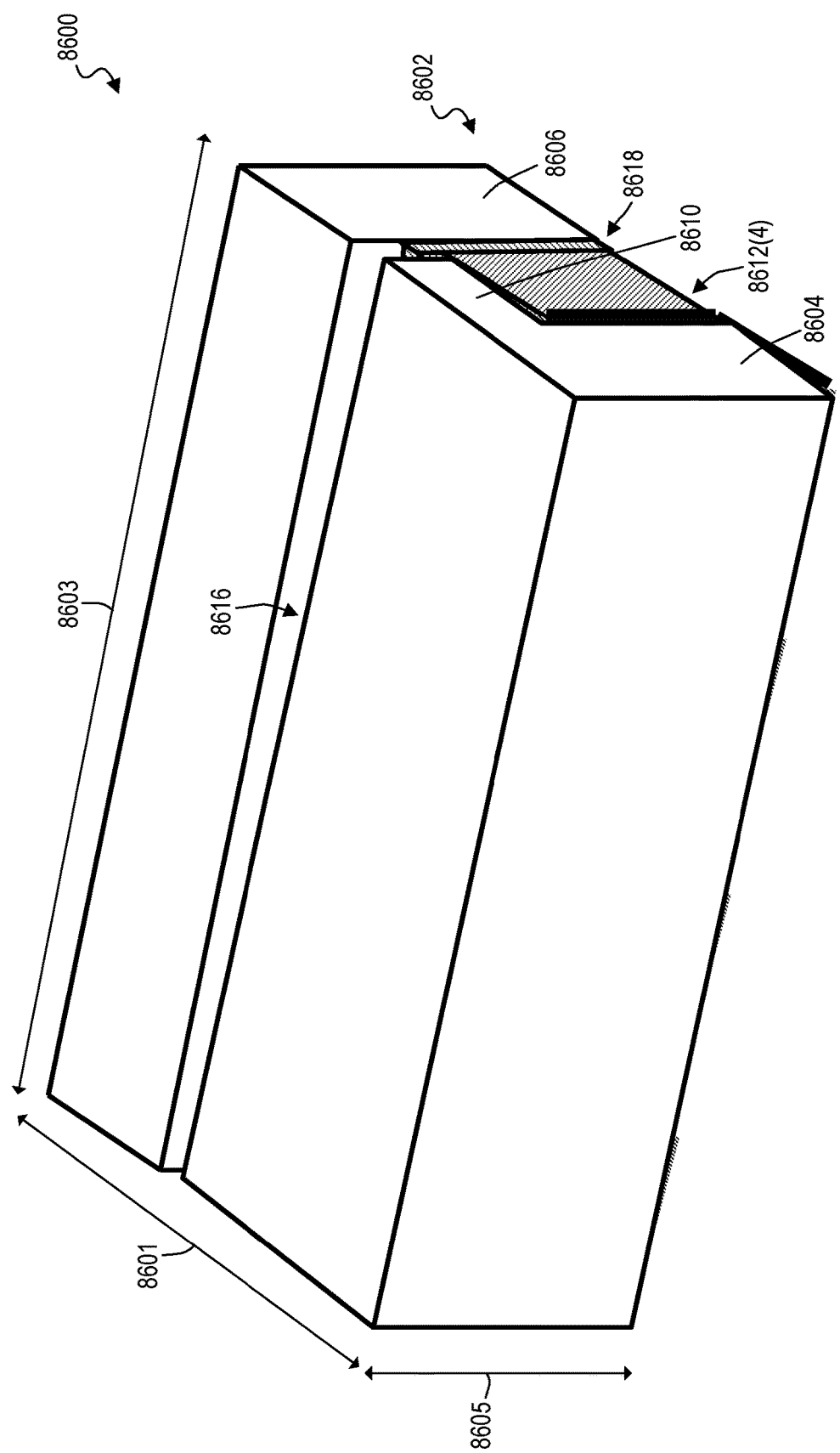
FIG. 86 shows a perspective view of a magnetic device including a coupled inductor and an additional inductor strongly magnetically coupled thereto, according to an embodiment.
Figure 87:
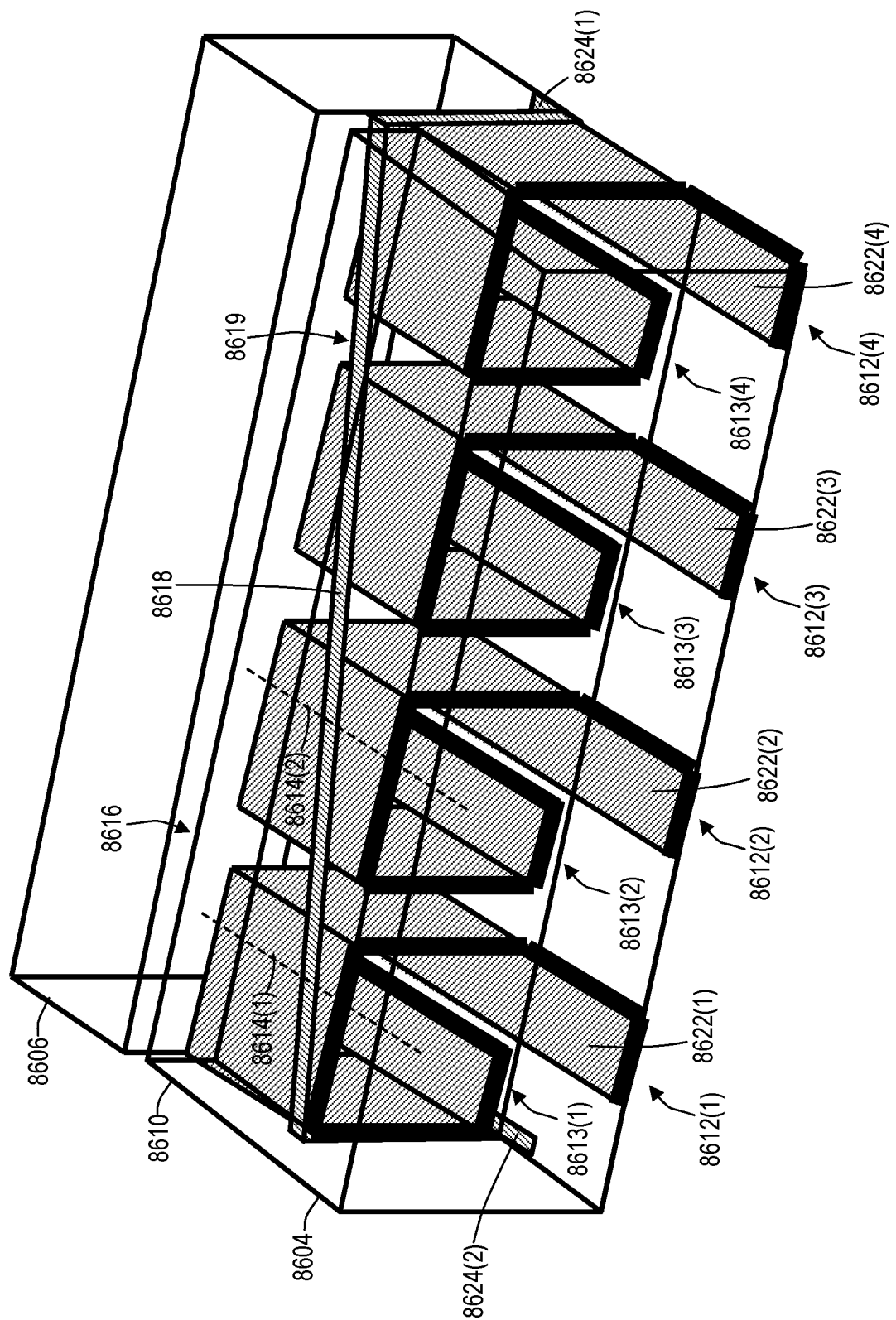
FIG. 87 shows a perspective view of the FIG. 86 magnetic device with a magnetic core of the device shown in wire view.
Figures 88, 89:
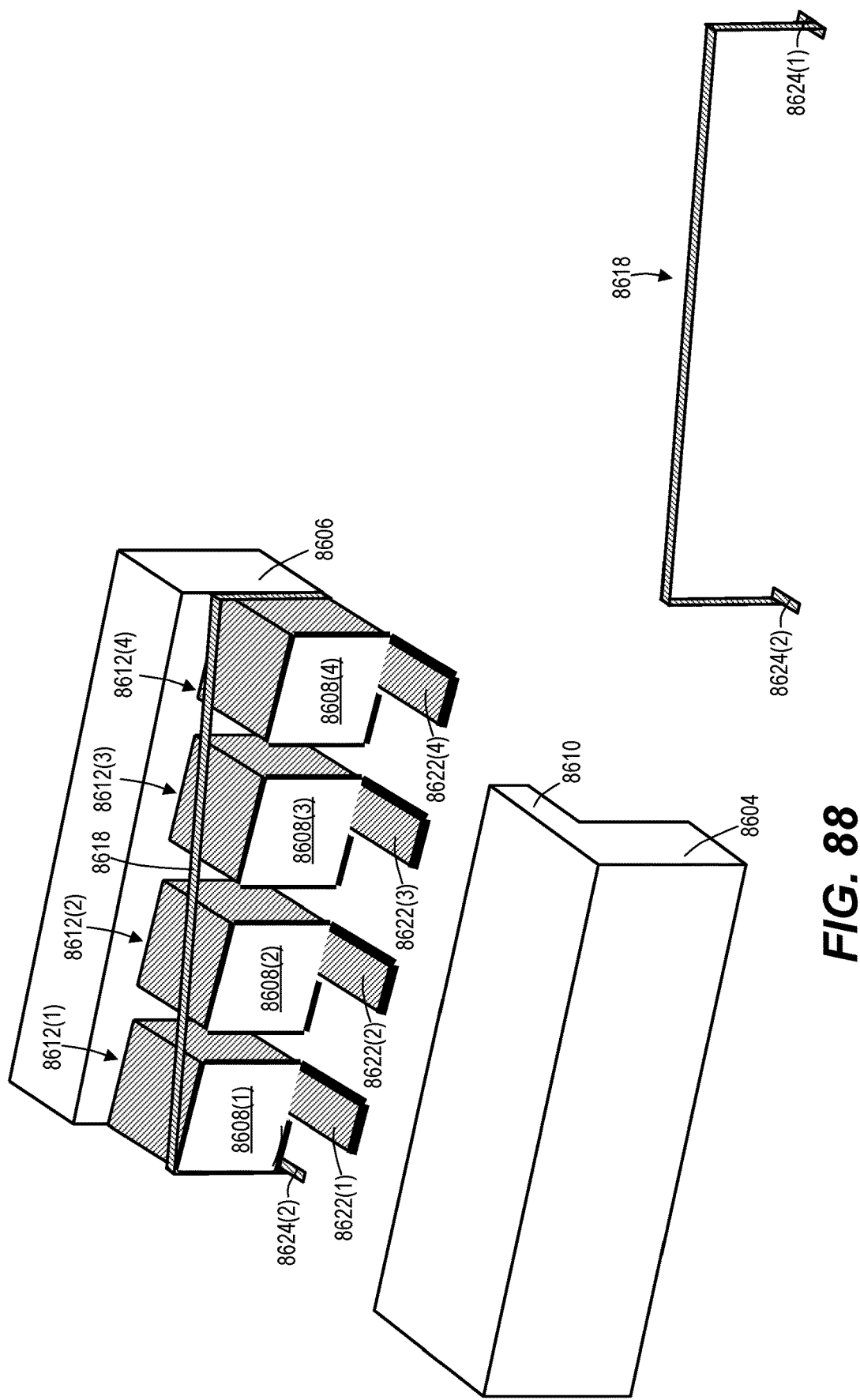
FIG. 88 shows an exploded perspective view of the FIG. 86 magnetic device.
FIG. 89 shows a perspective view of a second winding of the FIG. 86 magnetic device.

FIG. 86 shows a perspective view of a magnetic device 8600, which includes a coupled inductor and an additional inductor strongly magnetically coupled thereto. Magnetic device 8600 has a depth 8601, a width 8603, and a height 8605. Magnetic device 8600 includes a magnetic core 8602 including a first end magnetic element 8604, a second end magnetic element 8606, a plurality of rungs 8608, and top magnetic element 8610. FIG. 87 shows a perspective view of magnetic device 8600 with magnetic core 8602 shown in wire view, i.e. where only the outline of magnetic core 8602 is shown, to show the interior of magnetic device 8600. FIG. 88 shows an exploded perspective view of magnetic device 8600 with first end magnetic element 8604 and top magnetic element 8610 separated from the reminder of the magnetic device.

Each rung 8608 joins first end magnetic element 8604 and second magnetic element 8606 in the depth 8601 direction. Therefore, first and second end magnetic elements 8604, 8606 and legs 8608 collectively form a "ladder" magnetic core, where first and second end magnetic elements 8604, 8606 are analogous to ladder rails and where rungs 8608 are analogous to ladder rungs. Top magnetic element 8610 is disposed over some or all of rungs 8608 in the height direction, such that top magnetic element 8610 provides a path in the depth 8601 direction for magnetic flux between first end magnetic element 8604 and second end magnetic element 8606.

A respective first winding 8612 is wound around each rung 8608, such that each first winding forms a first winding turn 8613 having a first center winding axis 8614 extending in the depth 8601 direction (see FIG. 87). Only some first center winding axes 8614 are shown to promote illustrative clarity. First and second end magnetic elements 8604, 8606 and rungs 8608 collectively magnetically couple first windings 8612 together. Top magnetic element 8610, on the other hand, provides paths for leakage magnetic flux associated with first windings 8612. Accordingly, first windings 8612 and magnetic core 8602 collective from a first inductor, which is a coupled inductor. Although not required, one or more gaps 8616 are typically formed in series with the magnetic flux path of top magnetic element 8610, such as to achieve desired leakage inductance values of first windings 8612 and/or to achieve resistance to magnetic saturation.

Magnetic device 8600 further includes a second winding 8618 wound around all rungs 8608 such that second winding 8618 forms a second winding turn 8619. Each first winding turn 8613 is within second winding turn 8619, as seen when magnetic device 8600 is viewed cross-sectionally in the depth 8601 direction. Accordingly, each first winding turn 8613 encloses a respective first area, second winding turn 8619 encloses a second area, and the second area overlaps each first area, when magnetic device 8600 is viewed cross-sectionally in the depth 8601 direction. FIG. 89 shows a perspective view of second winding 8618 separated from the remainder of magnetic device 8600. Second winding 8618 and magnetic core 8602 collectively form a second inductor.

The fact that each first winding turn 8613 is within second winding turn 8619 causes magnetizing flux linking each first winding 8612 to also link second winding 8618, thereby strongly magnetically coupling second winding 8618 with each first winding 8612. Therefore, net magnetizing flux associated with first windings 8612 is substantially zero within second winding turn 8619, and operation of the first inductor will have relatively little effect on operation of the second inductor, even though both inductors share magnetic core 8602.

Additionally, magnetic flux linking second winding 8618 is divided among first windings 8612, such that relatively little magnetic flux associated with current flowing through second winding 8618 links each first winding 8612. As a result, operation of the second inductor will have relatively little effect on operation of the first inductor, even though both inductors share common magnetic core 8602.

Opposing ends of first winding 8612 form respective solder tabs 8622, and opposing ends of second winding 8618 form respective solder tabs 8624 (see FIGS. 87-89). Only some solder tabs 8622 are visible in the perspective views herein, however. Second winding 8618 diagonally crosses rungs 8608 so that solder tabs 8624 do not interfere with solder tabs 8622 on a bottom of magnetic device 8600. The configuration of second winding 8618 could be modified, however, as long as it forms at least one common turn around all rungs 8608. Although magnetic device 8600 is shown with first windings 8612 and second winding 8618 being single-turn foil windings to help minimize conduction losses at high frequencies, the winding style may be varied without departing from the scope thereof. Additionally, the number of first windings 8612 may be varied, as long as magnetic device 8600 includes at least two first windings 8612.

One possible application of the first inductor of magnetic device 8600 is in switching sub-converters intended for use at moderate or heavy loads, such as in first buck sub-converters 1036 of converter 1000 (FIGS. 10 and 11). One possible application of the second inductor of magnetic device 8600 is in a switching sub-converter intended for use at light loads, such as in one of second buck sub-converters 1038 of converter 1000 (FIGS. 10 and 12).

Figure 90:
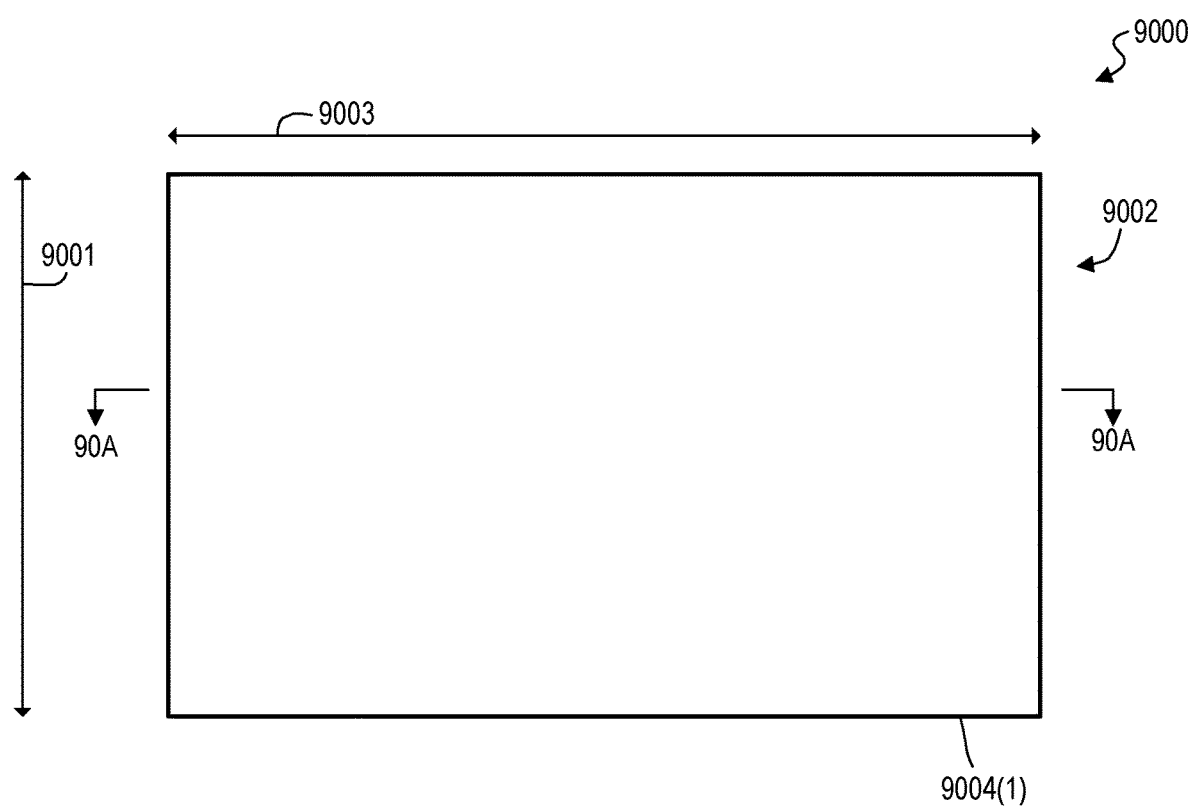
FIG. 90 shows a top-plan view of another magnetic device including a coupled inductor and an additional inductor strongly magnetically coupled thereto, according to an embodiment.
Figure 91:
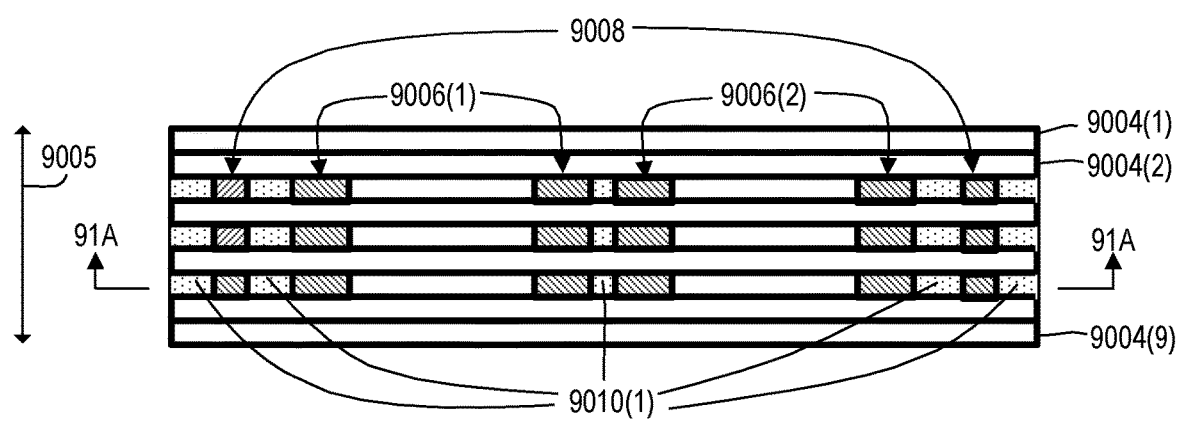
FIG. 91 shows a cross-sectional view of the FIG. 90 magnetic device taken along lines 90A-90A of FIG. 90.
Figure 92:
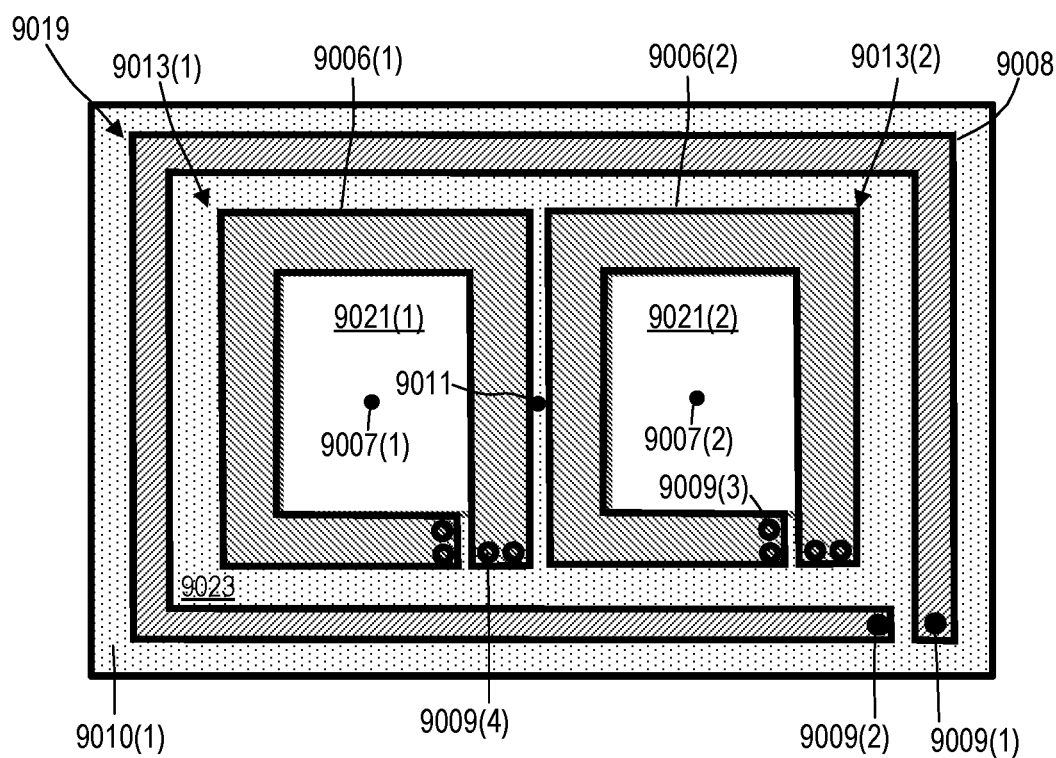
FIG. 92 shows a cross-sectional view of the FIG. 90 magnetic device taken along lines 91A-91A of FIG. 91.

FIG. 90 shows a top-plan view of a magnetic device 9000, which is another magnetic device including a coupled inductor and an additional inductor strongly magnetically coupled thereto. FIG. 91 shows a cross-sectional view of magnetic device 9000 taken along lines 90A-90A of FIG. 90, and FIG. 92 shows a cross-sectional view of magnetic device 9000 taken along lines 91A-91A of FIG. 91. Magnetic device 9000 has a depth 9001, a width 9003, and a height 9005 (see FIGS. 90 and 91).

Magnetic device 9000 includes a monolithic magnetic core 9002 including a plurality of magnetic film layers 9004 stacked in the height 9005 direction (see FIG. 91). Only some magnetic film layers 9004 are labeled to promote illustrative clarity. Two first windings 9006 and one second winding 9008 are embedded in monolithic magnetic core 9002. Each first winding 9006 forms a respective first winding turn 9013 around a respective first winding center axis 9007 extending in the height 9005 direction, and second winding 9008 forms a second winding turn 9019 around a second winding center axis 9011 extending in the height direction (see FIG. 92). First windings 9006 and second winding 9008 are formed, for example, of one or more layers of conductive ink or film disposed on respective magnetic film layers 9004, where different layers of conductive ink or film are connected in the height 9005 direction by conductive vias 9009. Several examples of conductive vias 9009 are shown in the cross-sectional view of FIG. 92, although not all via instances are labeled to promote illustrative clarity. First windings 9006 and magnetic core 9002 collectively form a first inductor, and second winding 9008 and magnetic core 9002 collectively form a second inductor. Magnetic core 9002 magnetically couples first windings 9006 together. Thus, the first inductor is a two-winding coupled inductor.

First windings 9006 are separated from each other in the width 9003 direction. Each first winding turn 9013 is within second winding turn 9019, as seen when magnetic device 9000 is viewed cross-sectionally in the height 9005 direction (see FIG. 92). Accordingly, each first winding turn 9013 encloses a respective first area 9021, second winding turn 9019 encloses a second area 9023, and second area 9023 overlaps each first area 9021, when magnetic device 9000 is viewed cross-sectionally in the height 9005 direction. Consequentially, magnetizing flux linking each first winding 9006 also links second winding 9008, thereby strongly magnetically coupling second winding 9008 with each first winding 9006. As a result, net magnetizing flux associated with first windings 9006 is substantially zero within area 9023, and operation of the first inductor will have relatively little effect on operation of the second inductor, even though both inductors share magnetic core 9002.

Additionally, magnetic flux linking second winding 9008 is divided among first windings 9006, such that relatively little magnetic flux associated with current flowing through second winding 9008 links any given first winding 9006. As a result, operation of the second inductor will have relatively little effect on operation of the first inductor, even though both inductors share common magnetic core 9002.

In some embodiments, non-magnetic structures 9010 are additionally embedded in monolithic magnetic core 9002, such that non-magnetic structures 9010 are disposed in some or all of portions of monolithic magnetic core 9002 outside of areas 9021 enclosed by first winding turns 9013, as seen when magnetic device 9000 is viewed cross-sectionally in the height 9005 direction. Non-magnetic structures 9010 are formed of non-magnetic material or of material having a lower magnetic permeability than the material of magnetic film layers 9004. Consequentially, non-magnetic structures 9010 help prevent flow of magnetic flux outside of areas 9021 enclosed by first winding turns 9013, thereby promoting strong magnetic coupling of first windings 9006.

Each first winding 9006 and second winding 9008 may include multiple turns, as illustrated. The turns of each winding 9006 and 9008 are electrically coupled in series and/or parallel, to achieve desired inductance values and requisite current carrying capability. In some embodiments, two or more turns of each first winding 9006 are electrically coupled in parallel to achieve relatively small inductance values and to achieve relatively high current carrying capabilities, while the turns of second winding 9008 are electrically coupled in series to achieve a relatively large inductance value. The number of first windings 9006 can be varied as long as magnetic device 9000 includes at least two first winding 9006 instances. Additionally, the number of turns of each first winding 9006 and of second winding 9008 can be varied without departing from the scope hereof.

One possible application of first inductor of magnetic device 9000 is in a switching sub-converter intended for use at moderate or heavy loads, such as in first buck sub-converters 1036 of converter 1000 (FIGS. 10 and 11), and one possible application of the second inductor of magnetic device 9000 is in a switching sub-converter intended for use at light loads, such as in one of second buck sub-converters 1038 of converter 1000 (FIGS. 10 and 12).

Figure 93:
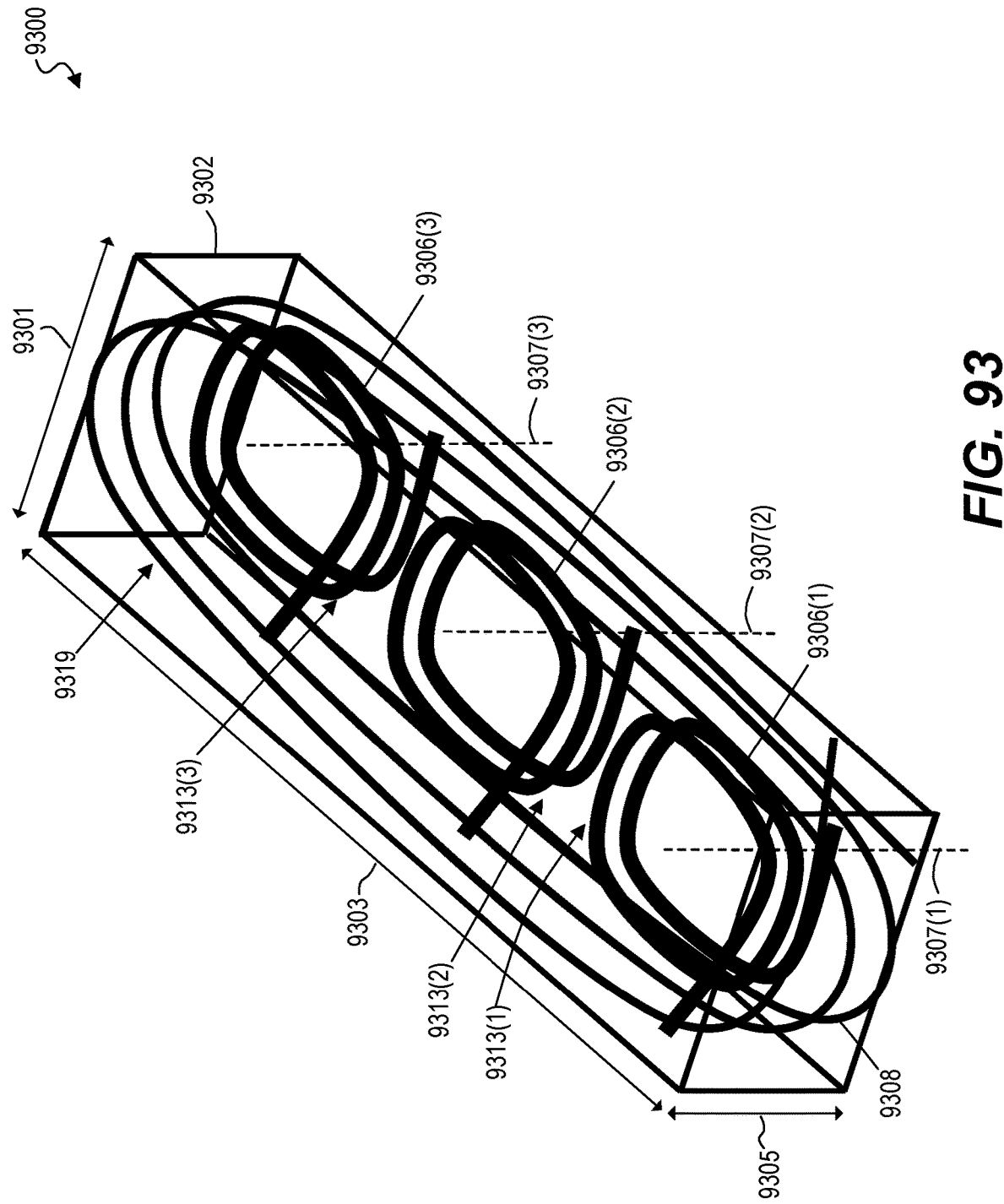
FIG. 93 shows a perspective view of a magnetic device similar to that of FIG. 90, but including a monolithic magnetic core formed of powder magnetic material, instead of a magnetic core formed of magnetic film layers, according to an embodiment.

FIG. 93 shows a perspective view of a magnetic device 9300 having a depth 9301, a width 9303, and a height 9305. Magnetic device 9300 is similar to magnetic device 9000 of FIGS. 90-92, but magnetic device 9300 includes a monolithic magnetic core 9302 formed of powder magnetic material, instead of magnetic film layers. Monolithic magnetic core 9302 is shown in wire view, i.e., only the outline of magnetic core 9302 is shown, to show the interior of magnetic device 9300.

Three first windings 9306 and one second winding 9308 are embedded in monolithic magnetic core 9302. Each first winding 9306 forms a respective first winding turn 9313 wound around a respective winding center axis 9307 extending in the height 9305 direction, and second winding 9308 forms a second winding turn 9319 wound around a winding center axis 9307(2) of first winding 9306(2), such that second winding turn 9319 and first winding turn 9313(2) are wound around the same winding center axis. First windings 9306 and monolithic magnetic core 9302 collectively form a first inductor, and second winding 9308 and monolithic magnetic core 9302 collectively form a second inductor. Monolithic magnetic core 9302 magnetically couples first windings 9306 together. Thus, the first inductor is a three-winding coupled inductor.

First windings 9306 are separated from each other in the width 9303 direction. Each first winding turn 9313 is within second winding turn 9319, as seen when magnetic device 9300 is viewed cross-sectionally in the height direction. As a result, magnetizing flux linking each first winding 9306 also links second winding 9308, thereby strongly magnetically coupling second winding 9308 with each first winding 9306. Consequentially, net magnetizing flux associated with first windings 9306 is substantially zero within second winding turn 9319, and operation of the first inductor will have relatively little effect on operation of the second inductor, even though both inductors share common magnetic core 9302. Additionally, magnetic flux linking second winding 9308 is divided among first windings 9306, such that relatively little magnetic flux associated with current flowing through second winding 9308 links any given first winding 9306. As a result, operation of the second inductor will have relatively little effect on operation of the first inductor, even though both inductors share common magnetic core 9302.

Figure 95:
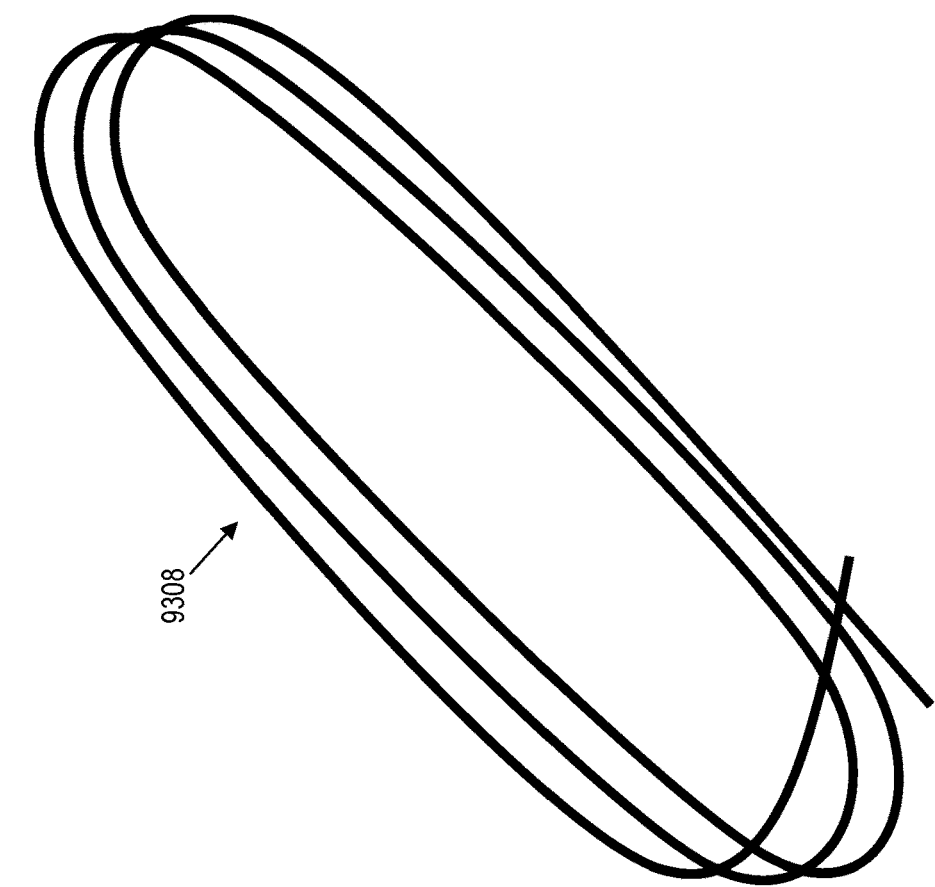
FIG. 95 shows a perspective view of a second winding of the FIG. 93 magnetic device when separated from the remainder of the magnetic device.
Figure 94:
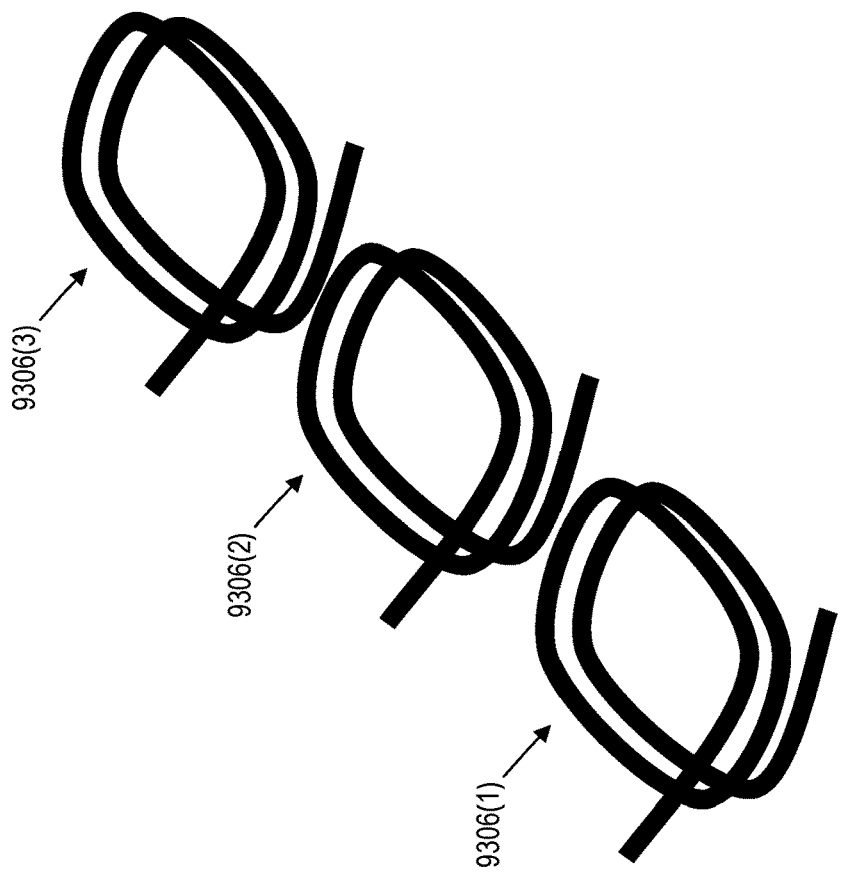
FIG. 94 shows a perspective view of first windings of the FIG. 93 magnetic device when separated from the remainder of the magnetic device.

Each first winding 9306 and second winding 9308 may include multiple turns, as illustrated. FIG. 94 shows a perspective view of first windings 9306 separated from the remainder of magnetic device 9300, and FIG. 95 shows a perspective view of second winding 9308 separated from the remainder of magnetic device 9300. The number of first windings 9306 can be varied as long as magnetic device 9300 includes at least two first winding 9306 instances. Additionally, the number of turns of each first winding 9306 and second winding 9308 can be varied without departing from the scope hereof.

Combinations of Features

Features described above as well as those claimed below may be combined in various ways without departing from the scope hereof. The following examples illustrate some possible combinations:

(A1) A power converter may include first and second switching sub-converters. The first switching sub-converter may be adapted to transfer power from an input power port to an output power port in a first operating mode of the power converter, and the first switching sub-converter may be adapted to operate in an inactive mode in a second operating mode of the power converter. The second switching sub-converter may be adapted to transfer power from the input power port to the output power port in the second operating mode of the power converter, and the second switching sub-converter may be adapted to operate in an inactive mode in the first operating mode of the power converter.

(A2) In the power converter denoted as (A1), an effective energy storage inductance value of the second switching sub-converter may be greater than an effective energy storage inductance value of the first switching sub-converter.

(A3) Either of the power converters denoted as (A1) or (A2) may be adapted to switch between the first and second operating modes in response to an external signal.

(A4) In any of power converters denoted as (A1) through (A3), the first operating mode may correspond to a moderate or heavy load operating condition of the power converter, and the second operating mode may correspond to a light load operating condition of the power converter.

(A5) In any of the power converters denoted as (A1) through (A4), each of the first and second switching sub-converters may have a buck-type topology.

(A6) In any of the power converters denoted as (A1) though (A5), the first switching sub-converter may include a first inductor, the second switching sub-converter may include both the first inductor and a second inductor, and the first and second inductors may be electrically coupled in series.

(A7) In any of the power converters denoted as (A1) through (A5), the first switching sub-converter may include a first inductor, the second switching sub-converter may include both the first inductor and a second inductor, and the first and second inductors may be part of a common coupled inductor.

(A8) In the power converter denoted as (A7), the first and second inductors may collectively form a single multi-turn inductor, in the second operating mode of the power converter.

(B1) A power converter may include first and second inductors, first and second control switching devices, and first and second freewheeling devices. The first inductor may be electrically coupled to a first switching node, and the first control switching device may be electrically coupled between a first power node and the first switching node. The second inductor may be electrically coupled to a second switching node, and the second control switching device may be electrically coupled between the first power node and the second switching node. The first control switching device may be adapted to (1) repeatedly switch between its conductive and non-conductive states in a first operating mode of the power converter, and (2) operate in its non-conductive state in a second operating mode of the power converter. The second control switching device may be adapted to (1) operate in its non-conductive state in the first operating mode of the power converter, and (2) repeatedly switch between its conductive and non-conductive states in the second operating mode of the power converter. The first freewheeling device may be adapted to provide a path for current flowing through the first inductor when the first control switching device is in its non-conductive state, in the first operating mode of the power converter. The second freewheeling device may be adapted to provide a path for current flowing through the second inductor when the second control switching device is in its non-conductive state.

(B2) In the power converter denoted as (B1), the second inductor may be electrically coupled between the first and second switching nodes, and the second freewheeling device may be adapted to provide a path for current flowing through both of the first and second inductors when the second control switching device is in its non-conductive state.

(B3) In either of the power converters denoted as (B1) or (B2), the first power node may be selected from the group consisting of an input power node and a common power node.

(B4) In the power converter denoted as (B3), the common power node may be a ground node.

(B5) In any of the power converters denoted as (B1) through (B4), the first control switching device may include a transistor electrically coupled between the first power node and the first switching node, the second control switching device may include a transistor electrically coupled between the first power node and the second switching node.

(B6) In any of the power converters denoted as (B1) through (B5), the first freewheeling device may be electrically coupled between a second power node and the first switching node, the second power node may be selected from the group consisting of a common power node and an output power node, and the second freewheeling device may be electrically coupled between the second power node and the second switching node.

(B7) In the power converter denoted as (B6), the first freewheeling device may include a first freewheeling switching device electrically coupled between the second power node and the first switching node, and the second freewheeling device may include a second freewheeling switching device electrically coupled between the second power node and the second switching node.

(B8) In the power converter denoted as (B6), the first freewheeling device may include a first freewheeling diode electrically coupled between the second power node and the first switching node, and the second freewheeling device may include a second freewheeling diode electrically coupled between the second power node and the second switching node.

(B9) In any of the power converters denoted as (B1) through (B8), the first inductor may have a first inductance value, and the second inductor may have a second inductance value that is larger than the first inductance value.

(B10) In any of the power converters denoted as (B1) through (B9), the first operating mode may correspond to a moderate or heavy load operating condition of the power converter, and the second operating mode may correspond to a light load operating condition of the power converter.

(B11) Any of the power converters denoted as (B1) through (B10) may further include a controller for controlling at least the first and second control switching devices.

(B12) In the power converter denoted as (B11), each of the first and second control switching devices may include a transistor, and the controller may include circuitry for driving the transistors between their conductive and non-conductive states.

(B13) In either of the power converters denoted as (B11) or (B12), the controller may be adapted to switch the power converter between the first and second operating modes.

(B14) In the power converter denoted as (B13) the controller may be adapted to switch the power converter between the first and second operating modes in a response to an external signal.

(B15) In the power converter denoted as (B13), the controller may be adapted to switch the power converter between the first and second operating modes in a response to a signal generated by or associated with a processor.

(B16) In the power converter denoted as (B15), the processor may be a processor of an information technology device.

(B17) In the power converter denoted as (B16), the information technology device may be selected from the group consisting of a tablet computer and a smart phone.

(B18) In any of the power converters denoted as (B1) through (B17), the first inductor may be electrically coupled between the first switching node and an output power node, and the power converter may further include a capacitor electrically coupled to the output power node.

(B19) In the power converter denoted as (B18), the first inductor, the first control switching device, the first freewheeling device, and the capacitor may be configured to collectively form at least part of a first buck sub-converter.

(B20) In the power converter denoted as (B19), the first buck sub-converter may be operable to operate in a discontinuous conduction mode during at least one of the first and second operating modes of the power converter.

(B21) In either of the power converters denoted as (B19) or (B20), the second inductor, the second control switching device, the second freewheeling device, and the capacitor may be configured to collectively form at least part of a second buck sub-converter.

(B22) In the power converter denoted as (B21), the first and second inductors may be electrically coupled in series and collectively form an energy storage inductance for the second buck sub-converter.

(B23) In either of the power converters denoted as (B21) or (B22), the second buck sub-converter may be operable to operate in a discontinuous conduction mode during the second operating mode of the power converter.

(B24) In any of the power converters denoted as (B1) through (B17), the first inductor, the first freewheeling device, and the first control switching device may collectively form part of a DC-to-DC sub-converter selected from the group consisting of a boost sub-converter and a buck-boost sub-converter.

(B25) Any of the power converters denoted as (B1) through (B24) may further include a third inductor, a third control switching device, and a third freewheeling device. The third inductor may be electrically coupled to a third switching node, and the third control switching device may be electrically coupled between the first power node and the third switching node. The third control switching device may be adapted to (1) repeatedly switch between its conductive and non-conductive states in the first operating mode of the power converter, and (2) operate in its non-conductive state in the second operating mode of the power converter. The third freewheeling device may be adapted to provide a path for current flowing through the third inductor when the third control switching device is in its non-conductive state, in the first operating mode of the power converter.

(B26) The power converter denoted as (B25) may further include a fourth inductor electrically coupled to a fourth switching node, a fourth control switching device electrically coupled between the first power node and the fourth switching node, and a fourth freewheeling device. The fourth control switching device may be adapted to (1) operate in its non-conductive state in the first operating mode of the power converter, and (2) repeatedly switch between its conductive and non-conductive states in the second operating mode of the power converter. The fourth freewheeling device may be adapted to provide a path for current flowing through the fourth inductor when the fourth control switching device is in its non-conductive state.

(B27) In the power converter denoted as (B26), the fourth inductor may be electrically coupled between the third and fourth switching nodes, and the fourth freewheeling device may be adapted to provide a path for current flowing through both of the third and fourth inductors when the fourth control switching device is in its non-conductive state.

(B28) In any of the power converters denoted as (B25) through (B27), the first and third inductors may be part of a common coupled inductor.

(B29) In any of the power converters denoted as (B1) through (B28), the first and second inductors may be part of a common magnetic device.

(B30) In the power converter denoted as (B29), the common magnetic device may include a magnetic core and first and second windings.

(B31) In the power converter denoted as (B30), the magnetic core and the first winding may collectively form the first inductor, and the magnetic core and the second winding may collectively form the second inductor.

(B32) In any of the power converters denoted as (B30) through (B32), the magnetic core may have opposing first and second outer portions.

(B33) In the power converter denoted as (B32), the magnetic core may have a center portion, the first winding may be disposed between the first outer portion and the center portion, and the second winding may be disposed between the center portion and the second outer portion.

(B34) In either of the power converters denoted as (B32) and (B33), the magnetic core may form first and second gaps in the first and second outer portions, respectively.

(B35) In the power converter denoted as (B34), the first and second gaps may have different respective thicknesses.

(B36) In the power converter denoted as (B34), the first gap may have a first thickness, and the second gap may have a second thickness that is smaller than the first thickness.

(B37) In any of the power converters denoted as (B30) through (B36), the first winding may have a first width, and the second winding may have a second width that is different from the first width.

(B38) In any of the power converters denoted as (B30) through (B36), the first winding may have first width, and the second winding may have a second width that is smaller than the first width.

(B39) In the power converter denoted as (B30), the first winding may form a first number of turns, and the second winding may form a second number of turns that is different from the first number of turns.

(B40) In the power converter denoted as (B30), the first winding may form a first number of turns, and the second winding may form a second number of turns that is greater than the first number of turns.

(B41) In either of the power converters denoted as (B39) or (B40), the first may winding may enclose a first area, and the second winding may enclose a second area having a different size than the first area.

(B42) In either of the power converters denoted as (B39) or (B40), the first winding may enclose a first area, and the second winding may enclose a second area that is smaller than the first area.

(B43) In any of the power converters denoted as (B39) through (B42), the magnetic core may be a monolithic magnetic core, and the first and second windings may be embedded in the monolithic magnetic core.

(B44) In the power converter denoted as (B29), the common magnetic device may include a magnetic core, a first single-turn winding, and at least two second single-turn windings.

(B45) In the power converter denoted as (B44), the magnetic core may include first and second magnetic elements, where the first single-turn winding is wound around the first magnetic element, and each second single-turn winding is wound around the second magnetic element.

(B46) In the power converter denoted as (B45), the magnetic core may further include a top magnetic element disposed over the first and second magnetic elements.

(B47) In the power converter denoted as (B46): (1) the first single-turn winding, the first magnetic element, and the top magnetic element may collectively form the first inductor, (2) the second single-turn windings may be electrically coupled in series, and (3) the second single-turn windings, the second magnetic element, and the top magnetic element may collectively form the second inductor.

(B48) In either of the power converters denoted as (B46) or (B47), the top magnetic element may be separated from the first magnetic element by a first gap, and the top magnetic element may be separated from the second magnetic element by a second gap, where the first gap has a thickness that is different from that of the second gap.

(B49) In either of the power converters denoted as (B46) or (B47), the top magnetic element may be separated from the first magnetic element by a first gap, and the top magnetic element may be separated from the second magnetic element by a second gap, where the first gap has a thickness that is greater than that of the second gap.

(B50) In any of the power converters denoted as (B45) through (B49), the first magnetic element may have a first cross-sectional area, the second magnetic element may have a second cross-sectional area, and the first cross-sectional area may be larger than the second cross-sectional area.

(B51) In the power converter denoted as (B44), the magnetic core may include first and second magnetic elements, and each of the first and second single-turn windings may be wound around the first magnetic element.

(B52) In the power converter denoted as (B51): (1) the first single-turn winding, the first magnetic element, and the second magnetic element may collectively form the first inductor, (2) the second single-turn windings may be electrically coupled in series, and (3) the second single-turn windings, the first magnetic element, and second magnetic element may collectively form the second inductor.

(B53) In either of the power converters denoted as (B51) or (B52): (1) the magnetic core may include opposing first and second outer portions and a middle portion between the outer portions, (2) the first single-turn winding may be disposed between the first outer portion and the center portion, and (3) the second single-turn winding may be disposed between the center portion and the second outer portion.

(B54) In the power converter denoted as (B53): (1) the first magnetic element may be separated from the second magnetic element by a first gap in the first outer portion of the magnetic core, (2) the first magnetic element may be separated from the second magnetic element by a second gap in the second outer portion of the magnetic core, (3) the first and second gaps may have first and second thicknesses, respectively, and (4) the first thickness may be different from the second thickness.

(B55) In the power converter denoted as (B54), the first thickness may be larger than the second thickness.

(B56) In the power converter denoted as (B29), the first and second inductors may be part of a common coupled inductor.

(B57) In the power converter denoted as (B56): the second control switching device may include a control transistor; the second freewheeling device may include a freewheeling transistor; and the power converter may further include (1) a first additional transistor electrically coupled in series with the control transistor, the first additional transistor adapted to prevent a body diode of the control transistor from conducting current in the first operating mode of the power converter, and (2) a second additional transistor electrically coupled in series with the freewheeling transistor, the second additional transistor adapted to prevent a body diode of the freewheeling transistor from conducting current in the first operating mode of the power converter.

(B58) In the power converter denoted as (B57), the first and second additional transistors may be further adapted to continuously operate in their conductive states in the second operating mode of the power converter.

(B59) In either of the power converters denoted as (B57) or (B58), the first and second additional transistors may be further adapted to continuously operate in their non-conductive states in the first operating mode of the power converter.

(B60) In any of the power converters denoted as (B56) through (B59), the common coupled inductor may include first and second magnetic elements, and at least two windings wound around the first magnetic element.

(B61) In the power converter denoted as (B60), the first inductor may include at least two single-turn windings electrically coupled in parallel and wound around the first magnetic element.

(B62) In either of the power converters denoted as (B60) or (B61), the second inductor may include at least two single-turn windings electrically coupled in series and wound around the first magnetic element.

(B63) In any of the power converters denoted as (B1) through (B27), the first and second inductors may be part of a common magnetic device denoted as any one of (E1) through (E12) below, where: (1) the one or more first windings and the magnetic core collectively form the first inductor, and (2) the one or more second windings and the magnetic core collectively form the second inductor (B64) In any of the power converters denoted as (B1) through (B27), the first and second inductors may be part of a common magnetic device denoted as any one of (F1) through (F4) below, where: (1) the plurality of first windings and the magnetic core collectively form the first inductor, and (2) the second winding and the magnetic core collectively form the second inductor.

(B65) In any of the power converters denoted as (B1) through (B27), the first and second inductors may be part of a common magnetic device denoted as any one of (G1) through (G7) below, where: (1) the one or more first windings and the magnetic core collectively form the first inductor, and (2) the one or more second windings and the magnetic core collectively form the second inductor.

(C1) A power converter may include N first inductors, M second inductors, N first control switching devices, N first freewheeling devices, M second control switching devices, and M second freewheeling devices. N may be an integer greater than one, and M may be an integer greater than or equal to one and less than or equal to N. Each of the N first control switching devices may be electrically coupled between a first power node and a respective one of the N first inductors, and each of the M second control switching devices may be electrically coupled between the first power node and a respective one of the M second inductors. Each of the N first control switching devices may be adapted to: (1) repeatedly switch between its conductive and non-conductive states in a first operating mode of the power converter, and (2) operate in its non-conductive state in a second operating mode of the power converter. Each of the M second control switching devices may be adapted to: (1) operate in its non-conductive state in the first operating mode of the power converter, and (2) repeatedly switch between its conductive and non-conductive states in the second operating mode of the power converter. Each of the N first freewheeling devices may be adapted to provide a path for current flowing through a respective one of the N first inductors when the first control switching device electrically coupled to the first inductor is in its non-conductive state, in the first operating mode of the power converter. Each of the M second freewheeling devices may be adapted to provide a path for current flowing through a respective one of the M second inductors when the second control switching device electrically coupled to the second inductor is in its non-conductive state.

(C2) In the power converter denoted as (C1), at least two of the N first inductors may be part of a common coupled inductor.

(C3) In either of the power converters denoted as (C1) or (C2), each of the M second inductors may be electrically coupled in series with a respective one of the N first inductors, and each of the M second freewheeling devices may be adapted to provide a path for current flowing through both a respective one of the N first inductors and a respective one of the M second inductors when the second control switching device electrically coupled to the second inductor is in its non-conductive state.

(C4) In any of the power converters denoted as (C1) through (C3), each of the N first inductors may be electrically coupled between an output power node and a respective one of the N first control switching devices, and the power converter may further include a capacitor electrically coupled to the output power node.

(C5) In the power converter denoted as (C4), the N first control switching devices, the N first inductors, the N first freewheeling devices, and the capacitor may collectively form at least part of N first buck sub-converters.

(C6) In the power converter denoted as (C5), at least one of the N first buck sub-converters may be operable to operate in a discontinuous conduction mode during at least one of the first and second operating modes of the power converter.

(C7) In any of the power converters denoted as (C4) through (C6), the M second control switching devices, the M second freewheeling devices, and the M second inductors may collectively form part of M second buck sub-converters.

(C8) In the power converter denoted as (C7), at least one of the M second buck sub-converters may be operable to operate in a discontinuous conduction mode during the second operating mode of the power converter.

(C9) Any of the power converters denoted as (C1) through (C8) may further include a master controller for at least partially controlling at least the N first control switching devices.

(C10) In the power converter denoted as (C9), the master controller may include the M second control switching devices.

(C11) Either of the power converters denoted as (C9) or (C10) may further include at least one slave integrated circuit, separate from the master controller, including the N first control switching devices.

(C12) In any of the power converters denoted as (C1) through (C11), the first power node may be selected from the group consisting of an input power node and a common power node.

(C13) In the power converter denoted as (C12), the common power node may be a ground node.

(C14) In any of the power converters denoted as (C1) through (C13), each of the N first control switching devices may include a first transistor, and each of the M second control switching devices may include a second transistor.

(C15) In any of the power converters denoted as (C1) through (C14), the first operating mode may correspond to a moderate or heavy load operating condition of the power converter, and the second operating mode may correspond to a light load operating condition of the power converter.

(C16) In any of the power converters denoted as (C1) through (C15), each of the N first freewheeling devices may include a first freewheeling switching device electrically coupled between a respective one of the N first inductors and a second power node, each of the M second freewheeling devices may include a second freewheeling switching device electrically coupled between a respective one of the M second inductors and the second power node, and the second power node may be selected from the group consisting of a common power node and an output power node.

(C17) In any of the power converters denoted as (C1) through (C15), each of the N first freewheeling devices may include a first freewheeling diode electrically coupled between a second power node and a respective one of the N first inductors, each of the M second freewheeling devices may include a second freewheeling diode electrically coupled between the second power node and a respective one of the M second inductors, and the second power node may be selected from the group consisting of a common power node and an output power node.

(C18) In any of the power converters denoted as (C1) through (C17), at least one of the N first inductors and at least one of the M second inductors may be part of a common coupled inductor.

(C19) In the power converter denoted as (C18): each of the M second control switching devices may include a control transistor; each of the M second freewheeling devices may include a freewheeling transistor; and the power converter may further include (1) M first additional transistors, where each of the M first additional transistors is electrically coupled in series with a respective control transistor and adapted to prevent a body diode of the control transistor from conducting current in the first operating mode of the power converter, and (2) M second additional transistors, where each of the M second additional transistors is electrically coupled in series with a respective freewheeling transistor and adapted to prevent a body diode of the freewheeling transistor from conducting current in the first operating mode of the power converter.

(C20) In the power converter denoted as (C19), each of the M first and second additional transistors may be further adapted to continuously operate in its conductive state in the second operating mode of the power converter.

(C21) In either of the power converters denoted as (C19) or (C20), each of the M first and second additional transistors may be further adapted to continuously operate in its non-conductive state in the first operating mode of the power converter.

(D1) A method for transferring power from an input power port to an output power port using a first and a second switching sub-converter may include the following steps: (1) in a first operating mode, operating the first switching sub-converter to transfer power from the input power port to the output power port, while operating the second switching sub-converter in an inactive mode; and (2) in a second operating mode, operating the second switching sub-converter to transfer power from the input power port to the output power port, while operating the first switching sub-converter in an inactive mode.

(D2) In the method denoted as (D1): (1) the step of operating the first switching sub-converter to transfer power from the input power port to the output power port may include causing a first control switching device electrically coupled between a power node and a first inductor to repeatedly switch between its conductive and non-conductive states; and (2) the step of operating the first switching sub-converter in an inactive mode may include causing the first control switching device to remain in its non-conductive state.

(D3) In the method denoted as (D2): (1) the step of operating the second switching sub-converter to transfer power from the input power port to the output power port may include causing a second control switching device electrically coupled between the power node and a second inductor to repeatedly switch between its conductive and non-conductive states; and (2) the step of operating the second switching sub-converter in an inactive mode may include causing the second control switching device to remain in its non-conductive state.

(D4) In the method denoted as (D1), the step of operating the second switching sub-converter to transfer power from the input power port to the output power port may include using energy storage inductance of the first switching sub-converter and energy storage inductance of the second switching sub-converter to transfer power from the input power port to the output power port.

(D5) Any of the methods denoted as (D1) through (D4) may further include powering an information technology device processor from the output power port.

(D6) Any of the methods denoted as (D1) through (D5) may further include switching between the first and second operating modes in response to a signal provided by, or associated with, the processor.

(D7) In the method denoted as (D6), the signal may be a processor sleep signal.

(D8) In any of the methods denoted as (D1) through (D7), the first operating mode may correspond to a moderate or heavy load operating condition, and the second operating mode may correspond to a light load operating condition.

(E1) A magnetic device may include: (1) a magnetic core, (2) one or more first windings wound around at least a portion of the magnetic core, each of the one or more first windings forming a respective first turn around a respective first winding center axis, and (3) one or more second windings wound around at least a portion of the magnetic core, each of the one or more second windings forming a respective second turn around a common second winding center axis that is orthogonal to each first winding center axis.

(E2) In the magnetic device denoted as (E1), at least one first winding and at least one second winding may be wound around a common portion of the magnetic core.

(E3) In either of the magnetic devices denoted as (E1) or (E2), the one or more second windings may at least partially enclose the one or more first windings.

(E4) In any of the magnetic devices denoted as (E1) through (E3), the one or more first windings may include a plurality of first windings separated from each other along a width of the magnetic device.

(E5) In any of the magnetic devices denoted as (E1) through (E3), the one or more first windings may extend though the magnetic core, and the one or more second windings may be wrapped around top and side outer surfaces of the magnetic core.

(E6) The magnetic device denoted as (E5) may further include a top magnetic plate disposed on the magnetic core, such that portions of the one or more second windings are sandwiched between the top outer surface of the magnetic core and the top magnetic plate.

(E7) The magnetic device denoted as (E5) may further include first and second side magnetic plates respectively disposed on opposing first and second side outer surfaces of the magnetic core, such that: (1) first portions of the one or more second windings are sandwiched between the first side outer surface of the magnetic core and the first side magnetic plate; and (2) second portions of the one or more second windings are sandwiched between the second side outer surface of the magnetic core and the second side magnetic plate.

(E8) In any of the magnetic devices denoted as (E1) through (E3): (1) the magnetic device may have depth and width, (2) each of the one or more first windings may extend through the magnetic core in the width direction, and (3) each of the one or more second windings may extend through the magnetic core in the depth direction.

(E9) In any of the magnetic devices denoted as (E1) through (E3), the magnetic core may be a monolithic magnetic core, and each first turn and each second turn may be embedded in the monolithic magnetic core.

(E10) In any of the magnetic devices denoted as (E1) through (E3): (1) the magnetic core may include first and second end magnetic elements and a plurality of rungs, each rung joining the first and second end magnetic elements, and (2) the one or more first windings may include a respective first winding wound around each of the plurality of rungs.

(E11) In the magnetic device denoted as (E10), the one or more second windings may be wound around the first and second end magnetic elements.

(E12) The magnetic device denoted as (E11) may further include a top magnetic element disposed over at least a portion of the first end magnetic element and a least a portion of the second end magnetic element, where portions of the one or more second windings are sandwiched between the first and second end magnetic elements and the top magnetic element.

(F1) A magnetic device may include: (1) a magnetic core, (2) a plurality of first windings forming respective first winding turns around respective portions of the magnetic core, and (3) a second winding forming a second winding turn around a portion of the magnetic core, where each of the plurality of first winding turns is within the second winding turn, as seen when the magnetic device is viewed cross-sectionally in a first direction.

(F2) In the magnetic device denoted as (F1): (1) each first winding turn may enclose a respective first area, as seen when the magnetic device is viewed cross-sectionally in the first direction, (2) each first area may be non-overlapping with other first area, as seen when the magnetic device is viewed cross-sectionally in the first direction, (3) the second winding turn may enclose a second area, as seen when the magnetic device is viewed cross-sectionally in the first direction; and (4) the second area may overlap each first area.

(F3) In either of the magnetic devices denoted as (F1) or (F2): (1) the magnetic core may include first and second end magnetic elements and a plurality of rungs, each rung joining the first and second end magnetic elements; (2) each first winding turn may be wound around a respective one of the plurality of rungs, and (3) the second winding turn may be wound around all of the plurality of rungs.

(F4) In either of the magnetic devices denoted as (F1) or (F2), the magnetic core may be a monolithic magnetic core, and each first winding turn and each second winding turn may be embedded in the monolithic magnetic core.

(G1) A magnetic device may include: (1) a magnetic core, (2) one or more first windings wound around respective portions of the magnetic core, and (3) one or more second windings wound around respective portions of the magnetic core, where the one or more first windings are magnetically isolated from the one or more second windings.

(G2) In the magnetic device denoted as (G1): (1) the magnetic core may include first, second, and third magnetic elements, where the third magnetic element is disposed on both of the first and second magnetic elements in a first direction, (2) the one or more first windings may be wound around the first magnetic element, (3) the one or more second windings may be wound around the second magnetic element, and (4) the first and second magnetic elements may be at least partially separated from each other in a second direction by a material having a lower magnetic permeability than material forming the first, second, and third magnetic elements, where the second direction is orthogonal to the first direction.

(G3) In magnetic device denoted as (G1): (1) the magnetic core may include a first rail, a second rail, a third rail, a plurality of rungs, and a center post, (2) each of the plurality of rungs may join the first and second rails in a first direction, (3) the center post may join the first and third rails in the first direction, (4) each of the one or more first windings may be wound around a respective one of the plurality of rungs, (5) the one or more second windings may be wound around the center post, and (6) the second and third rails may be separated from each other in a second direction by a material having a lower magnetic permeability than material forming the first, second, and third rails, the second direction being orthogonal to the first direction.

(G4) In magnetic device denoted as (G1): (1) the magnetic core may be a monolithic magnetic core, (2) the one or more first windings may be embedded in a first portion of the monolithic magnetic core, (3) the one or more second windings may be embedded in a second portion of the monolithic magnetic core, and the magnetic device may further include one or more non-magnetic structures embedded in the monolithic magnetic core and separating the first portion of the monolithic magnetic core from the second portion of the monolithic magnetic core.

(G5) In magnetic device denoted as (G1): (1) the magnetic core may include opposing first and second outer portions and a middle portion between the outer portions, (2) the one or more first windings may be disposed between first outer portion and the center portion, (3) the one or more second windings may be disposed between the center portion and the second outer portion, (4) the magnetic core may form a first gap in the first outer portion, and (5) the magnetic core may form a second gap in second outer portion.

(G6) In magnetic device denoted as (G5), a thickness of the first gap may be greater than a thickness of the second gap.

(G7) In magnetic device denoted as (G1): (1) the magnetic core may be a monolithic magnetic core, (2) the one or more first windings may include a first winding embedded in the monolithic magnetic core, where the first winding encloses a first area as seen when the magnetic device is viewed cross-sectionally in a first direction, (3) the one or more second windings may include a second winding embedded in the monolithic magnetic core, where the second winding encloses a second area as seen when the magnetic device is viewed cross-sectionally in the first direction, and (4) an area of the monolithic magnetic core outside of the first and second areas, as seen when the magnetic device is viewed cross-sectionally in the first direction, may be greater than a sum of the first and second areas.

Changes may be made in the above methods and systems without departing from the scope hereof. For example, converter controllers can be modified such that converter first and second operating modes do not necessarily correspond to heavy and light load conditions, respectively. Therefore, the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A magnetic device, comprising:
   a plurality of magnetic film layers forming a magnetic core,
      one or more of the magnetic film layers having:
      (a) a plurality of first windings around a plurality of respective first axes in the magnetic core, the plurality of first windings enclosing a plurality of respective first areas, wherein a first space exists between each winding of the plurality of first windings in a horizontal dimension; and
      (b) a second winding around a second axis, the second winding enclosing the plurality of first windings, wherein a second space exists between the plurality of first windings and the second winding,
      wherein the first and second spaces comprise material with a smaller magnetic permeability than the magnetic core.

2. The magnetic device of claim 1, the plurality of first windings and the second winding implemented on two or more layers of the plurality of magnetic film layers and being electrically coupled between layers by vias in a height dimension.

3. The magnetic device of claim 1, the plurality of first windings and the second winding being made of conductive material.

4. The magnetic device of claim 3, the plurality of first windings and the second winding being made of conductive film.

5. The magnetic device of claim 1, wherein the first and second spaces comprise non-magnetic material.

6. The magnetic device of claim 1, wherein the plurality of first windings electrically couple to a switching sub-converter configured to drive a load.

7. The magnetic device of claim 1, wherein the second winding electrically couples to a switching sub-converter configured to drive a load.

8. The magnetic device of claim 1, the plurality of first windings comprising three or more windings.

* * * * *